(12) United States Patent
Uzawa et al.

(10) Patent No.: US 6,825,989 B2
(45) Date of Patent: Nov. 30, 2004

(54) ZOOM LENS

(75) Inventors: Tsutomu Uzawa, Hidaka (JP); Shinichi Mihara, Tama (JP); Yuko Kobayashi, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/441,107

(22) Filed: May 20, 2003

(65) Prior Publication Data
US 2003/0202257 A1 Oct. 30, 2003

Related U.S. Application Data

(63) Continuation of application No. 09/934,074, filed on Aug. 22, 2001, now Pat. No. 6,594,087.

(30) Foreign Application Priority Data

Aug. 22, 2000 (JP) ........................................ 2000-250577

(51) Int. Cl.[7] ............................................... G02B 15/14
(52) U.S. Cl. ...................................... 359/684; 359/685
(58) Field of Search ................................ 359/684, 685, 359/686, 687, 688

(56) References Cited

U.S. PATENT DOCUMENTS

| | | |
|---|---|---|
| 4,592,626 A | 6/1986 | Fujii |
| 5,134,524 A | 7/1992 | Hamano et al. |
| 5,532,881 A | 7/1996 | Nakatsuji et al. |
| 5,570,233 A | 10/1996 | Mihara et al. |
| 6,118,592 A | 9/2000 | Kohno et al. |
| 6,594,087 B2 * | 7/2003 | Uzawa et al. ............... 359/685 |
| 2002/0012174 A1 | 1/2002 | Horiuchi |

FOREIGN PATENT DOCUMENTS

| | | |
|---|---|---|
| JP | 8-5913 | 1/1996 |
| JP | 8-179213 | 7/1996 |
| JP | 10-039216 | 2/1998 |
| JP | 10-133109 | 5/1998 |

* cited by examiner

Primary Examiner—David N. Spector
(74) Attorney, Agent, or Firm—Pillsbury Winthrop LLP

(57) ABSTRACT

The invention relates to a zoom lens system which is compatible with a TTL optical finder having a diagonal field angle of at least 70° at the wide-angle end and about 7 to 10 magnifications and is fast as represented by an F-number of about 2.8 at the wide-angle end. The zoom lens system comprises a first lens group G1 which is movable along its optical axis during zooming and has positive refracting power, a second lens group G2 which moves toward the image side along the optical axis during zooming from the wide-angle end to the telephoto end and has negative refracting power and rear lens groups G3 to G6 having at least two spacings variable during zooming. In particular, the focal length $f_1$ of the first lens group G1 should meet $6<f_1/L<20$ where L is the diagonal length of an effective image pickup surface I located in the vicinity of an image-formation plane.

19 Claims, 69 Drawing Sheets

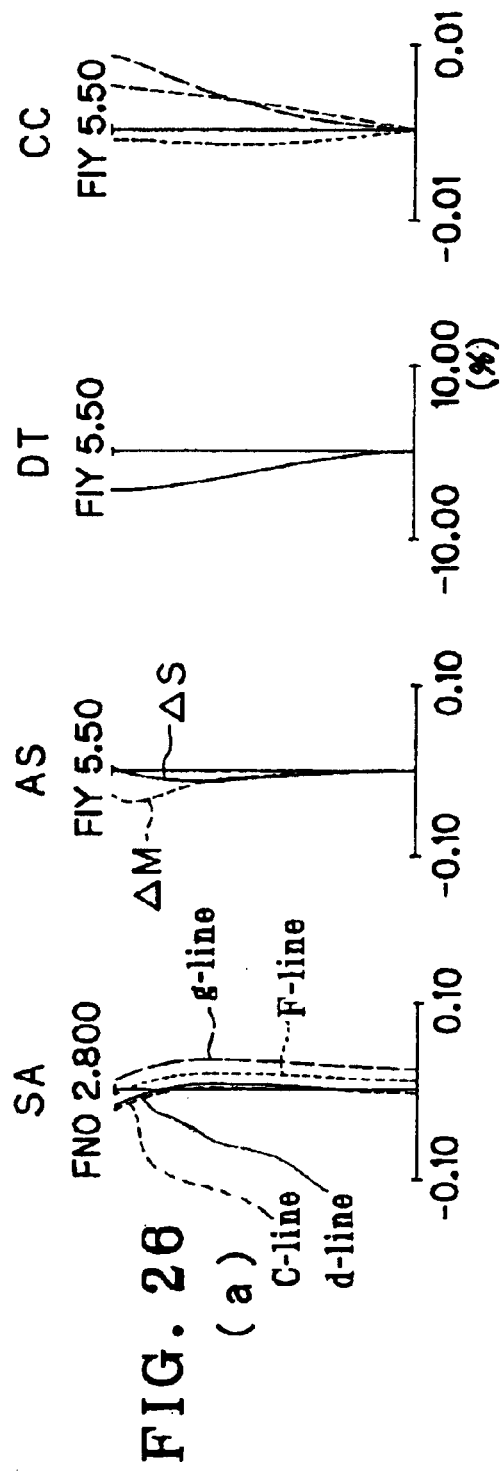
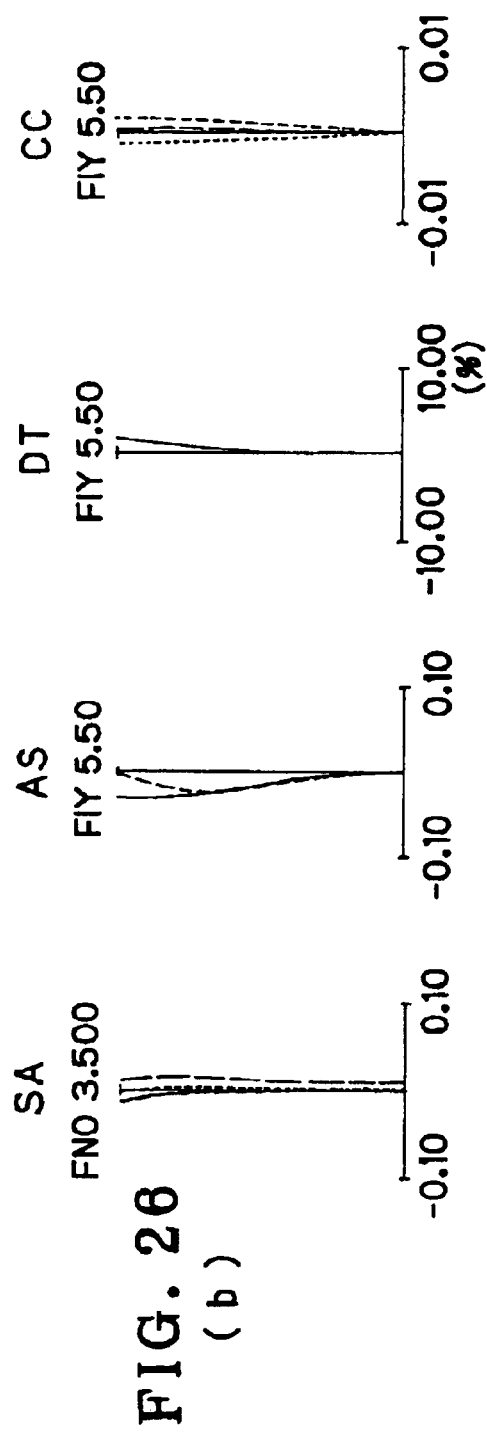
FIG. 26 (a)
FIG. 26 (b)

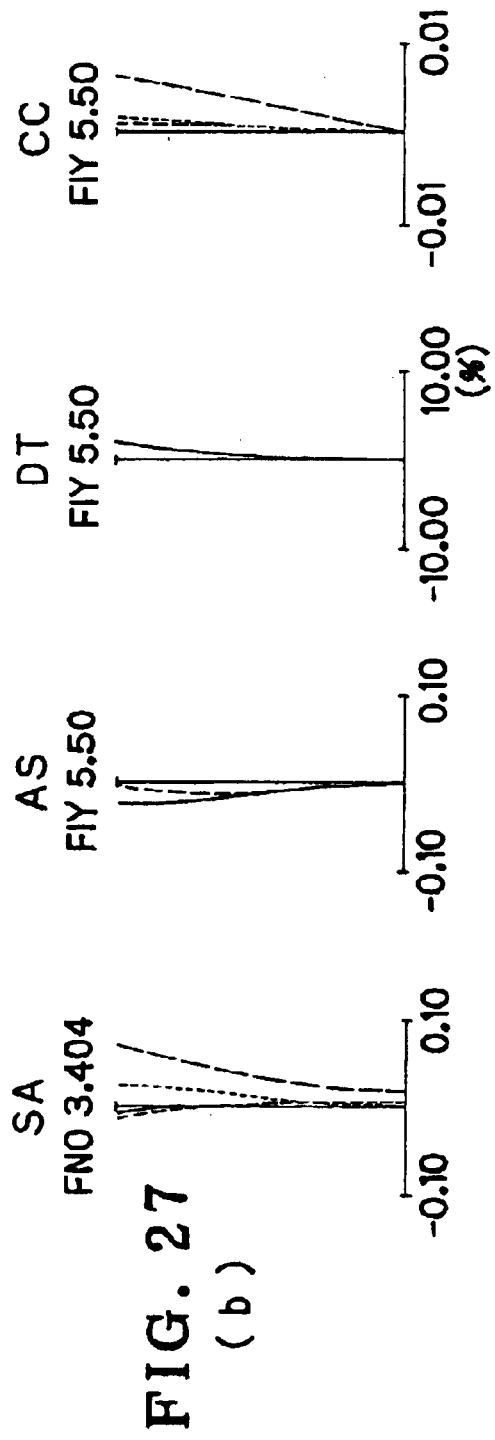

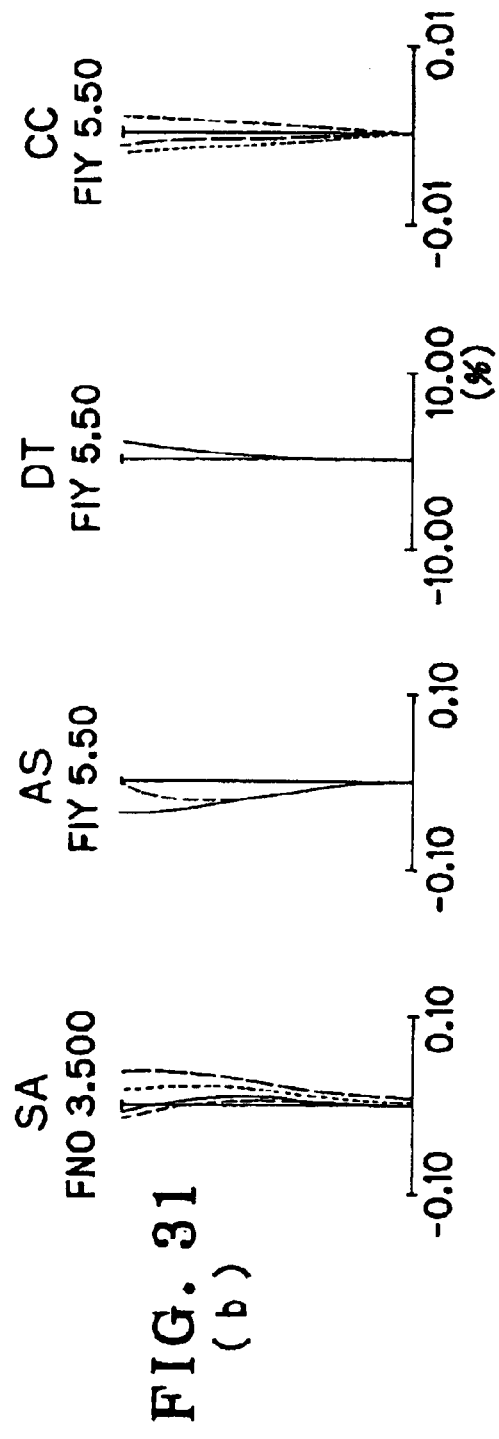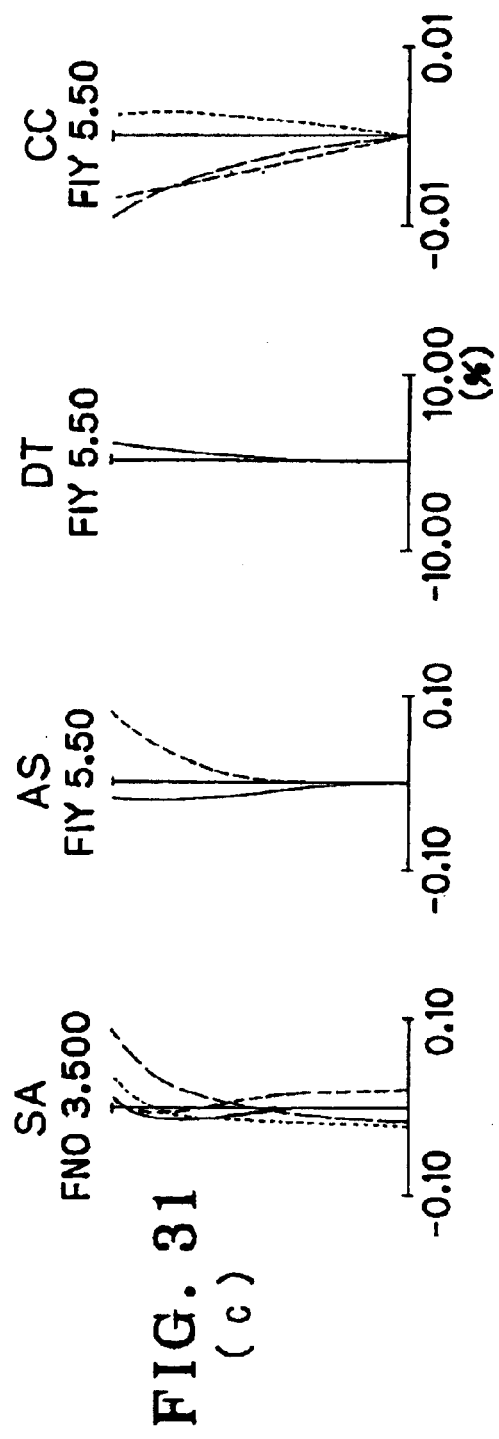

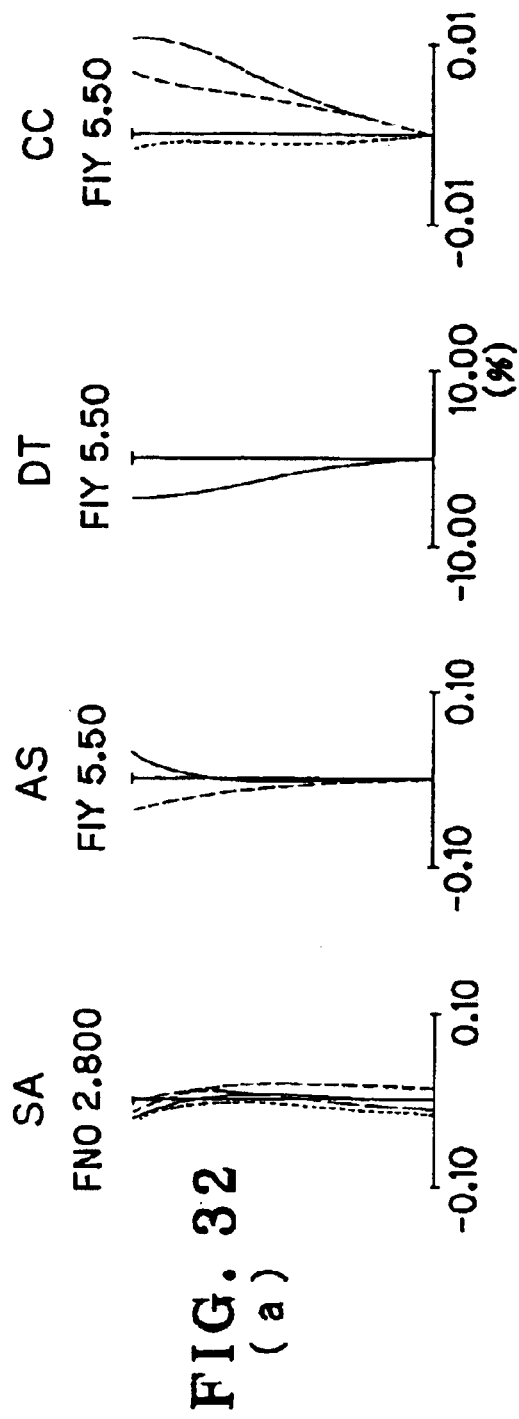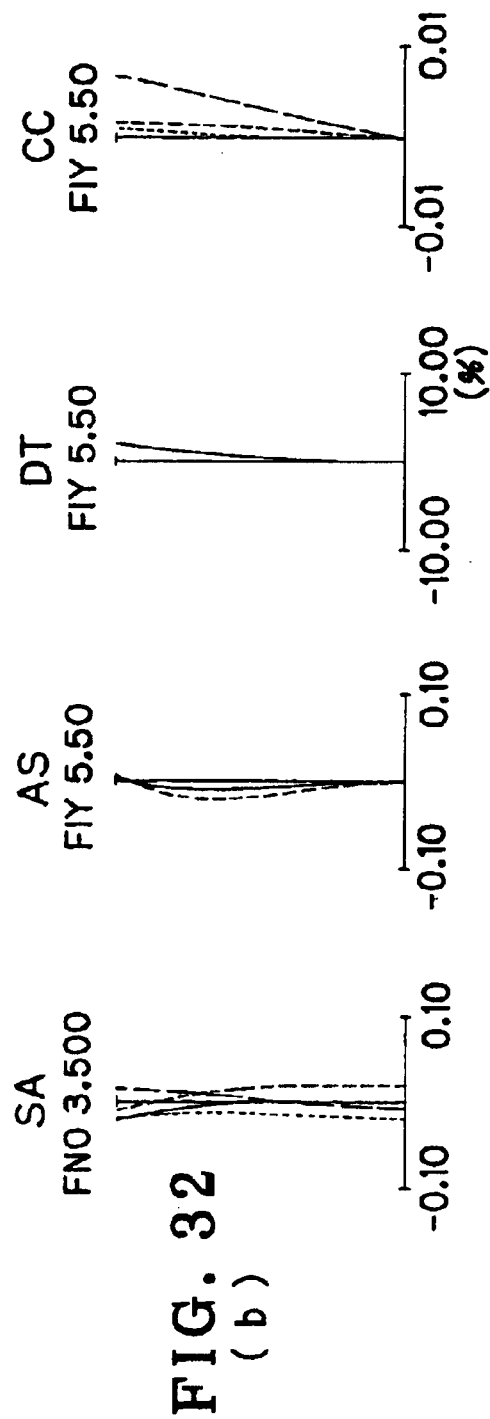

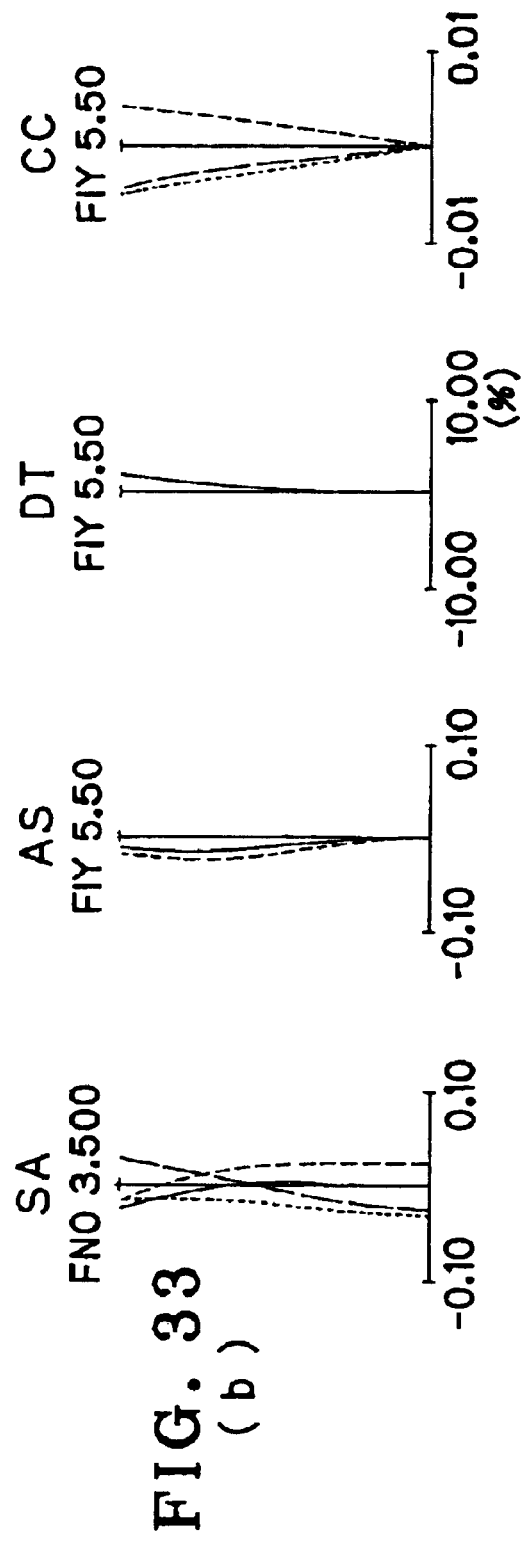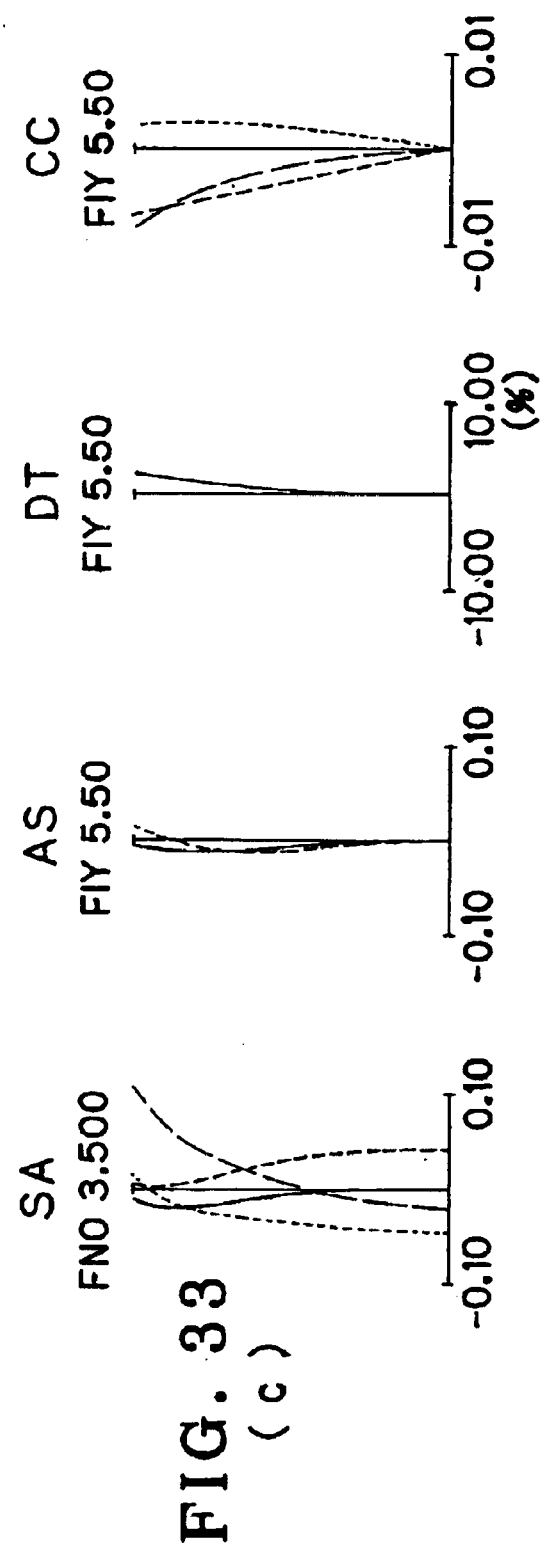
FIG. 33(b)
FIG. 33(c)

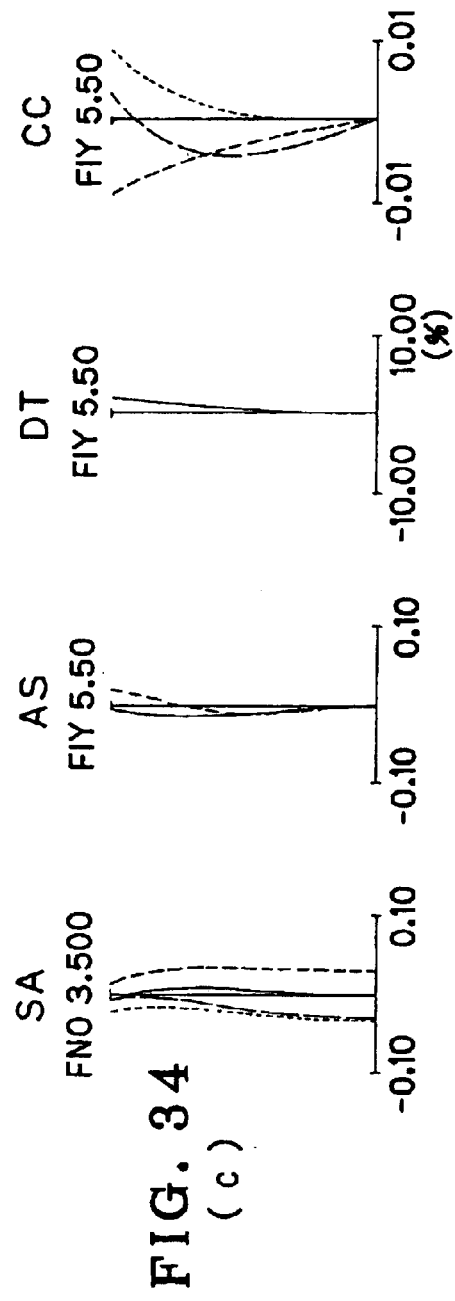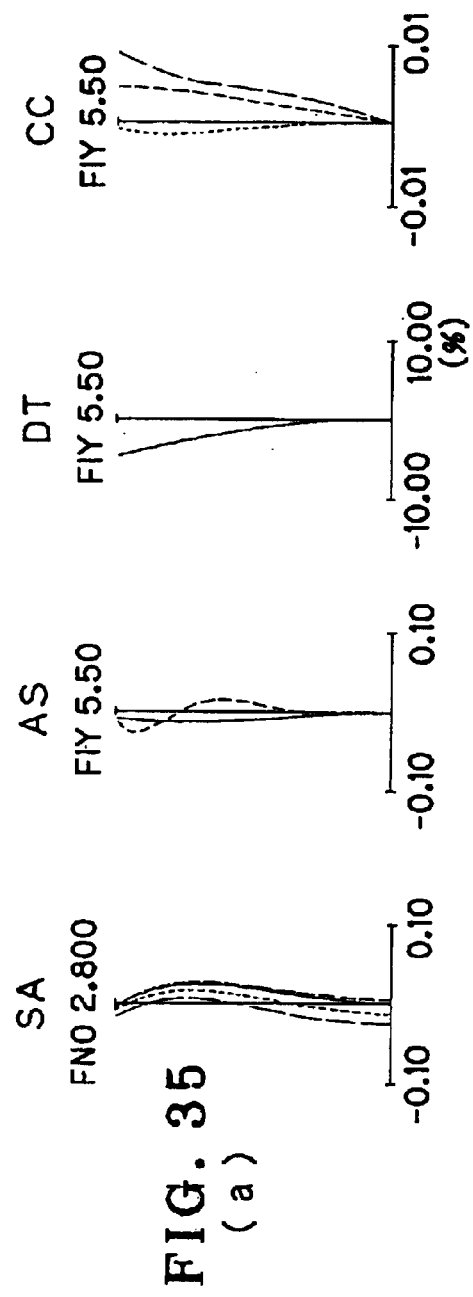

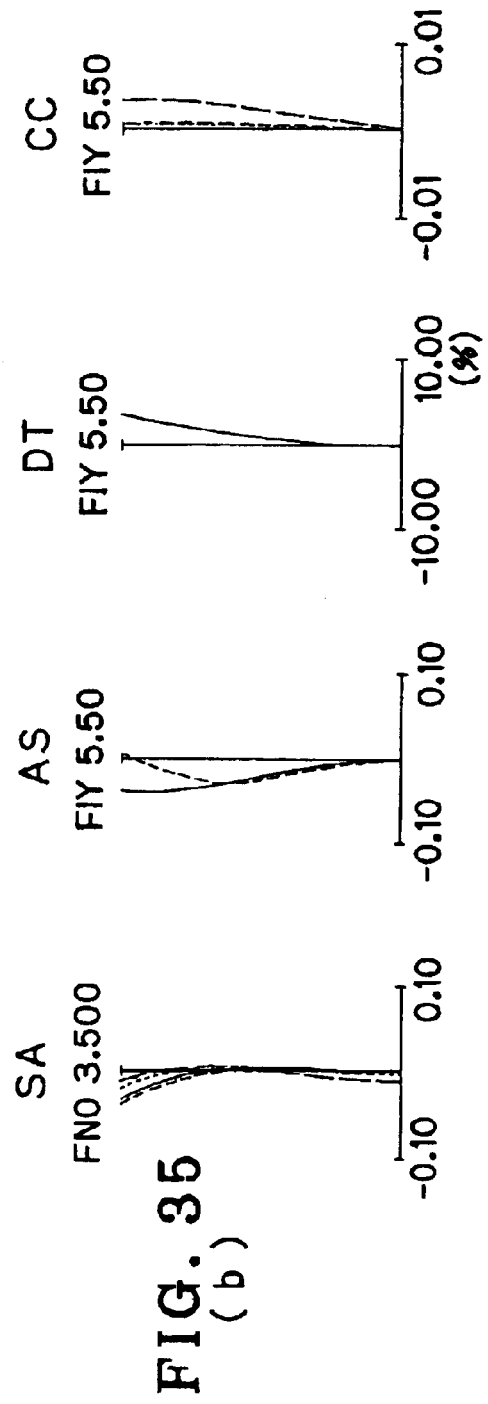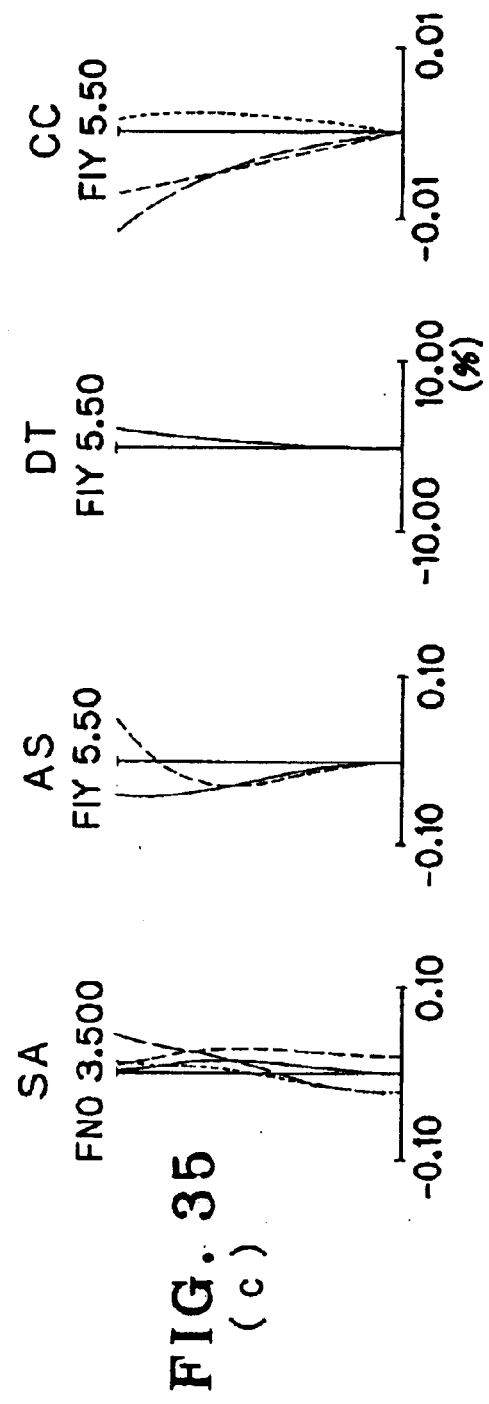
FIG. 35(b)
FIG. 35(c)

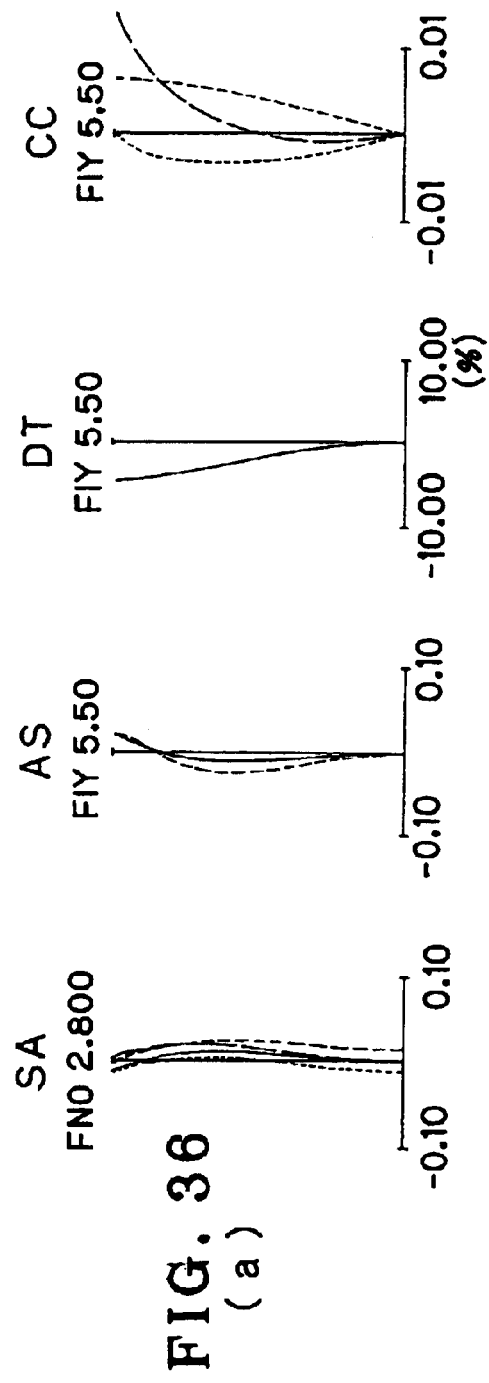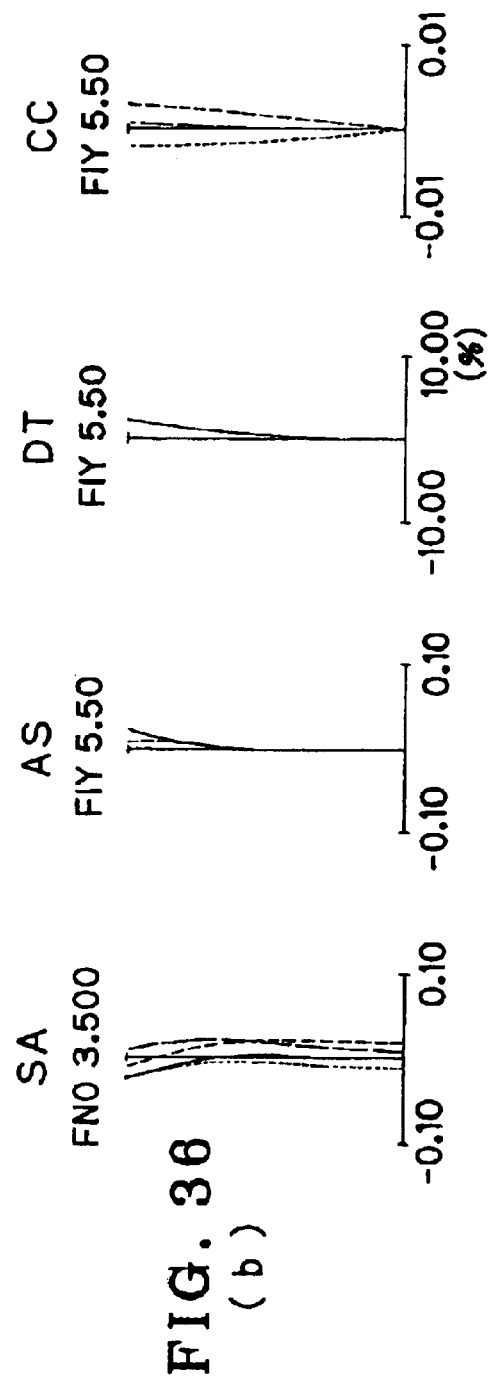

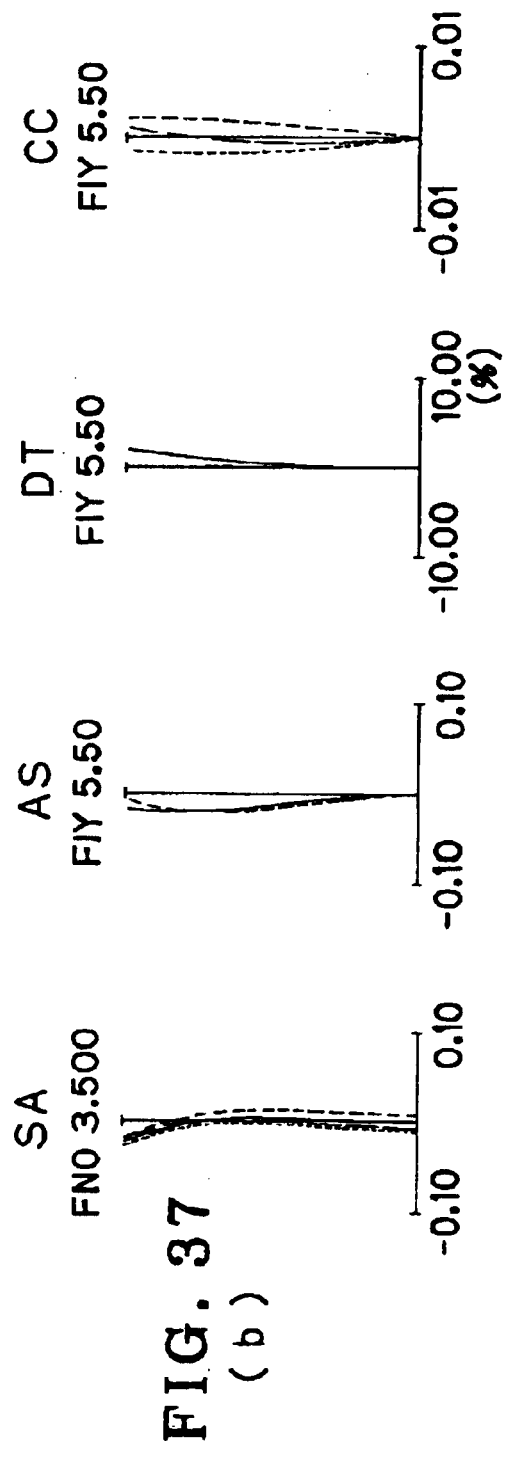
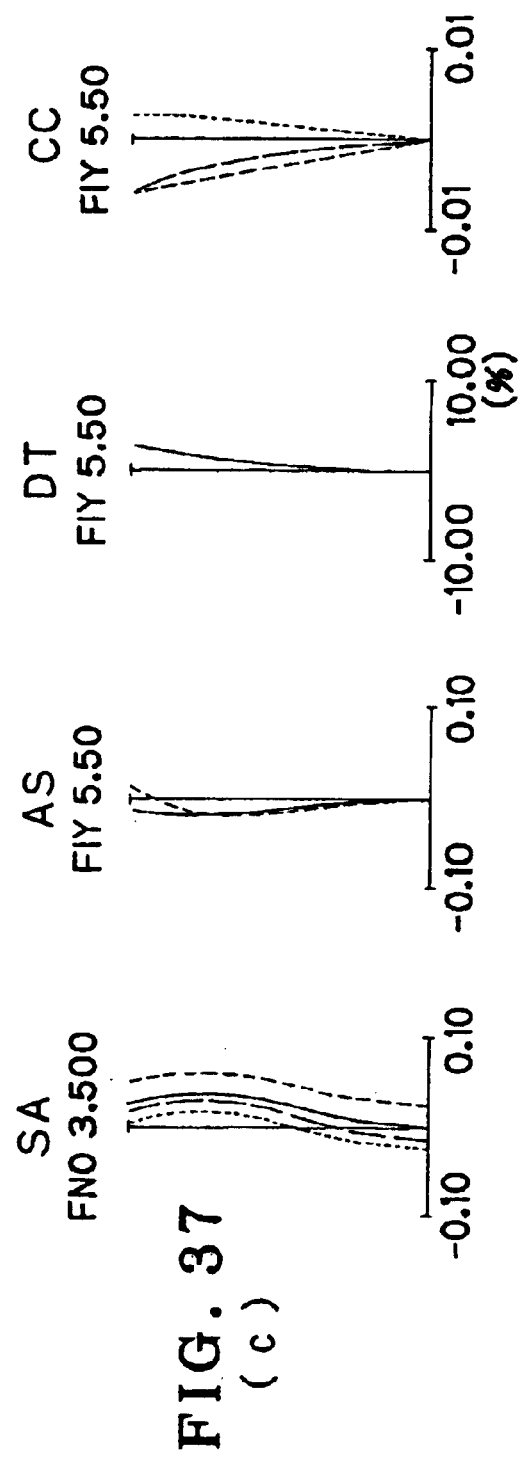
FIG. 37(b)
FIG. 37(c)

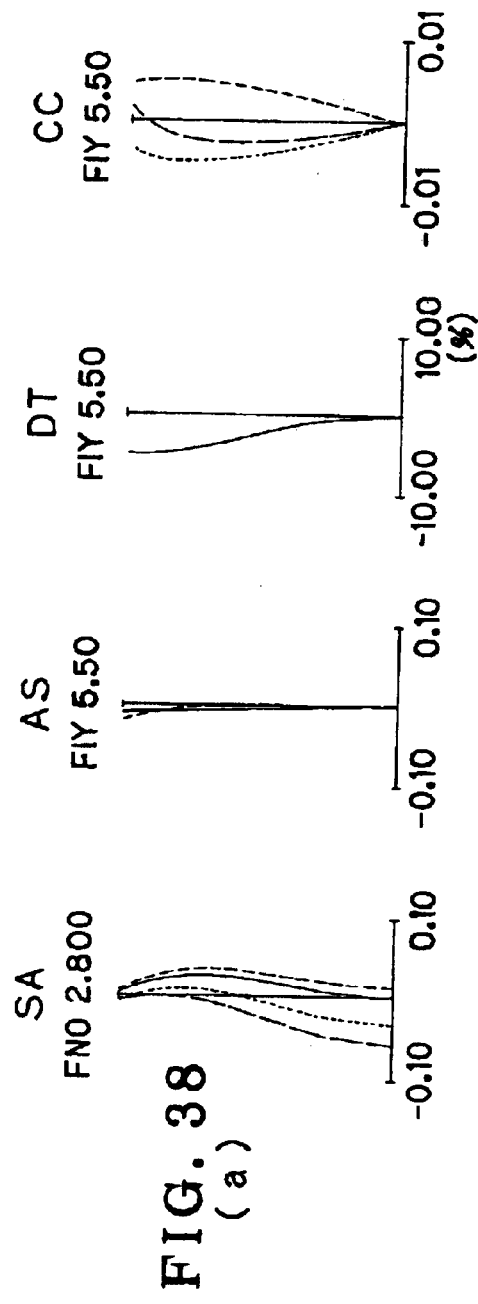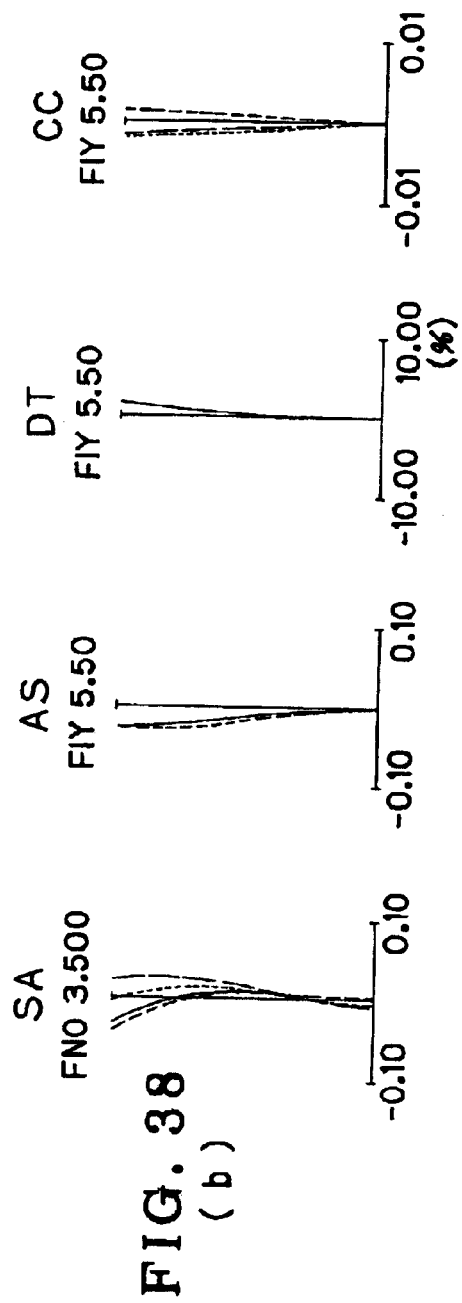

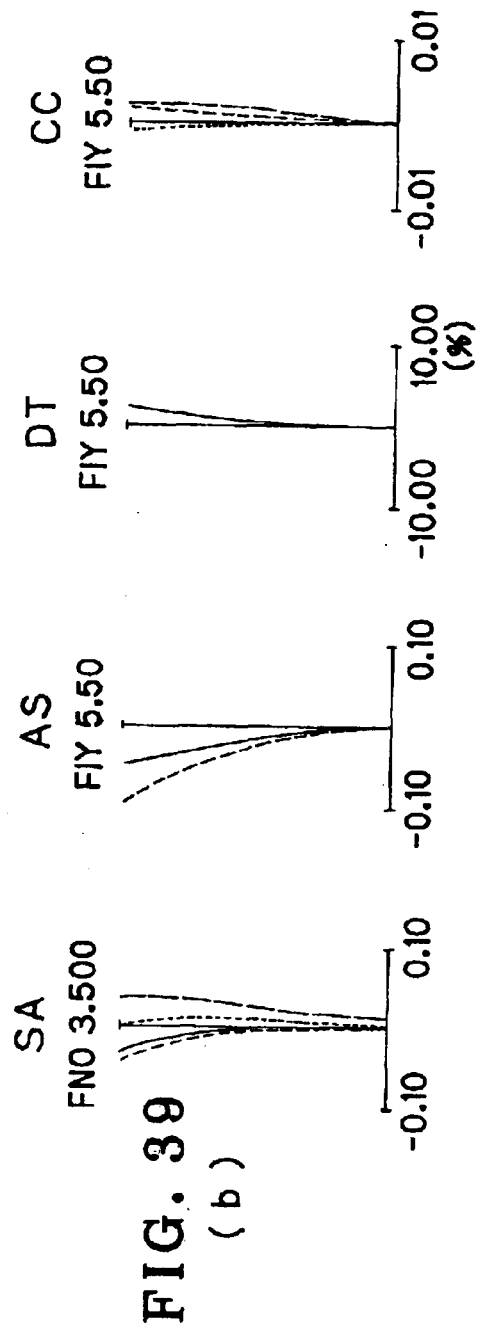
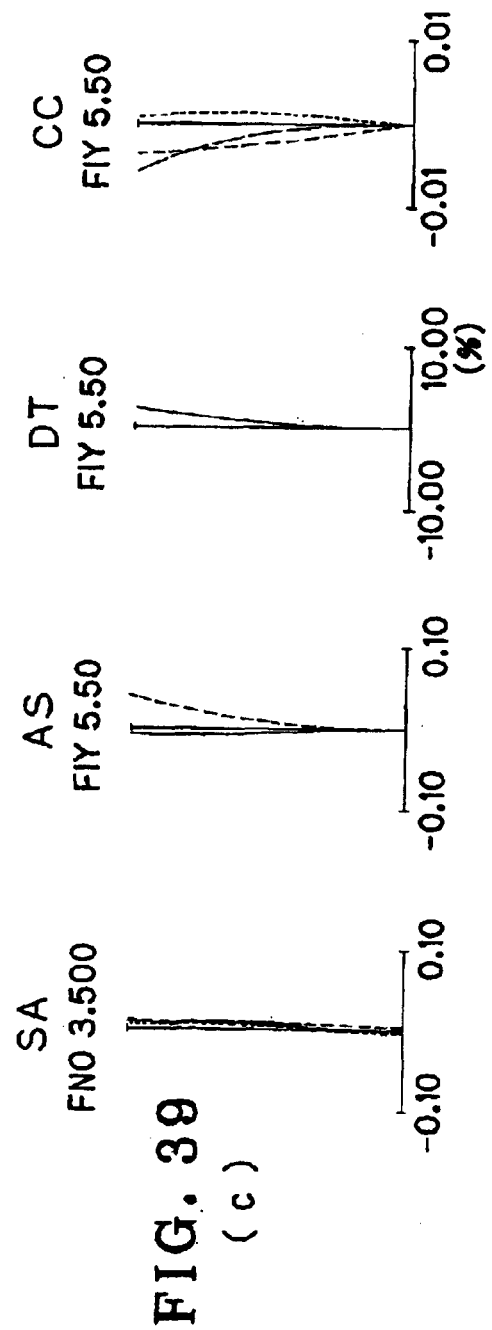
FIG. 39(b)
FIG. 39(c)

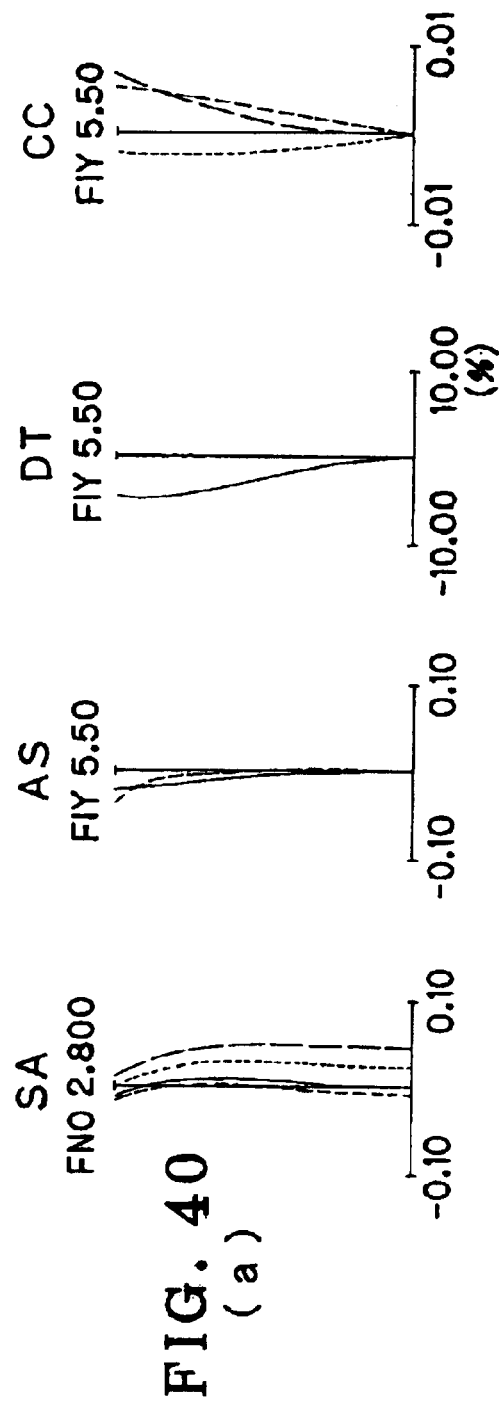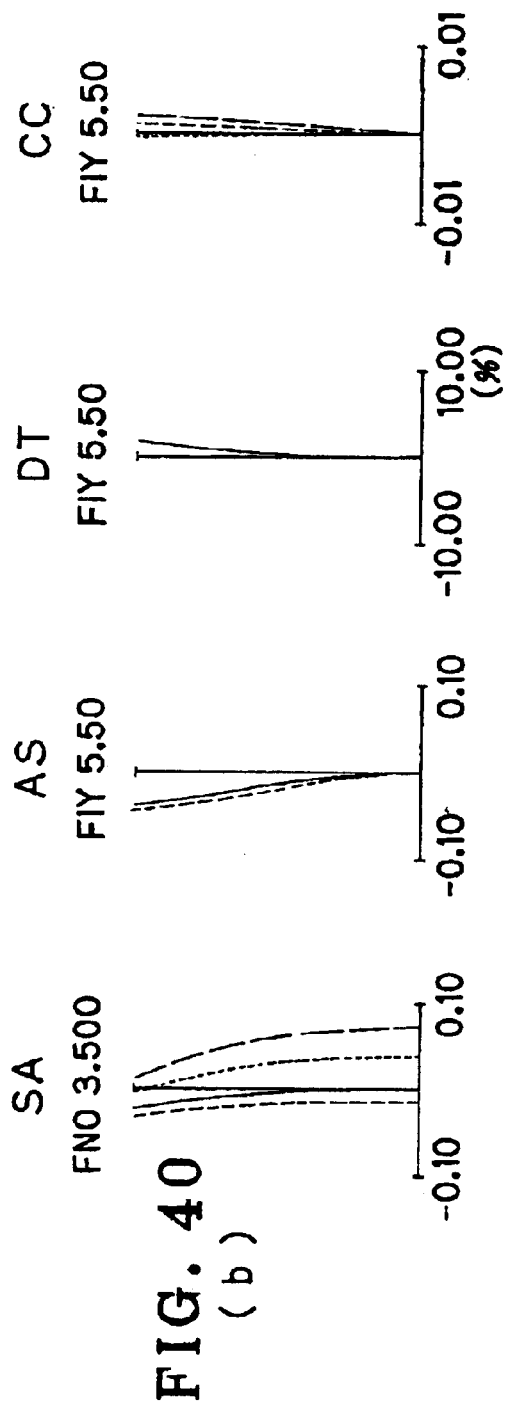
FIG. 40(a)
FIG. 40(b)

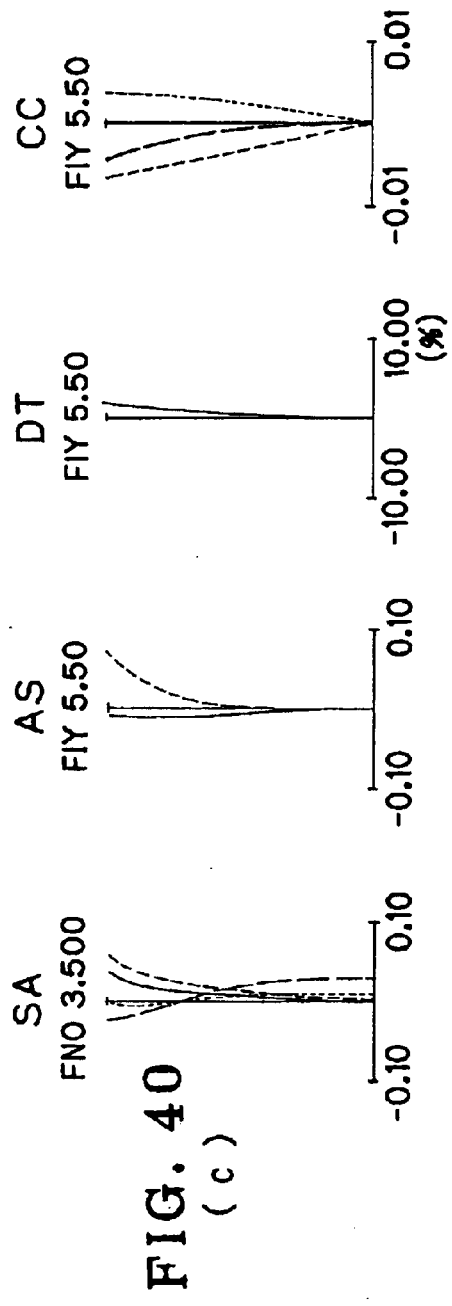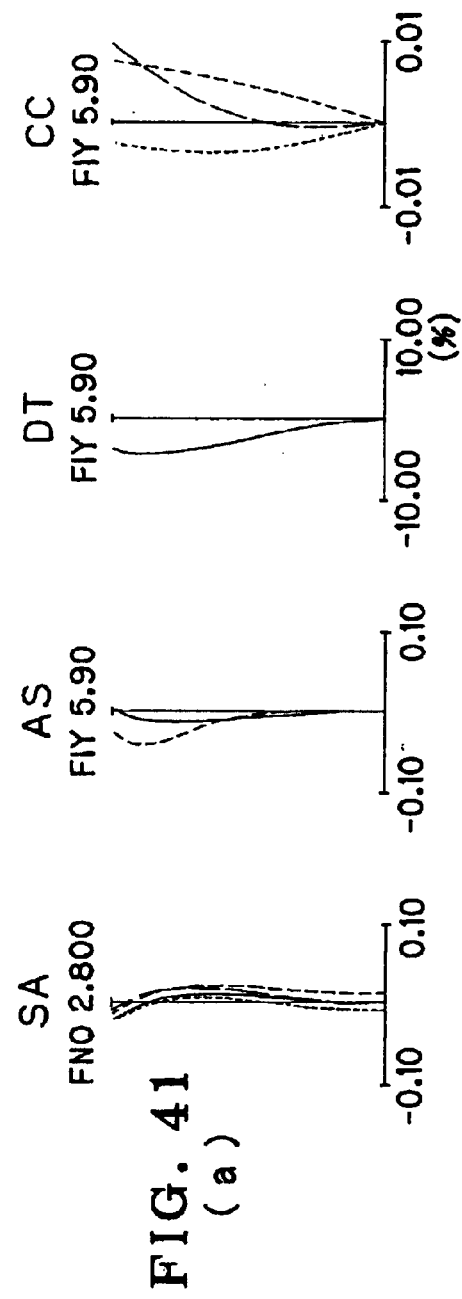

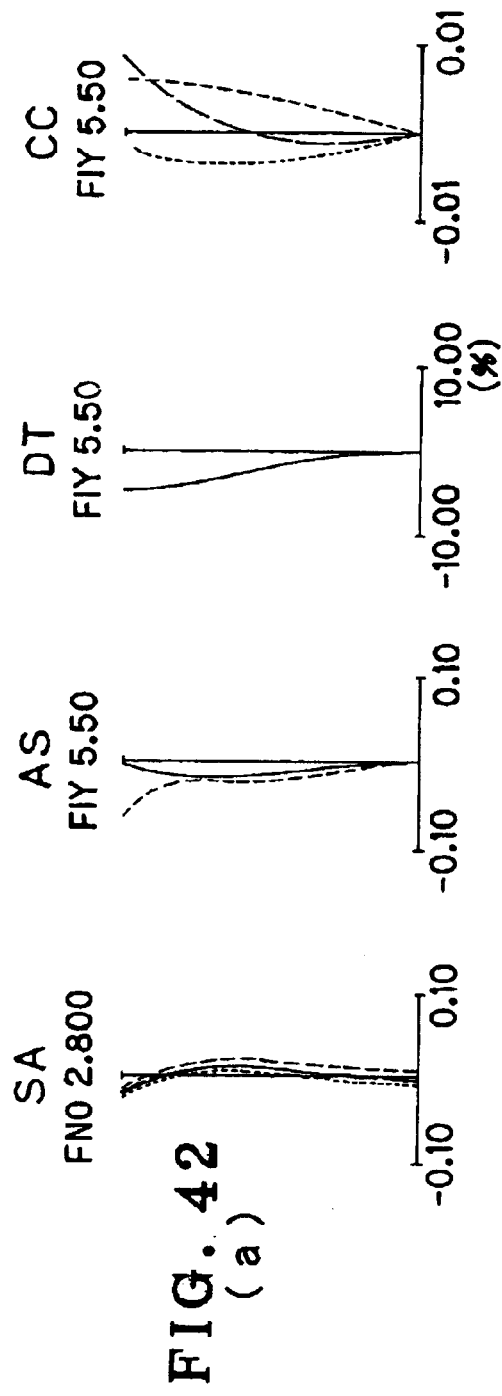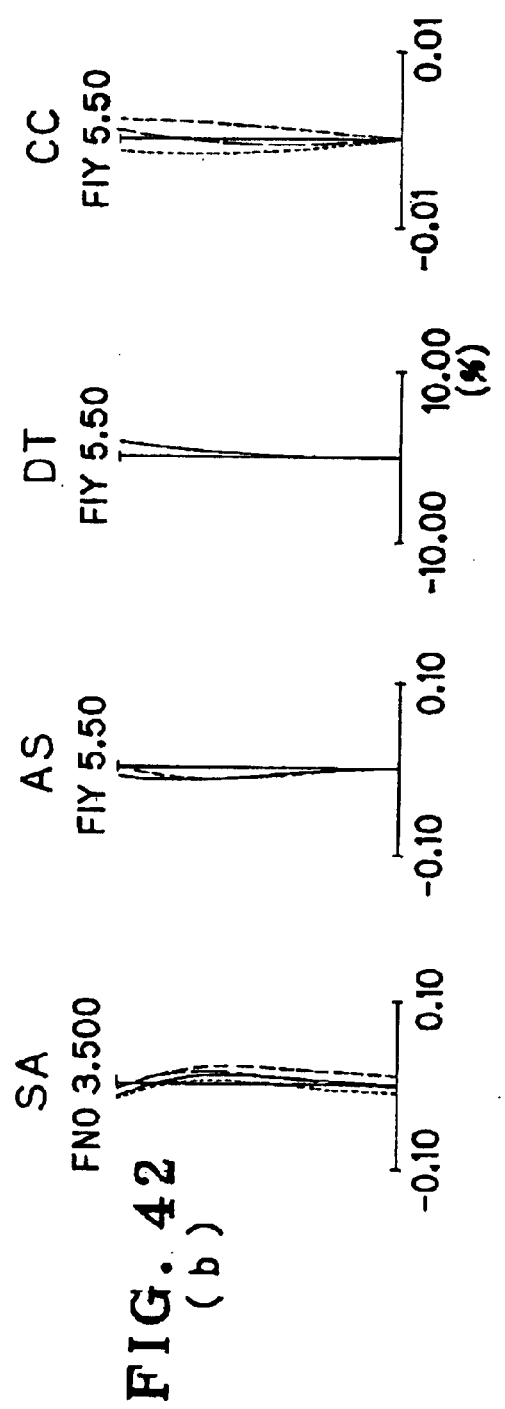
FIG. 42(a)
FIG. 42(b)

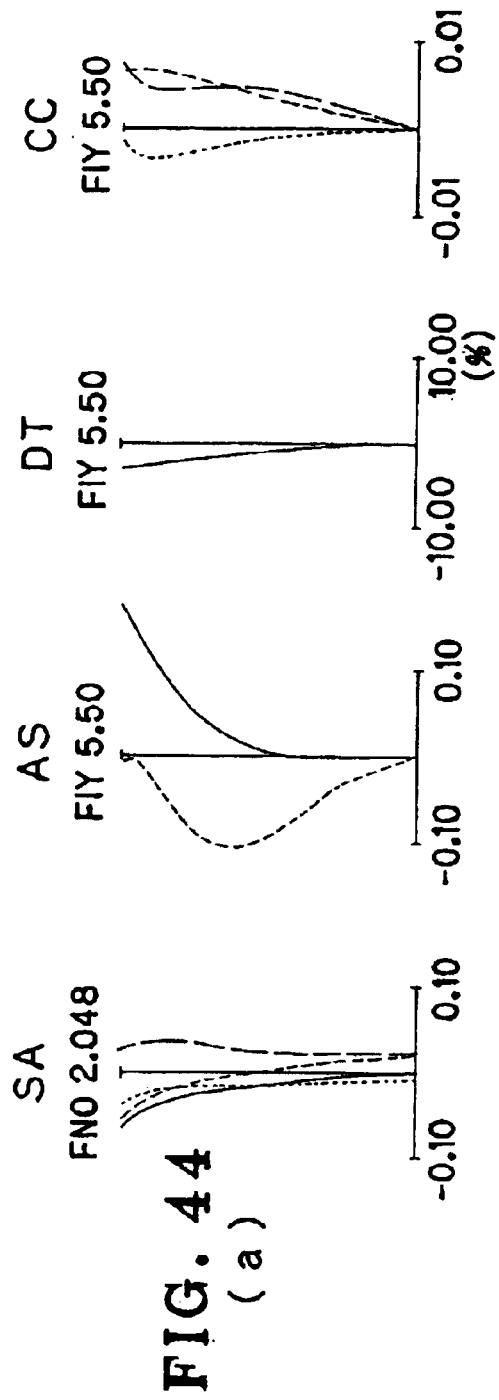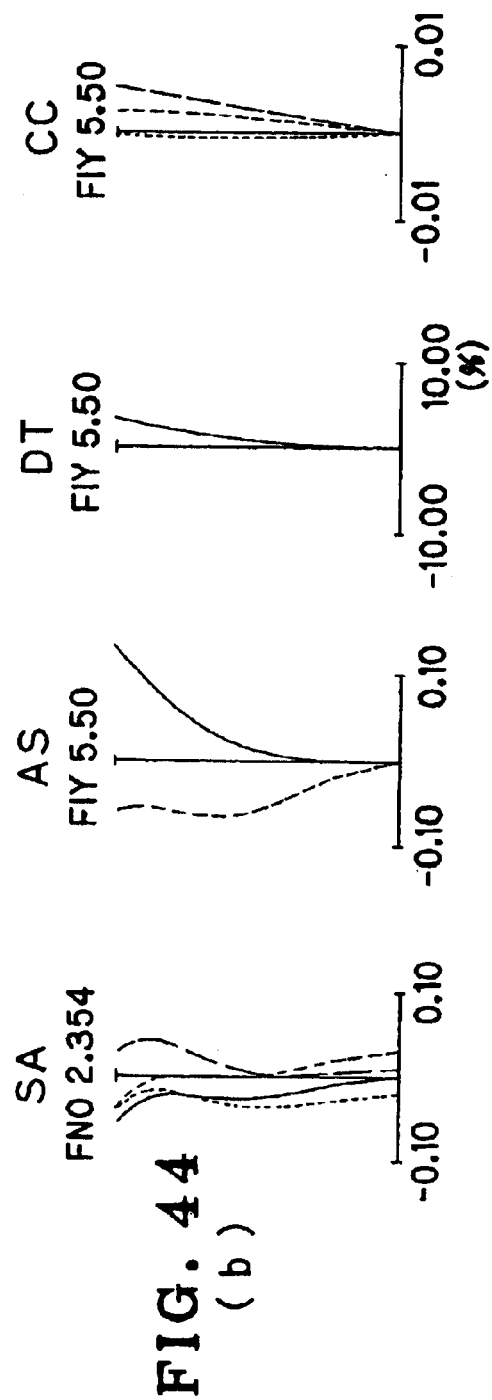

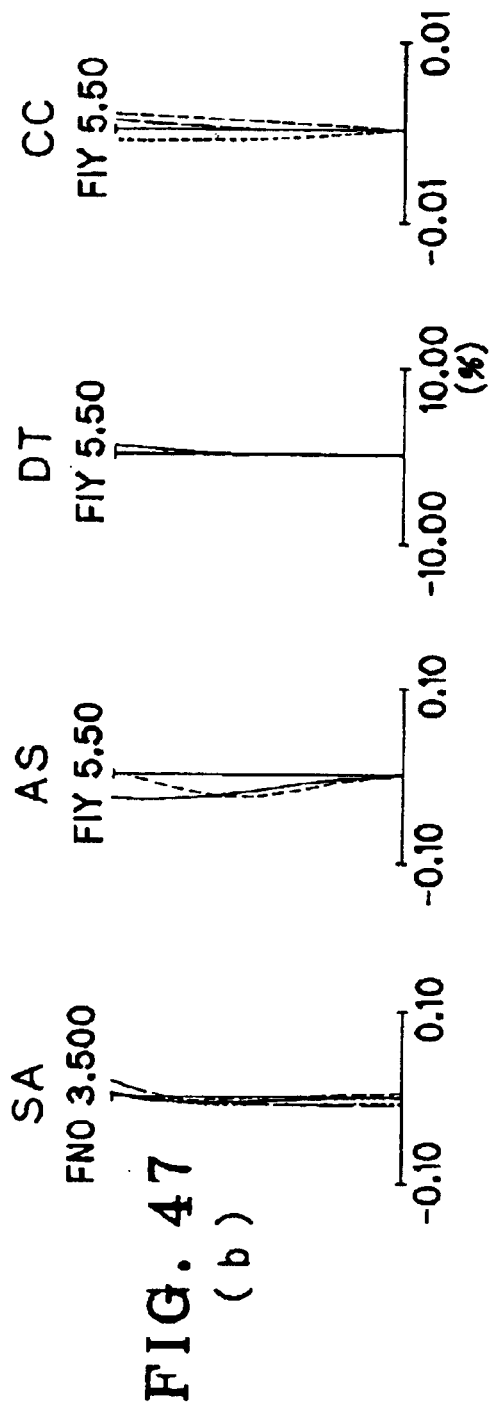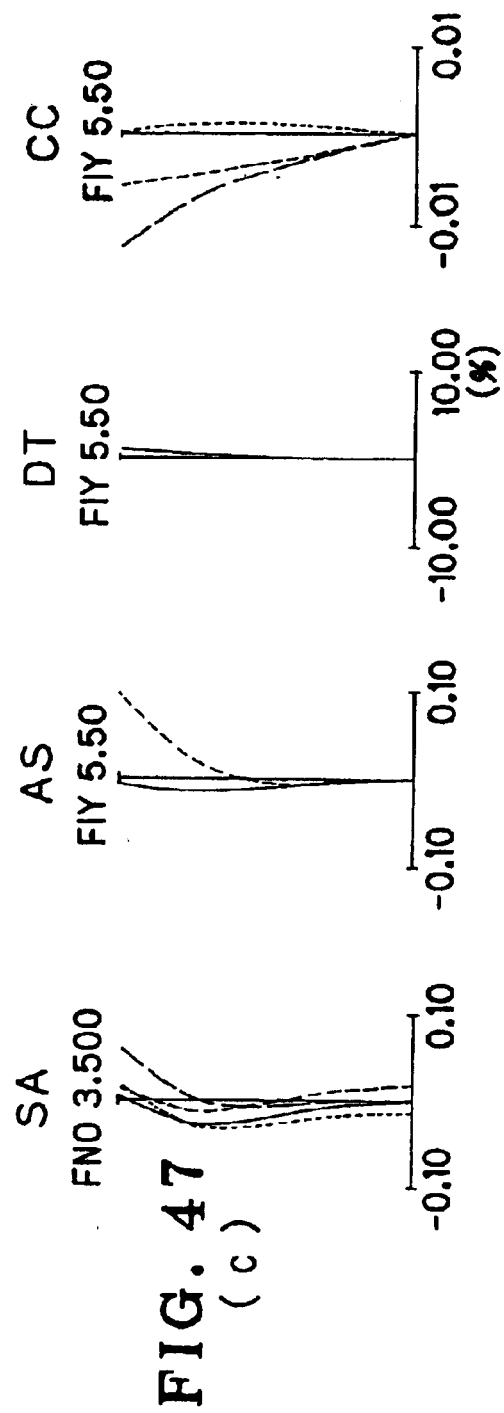

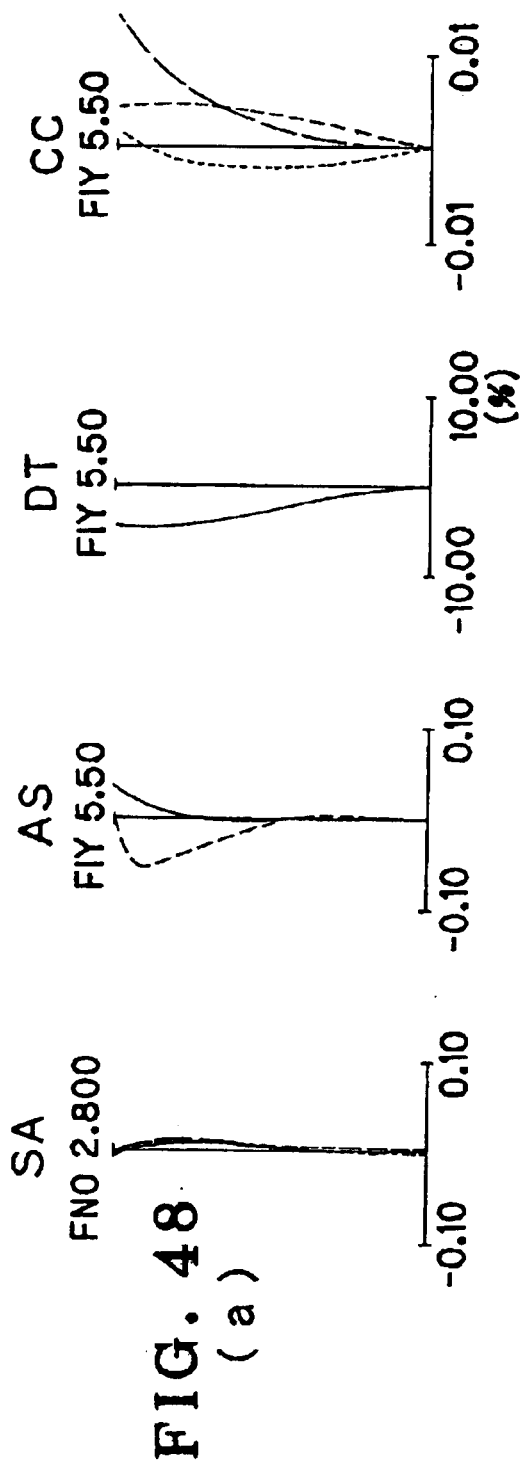
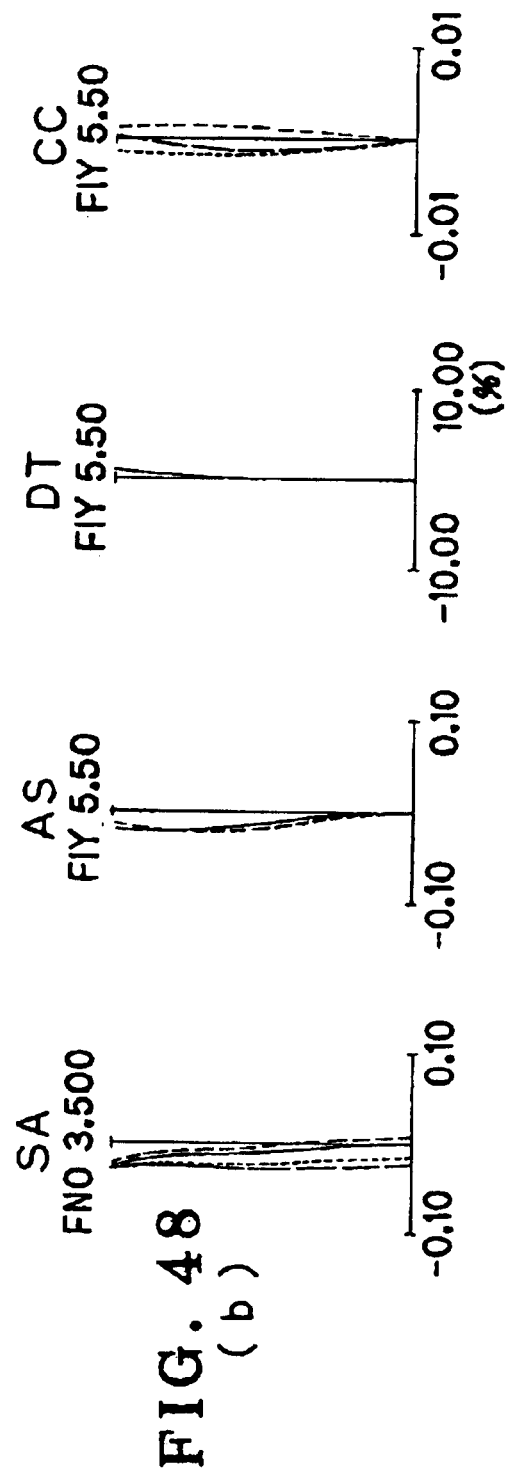
FIG. 48(a)
FIG. 48(b)

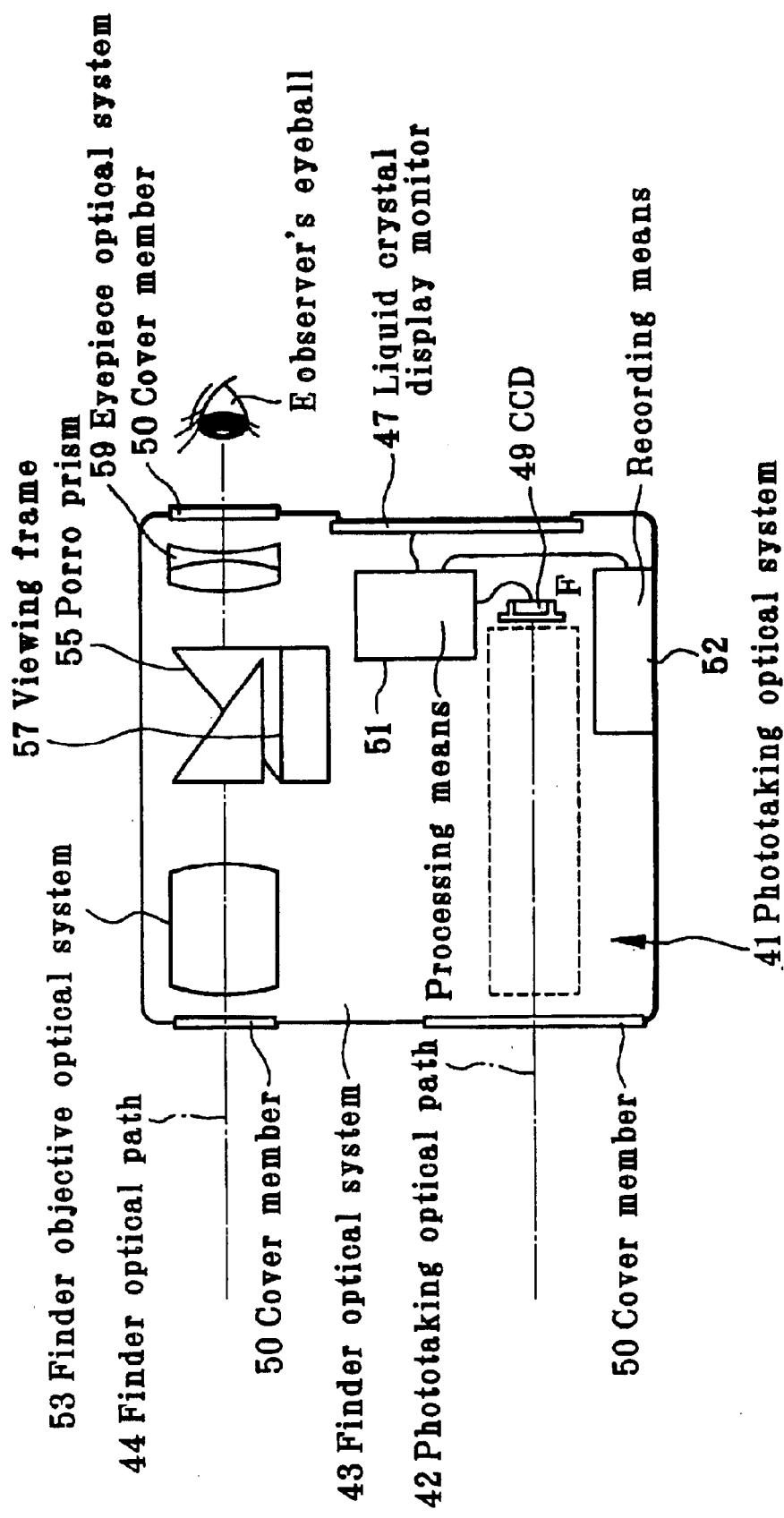

ZOOM LENS

CROSS REFERENCE TO RELATED APPLICATIONS

This Application is a Continuation Application of U.S. application Ser. No. 09/934,074, filed Aug. 22, 2001, now U.S. Pat. No. 6,594,087, issued Jul. 15, 2003, the specification and drawings of which are incorporated herein by reference.

BACKGROUND OF THE INVENTION

The present invention relates generally to a zoom lens, and more particularly to a high-aperture-ratio, high zoom-ratio zoom lens system including a wide-angle zone which has a phototaking field angle of at least 70° suitable for cameras in general, and video cameras or digital cameras in particular.

In recent years, attention has been paid on digital cameras (electronic cameras) which are potential next-generation cameras superseding silver-salt 135 mm film (usually called Leica size) cameras. For digital cameras for general users, single-focus lenses having a diagonal field angle of about 60° or zoom lenses of about 3 magnifications using the same at wide-angle ends go mainstream. For high-class users, on the other hand, zoom lenses must be further extended to the wide-angle or telephoto end, and be compatible with TTL optical finders as well. As a matter of course, such zoom lenses are required to have ever higher performance. For zoom lenses having a diagonal field angle of about 75° at the wide-angle end and about 7 to 10 magnifications and compatible with TTL optical finders, some are now commercially available for the aforesaid silver-salt 135 mm film cameras. However, wide-angle, high-zoom-ratio zoom lenses, which are well suitable for image-pickup formats considerably smaller in size than the film camera formats and are fast as expressed by an F-number of about 2.0 to 2.8 at the wide-angle end, are little known except those for TV cameras and other commercial purposes.

SUMAMRY OF THE INVENTION

The state of the art being like this, an object of the present invention is to provide a wide-angle, high-zoom-ratio zoom lens, and especially a zoom lens system which is compatible with a TTL optical finder having a diagonal field angle of at least 70° at the wide-angle end and about 7 to 10 magnifications, and is fast as well, as expressed by an F-number of about 2.0 to 2.8 at the wide-angle end.

To achieve this object, the present invention basically provides a zoom lens system comprising, in order from an object side thereof, a first lens group which is movable along an optical axis of the zoom lens system during zooming and has positive refracting power, a second lens group which moves toward an image side of the zoom lens system along the optical axis during zooming from a wide-angle end to a telephoto end of the zoom lens system and has negative refracting power, and a rear lens group having at least two movable subgroups or, alternatively, a zoom lens system comprising, in order from an object side thereof, a first lens group which is movable along an optical axis of the zoom lens system during zooming and has positive refracting power, a second lens group which moves toward an image side of the zoom lens system along the optical axis during zooming from a wide-angle end to a telephoto end of the zoom lens system and has negative refracting power, and a rear group which is located subsequent to the second lens group and has at least two spacings variable during zooming.

Such constructions are favorable for achieving high zoom ratios while various aberrations are minimized. The present invention having such basic constructions has the following characteristic features.

According to the first embodiment of the present invention, there is provided a zoom lens system comprising, in order from an object side thereof, a first lens group which is movable along an optical axis of the zoom lens system during zooming and having positive refracting power, a second lens group which moves toward an image side of the zoom lens system along the optical axis during zooming from a wide-angle end to a telephoto end of the zoom lens system and a rear lens group having at least two spacings variable during zooming, wherein a focal length $f_1$ of the first lens group satisfies the following condition (1):

$$6 < f_1/L < 20 \tag{1}$$

where L is a diagonal length of an effective image pickup surface located in the vicinity of an image-formation plane.

When the lower limit of 6 to condition (1) is not reached, spherical aberrations remain under-corrected at the telephoto end. When the upper limit to 20 is exceeded, the amount of zooming movement of the movable groups increases, and so the overall size of the zoom lens system tends to increase.

More preferably, condition (1) should be reduced to $$6.5 < f_1/L < 16 \tag{1'}$$

Most preferably, condition (1) should be reduced to $$7 < f_1/L < 12 \tag{1"}$$

According to the second embodiment of the present invention, there is provided a zoom lens system comprising, in order from an object side thereof, a first lens group which is movable along an optical axis of the zoom lens system during zooming and having positive refracting power, a second lens group which moves toward an image side of the zoom lens system along the optical axis during zooming from a wide-angle end to a telephoto end of the zoom lens system and a rear lens group having at least two movable subgroups or a zoom lens system comprising, in order from an object side thereof, a first lens group which is movable along an optical axis of the zoom lens system during zooming and having positive refracting power, a second lens group which moves toward an image side of the zoom lens system along the optical axis during zooming from a wide-angle end to a telephoto end of the zoom lens system and a rear lens group having at least two spacings variable during zooming, wherein a focal length $f_1$ of the first lens group and anomalous dispersion $\Delta\theta_{gF}$ of a medium of at least one positive lens in the first lens group satisfy the following conditions:

$$6 < f_1/L < 20 \tag{1}$$

$$0.015 < \Delta\theta_{gF} < 0.1 \tag{2}$$

where L is a diagonal length of an effective image pickup surface located in the vicinity of an image-formation plane.

It is here noted that the anomalous dispersion $\Delta\theta_{gF}$ of each medium (vitreous material) is defined by $$\theta_{gF} = A_{gF} + B_{gF} \cdot v_d + \Delta\theta_{gF}$$

with the proviso that $\theta_{gF}=(n_g-n_F)/(n_F-n_C)$ and $\nu_d=(n_d-1)/(n_F-n_C)$ wherein $n_d$, $n_F$, $n_C$ and $n_g$ are refractive indices with respect to d-line, F-line, C-line and g-line, respectively, and $A_{gF}$ and $B_{gF}$ are each a linear coefficient determined by two vitreous material types represented by glass code 511605 (available under the trade name of NSL7, Ohara Co., Ltd. with $\theta_{gF}=0.5436$ and $\nu_d=60.49$) and glass code 620363 (available under the trade name of PBM2, Ohara Co., Ltd. with $\theta_{gF}=0.5828$ and $\nu_d=36.26$);that is, $A_{gF}$ is 0.641462485 and $B_{gF}$ is −0.001617829.

When the lower limit of 0.015 to condition (2) is not reached, short wavelength longitudinal chromatic aberrations remain under-corrected at the telephoto end, and so colors are likely to bleed out at the edges of a subject having a large luminance difference. Any inexpensive medium exceeding the upper limit of 0.1 is little available, and opposite chromatic aberrations occur above 0.1.

More preferably, conditions (2) and (3) should be reduced to $$6.5<f_1/L<16 \tag{1'}$$

$$0.020<\Delta\theta_{gF}<0.08 \tag{2'}$$

Most preferably, conditions (2) and (3) should be reduced to $$7<f_1/L<12 \tag{1''}$$

$$0.025<\Delta\theta_{gF}<0.06 \tag{2''}$$

According to the third embodiment of the present invention, there is provided a zoom lens system comprising, in order from an object side thereof, a first lens group which is movable along an optical axis of the zoom lens system during zooming and has positive refracting power, a second lens group which moves toward an image side of the zoom lens system along the optical axis during zooming from a wide-angle end to a telephoto end of the zoom lens system, has negative refracting power and comprises at least three negative lens elements while a positive lens element is located nearest to an image side of the second lens group, or three negative lens elements located nearest to an object side of the second lens group while a positive lens element is located on said image side or a negative lens element while two positive lens elements are located nearest to the image side of the second lens group, with any one of surfaces in the second lens group being defined by an aspheric surface, and a rear lens group having at least two movable subgroups and comprising a total of 6 to 11 lens elements inclusive or a zoom lens system comprising, in order from an object side thereof, a first lens group which is movable along an optical axis of the zoom lens system during zooming, a second lens group which moves toward an image side of the zoom lens system along the optical axis during zooming from a wide-angle end to a telephoto end of the zoom lens system and has negative refracting power and a rear lens group having at least two spacings variable during zooming, wherein the following condition is satisfied with respect to an amount of movement $\Delta z_1$ of the first lens group from the wide-angle end to the telephoto end when the zoom lens system is focused on an object point at infinity and an amount of movement $\Delta z_2$ of the second lens group from the wide-angle end to the telephoto end when the zoom lens system is focused on an object point at infinity:

$$3<(\Delta z_2-\Delta z_1)/L<9 \tag{3}$$

where the movement of each lens group toward the image side is assumed to be positive and L is a diagonal length of an effective image pickup surface located in the vicinity of an image-formation plane.

For zooming from the wide-angle end to the telephoto end, the second lens group is relatively moved away from the first lens group, as already explained. Especially for a high-zoom-ratio zoom lens system, there must be a space large enough for the movement of the second lens group because that amount of movement is large. This is particularly true as the field angle of the zoom lens system becomes wide. As a result, the diameter of the first lens group often becomes too large. When the upper limit of 9 to condition (3) is exceeded, the diameter of the first lens group becomes too large and so the size of the zoom lens system becomes large. When the lower limit of 3 is not reached, there is an increased load of zooming on the rear lens group, which may result in large fluctuations of spherical aberrations upon zooming.

More preferably, condition (3) should be reduced to $$3.2<(\Delta z_2-\Delta z_1)/L<8 \tag{3'}$$

Most preferably, condition (3) should be reduced to $$3.4<(\Delta z_2-\Delta z_1)/L<7 \tag{3''}$$

When a zoom lens system has a wide-angle, high-zoom-ratio arrangement, the largest load is applied on the second lens group. In addition, even the magnitude of the diameter of the first lens group is determined by the power, amount of movement, and arrangement of the second lens group. In consideration of the diameter of the first lens group alone, it is favorable to locate the principal point of the second lens group as close to the object side as possible. Thus, it is preferable that the second lens group is constructed of a front subgroup having negative refracting power and a rear subgroup having positive refracting power. In this case, however, barrel distortion is likely to occur due to the wide-angle, high-zoom-ratio arrangement and difficulty is involved in making correction for astigmatism all over the zooming zone. These problems can substantially be eliminated if the second lens group is constructed of at least three negative lenses and a positive lens located nearest to the image side thereof, or three negative lenses located nearest to the object side thereof and a positive lens located on the image side, or a negative lens and two positive lenses located nearest to the image side thereof, with any one of the surfaces in the second lens group being defined by an aspheric surface.

When the number of lenses in the rear lens group is less than 6, severe conditions are added to correction of chromatic aberrations and spherical aberrations. When more than 11 lenses are used, on the other hand, the entire rear lens group becomes too thick to secure ample zooming space.

The rear lens group has a plurality of subgroups. In view of chromatic aberrations, spherical aberrations, coma and increased aperture, it is more preferable to construct the rear lens group of at least two subgroups having positive refracting power, wherein the subgroup located nearest to the image side thereof and having positive refracting power and the subgroup located nearest to the image side thereof and having positive refracting power are each composed of at least three lenses.

According to the fourth embodiment of the present invention, there is provided a zoom lens system comprising, in order from an object side thereof, a first lens group which is movable along an optical axis of the zoom lens system during zooming and has positive refracting power, a second lens group which moves toward an image side of the zoom lens system along the optical axis during zooming from a wide-angle end to a telephoto end of the zoom lens system, has negative refracting power and comprises at least three negative lens elements while a positive lens element is located nearest to an image side of the second lens group, or three negative lens elements located nearest to an object side of the second lens group while a positive lens element is located on said image side or a negative lens element while two positive lens elements are located nearest to the image side of the second lens group, with any one of surfaces in the second lens group being defined by an aspheric surface, and a rear lens group having at least two movable subgroups and comprising a total of 6 to 11 lens elements inclusive or a zoom lens system comprising, in order from an object side thereof, a first lens group which is movable along an optical axis of the zoom lens system during zooming, a second lens group which moves toward an image side of the zoom lens system along the optical axis during zooming from a wide-angle end to a telephoto end of the zoom lens system and has negative refracting power and a rear lens group having at least two spacings variable during zooming, wherein the following condition is satisfied with respect to an amount of movement $\Delta z_1$ of the first lens group from the wide-angle end to the telephoto end when the zoom lens system is focused on an object point at infinity and an amount of movement $\Delta z_2$ of the second lens group from the wide-angle end to the telephoto end when the zoom lens system is focused on an object point at infinity:

$$-1.0<(\Delta_{z1}/\Delta_{z2})<0.5 \text{ where } \Delta_{z2}>0 \quad (4)$$

where the movement of each lens group toward the image side is assumed to be positive.

This is the condition for making a proper locus of an image point defined by a composite first-and-second lens group system upon zooming from the wide-angle end to the telephoto end. By this locus, the magnification-variable zone and focal length of the rear lens group are determined to some extent. When the upper limit of 0.5 to condition (4) is exceeded, the magnification of the rear lens group becomes low or the focal length of the rear lens group becomes long and, hence, the entire size of the zoom lens system tends to become large relative to the value of L. When the lower limit of −1.0 is not reached, on the contrary, the entire size of the zoom lens system becomes small relative to the value of L. However, when the value of L is small and the F-number is small, it is difficult to make correction for spherical aberrations and comas.

It is acceptable to meet condition (4) and condition (3) simultaneously.

More preferably, condition (4) should be reduced to $$-0.9<(\Delta_{z1}/\Delta_{z2})<0.4 \text{ where } \Delta_{z2}>0 \quad (4')$$

Most preferably, condition (4) should be reduced to $$-0.8<(\Delta_{z1}/\Delta_{z2})<0.3 \text{ where } \Delta_{z2}>0 \quad (4'')$$

According to the fifth embodiment of the present invention, there is provided a zoom lens system comprising, in order from an object side thereof, a first lens group which is movable along an optical axis of said zoom lens during zooming and has positive refracting power, a second lens group which moves toward an image side of said zoom lens system along said optical axis during zooming from a wide-angle end to a telephoto end of said zoom lens system and has negative refracting power, and a rear lens group having at least two movable subgroups or a zoom lens system comprising, in order from an object side thereof, a first lens group which is movable along an optical axis of said zoom lens during zooming and has positive refracting power, a second lens group which moves toward an image side of said zoom lens system along said optical axis during zooming from a wide-angle end to a telephoto end of said zoom lens system and has negative refracting power, and a rear lens group having at least two spacings variable during zooming, wherein said first lens group moves toward said image side in a convex reciprocation locus and an amount of movement $\Delta z_{1WM}$ of said first lens group from said wide-angle end to an intermediate focal length of said zoom lens system, given by $f_M(=\sqrt{(f_W \cdot f_T)})$, is positive where $f_W$ is a composite focal length of said zoom lens system when focused at said wide-angle end on an object point at infinity and $f_T$ is a composite focal length of said zoom lens system when focused at said telephoto end on an object point at infinity, with the proviso that the movement of said first lens group lens toward said image side is assumed to be positive and $f_M$ is the geometric mean of $f_W$ and $f_T$. It is here noted that upon zooming from the wide-angle end to the telephoto end, the second lens group moves relatively away from the first lens group and the rear lens group moves in such a way that its principal point position goes off an image plane. It is also noted that the position of the image plane is kept constant.

When an electronic image pickup device or a viewing frame having a small value for L, the magnification of the rear lens group is particularly small or nearly one even at the telephoto end, because the ratio of the focal length of the first lens group to that of the zoom lens system becomes very large. At the same time, since the focal length of the rear lens group is longer than that of the second lens group, it is required that a locus of an image point defined by a composite first-and-second lens group system upon zooming from the wide-angle end to the telephoto end change considerably sharply toward the image side in the vicinity of the wide-angle end, and change considerably gently at the telephoto end. In other words, it is preferable that such a locus as mentioned above is taken by the first lens group.

According to the sixth embodiment of the present invention, there is a zoom lens system comprising, in order from an object side thereof, a first lens group which is movable along an optical axis of said zoom lens during zooming and has positive refracting power, a second lens group which moves toward an image side of said zoom lens system along said optical axis during zooming from a wide-angle end to a telephoto end of said zoom lens system and has negative refracting power, and a rear lens group having at least two movable subgroups or a zoom lens system comprising, in order from an object side thereof, a first lens group which is movable along an optical axis of said zoom lens during zooming and has positive refracting power, a second lens group which moves toward an image side of said zoom lens system along said optical axis during zooming from a wide-angle end to a telephoto end of said zoom lens system and has negative refracting power, and a rear lens group having at least two spacings variable during zooming, wherein said first lens group moves toward said image side in a convex reciprocation locus and only the aforesaid condition (4) or both conditions (3) and (4) are satisfied.

In this embodiment, too, the effects mentioned with reference to the fourth and fifth embodiments are obtainable.

According to the seventh embodiment of the present invention, there is provided a zoom lens system comprising, in order from an object side thereof, a first lens group which is movable along an optical axis of said zoom lens system during zooming and has positive refracting power, a second lens group which moves toward an image side of said zoom lens system along said optical axis during zooming from a wide-angle end to a telephoto end of said zoom lens system, has negative refracting power and comprises at least three negative lenses while a positive lens is located nearest to said image side, or three negative lenses located nearest to said object side while a positive lens is located on said image side or a negative lens while two positive lenses are located nearest to said image side, with any one of surfaces in said second lens group being defined by an aspheric surface, and a rear lens group having at least two movable subgroups and comprising a total of 6 to 11 lens elements inclusive, or a zoom lens system comprising, in order from an object side thereof, a first lens group which is movable along an optical axis of said zoom lens system during zooming and has positive refracting power, a second lens group which moves toward an image side of said zoom lens system along said optical axis during zooming from a wide-angle end to a telephoto end of said zoom lens system and has negative refracting power and a rear lens group having at least two spacings variable during zooming.

When a zoom lens system has a wide-angle, high-zoom-ratio arrangement, the largest load is applied on the second lens group. In addition, even the magnitude of the diameter of the first lens group is determined by the power, amount of movement, and arrangement of the second lens group. In consideration of the diameter of the first lens group alone, it is favorable to locate the principal point of the second lens group as close to the object side as possible. Thus, it is preferable to locate a positive lens nearest to the image side of the second lens group. In this case, however, barrel distortion is likely to occur due to the wide-angle, high-zoom-ratio arrangement and difficulty is involved in making correction for astigmatism all over the zooming zone. These problems can substantially be eliminated if the second lens group is constructed of at least three negative lenses, wherein at least one surface is formed by an aspheric surface. In particular, it is preferable that the aspheric surface is of such a shape that off and off the center of the aspheric surface, its divergence becomes weaker or its convergence becomes stronger as compared with its longitudinal curvature. Even when the second lens group is constructed of three negative lenses located nearest to the object side thereof with a positive lens located on the image side thereof or constructed of a negative lens with two positive lenses located nearest to the image side thereof, similar effects are obtainable as already mentioned.

Furthermore in this embodiment, the following conditions should preferably be satisfied with respect to a $\beta_{2T}/\beta_{2W}$ ratio $\Delta\beta_2$ where $\beta_{2T}$ is the magnification of the second lens group at the telephoto end and $\beta_{2W}$ is the magnification of the second lens group at the wide-angle end when the zoom lens system is focused on an object point at infinity and the focal length $f_2$ of the second lens group.

$$0.3 < \log(\Delta\beta_2)/\log(\gamma) < 0.8 \tag{5}$$

$$5 < \gamma < 15 \tag{6}$$

Here $\gamma$ is the zoom ratio of the zoom lens system from the wide-angle end to the telephoto end.

When a zoom lens system has a wide-angle, high-zoom-ratio arrangement, the largest load is applied on the second lens group, as already mentioned. In addition, even the magnitude of the diameter of the first lens group is determined by the power, amount of movement, and arrangement of the second lens group. It is thus preferable to allocate the zooming function to the rear lens group as much as possible. Condition (5) is provided to define the proportion of the zoom ratio of the second lens group all over the zooming zone. When the upper limit of 0.8 is exceed, the load of the zooming function on the second lens group becomes too large to make correction for the aforesaid off-axis aberrations and reduce the diameter of the first lens group. When the lower limit of 0.3 is not reached, on the contrary, the load of the zooming function on the rear lens group becomes too large and, hence, it is difficult to achieve large aperture because spherical aberrations, coma and so on become instable all over the zooming zone. Condition (6) represents the zoom ratio range wherein condition (5) is effective. Any departure from this range causes condition (5) to be ineffective. In other words, when the upper limit of 15 to condition (6) is exceeded, it is preferable to reduce the degree of allocation of the zooming function to the second lens group to below the lower limit to condition (5). When the lower limit of 5 is not reached, on the other hand, it is acceptable to increase the degree of allocation of the zooming function to the second lens group to greater than the upper limit to condition (5) because influences of aberrations diminish. However, any sufficient zoom ratio is not obtainable.

More preferably, the aforesaid conditions should be $$0.35 < \log(\Delta\beta_2)/\log(\gamma) < 0.65 \tag{5'}$$

$$9 < \gamma < 15 \tag{6'}$$

or $$0.5 < \log(\Delta\beta_2)/\log(\gamma) < 0.8 \tag{5''}$$

$$5 < \gamma < 9 \tag{6''}$$

According to the eighth embodiment of the present invention, there is provided a zoom lens system comprising, in order from an object side thereof, a first lens group which is movable along an optical axis of said zoom lens system during zooming and has positive refracting power, a second lens group which moves toward an image side of said zoom lens system along said optical axis during zooming from a wide-angle end to a telephoto end of said zoom lens system, has negative refracting power and comprises at least three negative lenses while a positive lens is located nearest to said image side, or three negative lenses located nearest to said object side while a positive lens is located on said image side or a negative lens while two positive lenses are located nearest to said image side, with any one of surfaces in said second lens group being defined by an aspheric surface, and a rear lens group having at least two movable subgroups and comprising a total of 6 to 11 lens elements inclusive, or a zoom lens system comprising, in order from an object side thereof, a first lens group which is movable along an optical axis of said zoom lens system during zooming and has positive refracting power, a second lens group which moves toward an image side of said zoom lens system along said optical axis during zooming from a wide-angle end to a telephoto end of said zoom lens system and has negative refracting power and a rear lens group having at least two spacings variable during zooming, wherein the following condition is satisfied with respect to the composite magnification $\beta_{rW}$ of the rear lens group when the zoom lens system is focused at the wide-angle end on an object point at infinity.

$$-0.6 < \beta_{rW} < -0.1 \tag{7}$$

As already mentioned, when an image pickup device or a film viewing frame having a small value for L (the diagonal length of an effective image pickup surface) is used, the ratio of the focal length of the first lens group to that of the zoom lens system becomes very large. For instance, this is because the simple proportional coefficient multiple of an optical system for 135 mm format or APS format cannot be physically applied to mechanical construction or lens machining. For this reason, it is impossible to reduce the focal length of each lens group, and especially the composite focal length of the first and second lens groups. In other words, the magnification of the rear lens group must be smaller than that of an optical system for the aforesaid formats. When the lower limit of −0.6 to condition (7) is not reached, the focal length of the composite first-and-second lens group system tends to become short and, hence, the edge thickness, center thickness and air space of each lens tend to become extremely small. An attempt to secure these make the Petzval sum of the optical system negative and, at the same time, renders it difficult to secure off-axis aberrations such as distortion, astigmatism and coma all over the zooming zone. When the upper limit of −0.1 is exceeded, the lens system tends to become huge.

It is preferable that the aforesaid rear lens group is composed of at least three subgroups, each having a variable axial relative distance, and three such subgroups have positive, negative, and positive power in order from the object side of the rear lens group.

Alternatively, it is preferable that the rear lens group is composed of a plurality of subgroups, each having a variable axial relative distance, and all subgroups in the rear lens group have each at least one doublet component. Still alternatively, it is preferable that the rear lens group is composed of at least three subgroups, each having a variable axial relative distance and all subgroups in the rear lens group have each at least one doublet component.

It is more preferable that when $$9<\gamma<15 \tag{6'}$$

$$-0.5<\beta_{rW}<-0.1 \tag{7'}$$

or when $$5<\gamma<9 \tag{6''}$$

$$-0.6<\beta_{rW}<-0.2. \tag{7''}$$

According to the ninth embodiment of the present invention, there is provided a zoom lens system comprising, in order from an object side thereof, a first lens group which is movable along an optical axis of said zoom lens system during zooming and has positive refracting power, a second lens group which moves toward an image side of said zoom lens system along said optical axis during zooming from a wide-angle end to a telephoto end of said zoom lens system, has negative refracting power and comprises at least three negative lenses while a positive lens is located nearest to said image side, or three negative lenses located nearest to said object side while a positive lens is located on said image side or a negative lens while two positive lenses are located nearest to said image side, with any one of surfaces in said second lens group being defined by an aspheric surface, and a rear lens group having at least two movable subgroups and comprising a total of 6 to 11 lens elements inclusive, or a zoom lens system comprising, in order from an object side thereof, a first lens group which is movable along an optical axis of said zoom lens system during zooming and has positive refracting power, a second lens group which moves toward an image side of said zoom lens system along said optical axis during zooming from a wide-angle end to a telephoto end of said zoom lens system and has negative refracting power and a rear lens group having at least two spacings variable during zooming, wherein focusing is effected by any one of subgroups located nearer to an image side of said rear lens group than a positive subgroup of subgroups having negative magnification, said positive subgroup located nearest to an object side of said rear lens group, and the following condition is satisfied with respect to a magnification $\beta_{RRW}$ of said positive subgroup located nearest to the image side of said rear lens group when said zoom lens system is focused at said wide-angle end on an object point at infinity:

$$-0.4<\beta_{RRW}<0.9 \tag{8}$$

In the present invention, focusing is effected by moving a subgroup or subgroups in the rear lens group on the optical axis, and zooming is effected by the second lens group and the rear lens group. Actually, however, only the subgroup of a plurality of subgroups constituting the rear lens group, which subgroup has positive refracting power and negative magnification and is located nearest to the object side of the rear lens group, contributes to zooming. Other subgroups are designed to have magnifications far away from −1, so that focusing can be done by one or more of the subgroups. It is particularly preferable to effect focusing with a positive subgroup located nearest to the image side of the rear lens group, because there are little fluctuations of aberrations with focusing. Condition (8) is provided to define the magnification $\beta_{RRW}$ of the positive subgroup located nearest to the image side of the rear lens group. Falling below the lower limit of −0.4 is not preferable because of increased fluctuations of the paraxial amount and the amount of aberrations. Exceeding the upper limit of 0.9 is again not preferable because the amount of movement of the focusing subgroup becomes too large and so this subgroup tends to interfere with the adjacent subgroup before focusing is achieved from an object point at infinity to a close-up object point.

It is preferable that focusing is effected by the positive subgroup located nearest to the image side of the rear lens group and/or a negative subgroup located on the object side of the rear lens group, because fluctuations of aberrations with focusing can be so reduced that proper focusing and proper sensitivity can be obtained.

More preferably, condition (8) should be reduced to $$-0.3<\beta_{RRW}<0.8 \tag{8'}$$

Most preferably, condition (8) should be reduced to $$-0.2<\beta_{RRW}<0.7 \tag{8''}$$

According to the tenth embodiment of the present invention, there is provided a a zoom lens system comprising, in order from an object side thereof, a first lens group which is movable along an optical axis of said zoom lens system during zooming and has positive refracting power, a second lens group which moves toward an image side of said zoom lens system along said optical axis during zooming from a wide-angle end to a telephoto end of said zoom lens system, has negative refracting power and comprises at least three negative lenses while a positive lens is located nearest to said image side, or three negative lenses located nearest to said object side while a positive lens is located on said image side or a negative lens while two positive lenses are located nearest to said image side, with any one of surfaces in said second lens group being defined by an aspheric surface, and a rear lens group having at least two movable subgroups and comprising a total of 6 to 11 lens elements inclusive, or a zoom lens system comprising, in order from an object side thereof, a first lens group which is movable along an optical axis of said zoom lens system during zooming and has positive refracting power, a second lens group which moves toward an image side of said zoom lens system along said optical axis during zooming from a wide-angle end to a telephoto end of said zoom lens system and has negative refracting power and a rear lens group having at least two spacings variable during zooming, wherein the following conditions are satisfied with respect to an amount of movement $\Delta_{zRF}$ of a subgroup of said subgroups in said rear lens group, said subgroup having positive refracting power and located nearest to an object side of said rear lens group, from said wide-angle end to said telephoto end when said zoom lens system is focused on an object point at infinity and an amount of movement $\Delta_{zRR}$ of a positive subgroup located nearest to an image side of said rear lens group when said zoom lens system is focused on an object point at infinity:

$$-0.4 < \Delta_{zRR}/\Delta_{zRF} < 0.8 \tag{9}$$

$$0.3 < |\Delta_{zRF}|/L < 4.0 \tag{10}$$

where L is a diagonal length of an effective image pickup surface located in the vicinity of an image-formation plane.

Of the subgroups constituting the rear lens group, the positive subgroup located nearest to the object side of the rear lens group contributes actually to zooming. Consequently, this subgroup moves monotonously toward the object side of the zoom lens system from the wide-angle end to the telephoto end thereof. Other subgroups have magnifications far away from −1, and move or act substantially to make correction for displacements of focusing positions due to zooming and aberrations. On the other hand, as the positive subgroup located nearest to the image side of the rear lens group moves toward the object side of the zoom lens system than required, the position of an exit pupil comes close to the image plane. For this reason, when an electronic image pickup device is used, shading is likely to occur. When the upper limit of 0.8 to condition (9) is exceeded, the exit pupil comes close to the image plane on the telephoto side, and so the angle of light rays incident on the perimeter of a screen becomes too large. When the lower limit of −0.4 is not reached, the total thickness of the rear lens group increases and so the overall size of the optical system becomes large. When the upper limit of 4.0 to condition (10) is exceeded, it is likely that the overall length of the optical system becomes long or fluctuations of aberrations with zooming become noticeable. When the lower limit of 0.3 is not reached, the diameter of the first lens group is likely to become large. These are true even when at least one subgroup is placed midway between the aforesaid two positive subgroups. Especially when that subgroup is a negative one, it is preferable to satisfy $$-2 < \Delta_{zRN}/L < 1 \tag{11}$$

Here $\Delta_{zRN}$ is the amount of movement of the negative subgroup from the wide-angle end to the telephoto end when the zoom lens system is focused on an object point at infinity. When the lower limit of −2 to this condition is not reached, the total thickness of the rear lens group increase and so the overall size of the optical system becomes large. When the upper limit of 1 is exceeded, it is likely that the subgroups interfere during focusing on a nearby object point at the telephoto end. This holds true even when a negative subgroup is located on the object side with respect to the aforesaid positive subgroups and on the image side with respect to the second lens group.

More preferably, the following conditions should be satisfied independently or simultaneously.

$$-0.3 < \Delta_{zRR}/\Delta_{zRF} < 0.7 \tag{9'}$$

$$0.5 < |\Delta_{zRF}|/L < 3.5 \tag{10'}$$

$$-1.5 < \Delta_{zRN}/L < 0.7 \tag{11'}$$

Most preferably, the following conditions should be satisfied independently or simultaneously.

$$-0.2 < \Delta_{zRR}/\Delta_{zRF} < 0.6 \tag{9''}$$

$$0.7 < |\Delta_{zRF}|/L < 3.0 \tag{10''}$$

$$-1 < \Delta_{zRN}/L < 0.5 \tag{11''}$$

It is also preferable that the positive subgroup located nearest to the object side of the rear lens group has negative magnification in view of its contribution to zooming.

According to the eleventh embodiment of the present invention, there is provided a zoom lens system comprising, in order from an object side thereof, a first lens group which is movable along an optical axis of said zoom lens system during zooming and has positive refracting power, a second lens group which moves toward an image side of said zoom lens system along said optical axis during zooming from a wide-angle end to a telephoto end of said zoom lens system, has negative refracting power and comprises at least three negative lenses while a positive lens is located nearest to said image side, or three negative lenses located nearest to said object side while a positive lens is located on said image side or a negative lens while two positive lenses are located nearest to said image side, with any one of surfaces in said second lens group being defined by an aspheric surface, and a rear lens group having at least two movable subgroups and comprising a total of 6 to 11 lenses inclusive, said rear lens group comprising a subgroup having positive refracting power and negative magnification and a positive subgroup located nearest to an image side of said rear lens group which vary in relative positions thereof during zooming, or a zoom lens system comprising, in order from an object side thereof, a first lens group which is movable along an optical axis of said zoom lens during zooming and has positive refracting power, a second lens group which moves toward an image side of said zoom lens system along said optical axis during zooming from a wide-angle end to a telephoto end of said zoom lens system and has negative refracting power and a rear lens group having a plurality of subgroups, said rear lens group comprising a subgroup having positive refracting power and negative magnification and a positive subgroup located nearest to an image side of said rear lens group with a negative subgroup located between said two positive subgroup, while said three subgroup vary in relative positions thereof during zooming, wherein said two positive subgroups have each at least one doublet component, at least one aspheric surface and at least one lens formed of a vitreous material with ν>80 where ν is an Abbe constant. Since the chromatic aberrations, spherical aberrations and comas of each lens group are in good condition, satisfactory images can be obtained from the wide-angle end to the telephoto end. It is here preferable that the negative subgroup located midway between the two positive subgroups includes a doublet.

According to the twelfth embodiment of the present invention, there is provided a zoom lens system comprising, in order from an object side thereof, a first lens group which is movable along an optical axis of said zoom lens system during zooming and has positive refracting power, a second lens group which moves toward an image side of said zoom lens system along said optical axis during zooming from a wide-angle end to a telephoto end of said zoom lens system, has negative refracting power and comprises at least three negative lenses while a positive lens is located nearest to said image side, or three negative lenses located nearest to said object side while a positive lens is located on said image side or a negative lens while two positive lenses are located nearest to said image side, with any one of surfaces in said second lens group being defined by an aspheric surface, and a rear lens group having at least two movable positive subgroups and comprising a total of 7 to 11 lenses inclusive, or a zoom lens system comprising, in order from an object side thereof, a first lens group which is movable along an optical axis of said zoom lens during zooming and has positive refracting power, a second lens group which moves toward an image side of said zoom lens system along said optical axis during zooming from a wide-angle end to a telephoto end of said zoom lens system and has negative refracting power and a rear lens group having at least three spacings variable during zooming, wherein a subgroup located nearest to an object side of said rear lens group has negative refracting power.

In the zoom lens system according to the present invention, when a finder optical path-splitting member is inserted between the subgroup located nearest to the image side of the rear lens group and the image lance, a long back focus is needed. In other words, an attempt to forcibly ample back focus makes the Petzval sum of the zoom lens system likely to become negative. It is thus preferable that a negative lens subgroup is located nearest to the object side of the rear lens group. It is here noted that the negative subgroup located nearest to the object side of the rear lens group may be made up of one lens component or fixed in the vicinity of a stop. By the "lens component" used herein is intended a lens with no air separation between the object-side surface and the image-side surface thereof, which are in contact with air, or specifically a single lens or a doublet.

It is preferable that a negative subgroup and an aperture stop are located on the object side with respect to the two positive subgroup and on the image side with respect to the second lens group, with a spacing being at most three times as large as the thickness of that negative subgroup on the optical axis of the zoom lens system.

When a subgroup having negative refracting power is located nearest to the object side of the rear lens group, it is preferable to construct the rear lens group of seven or more lenses in all.

In the eleventh embodiment of the invention, it is preferable that the zoom lens system comprises, in order from an object side thereof, a first lens group which is movable along an optical axis thereof during zooming and positive refracting power, a second lens group which is movable along the optical axis and has negative refracting power, and a rear lens group located subsequent thereto and having variable refracting power, while at least one of the following three conditions is satisfied.

$$2.0 < F_{BW}/f_W < 5.0 \quad (12)$$

$$1.4 < F_W < 3.5 \quad (13)$$

$$2 < ENP/L < 5 \quad (14)$$

Here $F_{BW}$ is the back focus (calculated on an air basis) when the zoom lens system is focused at the wide-angle end on an object point at infinity, $F_W$ is the minimum F-number when the zoom lens system is focused at the wide-angle end on an object point at infinity, and ENP is the position of an entrance pupil at the wide-angle end.

The present invention is found to be effective for lens systems that satisfy one of these conditions. In particular, the present invention is best suited for image pickup systems using electronic image pickup devices. Especially when the present invention is applied to an image-formation optical system for phototaking systems (cameras, video movies, etc.) including a high-pixel image pickup device with a pixel interval a represented by $$1.0 \times 10^{-4} \times L < a < 6.0 \times 10^{-4} \times L \text{ (mm)}$$

it is possible to achieve an image pickup system making effective use of the image quality of a high-pixel arrangement.

Two or more of the conditions mentioned above with reference to the present zoom lens system should preferably be satisfied simultaneously. More preferably, two or more of the requirements for the present invention should be satisfied at the same time. The more the number of the requirements met, the better the results are.

In each of the embodiments of the present invention, it is preferable that the second lens group comprises at least three negative lenses while a positive lens is located nearest to said image side, or three negative lenses located nearest to said object side while a positive lens is located on said image side or a negative lens while two positive lenses are located nearest to said image side, with any one of surfaces in said second lens group being defined by an aspheric surface. When the rear lens group has at least two spacings variable during zooming, it is preferable that the rear lens group is made up of 7 to 11 lenses in all. More preferably, the rear lens group is made up of 7 to 9 lenses inclusive in all while two aspheric surfaces are used, because an arrangement favorable in view of size is achievable while high image-formation capability is maintained.

By the combined use of two or more of the aforesaid embodiments, it is possible to obtain ever higher effects.

Still other objects and advantages of the invention will be in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 26(a), 26(b) and 26(c) are aberration diagrams for Example 1 when focused on an object point at infinity.

FIGS. 27(a), 27(b) and 27(c) are aberration diagrams for Example 2 when focused on an object point at infinity.

FIGS. 34(a), 34(b) and 34(c) are aberration diagrams for Example 9 when focused on an object point at infinity.

FIGS. 35(a), 35(b) and 35(c) are aberration diagrams for Example 10 when focused on an object point at infinity.

FIGS. 38(a), 38(b) and 38(c) are aberration diagrams for Example 13 when focused on an object point at infinity.

FIGS. 39(a), 39(b) and 39(c) are aberration diagrams for Example 14 when focused on an object point at infinity.

FIGS. 40(a), 40(b) and 40(c) are aberration diagrams for Example 15 when focused on an object point at infinity.

FIGS. 42(a), 42(b) and 42(c) are aberration diagrams for Example 17 when focused on an object point at infinity.

FIGS. 44(a), 44(b) and 44(c) are aberration diagrams for Example 19 when focused on an object point at infinity.

FIGS. 47(a), 47(b) and 47(c) are aberration diagrams for Example 22 when focused on an object point at infinity.

FIGS. 48(a), 48(b) and 48(c) are aberration diagrams for Example 23 when focused on an object point at infinity.

FIG. 55 is a sectional view of the FIG. 53 digital camera.

DESCRITPION OF THE PREFERRED EMBODIMENTS

Set out below are Examples 1 to 25 of the zoom lens system according to the present invention. FIGS. 1 to 25 are sectional views illustrative of the lens arrangements of these examples when focused on an object point at infinity. Throughout the drawings, the first, second, third, fourth, fifth and sixth lens groups are shown at G1, G2, G3, G4, G5 and G6, respectively. A plane-parallel plate group comprising a finder optical path-splitting prism (a plane-parallel plate), an optical low-pass filter with an infrared cutting coat applied thereon and a cover glass for an electronic image pickup device such as a CCD is shown at P and an image plane at I. The plane-parallel plate group P is fixedly located between the final lens group and the image plane I. In FIGS. 1 to 25, the locus of movement of each lens group from the wide-angle end to the telephoto end is schematically depicted by an arrow. Numerical data on each example will be enumerated below.

Figure 1:
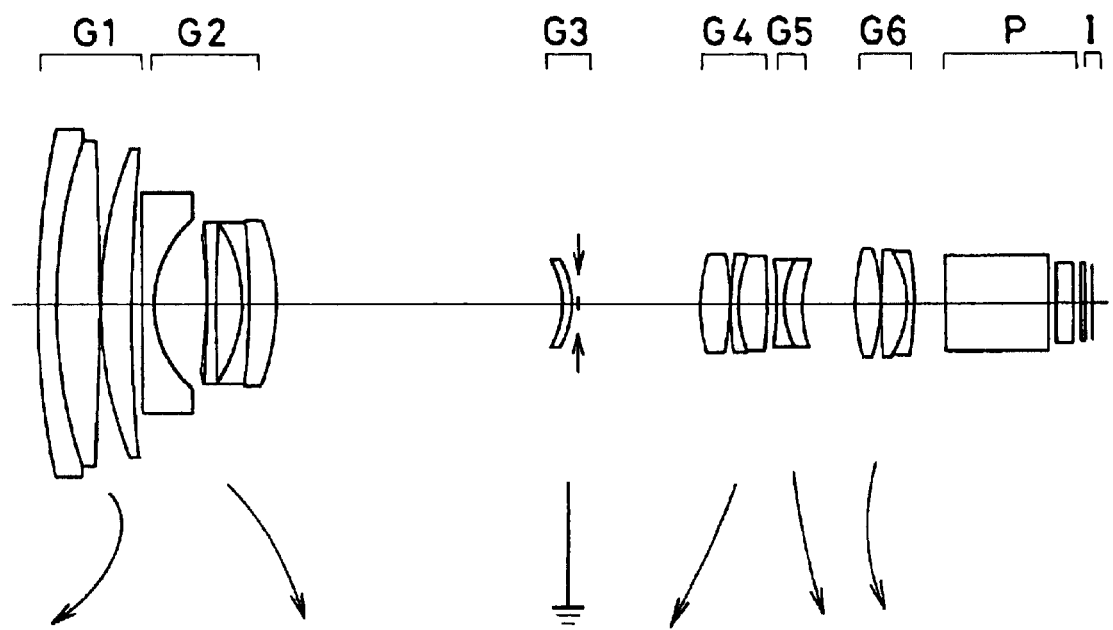
FIG. 1 is a sectional view for the lens arrangement of Example 1 of the zoom lens system according to the invention when focused on an object point at infinity.

As shown in FIG. 1, the zoom lens system of Example 1 is made up of a first lens group G1 having positive refracting power, a second lens group G2 having negative refracting power, a third lens group G3 having negative refracting power, a fourth lens group G4 having positive refracting power, a fifth lens group G5 having negative refracting power and a sixth lens group G6 having positive refracting power. For zooming from the wide-angle end to the telephoto end when the system is focused on an object point at infinity, the first lens group G1 moves toward the image side of the zoom lens system in a convex reciprocating locus and reaches the telephoto end where it is located nearer to the object side of the zoom lens system than at the location of the wide-angle end, the second lens group G2 moves toward the image side, the third lens group G3 remains fixed with an aperture stop integrated therewith on the image side, the fourth lens group G4 moves toward the object side, the fifth lens group G5 moves toward the image side, and the sixth lens group G6 moves toward the object side in a convex reciprocating locus while the spacing between the fifth lens group G5 and the sixth lens group G6 becomes narrow, and reaches the telephoto end where it is located somewhat nearer to the image side than at the location of the wide-angle end. For focusing on a nearby subject, the sixth lens group G6 is designed to move out toward the object side. More specifically, for focusing at 0.3 m from an infinite object distance at the wide-angle end, on the one hand, the sixth lens group G6 moves toward the object side in such a way that the spacing between the fifth lens group G5 and the sixth lens group G6 changes from 8.26323 mm to 8.10753 mm. For focusing at 1.284 m (with a magnification of 1/20) from an infinite object distance at the telephoto end, on the other hand, the sixth lens group G6 moves toward the object side in such a way that the spacing between the fifth lens group G5 and the sixth lens group G6 changes from 5.08574 mm to 1.45116 mm.

In Example 1, the first lens group G1 is made up of a negative meniscus lens convex on the object side thereof, a double-convex lens and a positive meniscus lens convex on the object side thereof, the second lens group G2 is made up of a double-concave lens, a double-concave lens with an object-side surface thereof provided with a thin resin layer, thereby making this surface aspheric, and a doublet consisting of a negative meniscus lens convex on the image side thereof and a positive meniscus lens convex on the image side thereof, the third lens group G3 is made up of a negative meniscus lens convex on the image side thereof and a stop, the fourth lens group G4 is made up of a double-convex lens and a doublet consisting of a negative meniscus lens convex on the object side thereof and a double-convex lens, the fifth lens group G5 is made up of a double-concave lens and a positive meniscus lens convex on the object side thereof, and the sixth lens group G6 is made up of a double-convex lens and a doublet consisting of a double-convex lens and a negative meniscus lens convex on the image side thereof. Three aspheric surfaces are used, one for the object-side resin layer surface of the double-concave lens in the second lens group G2, one for the object-side surface of the double-convex lens in the fourth lens group G4 and one for the object-side surface of the double-convex lens in the sixth lens group G6.

Figure 2:
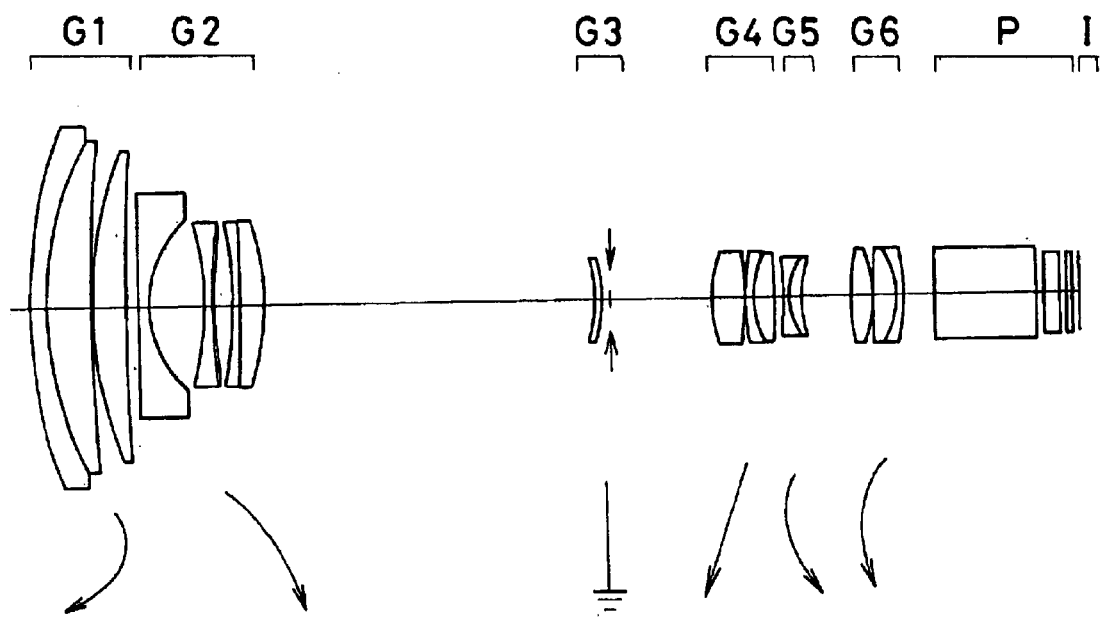
FIG. 2 is a sectional view, similar to FIG. 1, of the lens arrangement of Example 2 of the zoom lens system.

As shown in FIG. 2, the zoom lens system of Example 2 is made up of a first lens group G1 having positive refracting power, a second lens group G2 having negative refracting power, a third lens group G3 having negative refracting power, a fourth lens group G4 having positive refracting power, a fifth lens group G5 having negative refracting power and a sixth lens group G6 having positive refracting power. For zooming from the wide-angle end to the telephoto end when the zoom lens system is focused on an object point at infinity, the first lens group G1 moves toward the image side of the zoom lens system in a convex reciprocation locus and reaches the telephoto end where it is located nearer to the object side of the zoom lens system than at the location of the wide-angle end, the second lens group G2 moves toward the image side, the third lens group G3 remains fixed with an aperture stop integrated therewith on the image side, the fourth lens group G4 moves toward the object side, the fifth lens group G5 moves toward the object side in a convex reciprocation locus and reaches the telephoto end where it is located nearer to the image side than at the location of the wide-angle end, and the sixth lens group G6 moves toward the object side in a convex reciprocation locus while the spacing between the fifth lens group G5 and the sixth lens group G6 becomes narrow and then somewhat wide, and reaches the telephoto end where it is located somewhat nearer to the image side than at the location of the wide-angle end. For focusing on a nearby subject, the sixth lens group G6 is designed to move out toward the object side. More specifically, when the system is focused on a nearby subject at the wide-angle end, the spacing between the fifth lens group G5 and the sixth lens group G6 is set at 7.7998 mm and when focused on a nearby subject at the telephoto end, the spacing between the fifth lens group G5 and the sixth lens group G6 is set at 2.2730 mm.

In Example 2, the first lens group G1 is made up of two lenses, i.e., a negative meniscus lens convex on its object side and a positive meniscus lens convex on its object side, the second lens group G2 is made up of a double-concave lens, a double-concave lens with an image-side surface thereof provided with a thin resin layer, thereby making that surface aspheric and a doublet consisting of a negative meniscus lens convex on its mage side and a positive meniscus lens convex on its image side, the third lens group G3 is made up of a negative meniscus lens convex on its image side and a stop, the fourth lens group G4 is made up of a double-convex lens and a doublet consisting of a negative meniscus lens convex on its object side and a double-convex lens, the fifth lens group G5 is made up of a doublet consisting of a double-concave lens and a positive meniscus lens on its object side, and the sixth lens group G6 is made up of a double-convex lens and a doublet consisting of a positive meniscus lens convex on its image side and a negative meniscus lens convex on its image side. Three aspheric surfaces are used, one for the image-side resin layer surface of the double-concave lens in the second lens group G2, one for the object-side surface of the double-convex lens in the fourth lens group G4 and one for the object-side surface of the double-convex lens in the sixth lens group G6.

Figure 3:
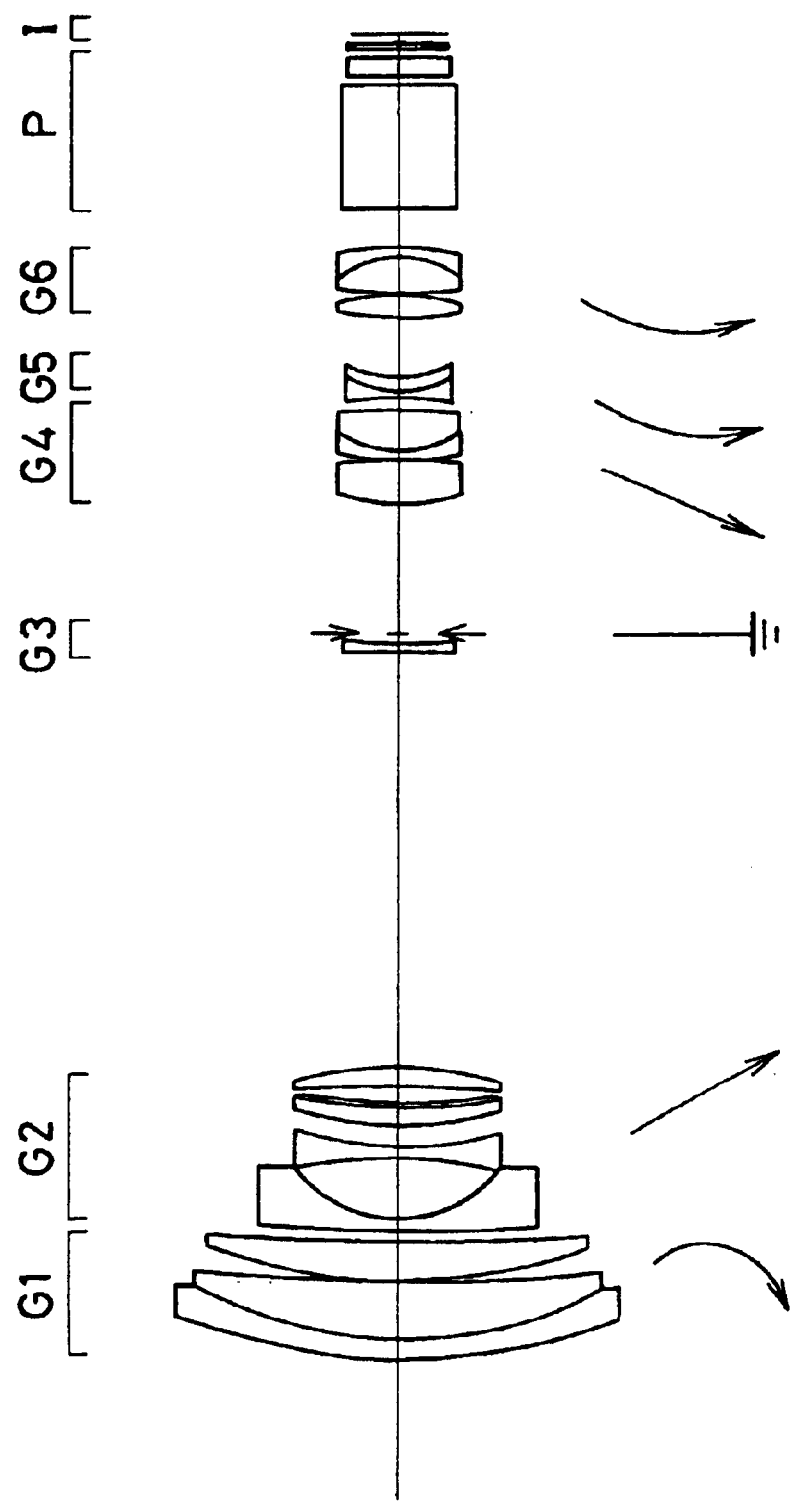
FIG. 3 is a sectional view, similar to FIG. 1, of the lens arrangement of Example 3 of the zoom lens system.

As shown in FIG. 3, the zoom lens system of Example 3 is made up of a first lens group G1 having positive refracting power, a second lens group G2 having negative refracting power, a third lens group G3 having negative refracting power, a fourth lens group G4 having positive refracting power, a fifth lens group G5 having negative refracting power and a sixth lens group G6 having positive refracting power. For zooming from the wide-angle end to the telephoto end where the system is focused on an object point at infinity, the first lens group G1 moves toward the image side of the zoom lens system in a convex reciprocation locus and reaches the telephoto end where it is located nearer to the object side of the zoom lens system than at the location of the wide-angle end, the second lens group G2 moves toward the image side, the third lens group G3 remains fixed with an aperture stop integrated therewith on its image side, the fourth lens group G4 moves toward the object side, the fifth lens group G5 moves toward the object side in a convex reciprocation locus and reaches the telephoto end where it is located somewhat nearer to the image side than at the location of the wide-angle end, and the sixth lens group G6 moves toward the object side in a convex reciprocation locus while the spacing between the fifth lens group G5 and the sixth lens group G6 becomes narrow and then somewhat wide, and reaches the telephoto end where it is located somewhat nearer to the object side than at the location of the wide-angle end. For focusing on a nearby subject, the sixth lens group G6 is designed to move out toward the object side. More specifically, when the system is focused on a nearby subject at the wide-angle end, the spacing between the fifth lens group G5 and the sixth lens group G6 is set at 7.6726 mm and when focused on a nearby subject at the telephoto end, the spacing between the fifth lens group G5 and the sixth lens group G6 is set at 3.1112 mm.

In Example 3, the first lens group G1 is made up of two lenses, i.e., a negative meniscus lens convex on its object side and a positive meniscus lens convex on its object side, the second lens group G2 is made up of a negative meniscus lens convex on its object side, a double-concave lens, a positive meniscus lens convex on its object side with an image-side surface thereof provided with a thin resin layer, thereby making that surface aspheric, and a negative meniscus lens convex on its object side, the third lens group G3 is made up of a negative meniscus lens convex on its object side and a stop, the fourth lens group G4 is made up of a double-convex lens and a doublet consisting of a negative meniscus lens convex on its object side and a double-convex lens, the fifth lens group G5 is made up of a doublet consisting of a double-concave lens and a positive meniscus lens convex on its object side, and the sixth lens group G6 is made up of a double-convex lens and a doublet consisting of a double-convex lens and a negative meniscus lens convex on its image side. Three aspheric surfaces are used, one for the image-side resin layer surface of the positive meniscus lens in the second lens group G2, said lens convex on its object side, one for the object-side surface of the double-convex lens in the fourth lens group G4 and one for the image-side surface of the double-convex lens in the sixth lens group G6.

Figure 4:
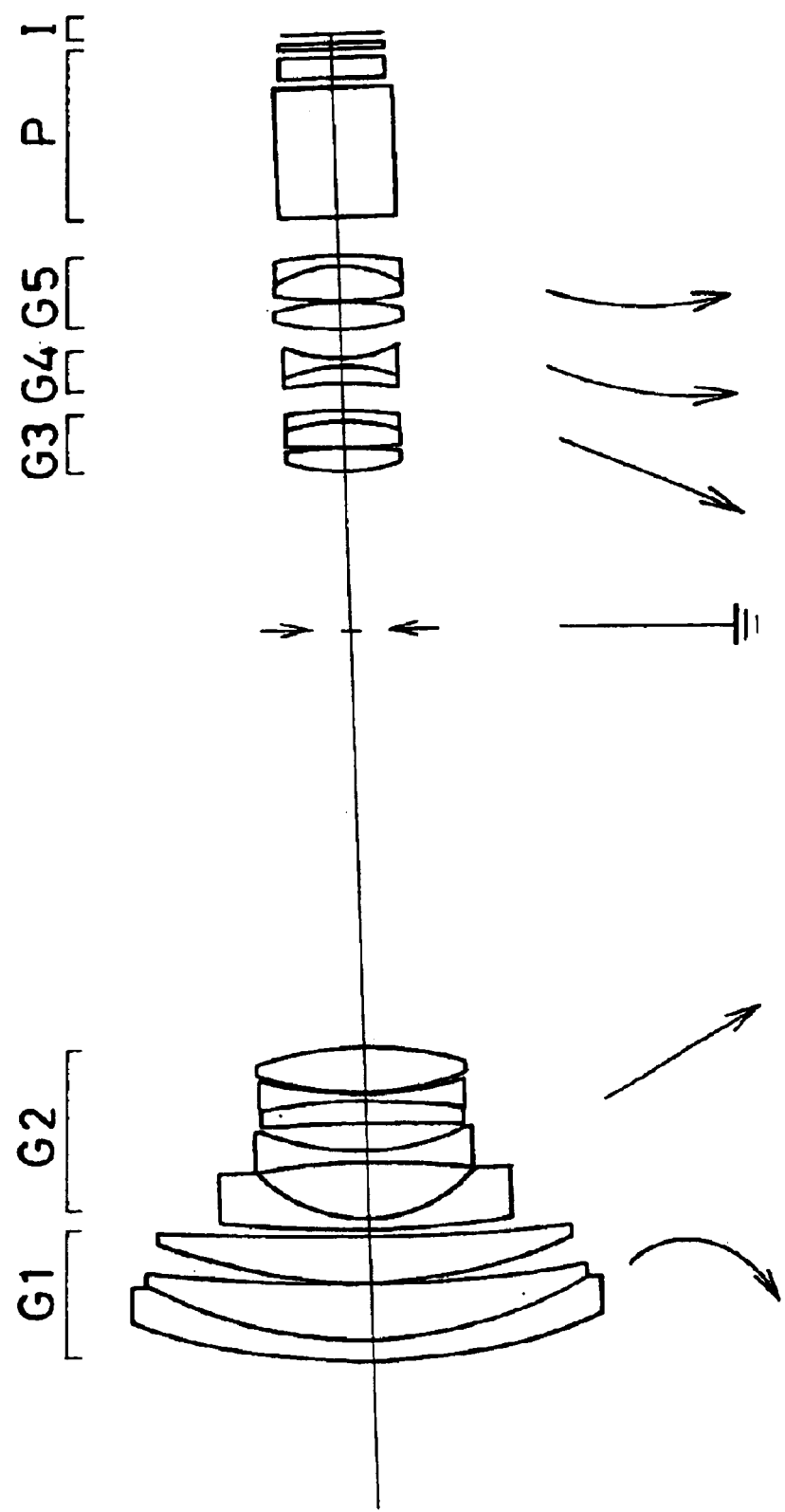
FIG. 4 is a sectional view, similar to FIG. 1, of the lens arrangement of Example 4 of the zoom lens system.

As shown in FIG. 4, the zoom lens system of Example 4 is made up of a first lens group G1 having positive refracting power, a second lens group G2 having negative refracting power, a fixed aperture stop, a third lens group G3 having positive refracting power, a fourth lens group G4 having negative refracting power and a fifth lens group G5 having positive refracting. For zooming from the wide-angle end to the telephoto end of the zoom lens system when focused on an object point at infinity, the first lens group G1 moves toward the image side of the zoom lens system in a convex reciprocation locus and reaches the telephoto end where it is located nearer to the object side of the zoom lens system than at the location of the wide-angle end, the second lens group G2 moves toward the image side, the third lens group G3 moves toward the object side, the fourth lens group G4 moves toward the object side in a convex reciprocation locus and reaches the telephoto end where it is located somewhat nearer to the object side than at the location of the wide-angle end, and the fifth lens group G5 moves toward the object side in a convex reciprocation locus while the spacing between the fourth lens group G4 and the fifth lens group G5 becomes wide and then somewhat narrow, and reaches the telephoto end where it is located somewhat nearer to the object side than at the location of the wide-angle end. For focusing on a nearby subject, the fifth lens group G5 is designed to move out toward the object side. More specifically, when the system is focused on a nearby subject at the wide-angle end, the spacing between the fourth lens group G4 and the fifth lens group G5 is set at 3.0843 mm and when focused on a nearby subject at the telephoto end, the spacing between the fourth lens group G4 and the fifth lens group G5 is set at 2.2572 mm.

In Example 4, the first lens group G1 is made up of two lenses, i.e., a negative meniscus lens convex on its object side and a positive meniscus lens convex on its object side, the second lens group G2 is made up of a negative meniscus lens convex on its object side, a double-concave lens and a doublet consisting of a positive meniscus lens convex on its image side and a double-concave lens and a double-convex lens, the third lens group G3, with the fixed aperture stop located between the second lens group G2 and the third lens group G3, is made up of a double-convex lens and a doublet consisting of a double-convex lens and a negative meniscus lens convex on its image side, the fourth lens group G4 is made up of a doublet consisting of a positive meniscus lens convex on its image side and a double-concave lens, and the fifth lens group G5 is made up of a double-convex lens and a doublet consisting of a double-convex lens and a negative meniscus lens convex on its image side. Three aspheric surfaces are used, one for the object-side surface of the doublet in the second lens group G2, one for the object-side surface of the double-convex lens in the third lens group G3 and one for the object-side surface of the double-convex lens in the fifth lens group G5.

Figure 5:
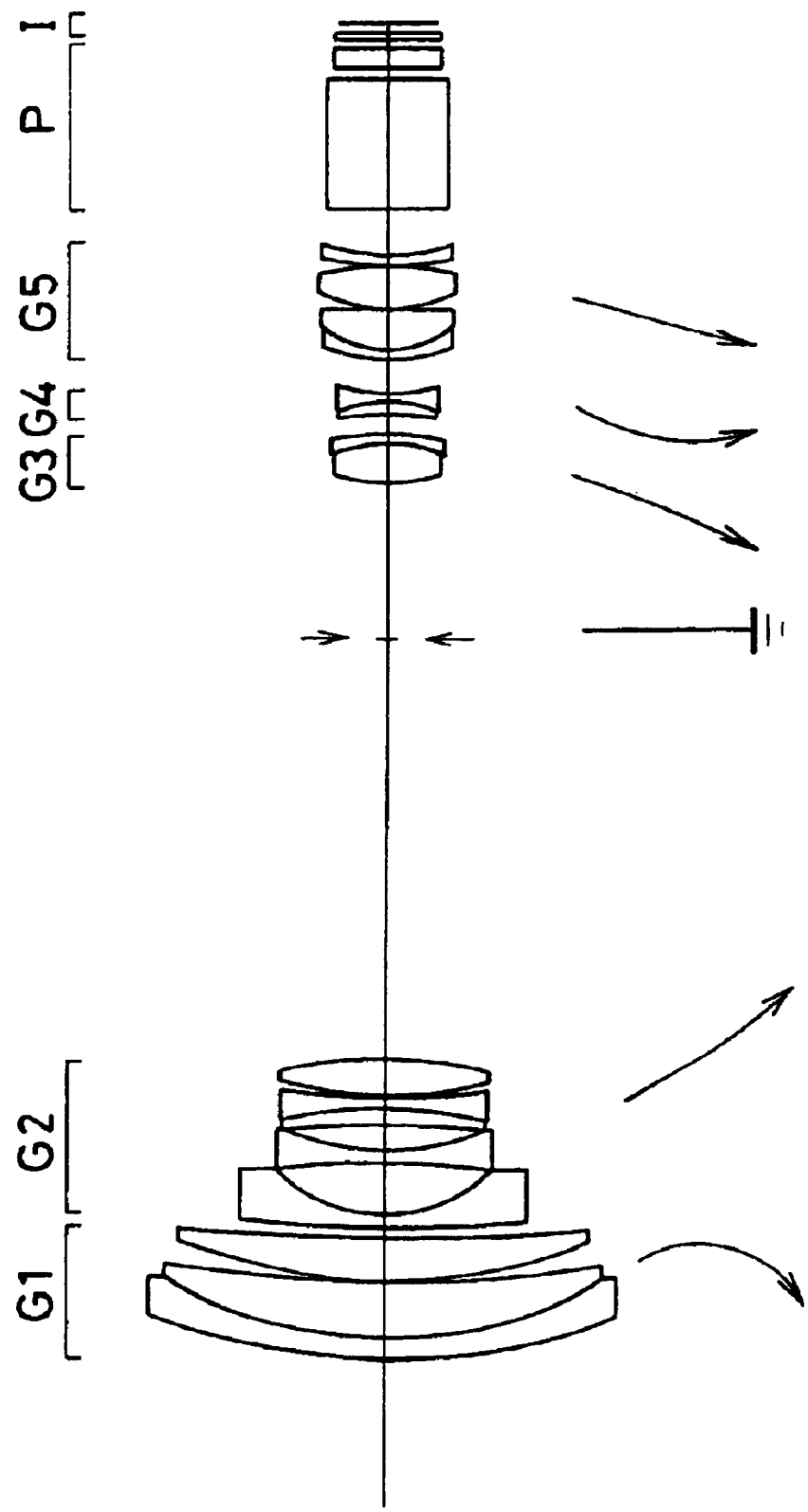
FIG. 5 is a sectional view, similar to FIG. 1, of the lens arrangement of Example 5 of the zoom lens system.

As shown in FIG. 5, the zoom lens system of Example 5 is made up of a first lens group G1 having positive refracting power, a second lens group G2 having negative refracting power, a fixed aperture stop, a third lens group G3 having positive refracting power, a fourth lens group G4 having negative refracting power and a fifth lens group G5 having positive refracting. For zooming from the wide-angle end to the telephoto end of the zoom lens system when focused on an object point at infinity, the first lens group GI moves toward the image side of the zoom lens system in a convex reciprocation locus and reaches the telephoto end where it is located nearer to the object side of the zoom lens system than at the location of the wide-angle end, the second lens group G2 moves toward the image side, the third lens group G3 moves toward the object side, the fourth lens group G4 moves toward the object side in a convex reciprocation locus and reaches the telephoto end where it is located somewhat nearer to the object side than at the location of the wide-angle end, and the fifth lens group G5 moves toward the object side while the spacing between the fourth lens group G4 and the fifth lens group G5 becomes wide and then somewhat narrow. For focusing on a nearby subject, the fifth lens group G5 is designed to move out toward the object side. More specifically, when the system is focused on a nearby subject at the wide-angle end, the spacing between the fourth lens group G4 and the fifth lens group G5 is set at 4.2063 mm and when focused on a nearby subject at the telephoto end, the spacing between the fourth lens group G4 and the fifth lens group G5 is set at 2.006 mm.

In Example 5, the first lens group G1 is made up of two lenses, i.e., a negative meniscus lens convex on its object side and a positive meniscus lens convex on its object side, the second lens group G2 is made up of a negative meniscus lens convex on its object side, a double-concave lens, a doublet consisting of a positive meniscus lens convex on its image side and a double-concave lens and a double-convex lens. The third lens group G3, with the fixed stop located between the second lens group G2 and the third lens group G3, is made up of a double-convex lens and a negative meniscus lens convex on its image side, the fourth lens group G4 is made up of a doublet consisting of a positive meniscus lens convex on its image side and a double-concave lens, and the fifth lens group G5 is made up of a doublet consisting of a negative meniscus lens convex on its object side and a positive meniscus lens convex on its object side, a double convex lens and a positive meniscus lens convex on its object side. Three aspheric surfaces are used, one for the object-side surface of the doublet in the second lens group G2, one for the object-side surface of the double-convex lens in the third lens group G3 and one for the image-side surface of the double-convex lens in the fifth lens group G5.

Figure 6:
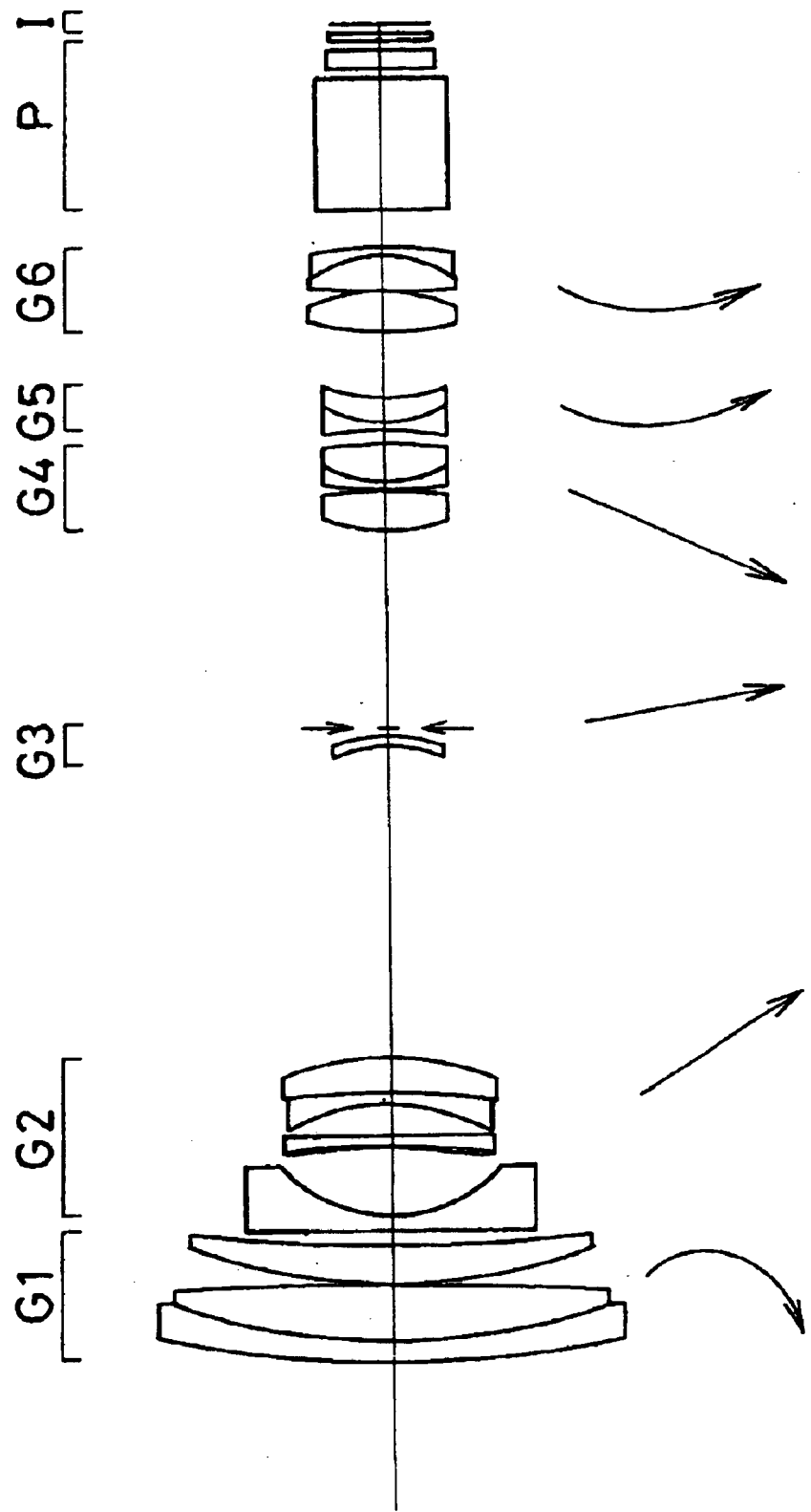
FIG. 6 is a sectional view, similar to FIG. 1, of the lens arrangement of Example 6 of the zoom lens system.

As shown in FIG. 6, the zoom lens system of Example 6 is made up of a first lens group G1 having positive refracting power, a second lens group G2 having negative refracting power, a third lens group G3 having negative refracting power, a fourth lens group G4 having positive refracting power, a fifth lens group G5 having negative refracting power and a sixth lens group G6 having positive refracting power. For zooming from the wide-angle end to the telephoto end of the zoom lens system when focused on an object point at infinity, the first lens group G1 moves toward the image side of the zoom lens system in a convex reciprocation locus and reaches the telephoto end of the zoom lens system where it is located nearer to the object side than at the location of the wide-angle end, the second lens group G2 moves toward the image side, the third lens group G3, which is integrally provided with an aperture stop on its image side, moves toward the image side while the spacing between the second lens group G2 and the third lens group G3 becomes narrow, the fourth lens group G4 moves toward the object side, the fifth lens group G5 moves toward the object side in a convex reciprocation locus and reaches the telephoto end where it is located nearer to the image side than at the location of the wide-angle end, and the sixth lens group G6 moves toward the object side in a convex reciprocation locus while the spacing between the fifth lens group G5 and the sixth lens group G6 becomes narrow, and reaches the telephoto end where it is located somewhat nearer to the object side than at the location of the wide-angle end. For focusing on a nearby subject, the sixth lens group G6 is designed to move out toward the object side of the system. More specifically, when the system is focused on a nearby substance at the wide-angle end, the spacing between the fifth lens group G5 and the sixth lens group G6 is set at 7.9681 mm and when focused on a nearby subject at the telephoto end, the spacing between the fifth lens group G5 and the sixth lens group G6 is set at 1.7655 mm.

In Example 6, the first lens group G1 is made up of a negative meniscus lens convex on its object side, a double-convex lens and a positive meniscus lens convex on its object side, the second lens group G2 is made up of a double-concave lens, a double-concave lens with an object-side surface thereof provided with a thin resin layer, thereby making that surface aspheric, and a doublet consisting of a negative meniscus lens convex on its image side and a positive meniscus lens convex on its image side, the third lens group G3 is made up of a negative meniscus lens convex on its image side and a stop, the fourth lens group G4 is made up of a double-convex lens and a doublet consisting of a negative meniscus lens convex on its object side and a double-convex lens, the fifth lens group G5 is made up of a doublet consisting of a double-concave lens and a positive meniscus lens convex on its object side, and the sixth lens group G6 is made up of a double-convex lens and a doublet consisting of a double-convex lens and a negative meniscus lens convex on its image side. Three aspheric surfaces are provided, one for the object-side resin layer surface of the double-concave lens in the second lens group G2, one for the object-side surface of the double-convex lens in the fourth lens group G4 and one for the object-side surface of the double-convex lens in the sixth lens group G6.

Figure 7:
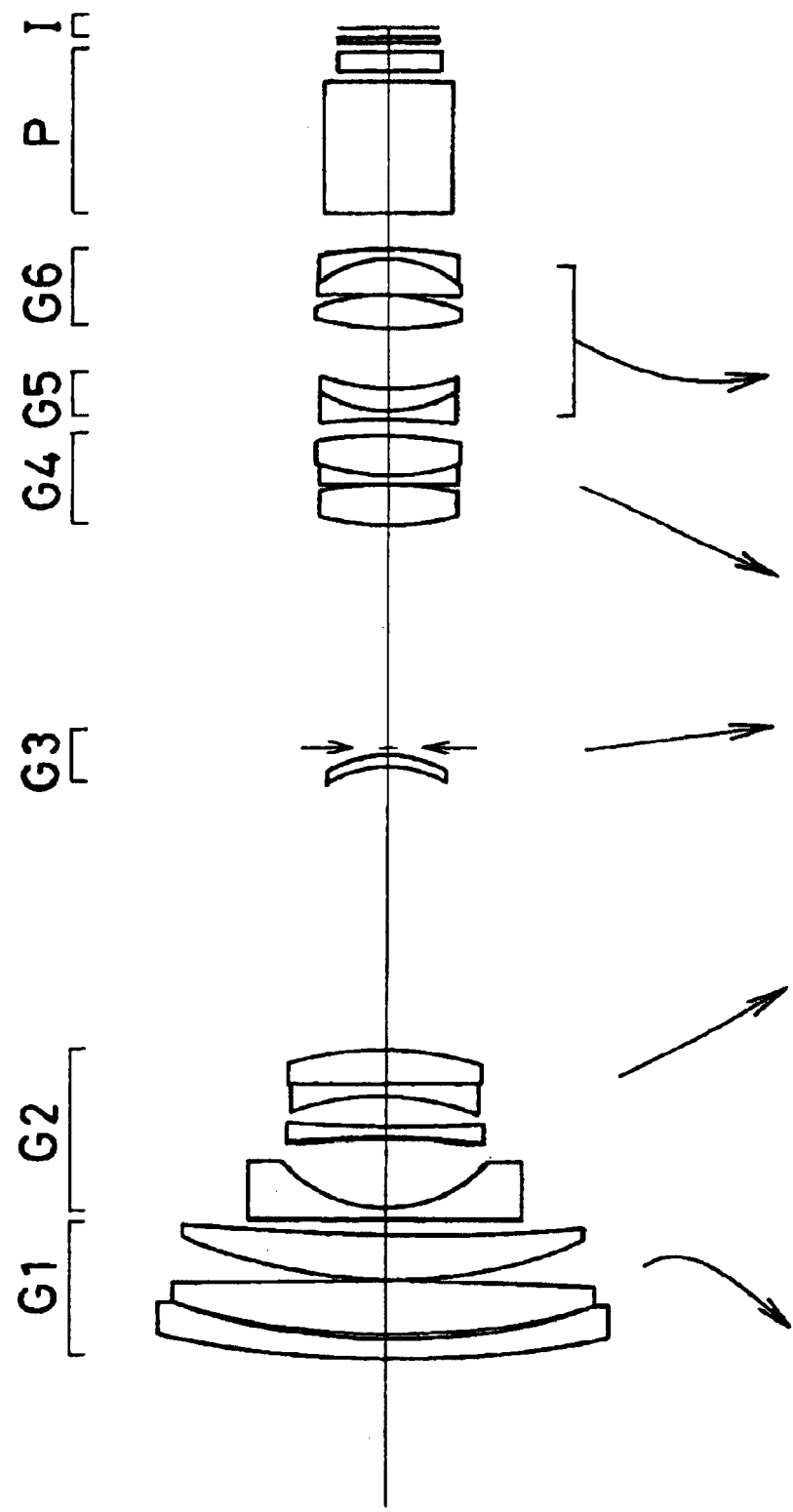
FIG. 7 is a sectional view, similar to FIG. 1, of the lens arrangement of Example 7 of the zoom lens system.

As shown in FIG. 7, the zoom lens system of Example 7 is made up of a first lens group G1 having positive refracting power, a second lens group G2 having negative refracting power, a third lens group G3 having negative refracting power, a fourth lens group G4 having positive refracting power, a fifth lens group G5 having negative refracting power and a sixth lens group G6 having positive refracting power. For zooming from the wide-angle end to the telephoto end of the zoom lens system when focused on an object point at infinity, the first lens group G1 moves toward the image side of the system in a convex reciprocation locus and reaches the telephoto end where it is located nearer to the object side of the zoom lens system than at the location of the wide-angle end, the second lens group G2 moves toward the image side, the third lens group G3, which is integrally provided with an aperture stop on its image side, moves toward the image side while the spacing between the second lens group G2 and the third lens group G3 becomes narrow, the fourth lens group G4 moves toward the object side, and the fifth lens group G5 moves together with the sixth lens group G6 in a convex reciprocation locus and reaches the telephoto end where it is located somewhat nearer to the object side than at the location of the wide-angle end. For focusing on a nearby subject, the sixth lens group G6 is designed to move out toward the object side. More specifically, when the system is focused on a nearby subject at the wide-angle end, the spacing between the fifth lens group G5 and the sixth lens group G6 is set at 7.4249 mm, and when focused on a nearby subject at the telephoto end, the spacing between the fifth lens group G5 and the sixth lens group G6 is set at 3.9201 mm.

In Example 7, the first lens group G1 is made up of a negative meniscus lens convex on its object side, a double-convex lens and a positive meniscus lens convex on its object side, the second lens group G2 is made up of a negative meniscus lens convex on its object side, a double-concave lens with an object-side surface thereof provided with a thin resin layer thereby making that surface aspheric, and a doublet consisting of a negative meniscus lens convex on its image side and a positive meniscus lens convex on its image side, the third lens group G3 is made up of a negative meniscus lens convex on its image side and a stop, the fourth lens group G4 is made up of a double-convex lens and a doublet consisting of a double-concave lens and a double-convex lens, the fifth lens group G5 is made up of a doublet consisting of a double-concave lens and a positive meniscus lens convex on its object side, and the sixth lens group G6 is made up of a double-convex lens and a doublet consisting of a positive meniscus lens convex on its image side and a negative meniscus lens convex on its image side. Three aspheric surfaces are provided, one for the object-side resin layer surface of the double-concave lens in the second lens group G2, one for the object-side surface of the double-convex lens in the fourth lens group G4 and one for the object-side surface of the double-convex lens in the sixth lens group G6.

As shown in FIG. 7, the zoom lens system of Example 7 is made up of a first lens group G1 having positive refracting power, a second lens group G2 having negative refracting power, a third lens group G3 having negative refracting power, a fourth lens group G4 having positive refracting power, a fifth lens group G5 having negative refracting power and a sixth lens group G6 having positive refracting power. For zooming from the wide-angle end to the telephoto end of the system when focused on an object point at infinity, the first lens group G1 moves toward the image side of the system in a convex reciprocation locus and reaches the telephoto end where it is located on the object side of the system with respect to the location of the wide-angle end, the second lens group G2 moves toward the image side, the third lens group G3, which is integrally provided with an aperture stop on its image side, moves toward the image side while the spacing between the second lens group G2 and the third lens group G3 becomes narrow, the fourth lens group G4 moves toward the object side, and the fifth lens group G5 moves together with the sixth lens group G6 in a convex reciprocation locus and reaches the telephoto end where it is located somewhat on the object side with respect to the location of the wide-angle end. For focusing on a nearby subject, the sixth lens group G6 is designed to move toward the object side. More specifically, when the system is focused on a nearby subject at the wide-angle end, the spacing between the fifth lens group G5 and the sixth lens group G6 is set at 7.4249 mm, and when focused on a nearby subject at the telephoto end, the spacing between the fifth lens group G5 and the sixth lens group G6 is set at 3.9201 mm.

In Example 7, the first lens group G1 is made up of a negative meniscus lens convex on its object side, a double-convex lens and a positive meniscus lens convex on its object side, the second lens group G2 is made up of a negative meniscus lens convex on its object side, a double-concave lens with an object-side surface thereof provided with a thin resin layer thereby making that surface aspheric, and a doublet consisting of a negative meniscus lens convex on its image side and a positive meniscus lens convex on its image side, the third lens group G3 is made up of a negative meniscus lens convex on its image side and a stop, the fourth lens group G4 is made up of a double-convex lens and a doublet consisting of a double-concave lens and a double-convex lens, the fifth lens group G5 is made up of a doublet consisting of a double-concave lens and a positive meniscus lens convex on its object side, and the sixth lens group G6 is made up of a double-convex lens and a doublet consisting of a positive meniscus lens convex on its image side and a negative meniscus lens convex on its image side. Three aspheric surfaces are provided, one for the object-side resin layer surface of the double-concave lens in the second lens group G2, one for the object-side surface of the double-convex lens in the fourth lens group G4 and one for the object-side surface of the double-convex lens in the sixth lens group G6.

Figure 8:
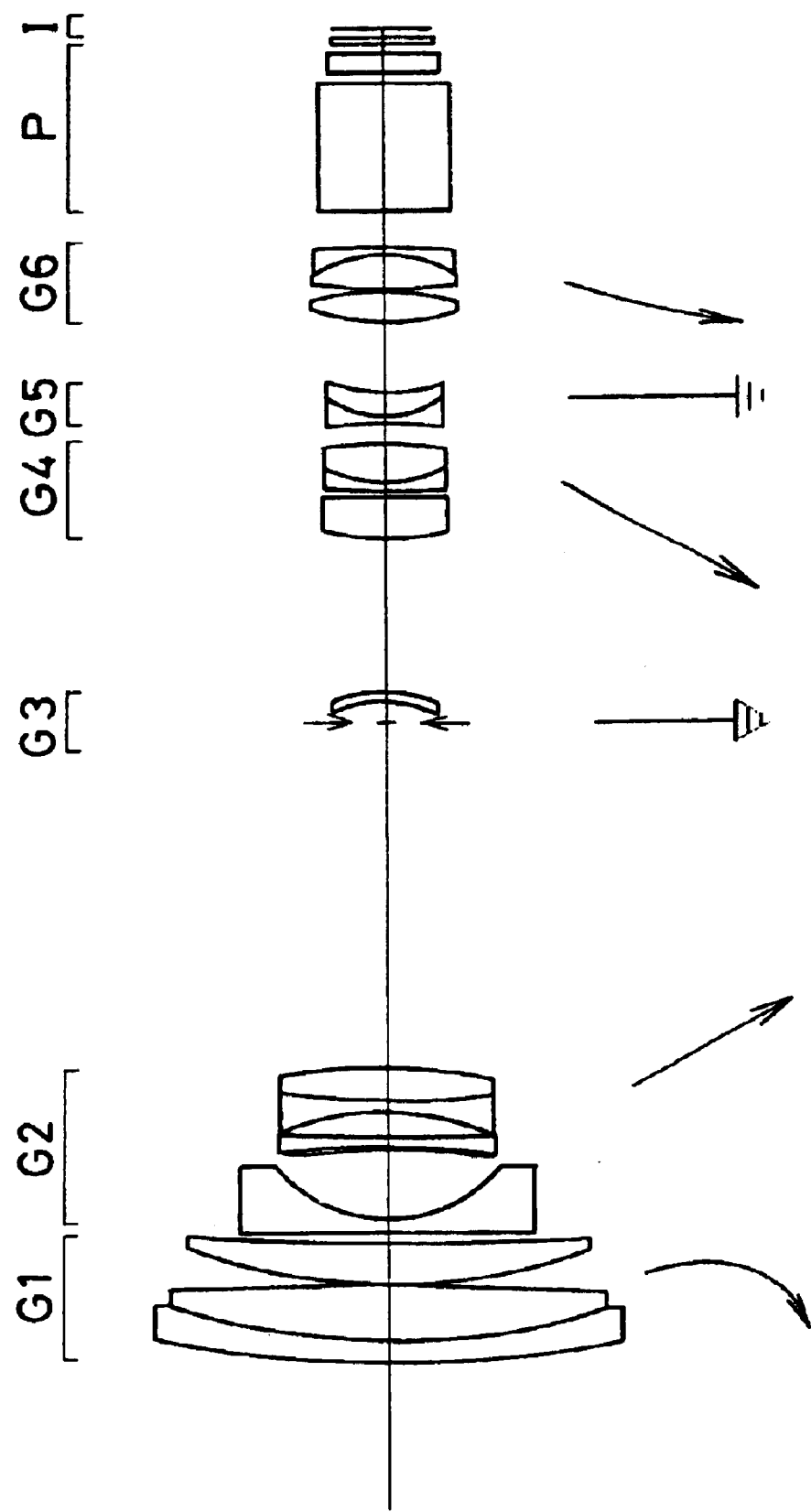
FIG. 8 is a sectional view, similar to FIG. 1, of the lens arrangement of Example 8 of the zoom lens system.

As shown in FIG. 8, the zoom lens system of Example 8 is made up of a first lens group G1 having positive refracting power, a second lens group G2 having negative refracting power, a third lens group G3 having negative refracting power, a fourth lens group G4 having positive refracting power, a fifth lens group G5 having negative refracting power and a sixth lens group G6 having positive refracting power. For zooming from the wide-angle end to the telephoto end of the zoom lens system when focused on an object point at infinity, the first lens group G1 moves toward the image side of the system in a convex reciprocation locus and reaches the telephoto end where it is located neater to the object side of the zoom lens system than at the location of the wide-angle end, the second lens group G2 moves toward the image side, the third lens group G3 is integrally provided with an aperture stop on its object side and remains fixed, the fourth lens group G4 moves toward the object side, the fifth lens group G5 remains fixed, and the sixth lens group G6 moves toward the object side. For focusing on a nearby subject, the sixth lens group G6 is designed to move out toward the object side. More specifically, when the zoom lens system is focused on a nearby subject at the wide-angle end, the spacing between the fifth lens group G5 and the sixth lens group G6 is set at 8.5198 mm, and when focused on a nearby subject at the telephoto end, the spacing between the fifth lens group G5 and the sixth lens group G6 is set at 1.3741 mm.

In Example 8, the first lens group G1 is made up of a negative meniscus lens convex on its object side, a double-convex lens and a positive meniscus lens convex on its object side, the second lens group G2 is made up of a double-concave lens, a double-concave lens with an object-side surface therein provided with a thin resin layer thereby making that surface aspheric, and a doublet consisting of a double-concave lens and a double-convex lens, the third lens group G3 is made up of a stop and a negative meniscus lens convex on its image side, the fourth lens group G4 is made up of a positive meniscus lens convex on its object side and a doublet consisting of a negative meniscus lens convex on its object side and a double-convex lens, the fifth lens group G5 is made up of a doublet consisting of a double-concave lens and a positive meniscus lens convex on its object side, and the sixth lens group G6 is made up of a double-convex lens and a doublet consisting of a double-convex lens and a negative meniscus lens convex on its image side. Three aspheric surfaces are provided, one for the object-side resin layer surface of the double-concave lens in the second lens group G2, one for the double-convex lens in the fourth lens group G4 and one for the object-side surface of the double-convex lens in the sixth lens group G6.

Figure 9:
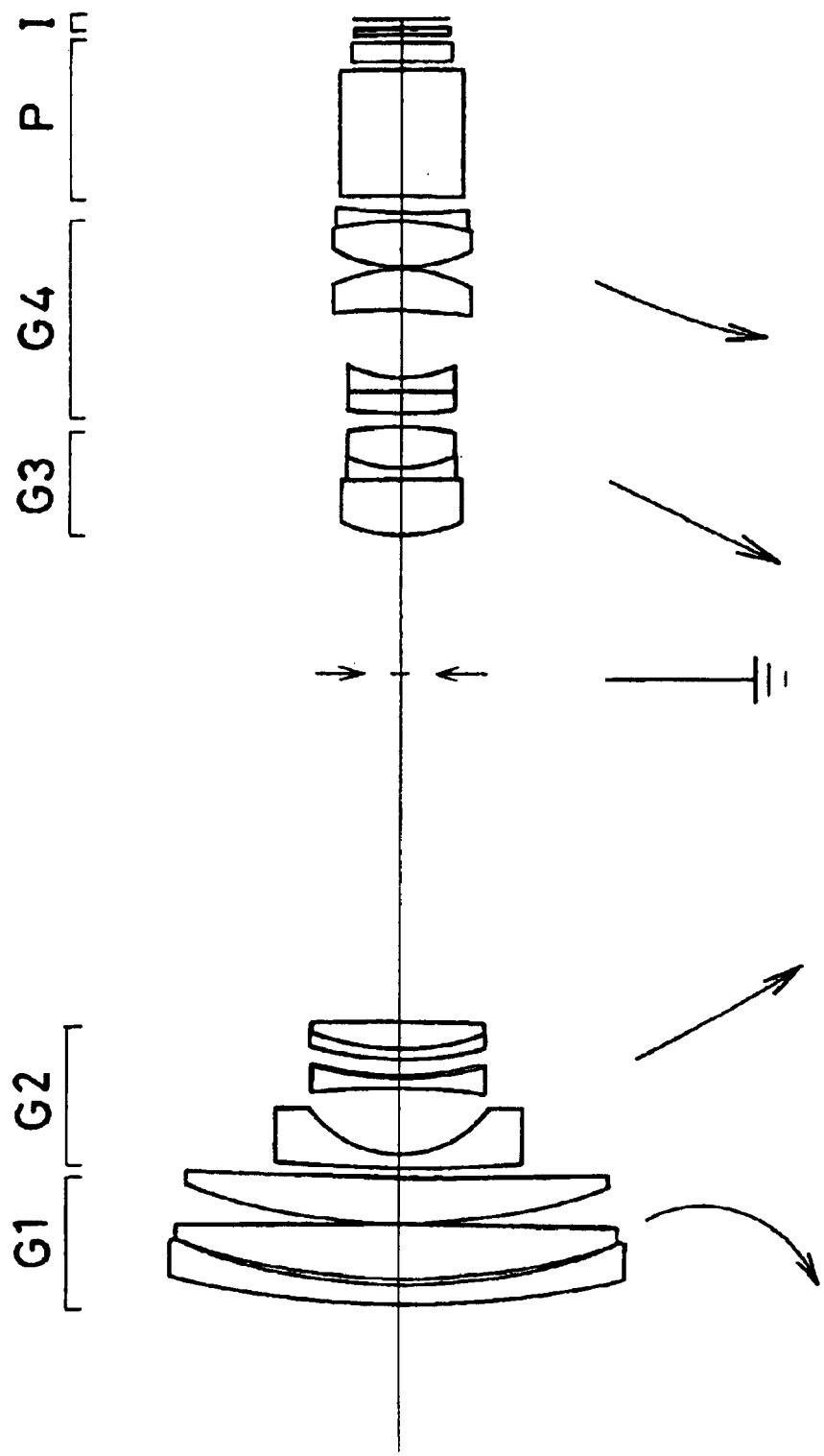
FIG. 9 is a sectional view, similar to FIG. 1, of the lens arrangement of Example 9 of the zoom lens system.

As shown in FIG. 9, the zoom lens system of Example 9 is made up of a first lens group G1 having positive refracting power, a second lens group G2 having negative refracting power, a fixed aperture stop, a third lens group G3 having positive refracting power and a fourth lens group G4 having positive refracting power. For zooming from the wide-angle end to the telephoto end of the system when focused on an object point at infinity, the first lens group G1 moves to the image side of the system in a convex reciprocation locus and reaches the telephoto end where it is located nearer to the object side of the zoom lens system than at the location of the wide-angle end, the second lens group G2 moves toward the image side, the third lens group G3 moves toward the object side, and the fourth lens group G4 moves toward the object side while the spacing between the third lens group G3 and the fourth lens group G4 becomes wide. For focusing on a nearby subject, the fourth lens group G4 is designed to move out toward the object side. More specifically, when the system is focused on a nearby subject at the wide-angle end, the spacing between the third lens group G3 and the fourth lens group G4 is set at 1.3397 mm, and when focused on a nearby subject at the telephoto end, the spacing between the third lens group G3 and the fourth lens group G4 is set at 15.0854 mm.

In Example 9, the first lens group G1 is made of a negative meniscus lens convex on its object side, a double-convex lens and a positive meniscus lens convex on its object side, the second lens group G2 is made up of a negative meniscus lens convex on its object side, a double-concave lens with an image-side surface thereof provided with a thin resin layer thereby making that surface aspheric, and a doublet consisting of a negative meniscus lens convex on its object side and a double-convex lens, the third lens group G3, with the fixed stop located between the second lens group G2 and the third lens group G3, is made up of a positive meniscus lens convex on its object side and a doublet consisting of a negative meniscus lens convex on its object side and a double-convex lens, and the fourth lens group G4 is made up of a doublet consisting of a double-convex lens and a double-concave lens, a positive meniscus lens convex on its image side and a doublet consisting of a double-convex lens and a double-concave lens. Three aspheric surfaces are provided, one for the image-side resin layer surface of the double-concave lens in the second lens group G2, one for the object-side surface of the positive meniscus lens in the third lens group G3 and one for the object-side surface of the positive meniscus lens in the fourth lens group G4.

Figure 10:
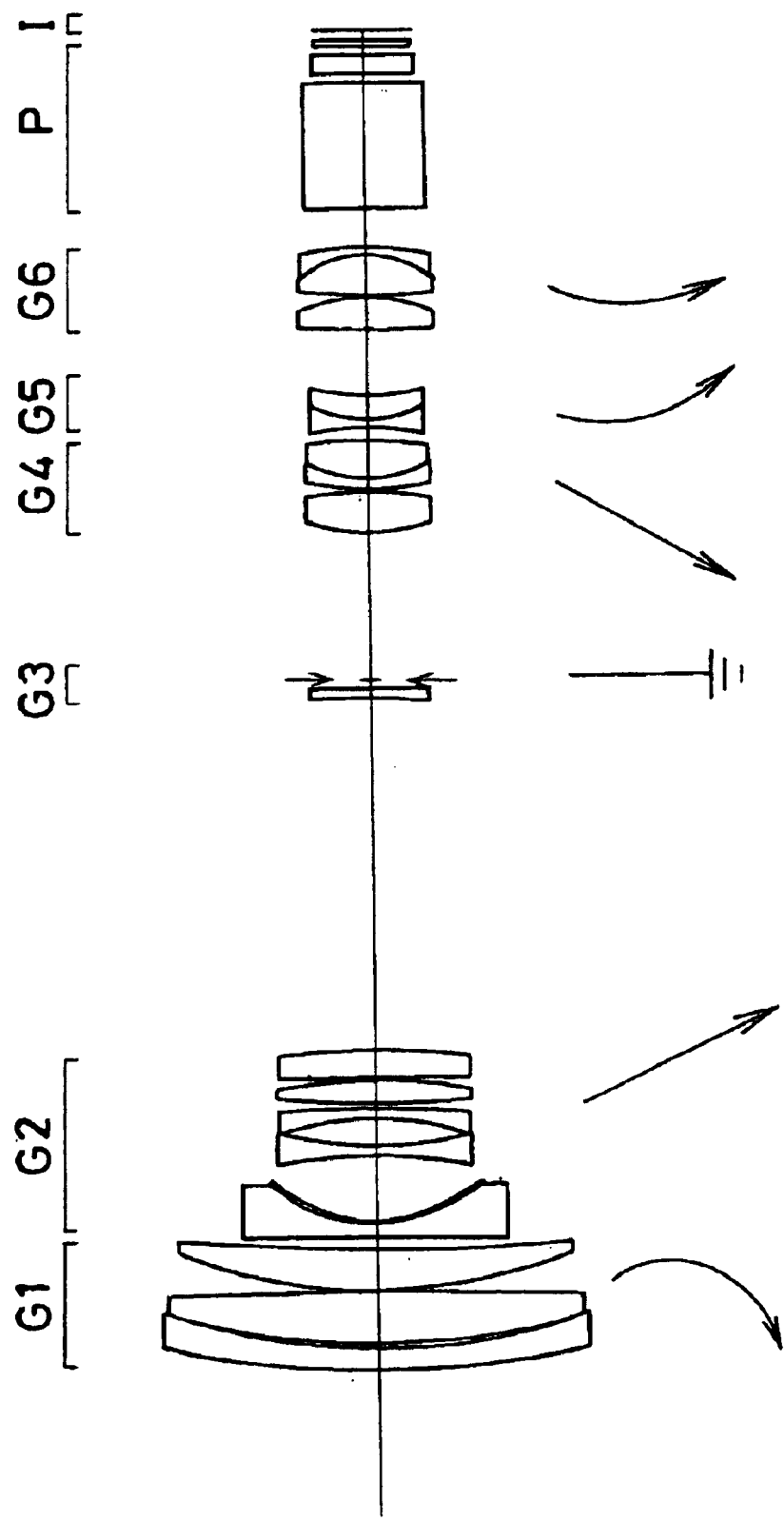
FIG. 10 is a sectional view, similar to FIG. 1, of the lens arrangement of Example 10 of the zoom lens system.

As shown in FIG. 10, the zoom lens system of Example 10 is made up of a first lens group G1 having positive refracting power, a second lens group G2 having negative refracting power, a third lens group G3 having negative refracting power, a fourth lens group G4 having positive refracting power, a fifth lens group G5 having negative refracting power and a sixth lens group G6 having positive refracting power. For zooming from the wide-angle end to the telephoto end of the zoom lens system when focused on an object point at infinity, the first lens group G1 moves toward the image side of the system in a convex reciprocation locus and reaches the telephoto end where it is located neater to the object side of the zoom lens system than at the location of the wide-angle end, the second lens group G2 moves toward the image side, the third lens group G3, which is integrally provided with an aperture stop on its image side, remains fixed, the fourth lens group G4 moves toward the object side, the fifth lens group G5 moves toward the object side in a convex reciprocation locus and reaches the telephoto end where it is located nearer to the image side than at the location of the wide-angle end, and the sixth lens group G6 moves toward the object side in a concave reciprocation locus while the spacing between the fifth lens group G5 and the sixth lens group G6 becomes narrow and reaches the telephoto end where it is located somewhat neater to the image side than at the location of the wide-angle end. For focusing on a nearby subject, the sixth lens group G6 is designed to move out toward the object side of the zoom lens system. More specifically, when the zoom lens system is focused on a nearby subject at the wide-angle end, the spacing between the fifth lens group G5 and the sixth lens group G6 is set at 8.1246 mm, and when focused on a nearby subject at the telephoto end, the spacing between the fifth lens group G5 and the sixth lens group G6 is set at 2.3175 mm.

In Example 10, the first lens group G1 is made up of a negative meniscus lens convex on its object side, a double-convex lens and a positive meniscus lens convex on its object side, the second lens group G2 is made up of a double-concave lens with an image-side surface thereof provided with a thin resin layer thereby making that surface aspheric, a double-concave lens, a negative meniscus lens convex on its image side and two double-convex lenses, the third lens group G3 is made up of a negative meniscus lens convex on its image side and a stop, the fourth lens group G4 is made up of a double-convex lens and a doublet consisting of a negative meniscus lens convex on its object side and a double-convex lens, the fifth lens group G5 is made up of a double-concave lens and a positive meniscus lens convex on its object side, and the sixth lens group G6 is made up of a double-convex lens and a doublet consisting of a double-convex lens and a negative meniscus lens convex on its image side. Three aspheric surfaces are provided, one for the image-side resin layer surface of the double-concave lens in the second lens group G2, one for the object-side surface of the double-convex lens in the fourth lens group G4 and one for the object-side surface of the double-convex lens in the sixth lens group G6.

Figure 11:
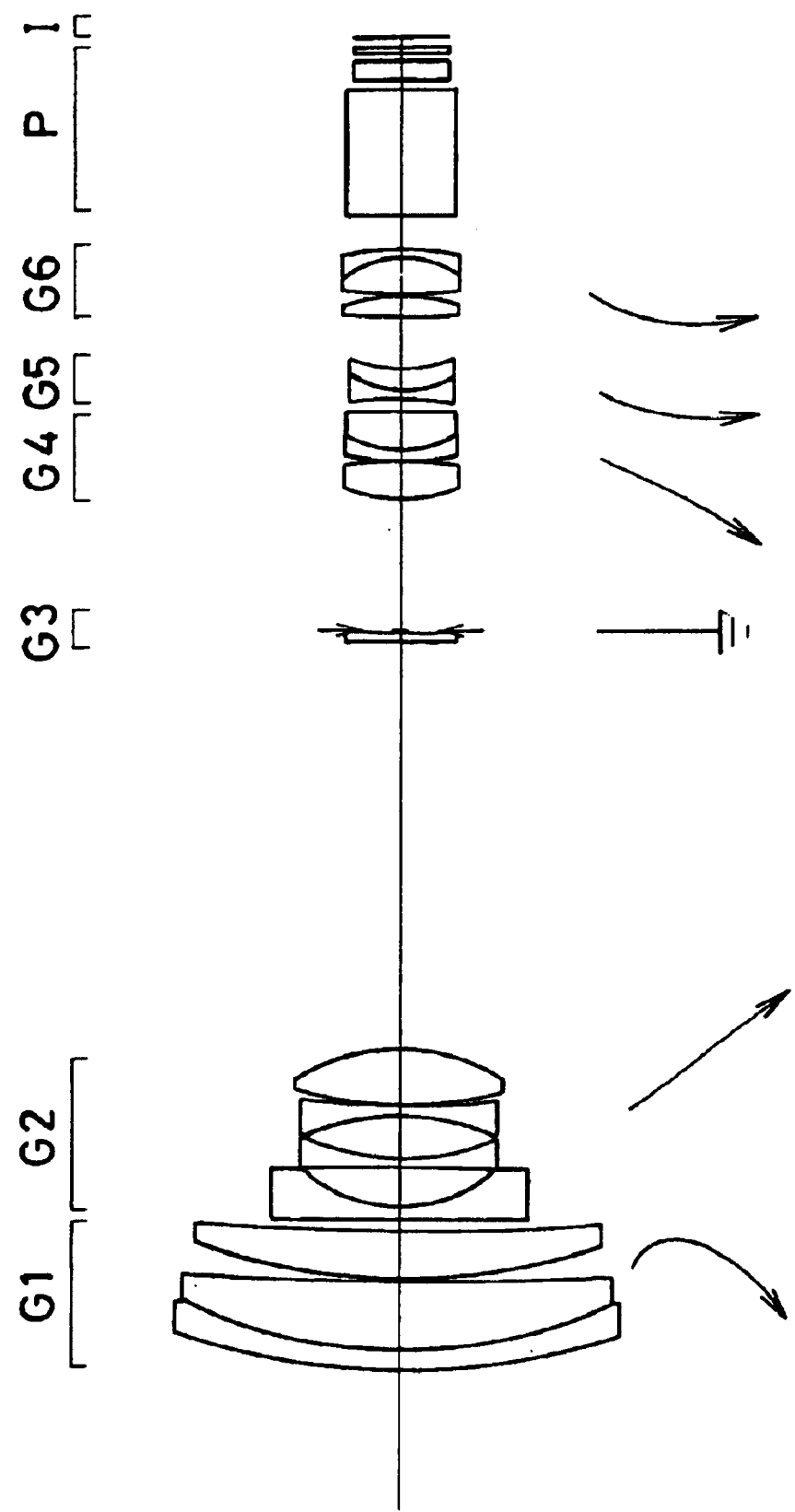
FIG. 11 is a sectional view, similar to FIG. 1, of the lens arrangement of Example 11 of the zoom lens system.

As shown in FIG. 11, the zoom lens system of Example 11 is made up of a first lens group G1 having positive refracting power, a second lens group G2 having negative refracting power, a third lens group G3 having negative refracting power, a fourth lens group G4 having positive refracting power, a fifth lens group G5 having negative refracting power and a sixth lens group G6 having positive refracting power. For zooming from the wide-angle end to the telephoto end of the zoom lens system when focused on an object point at infinity, the first lens group G1 moves toward the image side of the system in a convex reciprocation locus and reaches the telephoto end where it is located nearer to the object side than at the location of the wide-angle end, the second lens group G2 moves toward the image side, the third lens group G3, which is integrally provided with an aperture stop on its image side, remains fixed, the fourth lens group G4 moves toward the object side of the system, the fifth lens group G5 moves toward the object side in a convex reciprocation locus and reaches the telephoto end where it is located nearer to the object side than at the location of the wide-angle end, and the sixth lens group G6 moves toward the object side in a convex reciprocation locus while the spacing between the fifth lens group G5 and the sixth lens group G6 becomes narrow and then slightly wide and reaches the telephoto end where it is located somewhat nearer to the object side than at the location of the wide-angle end. For focusing on a nearby subject, the sixth lens group G6 is designed to move out toward the object side of the zoom lens system. More specifically, when the zoom lens system is focused on a nearby subject at the wide-angle end, the spacing between the fifth lens group G5 and the sixth lens group G6 is set at 6.6911 mm, and when focused on a nearby subject at the telephoto end, the spacing between the fifth lens group G5 and the sixth lens group G6 is set at 3.0700 mm.

In Example 11, the first lens group G1 is made up of two lenses, i.e., a negative meniscus lens convex on its object side and a positive meniscus lens convex on its object side, the second lens group G2 is made up of a negative meniscus lens convex on its object side, two double-concave lenses and a double-convex lens, the third lens group G3 is made up of a negative meniscus lens convex on its object side and a stop, the fourth lens group G4 is made up of a double-convex lens and a doublet consisting of a negative meniscus lens convex on its object side and a double-convex lens, the fifth lens group G5 is made up of a doublet consisting of a double-concave lens and a positive meniscus lens convex on its object side, and the sixth lens group G6 is made up of a double-convex lens and a doublet consisting of a double-convex lens and a negative meniscus lens convex on its image side. Three aspheric surfaces are used, one for the image-side surface of the double-convex lens in the second lens group G2, one for the object-side surface of the double-convex lens in the fourth lens group G4 and one for the image-side surface of the double-convex lens in the sixth lens group G6.

Figure 12:
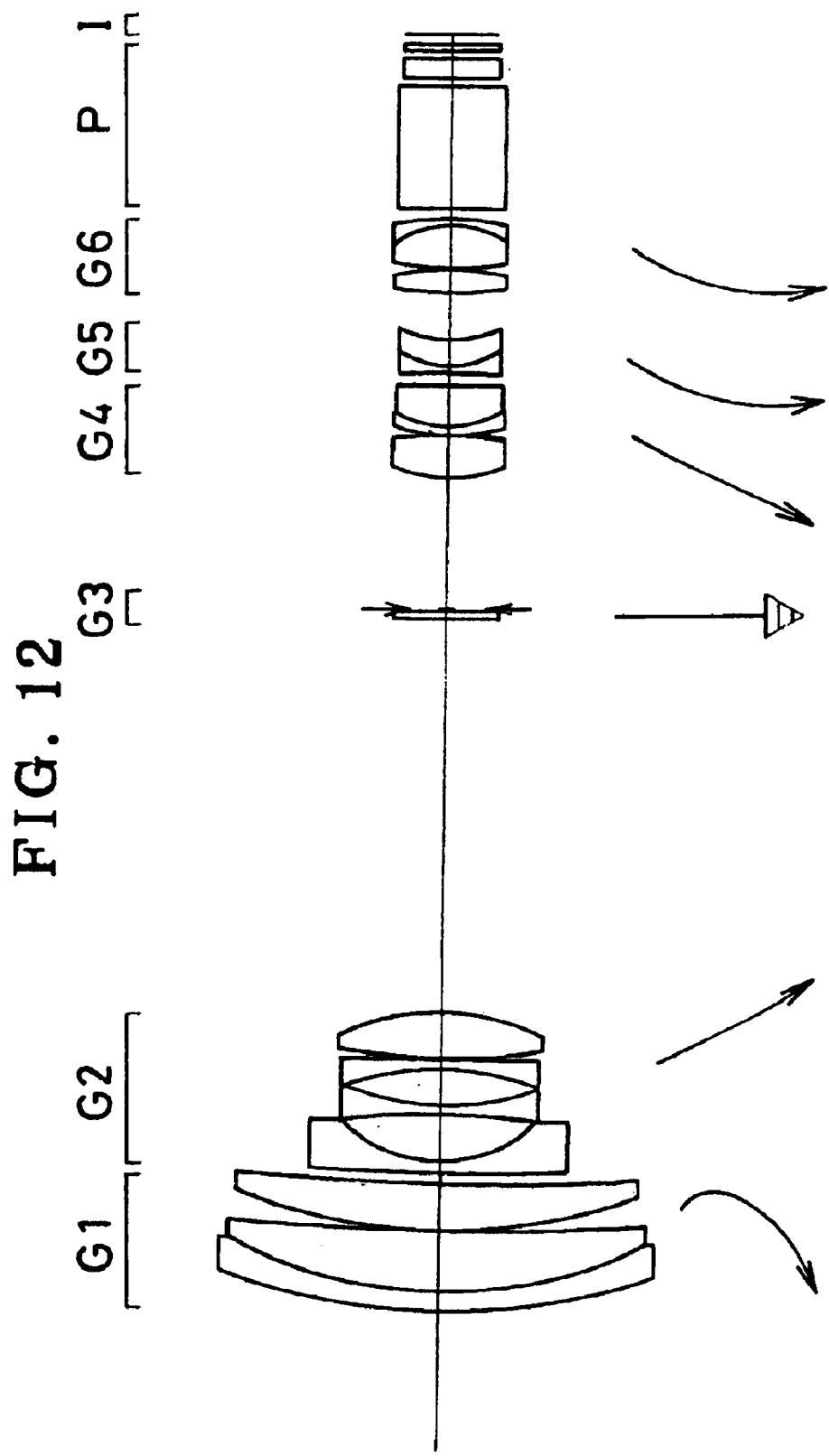
FIG. 12 is a sectional view, similar to FIG. 1, of the lens arrangement of Example 12 of the zoom lens system.

As shown in FIG. 12, the zoom lens system of Example 12 is made up of a first lens group G1 having positive refracting power, a second lens group G2 having negative refracting power, a third lens group G3 having negative refracting power, a fourth lens group G4 having positive refracting power, a fifth lens group G5 having negative refracting power and a sixth lens group G6 having positive refracting power. For zooming from the wide-angle end to the telephoto end of the zoom lens system when focused on an object point at infinity, the first lens group G1 moves toward the image side of the zoom lens system in a convex reciprocation locus and reaches the telephoto end where it is located nearer to the object side of the system than at the location of the wide-angle end, the second lens group G2 moves to the image side, the third lens group G3, which has an aperture stop on its image side as an integral piece, remains fixed, the fourth lens group G4 moves toward the object side, the fifth lens group G5 moves toward the object side in a convex reciprocation locus and reaches the telephoto end where it is located nearer to the object side than at the location of the wide-angle end, and the sixth lens group G6 moves toward the object side in a convex reciprocation locus while the spacing between the fifth lens group G5 and the sixth lens group G6 becomes narrow and then slightly wide, and reaches the telephoto end where it is located somewhat nearer to the object side than at the location of the wide-angle end. For focusing on a nearby subject, the sixth lens group G6 is designed to move out toward the object side of the system. More specifically, when the system is focused on a nearby subject at the wide-angle end, the spacing between the fifth lens group G5 and the sixth lens group G6 is set at 6.0167 mm, and when focused on a nearby subject at the telephoto end, the spacing between the fifth lens group G5 and the sixth lens group G6 is set at 2.1156 mm.

In Example 12, the first lens group G1 is made up of a negative meniscus lens convex on its object side and two positive meniscus lenses, each convex on its object side, the second lens group G2 is made up of a negative meniscus lens convex on its object side, two double-concave lenses and a double-convex lens, the third lens group G3 is made up of a double-concave lens and a stop, the fourth lens group G4 is made up of a double-convex lens and a doublet consisting of a negative meniscus lens convex on its object side and a positive meniscus lens convex on its object side, the fifth lens group G5 is made up of a doublet consisting of a double-concave lens and a positive meniscus lens convex on its object side, and the sixth lens group G6 is made up of a double-convex lens and a doublet consisting of a double-convex lens and a negative meniscus lens convex on its object side. Three aspheric surfaces are used, one for the object-side surface of the double-concave lens in the second lens group G2, one for the object-side surface of the double-convex lens in the fourth lens group G4 and one for the image-side surface of the double-convex lens in the sixth lens group G6.

Figure 13:
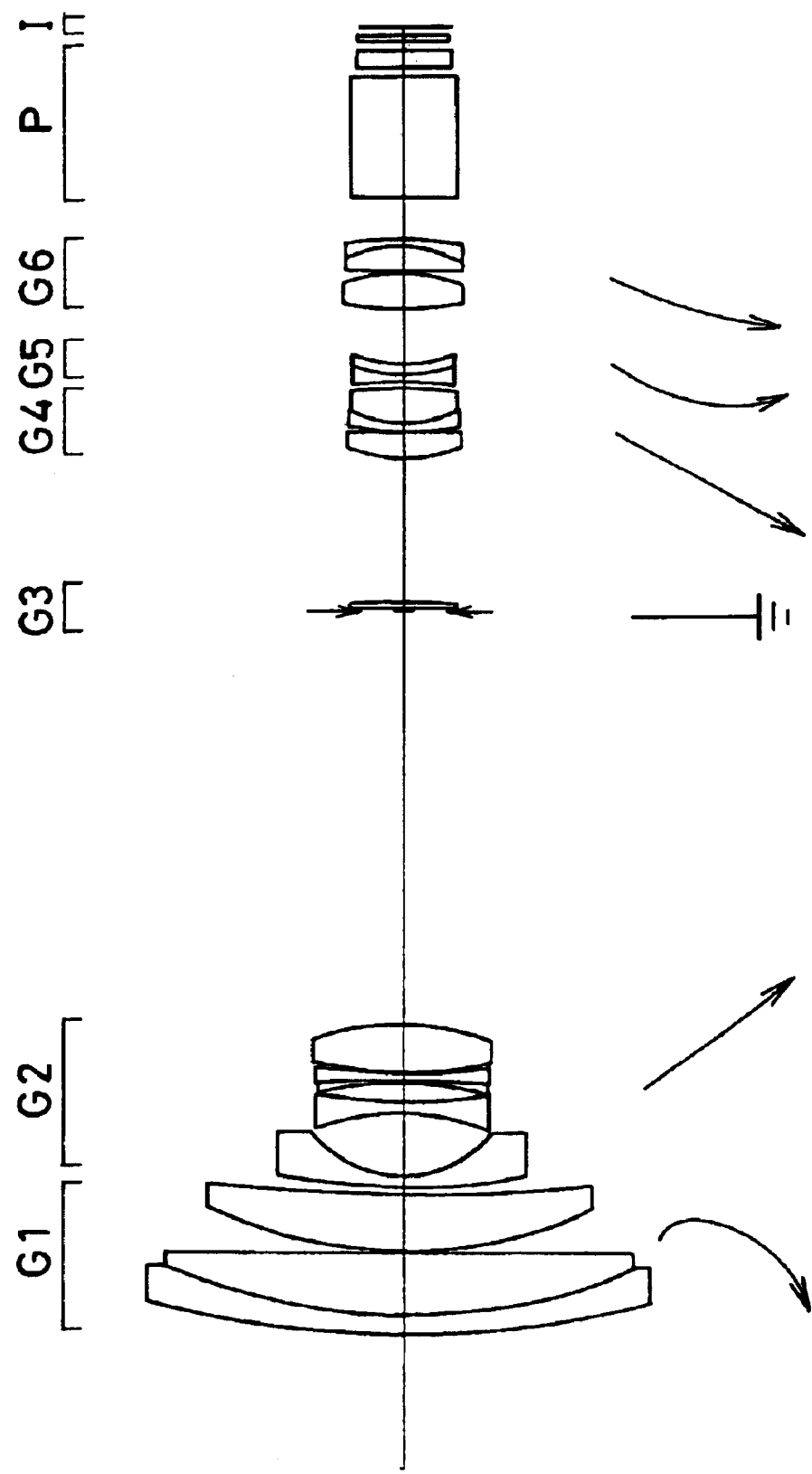
FIG. 13 is a sectional view, similar to FIG. 1, of the lens arrangement of Example 13 of the zoom lens system.

As shown in FIG. 13, the zoom lens system of Example 13 is made up of a first lens group G1 having positive refracting power, a second lens group G2 having negative refracting power, a third lens group G3 having positive refracting power, a fourth lens group G4 having positive refracting power, a fifth lens group G5 having negative refracting power and a sixth lens group G6 having positive refracting power. For zooming from the wide-angle end to the telephoto end of the zoom lens system when focused on an object point at infinity, the first lens group G1 moves toward the image side of the zoom lens system in a convex reciprocation locus and reaches the telephoto end where it is located nearer to the object side of the zoom lens system than at the location of the wide-angle end, the second lens group G2 moves toward the image side, the third lens group G3, which has an aperture stop on its object side as an integral piece, remains fixed, the fourth lens group G4 moves toward the object side, the fifth lens group G5 moves toward the object side in a convex reciprocation locus and reaches the telephoto end where it is located nearer to the object side than at the location of the wide-angle end, and the sixth lens group G6 moves toward the object side while the spacing between the fifth lens group G5 and the sixth lens group G6 becomes narrow. For focusing on a nearby subject, the sixth lens group G6 is designed to move out toward the object side. More specifically, when the zoom lens system is focused on a nearby subject at the wide-angle end, the spacing between the fifth lens group G5 and the sixth lens group G6 is set at 7.3354 mm, and when focused on a nearby subject at the telephoto end, the spacing between the fifth lens group G5 and the sixth lens group G6 is set at 1.7386 mm.

In Example 13, the first lens group G1 is made up of a negative meniscus lens convex on its object side and two positive meniscus lenses, each convex on its object side, the second lens group G2 is made up of a negative meniscus lens convex on its object side, a double-concave lens, a double-concave lens with an object-side surface thereof provided with a thin resin layer thereby making that surface aspheric and a double-convex lens, the third lens group G3 is made up of a stop and a double-convex lens, the fourth lens group G4 is made up of a double-convex lens and a doublet consisting of a negative meniscus lens convex on its object side and a double-convex lens, the fifth lens group G5 is made up of a doublet consisting of a double-concave lens and a positive meniscus lens convex on its object side, and the sixth lens group G6 is made up of a double-convex lens and a doublet consisting of a positive meniscus lens convex on its image side and a negative meniscus lens convex on its image side. Three aspheric surfaces are used, one for the object-side resin layer surface of the double-concave lens in the second lens group G2, one for the object-side surface of the double-convex lens in the fourth lens group G4 and one for the object-side surface of the double-convex lens in the sixth lens group G6.

Figure 14:
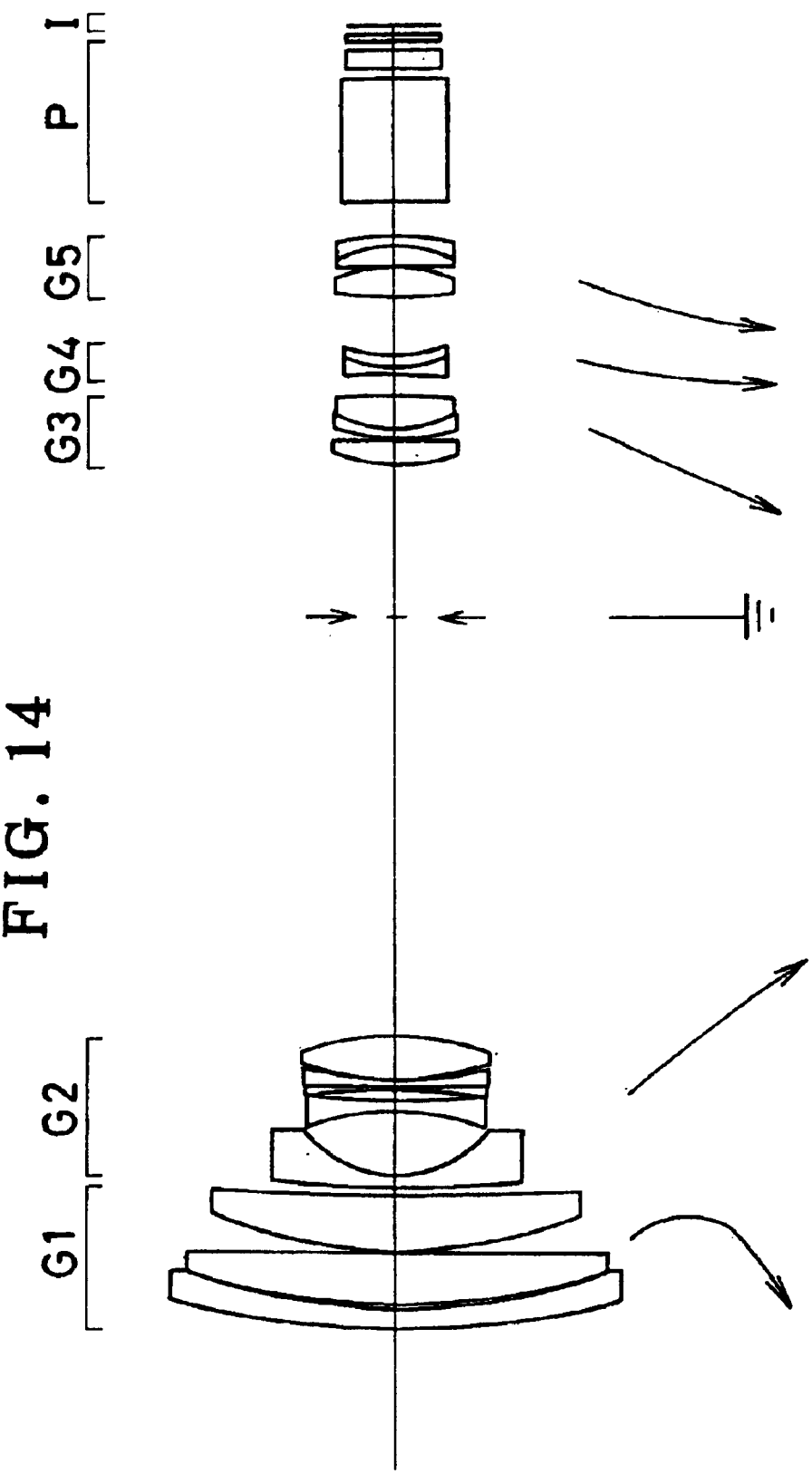
FIG. 14 is a sectional view, similar to FIG. 1, of the lens arrangement of Example 14 of the zoom lens system.

As shown in FIG. 14, the zoom lens system of Example 14 is made up of a first lens group G1 having positive refracting power, a second lens group G2 having negative refracting power, a fixed aperture stop, a third lens group G3 having positive refracting power, a fourth lens group G4 having negative refracting power and a fifth lens group G5 having positive refracting power. For zooming from the wide-angle end to the telephoto end of the zoom lens system when focused on an object point at infinity, the first lens group G1 moves toward the image side of the zoom lens system in a concave reciprocation locus and reaches the telephoto end where it is located nearer to the object side of the zoom lens system than at the location of the wide-angle end, the second lens group G2 moves toward the image side, the third lens group G3 moves toward the object side, the fourth lens group G4 moves toward the object side, and the fifth lens group G5 moves toward the object side while the spacing between the fourth lens group G4 and the fifth lens group G5 becomes narrow. For focusing on a nearby subject, the fifth lens group G5 is designed to move out toward the object side of the zoom lens system. More specifically, when the zoom lens system is focused on a nearby subject at the wide-angle end, the spacing between the fourth lens group G4 and the fifth lens group G5 is set at 7.5416 mm, and when focused on a nearby subject at the telephoto end, the spacing between the fourth lens group G4 and the fifth lens group G5 is set at 0.5503 mm.

In Example 14, the first lens group G1 is made up of a negative meniscus lens convex on its object side and two positive meniscus lenses, each convex on its object side, the second lens group G2 is made up of a negative meniscus lens convex on its object side, a double-concave lens, a doublet consisting of a double-concave lens and a negative meniscus lens convex on its object side and a double-convex lens, the third lens group G3, with the fixed stop located between the second lens group G2 and the third lens group G3, is made up of a double-convex lens and a doublet consisting of a negative meniscus lens convex on its object side and a double-convex lens, the fourth lens group G4 is made up of a doublet consisting of a double-concave lens and a positive meniscus lens convex on its object side, and the fifth lens group G5 is made up of a double-convex lens and a positive meniscus lens convex on its image side. Three aspheric surfaces are used, one for the object-side surface of the doublet in the second lens group G2, one for the object-side surface of the double-convex lens in the third lens group G3 and one for the object-side surface of the double-convex lens in the fifth lens group G5.

Figure 15:
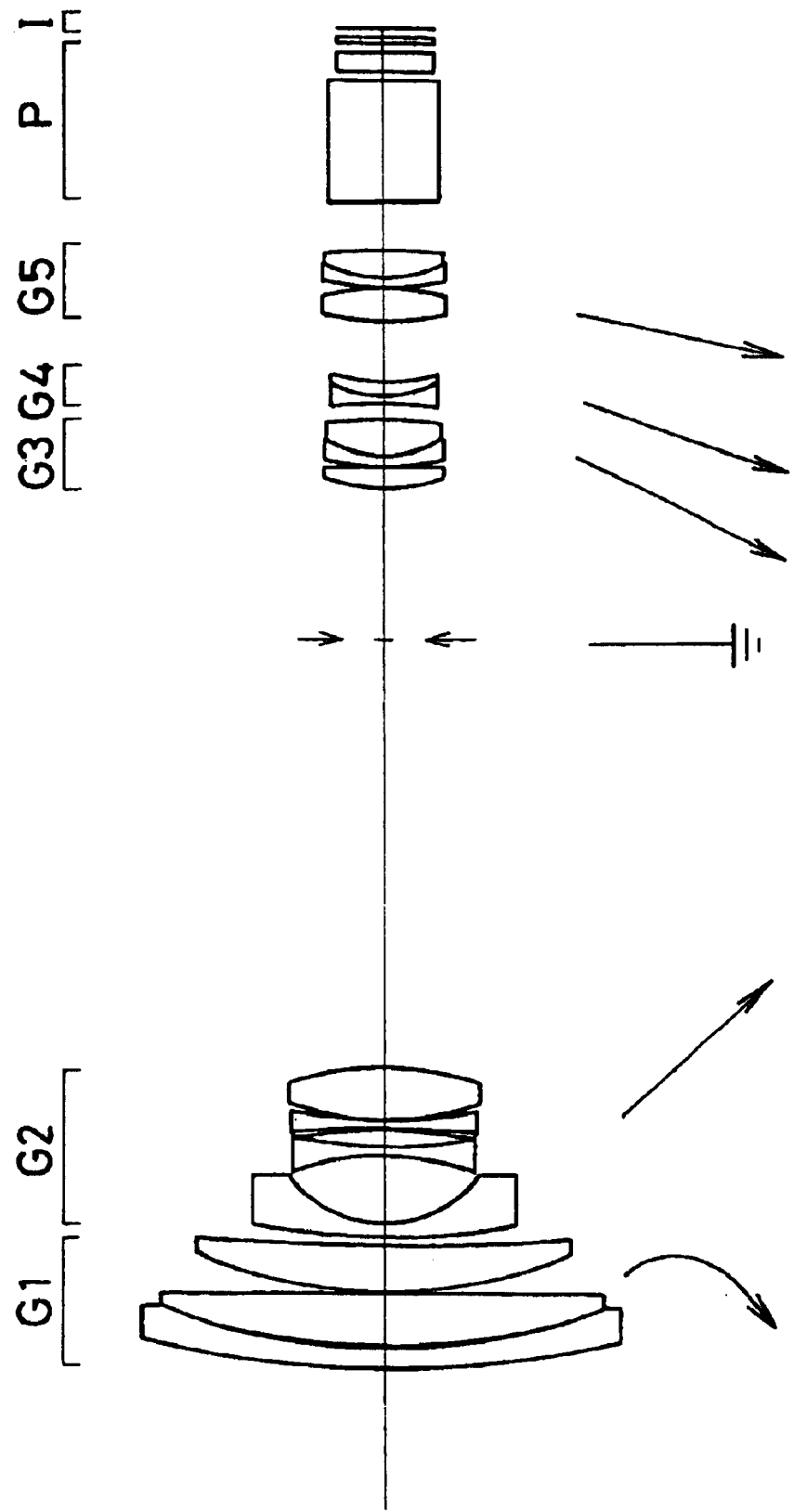
FIG. 15 is a sectional view, similar to FIG. 1, of the lens arrangement of Example 15 of the zoom lens system.

As shown in FIG. 15, the zoom lens system of Example 15 is made up of a first lens group G1 having positive refracting power, a second lens group G2 having negative refracting power, a fixed aperture stop, a third lens group G3 having positive refracting power, a fourth lens group G4 having negative refracting power and a fifth lens group G5 having positive refracting power. For zooming from the wide-angle end to the telephoto end of the zoom lens system when focused on an object point at infinity, the first lens group G1 moves toward the image side of the zoom lens system in a convex reciprocation locus and reaches the telephoto end where it is located nearer to the object side of the zoom lens system than at the location of the wide-angle end, the second lens group G2 moves toward the image side, the third lens group G3 moves toward the object side, the fourth lens group G4 moves toward the object side, and the fifth lens group G5 moves toward the object side while the spacing between the fourth lens group G4 and the fifth lens group G5 becomes narrow. For focusing on a nearby subject, the fifth lens group G5 is designed to move out toward the object side of the zoom lens system. More specifically, when the zoom lens system is focused on a nearby subject on the wide-angle end, the spacing between the fourth lens group G4 and the fifth lens group G5 is set at 7.8923 mm, and when focused on a nearby subject on the telephoto end, the spacing between the fourth lens group G4 and the fifth lens group G5 is set at 2.3128 mm.

In Example 15, the first lens group G1 is made up of a negative meniscus lens convex on its object side and two positive meniscus lenses, each convex on its object side, the second lens group G2 is made up of a negative meniscus lens convex on its object side, a double-concave lens, a double-concave lens with an object-side surface thereof provided with a thin resin layer thereby making that surface aspheric and a double-convex lens, the third lens group G3, with the fixed stop located between the second lens group G2 and the third lens group G3, is made up of a double-convex lens and a doublet consisting of a negative meniscus lens convex on its object side and a double-convex lens, the fourth lens group G4 is made up of a doublet consisting of a double-concave lens and a positive meniscus lens convex on its object side, and the fifth lens group G5 is made up of a double-convex lens and a doublet consisting of a negative meniscus lens convex on its object side and a double-convex lens. Three aspheric surfaces are provided, one for the object-side resin layer surface of the double-concave lens in the second lens group G2, the object-side surface of the double-convex lens in the third lens group G3 and one for the object-side surface of the double-convex lens in the fifth lens group G5.

Figure 16:
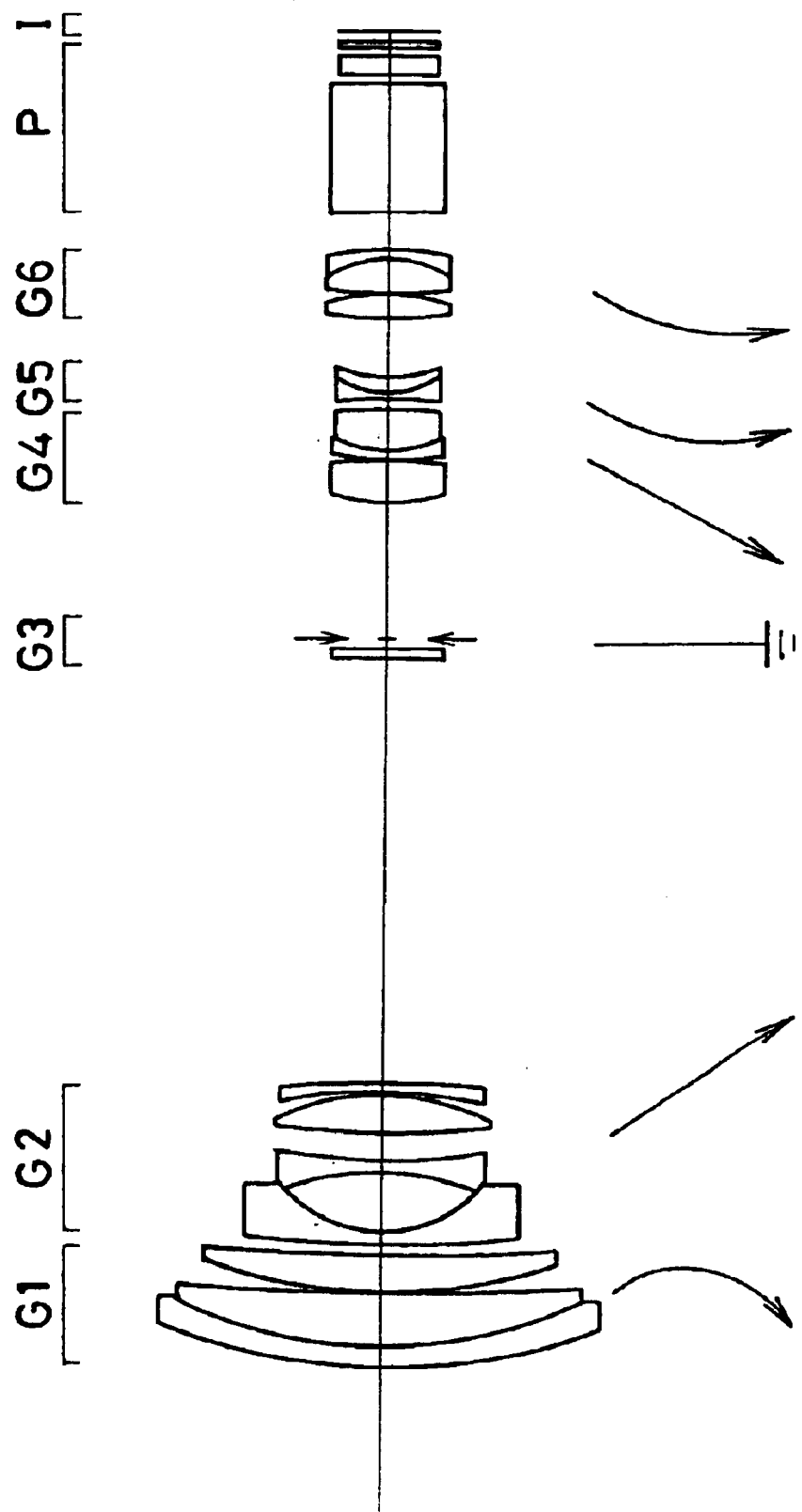
FIG. 16 is a sectional view, similar to FIG. 1, of the lens arrangement of Example 16 of the zoom lens system.

As shown in FIG. 16, the zoom lens system of Example 16 is composed of a first lens group G1 having positive refracting power, a second lens group G2 having negative refracting power, a third lens group G3 having negative refracting power, a fourth lens group G4 having positive refracting power, a fifth lens group G5 having negative refracting power and a sixth lens group G6 having positive refracting power. For zooming from the wide-angle end to the telephoto end of the zoom lens system when focused on an object point at infinity, the first lens group G1 moves toward the image side of the zoom lens system in a convex reciprocation locus and reaches the telephoto end where it is located nearer to the object side of the zoom lens system than at the location of the wide-angle end, the second lens group G2 moves toward the image side, the third lens group G3, which has an aperture stop on its image side as an integral piece, remains fixed, the fourth lens group G4 moves toward the object side, the fifth lens group G5 moves toward the object side in a convex reciprocation locus and reaches the telephoto end where it is located nearer to the object side than at the location of the wide-angle end, and the sixth lens group G6 moves toward the object side in a convex reciprocation locus while the fifth lens group G5 and the sixth lens group G6 becomes narrow and then slightly wide and reaches the telephoto end where it is located somewhat nearer to the object side than at the location of the wide-angle end. For focusing on a nearby subject, the sixth lens group G6 is designed to move out toward the object side of the system. More specifically, when the zoom lens system is focused on a nearby subject at the wide-angle end, the spacing between the fifth lens group G5 and the sixth lens group G6 is set at 7.6961 mm, and when focused on a nearby subject at the telephoto end, the spacing between the fifth lens group G5 and the sixth lens group G6 is set at 3.0968 mm.

In Example 16, the first lens group G1 is made up of a negative meniscus lens convex on its object side and two positive meniscus lenses, each convex on its object side, the second lens group G2 is made up of a negative meniscus lens convex on its object side, a double-concave lens, a double-convex lens and a negative meniscus lens convex on its image side, the third lens group G3 is made up of a double-concave lens and a stop, the fourth lens group G4 is made up of a double-convex lens and a doublet consisting of a negative meniscus lens convex on its object side and a double-convex lens, the fifth lens group G5 is made up of a doublet consisting of a double-concave lens and a positive meniscus lens convex on its object side, and the sixth lens group G6 is made up of a double-convex lens and a doublet consisting of a double-convex lens and a negative meniscus lens convex on its image side. Three aspheric surfaces are provided, one for the object-side surface of the double-concave lens in the second lens group G2, one for the object-side surface of the double-convex lens in the fourth lens group G4 and one for the image-side surface of the double-convex lens in the sixth lens group G6.

Figure 17:
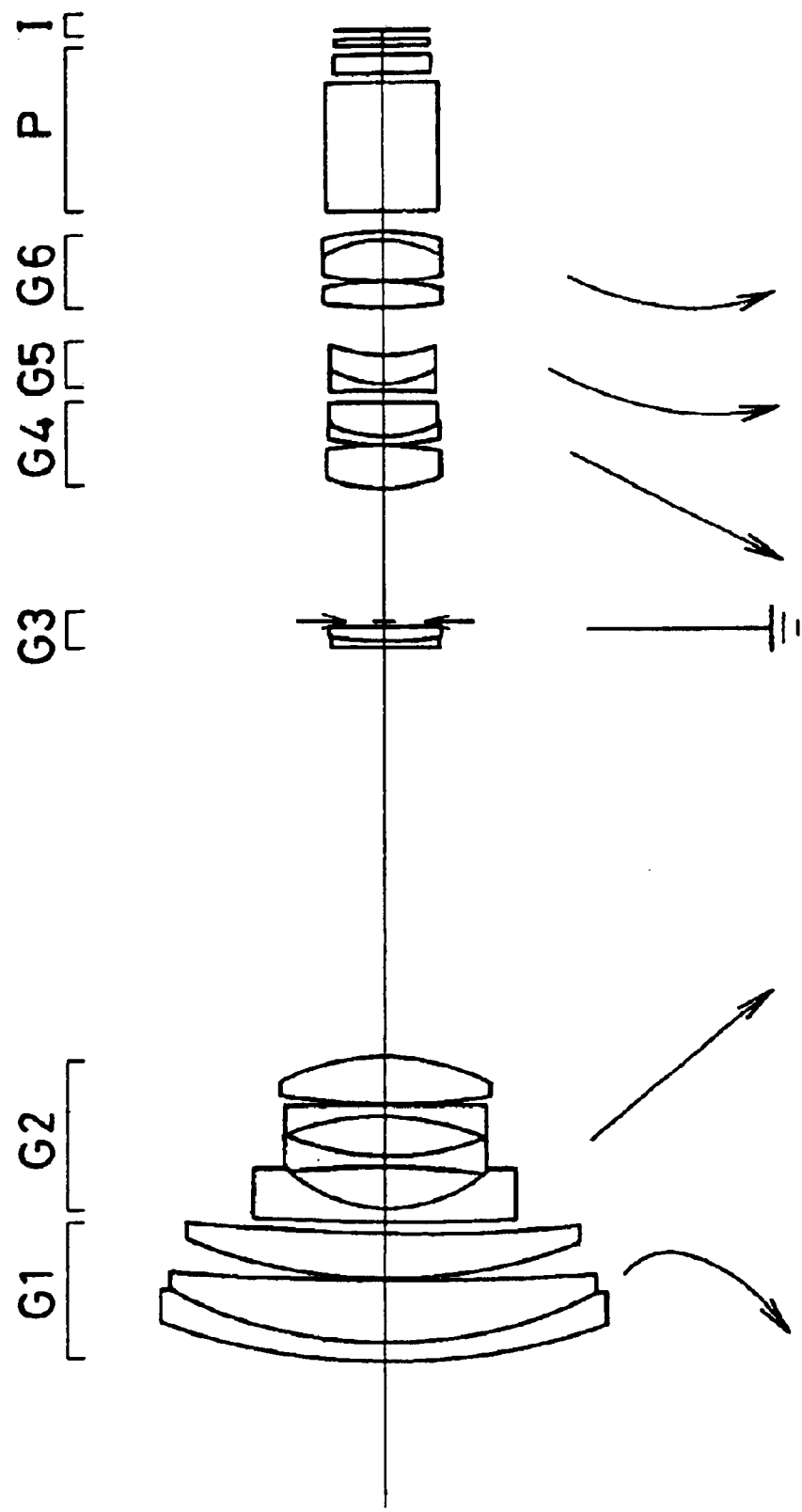
FIG. 17 is a sectional view, similar to FIG. 1, of the lens arrangement of Example 17 of the zoom lens system.

As shown in FIG. 17, the zoom lens system of Example 17 is composed of a first lens group G1 having positive refracting power, a second lens group G2 having negative refracting power, a third lens group G3 having negative refracting power, a fourth lens group G4 having positive refracting power, a fifth lens group G5 having negative refracting power and a sixth lens group G6 having positive refracting power. For zooming from the wide-angle end to the telephoto end of the zoom lens system when focused on an object point at infinity, the first lens group G1 moves toward the image side of the zoom lens system in a convex reciprocation locus and reaches the telephoto end where it is located nearer to the object side of the zoom lens system than at the location of the wide-angle end, the second lens group G2 moves toward the image side, the third lens group G3, which has an aperture stop on its image side as an integral piece, remains fixed, the fourth lens group G4 moves toward the object side, the fifth lens group G5 moves toward the object side in a convex reciprocation locus and reaches the telephoto end where it is located nearer to the object side than the location of the wide-angle end, and the sixth lens group G6 moves toward the object side in a convex reciprocation locus while the spacing between the fifth lens group G5 and the sixth lens group G6 becomes narrow and then slightly wide, and reaches the telephoto end where it is located somewhat nearer to the object side than at the location of the wide-angle end. For focusing on a nearby subject, the sixth lens group G6 is designed to move out toward the object side of the zoom lens system. More specifically, when the zoom lens system is focused on a nearby subject at the wide-angle end, the spacing between the fifth lens group G5 and the sixth lens group G6 is set at 6.0079 mm, and when focused on a nearby subject at the wide-angle end, the spacing between the fifth lens group G5 and the sixth lens group G6 is set at 2.6039 mm.

In Example 17, the first lens group G1 is made up of a negative meniscus lens convex on its object side and two positive meniscus lenses, each convex on its object side, the second lens group G2 is made up of a negative meniscus lens convex on its object side, two double-concave lenses and a double-convex lens, the third lens group G3 is made up of a doublet consisting of a double-concave lens and a positive meniscus lens convex on its object side and a stop, the fourth lens group G4 is made up of a double-convex lens and a doublet consisting of a negative meniscus lens convex on its object side and a positive meniscus lens convex on its object side, the fifth lens group G5 is made up of a doublet consisting of a double-concave lens and a positive meniscus lens convex on its object side, and the sixth lens group G6 is made up of a double-convex lens and a doublet consisting of a double-convex lens and a negative meniscus lens convex on its image side. Three aspheric surfaces are used, one for the object-side surface of the second double-concave lens in the second lens group G2, one for the object-side surface of the double-convex lens in the fourth lens group G4 and one for the image-side surface of the double-convex lens in the sixth lens group G6.

Figure 18:
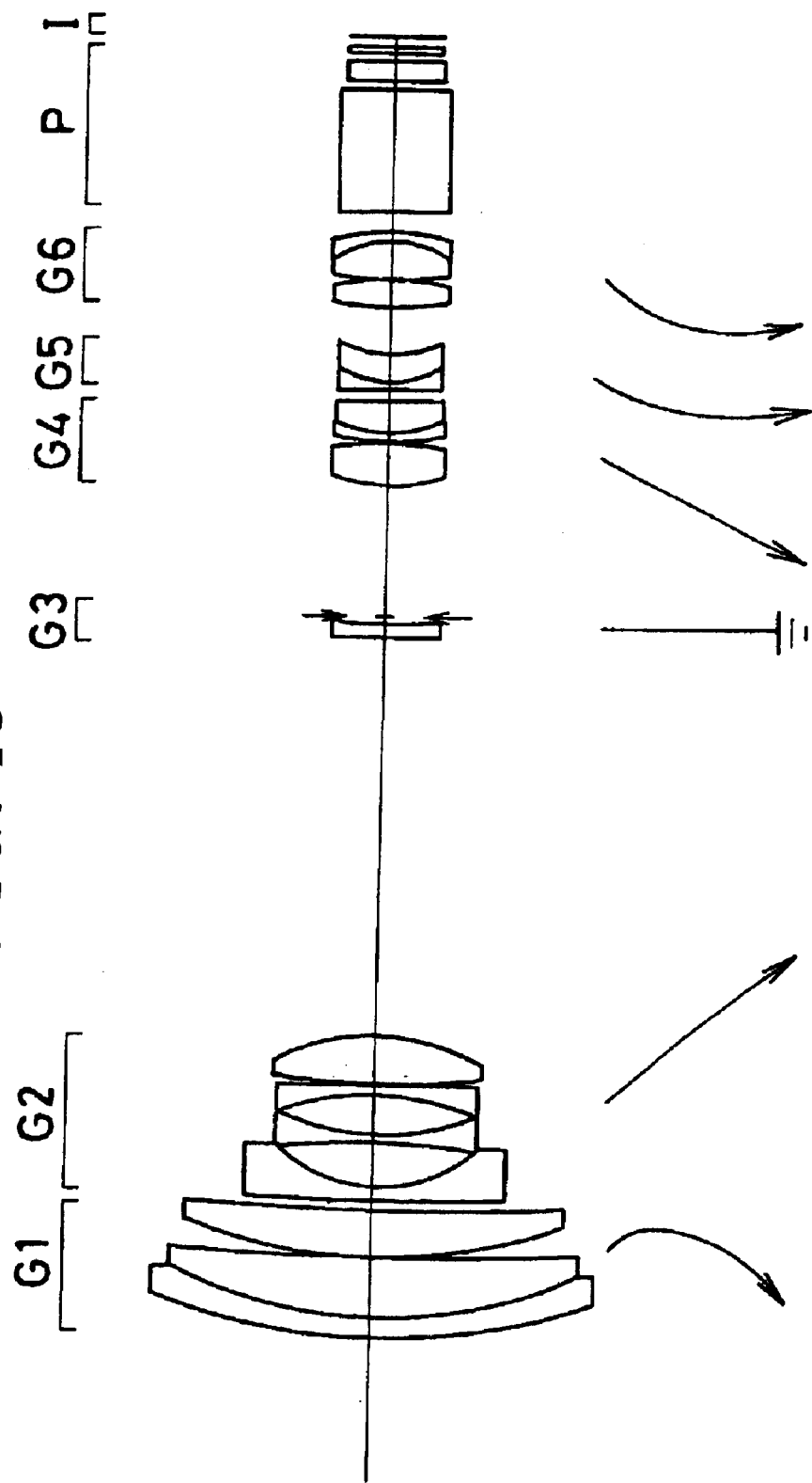
FIG. 18 is a sectional view, similar to FIG. 1, of the lens arrangement of Example 18 of the zoom lens system.

As shown in FIG. 18, the zoom lens system of Example 18 is composed of a first lens group G1 having positive refracting power, a second lens group G2 having negative refracting power, a third lens group G3 having negative refracting power, a fourth lens group G4 having positive refracting power, a fifth lens group G5, having negative refracting power and a fourth lens group G6. For zooming from the wide-angle end to the telephoto end of the zoom lens system when focused on an object point at infinity, the first lens group G1 moves toward the image side of the system in a convex reciprocation locus and reaches the telephoto end where it is located nearer to the object side of the zoom lens system than at the location of the wide-angle end, the second lens group G2 moves toward the image side, the third lens group G3, which has an aperture stop on its image side as an integral piece, remains fixed, the fourth lens group G4 moves toward the object side, the fifth lens group G5 moves toward the object side in a convex reciprocation locus and reaches the telephoto end where it is located nearer to the object side than at the location of the wide-angle end, and the sixth lens group G6 moves toward the object side in a convex reciprocation locus while the spacing between the fifth lens group G5 and the sixth lens group G6 becomes narrow and then slightly wide and reaches the telephoto end where it is located somewhat nearer to the object side than at the location of the wide-angle end. For focusing on a nearby object, the sixth lens group G6 is designed to move toward the object side. More specifically, when the system is focused on a nearby subject at the wide-angle end, the spacing between the fifth lens group G5 and the sixth lens group G6 is set at 6.0177 mm, and when focused on a nearby subject, the spacing between the fifth lens group G5 and the sixth lens group G6 is set at 2.2983 mm.

In Example 18, the first lens group G1 is made up of a negative meniscus lens convex on its object side and two positive meniscus lenses, each convex on its object side, the second lens group G2 is made up of a negative meniscus lens convex on its object side, two double-concave lenses and a double-convex lens, the third lens group G3 is made up of a plano-concave lens and a stop, the fourth lens group G4 is made up of a double-convex lens and a doublet consisting of a negative meniscus lens convex on its object side and a positive meniscus lens convex on its object side, the fifth lens group G5 is made up of a doublet consisting of a double-concave lens and a positive meniscus lens convex on its object side, and the sixth lens group G6 is made up of a double-convex lens and a doublet consisting of a double-convex lens and a negative meniscus lens convex on its image side. Four aspheric surfaces are used, one for the object-side surface of the second double-concave lens in the second lens group G2, one for the image-side surface of the plano-concave lens in the third lens group G3, one for the object-side surface of the double-convex lens in the fourth lens group G4 and one for the image-side surface of the double-convex lens in the sixth lens group G6.

Figure 19:
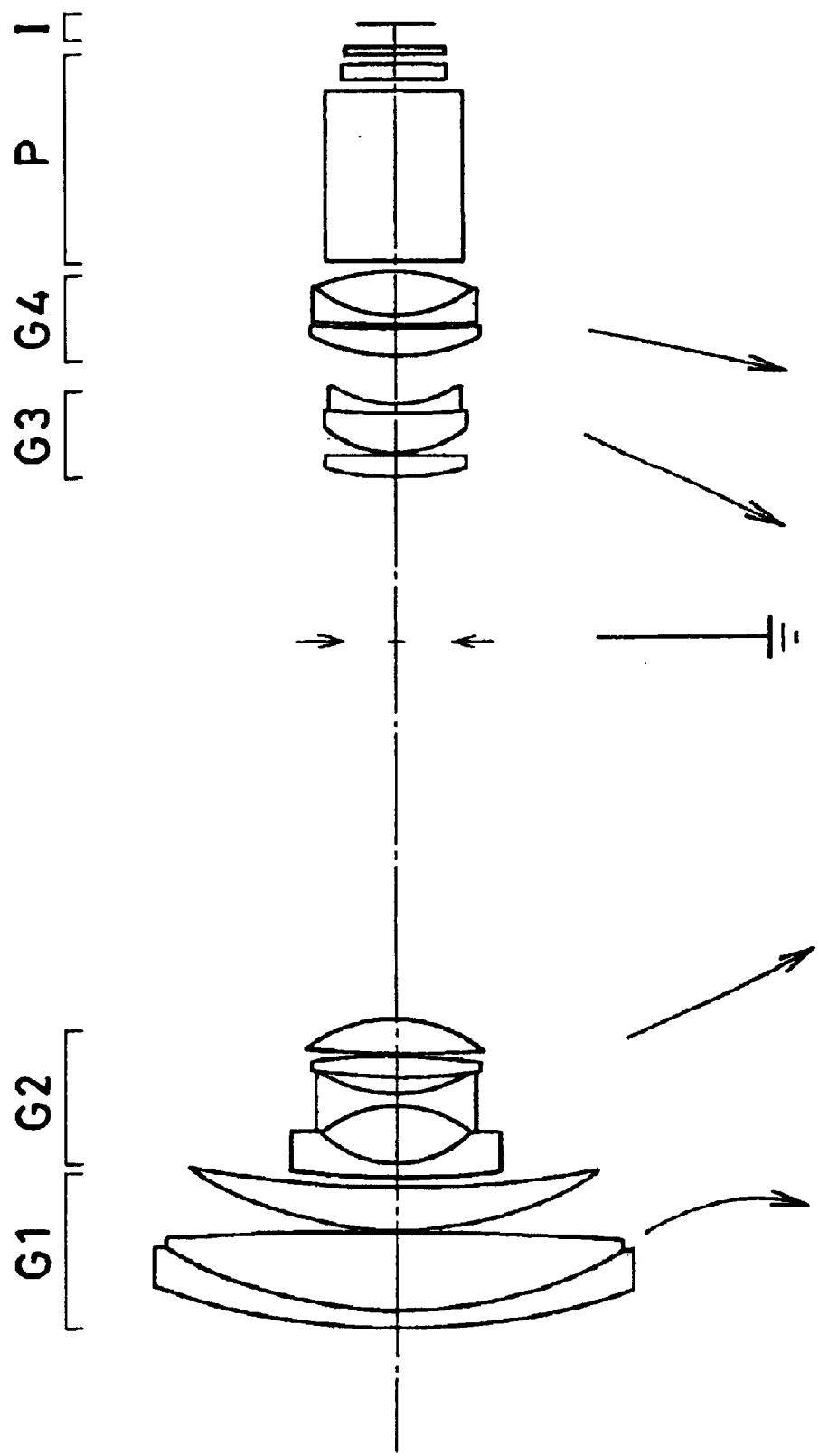
FIG. 19 is a sectional view, similar to FIG. 1, of the lens arrangement of Example 19 of the zoom lens system.

As shown in FIG. 19, the zoom lens system of Example 19 is composed of a first lens group G1 having positive refracting power, a second lens group G2 having negative refracting power, a fixed aperture stop, a third lens group G3 having positive refracting power and a fourth lens group G4 having positive refracting power. For zooming from the wide-angle end to the telephoto end of the zoom lens system when focused on an object point at infinity, the first lens group G1 moves toward the image side of the zoom lens system in a convex reciprocation locus and reaches the telephoto end where it is located nearer to object side of the zoom lens system than at the location of the wide-angle end, the second lens group G2 moves toward the image side, the third lens group G3 moves toward the object side, and the fourth lens group G4 moves toward the object side while the spacing between the third lens group G3 and the fourth lens group G4 becomes wide. For focusing on a nearby subject, the fourth lens group G4 is designed to move out toward the object side of the system.

In Example 19, the first lens group G1 is made up of a doublet consisting of a negative meniscus lens convex on its object side and a double-convex lens and a positive meniscus lens convex on its object side, and the second lens group G2 is made up of a negative meniscus lens convex on its object side, a double-concave lens and two double-convex lenses. The fixed stop is located between the second lens group G2 and the third lens group G3. The third lens group G3 is made up of a double-convex lens and a doublet consisting of a positive meniscus lens convex on its object side and a negative meniscus lens convex on its object side, and the fourth lens group G4 is made up of a positive meniscus lens convex on its object side and a doublet consisting of a negative meniscus lens convex on its object side and a double-convex lens. Three aspheric surfaces are provided, one for the image-side surface of the double-concave lens in the second lens group G2, one for the object-side surface of the double-convex lens in the third lens group G3 and one for the surface located nearest to the image side in the fourth lens group G4.

Figure 20:
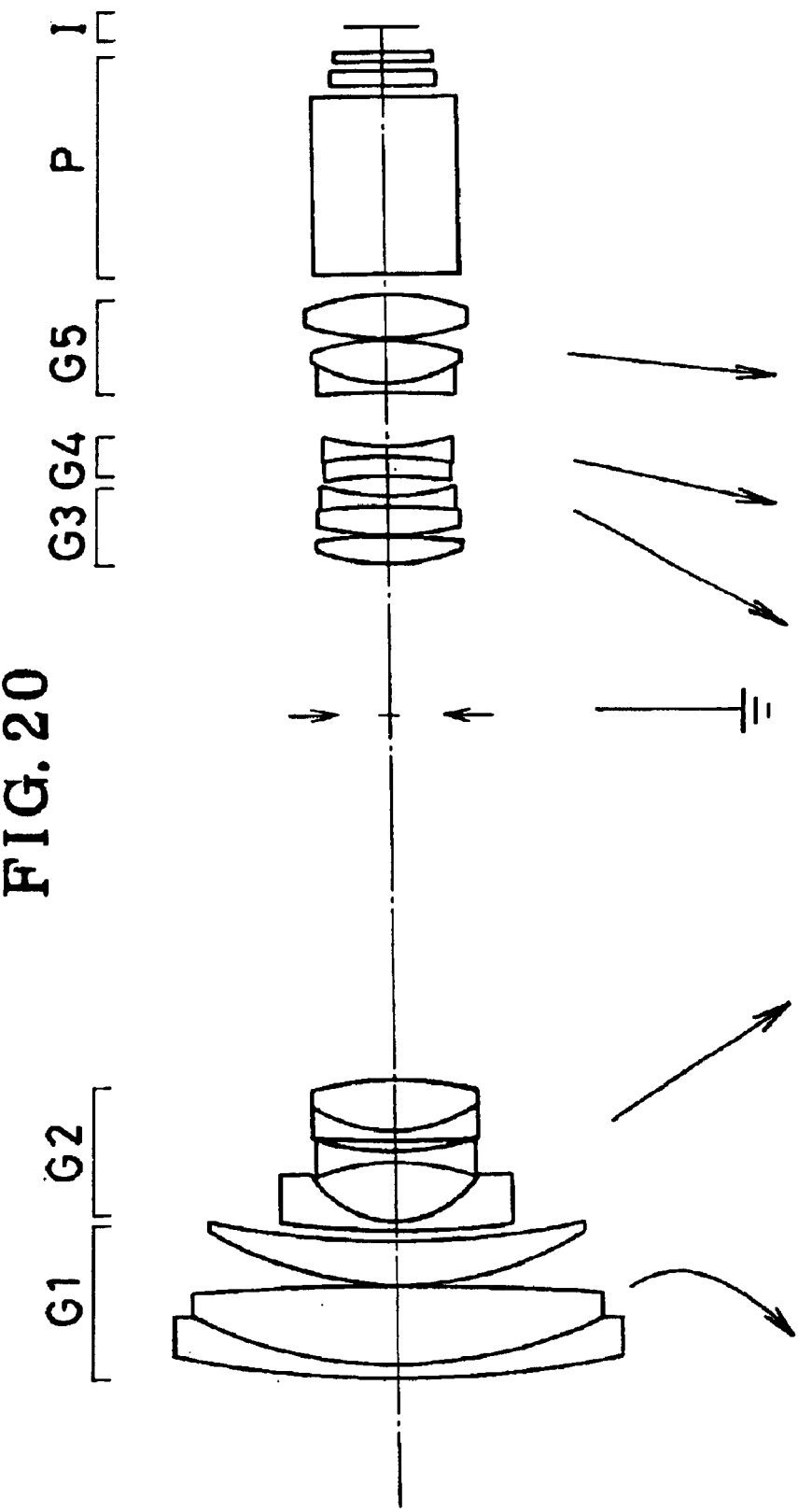
FIG. 20 is a sectional view, similar to FIG. 1, of the lens arrangement of Example 20 of the zoom lens system.

As shown in FIG. 20, the zoom lens system of Example 20 is composed of a first lens group G1 having positive refracting power, a second lens group G2 having negative refracting power, a fixed aperture stop, a third lens group G3 having positive refracting power, a fourth lens group G4 having negative refracting power and a fifth lens group G5. For zooming from the wide-angle end to the telephoto end of the zoom lens system when focused on an object point at infinity, the first lens group G1 moves toward the image side of the zoom lens system in a convex reciprocation locus and reaches the telephoto end where it is located nearer to the object side of the system than at the location of the wide-angle end, the second lens group G2 moves toward the image side, the third lens group G3 moves toward the object side, the fourth lens group G4 moves toward the object side while the spacing between the third lens group G3 and the fourth lens group G4 becomes wide, and the fifth lens group G5 moves toward the object side while the spacing between the fourth lens group G4 and the fifth lens group G5 becomes narrow and then slightly wide. For focusing on a nearby subject, the fifth lens group G5 is designed to move out toward the object side.

In Example 20, the first lens group G1 is made up of a doublet consisting of a negative meniscus lens convex on its object side and a double-convex lens and a positive meniscus lens convex on its object side, and the second lens group G2 is made up of a negative meniscus lens convex on its object side, a double-concave lens and a doublet consisting of a negative meniscus lens convex on its object side and a double-convex lens. The fixed stop is located between the second lens group G2 and the third lens group G3. The third lens group G3 is made up of a double-convex lens and a doublet consisting of a double-convex lens and a double-concave lens, the fourth lens group G4 is made up of a doublet consisting of a positive meniscus lens convex on its image side and a double-concave lens, and the fifth lens group G5 is made up of a doublet consisting of a double-concave lens and a double-convex lens and a double-convex lens. Three aspheric surfaces are provided, one for the image-side surface of the negative meniscus lens in the second lens group G2, one for the surface of the doublet in the third lens group G3, which is located nearest to the object side, and one for the surface of the doublet in the fifth lens group G5, which is located nearest to the image side.

Figure 21:
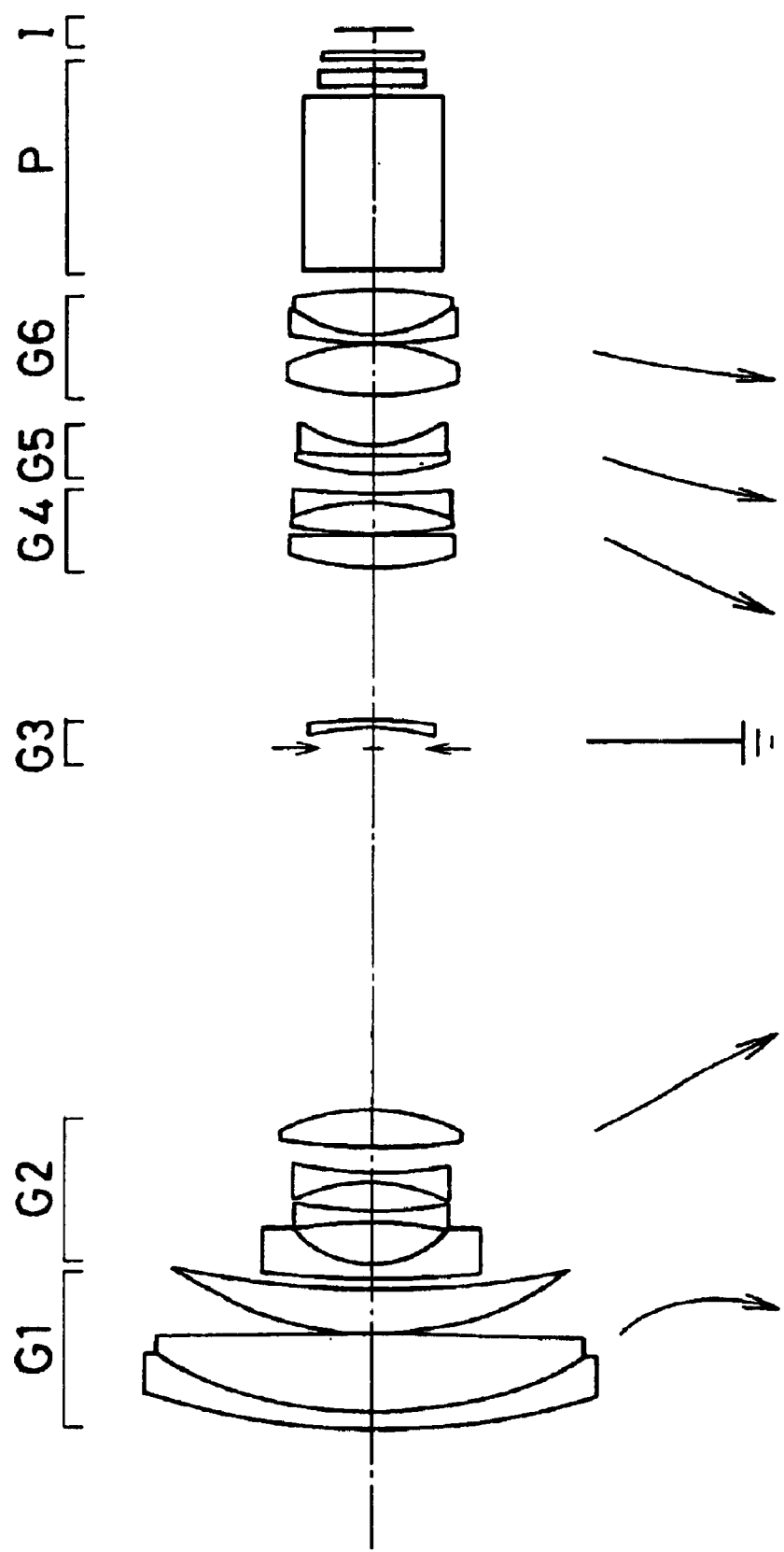
FIG. 21 is a sectional view, similar to FIG. 1, of the lens arrangement of Example 21 of the zoom lens system.

As shown in FIG. 21, the zoom lens system of Example 21 is composed of a first lens group G1 having positive refracting power, a second lens group G2 having negative refracting power, a third lens group G3 having negative refracting power, a fourth lens group G4 having positive refracting power, a fifth lens group G5 having negative refracting power and a sixth lens group G5 having positive refracting power. For zooming from the wide-angle end to the telephoto end of the zoom lens system when focused on an object point at infinity, the first lens group G1 moves toward the image side of the zoom lens system in a convex reciprocation locus and reaches the telephoto end where it is located nearer to the image side than at the location of the wide-angle end, the second lens group G2 moves toward the image side, the third lens group G3, which has an aperture stop on its object side as an integral piece, remains fixed, the fourth lens group G4 moves toward the object side, the fifth lens group G5 moves toward the object side while the spacing between the spacing between the fourth lens group G4 and the fifth lens group G5 becomes wide, and the sixth lens group G6 moves toward the object side while the spacing between the fifth lens group G5 and the sixth lens group G6 becomes slightly wide and then slightly narrow. For focusing on a nearby subject, the sixth lens group G6 is designed to move out toward the object side.

In Example 21, the first lens group G1 is made up of a doublet consisting of a negative meniscus lens convex on its object side and a double-convex lens, the second lens group G2 is made up of a negative meniscus lens convex on its object side, two double-concave lenses and a double-convex lens, the third lens group G3 is made up of a stop and a negative meniscus lens convex on its image side, the fourth lens group G4 is made up of a positive meniscus lens convex on its object side and a doublet consisting of a double-convex lens and a double-concave lens, the fifth lens group G5 is made up of a doublet consisting of a positive meniscus lens convex on its object side and a negative meniscus lens convex on its object side, and the sixth lens group G6 is made up of a double-convex lens and a doublet consisting of a negative meniscus lens convex on its image side and a double-convex lens. Three aspheric surfaces are provided, one for the image-side surface of the negative meniscus lens in the second lens group G2, one for the surface of the doublet in the fourth lens group G4, which is located nearest to the image side, and one for the image-side surface of the double-convex lens in the sixth lens group G6.

Figure 22:
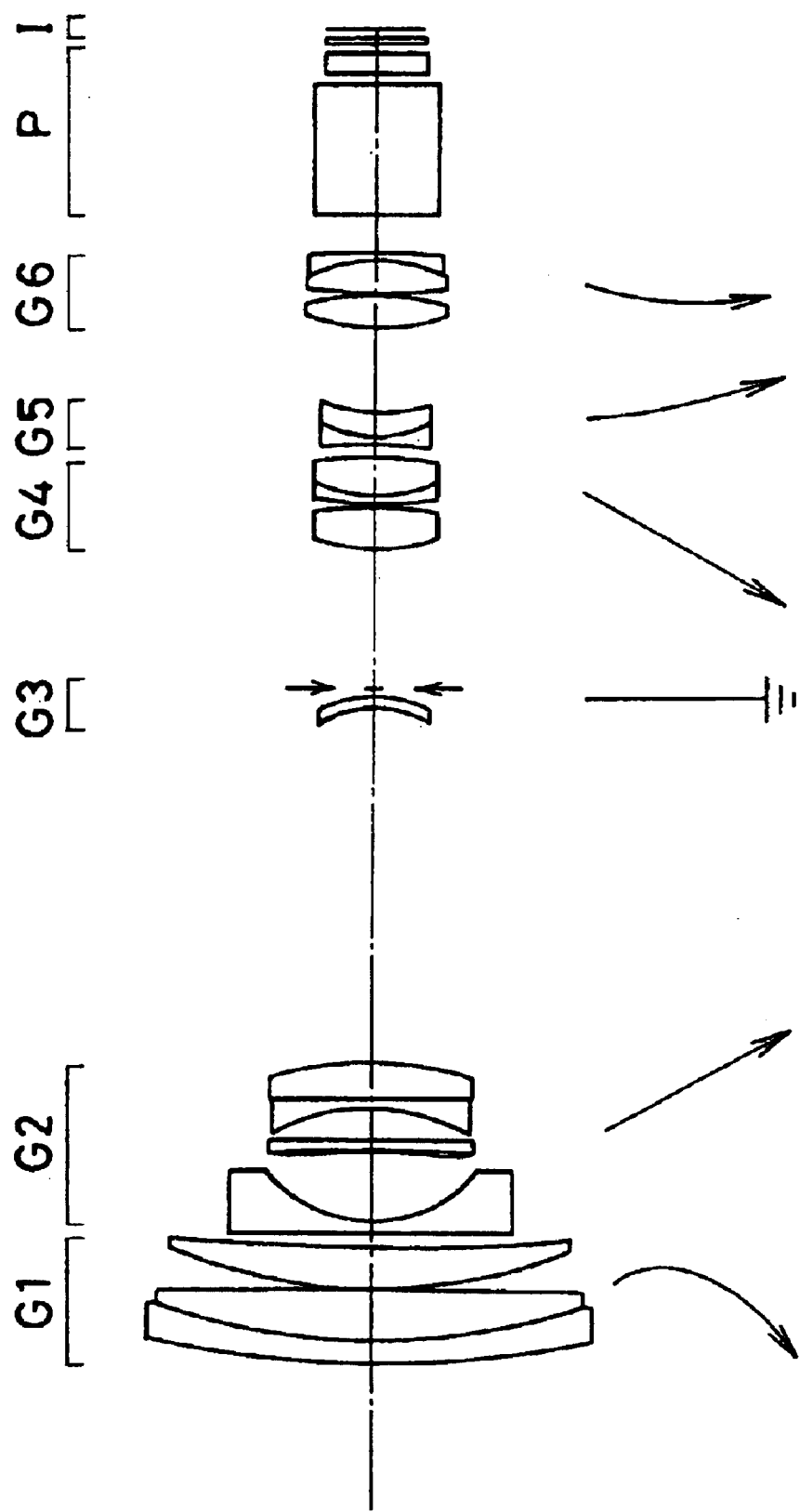
FIG. 22 is a sectional view, similar to FIG. 1, of the lens arrangement of Example 22 of the zoom lens system.

As shown in FIG. 22, the zoom lens system of Example 22 is composed of a first lens group G1 having positive refracting power, a second lens group G2 having negative refracting power, a third lens group G3 having negative refracting power, a fourth lens group G4 having positive refracting power, a fifth lens group G5 having negative refracting power and a sixth lens group G6 having positive refracting power. For zooming from the wide-angle end to the telephoto end of the zoom lens system when focused on an object point at infinity, the first lens group G1 moves toward the image side of the zoom lens system in a convex reciprocation locus and reaches the telephoto end where it is located nearer to the object side of the zoom lens system than at the location of the wide-angle end, the second lens group G2 moves toward the image side, the third lens group G3, which has an aperture stop on its image side as an integral piece, remains fixed, the fourth lens group G4 moves toward the object side, the fifth lens group G5 moves toward the image side, and the sixth lens group G6 moves toward the object side in a convex reciprocation locus while the spacing between the fifth lens group G5 and the sixth lens group G6 becomes narrow and reaches the telephoto end where it is located somewhat nearer to the object side than at the location of the wide-angle end. For focusing on a nearby subject, the sixth lens group G6 is designed to move out toward the object side. More specifically, when the zoom lens system is focused on a nearby subject at the wide-angle end, the spacing between the fifth lens group G5 and the sixth lens group G6 is set at 10.6679 mm, and when focused on a nearby subject at the telephoto end, the spacing between the fifth lens group G5 and the sixth lens group G6 is set at 1.0776 mm.

In Example 22, the first lens group G1 is made up of a negative meniscus lens convex on its object side, a double-convex lens and a positive meniscus lens convex on its object side, the second lens group G2 is made up of a negative meniscus lens convex on its object side, a double-concave lens with an image-side surface thereof provided with a thin resin layer thereby making that surface aspheric and a doublet consisting of a negative meniscus lens convex on its image side and a positive meniscus lens convex on its image side, the third lens group G3 is made up of a negative meniscus lens convex on its image side and a stop, the fourth lens group G4 is made up of a double-convex lens and a doublet consisting of a negative meniscus lens convex on its object side and a double-convex lens, the fifth lens group G5 is made up of a doublet consisting of a double-concave lens and a positive meniscus lens convex on its object side, and the sixth lens group G6 is made up of a double-convex lens and a doublet consisting of a double-convex lens and a negative meniscus lens convex on its image side. Three aspheric surfaces are provided, one for the object-side resin layer surface of the double-concave lens in the second lens group G2, the object-side surface of the double-convex lens in the fourth lens group G4 and one for the object-side surface of the double-convex lens in the sixth lens group G6.

Figure 23:
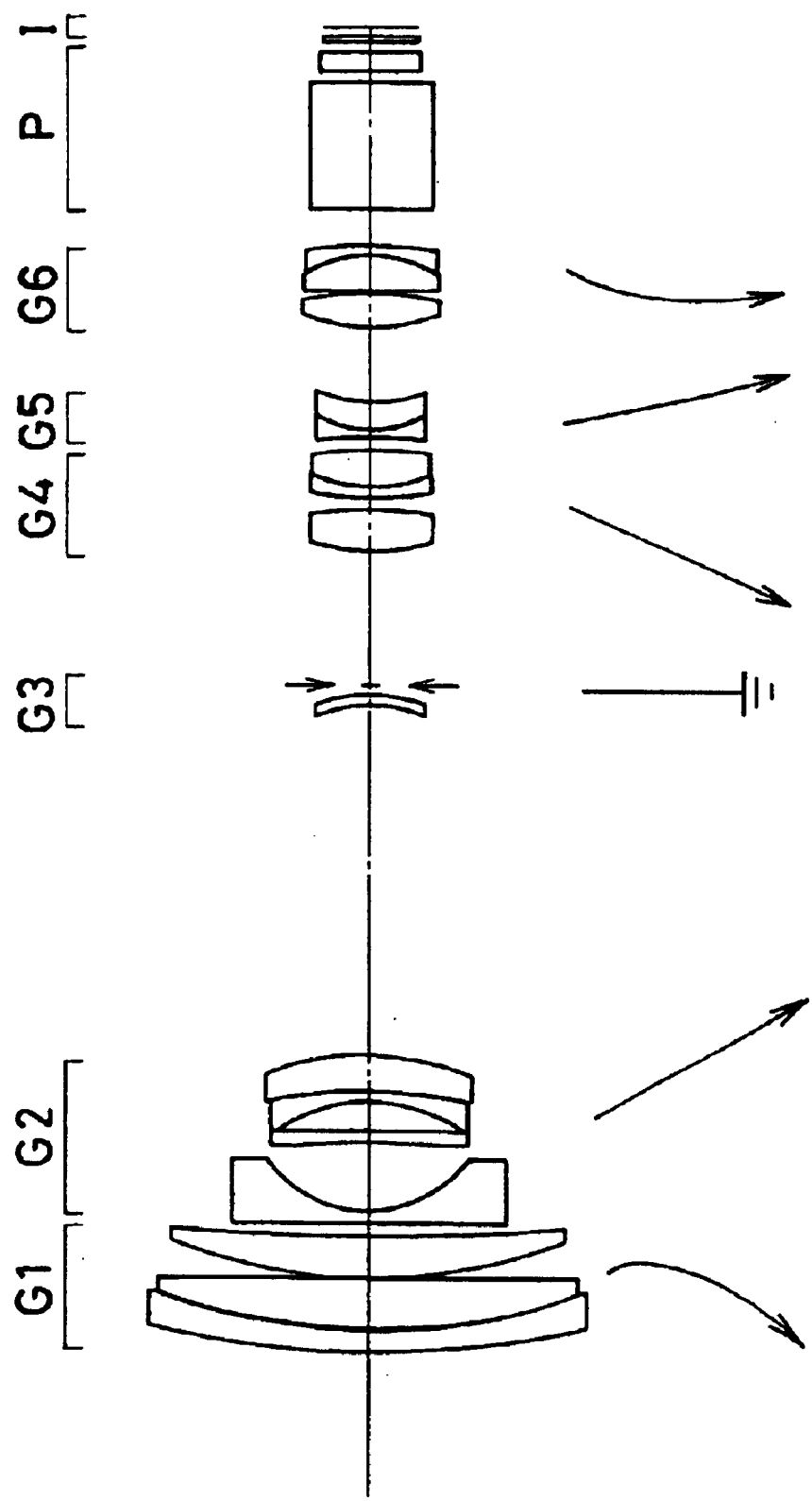
FIG. 23 is a sectional view, similar to FIG. 1, of the lens arrangement of Example 23 of the zoom lens system.

As shown in FIG. 23, the zoom lens system of Example 23 is composed of a first lens group G1 having positive refracting power, a second lens group G2 having negative refracting power, a third lens group G3 having negative refracting power, a fourth lens group G4 having positive refracting power, a fifth lens group G5 having negative refracting power and a sixth lens group G6 having positive refracting power. For zooming from the wide-angle end to the telephoto end of the zoom lens system when focused on an object point at infinity, the first lens group G1 moves toward the image side of the zoom system in a convex reciprocation locus and reaches the telephoto end where it is located nearer to the object side of the system than at the location of the wide-angle end, the second lens group G2 moves toward the image side, the third lens group G3, which has an aperture stop on its image side as an integral piece, remains fixed, the fourth lens group G4 moves toward the object side, the fifth lens group G5 moves toward the image side, and the sixth lens group G6 moves toward the object side in a convex reciprocation locus while the spacing between the fifth lens group G5 and the sixth lens group G6 becomes narrow and reaches the telephoto end where it is located somewhat nearer to the object side than at the location of the wide-angle end. For focusing on a nearby subject, the sixth lens group G6 is designed to move out toward the object side. More specifically, when the system is focused on a nearby subject at the wide-angle end, the spacing between the fifth lens group G5 and the sixth lens group G6 is set at 9.3998 mm, and when focused on a nearby subject at the telephoto end, the spacing between the fifth lens group G5 and the sixth lens group G6 is set at 0.9516 mm.

In Example 23, the first lens group G1 is made up of a negative meniscus lens convex on its object side and two positive meniscus lenses, each convex on its object side, the second lens group G2 is made up of a negative meniscus lens convex on its object side, a negative meniscus lens convex on its image side and a doublet consisting of a negative meniscus lens convex on its image side and a positive meniscus lens convex on its image side, the third lens group G3 is made up of a negative meniscus lens convex on its image side and a stop, the fourth lens group G4 is made up of a double-convex lens and a doublet consisting of a negative meniscus lens convex on its object side and a double-convex lens, the fifth lens group G5 is made up of a doublet consisting of a double-concave lens and a positive meniscus lens convex on its object side, and the sixth lens group G6 is made up of a double-convex lens and a doublet consisting of a double-convex lens and a negative meniscus lens convex on its image side. Three aspheric surfaces are provided, one for the object-side surface of the negative meniscus lens in the second lens group G2, one for the object-side surface of the double-convex lens in the fourth lens group G4 and one for the object-side surface of the double-convex lens in the sixth lens group G6.

Figure 24:
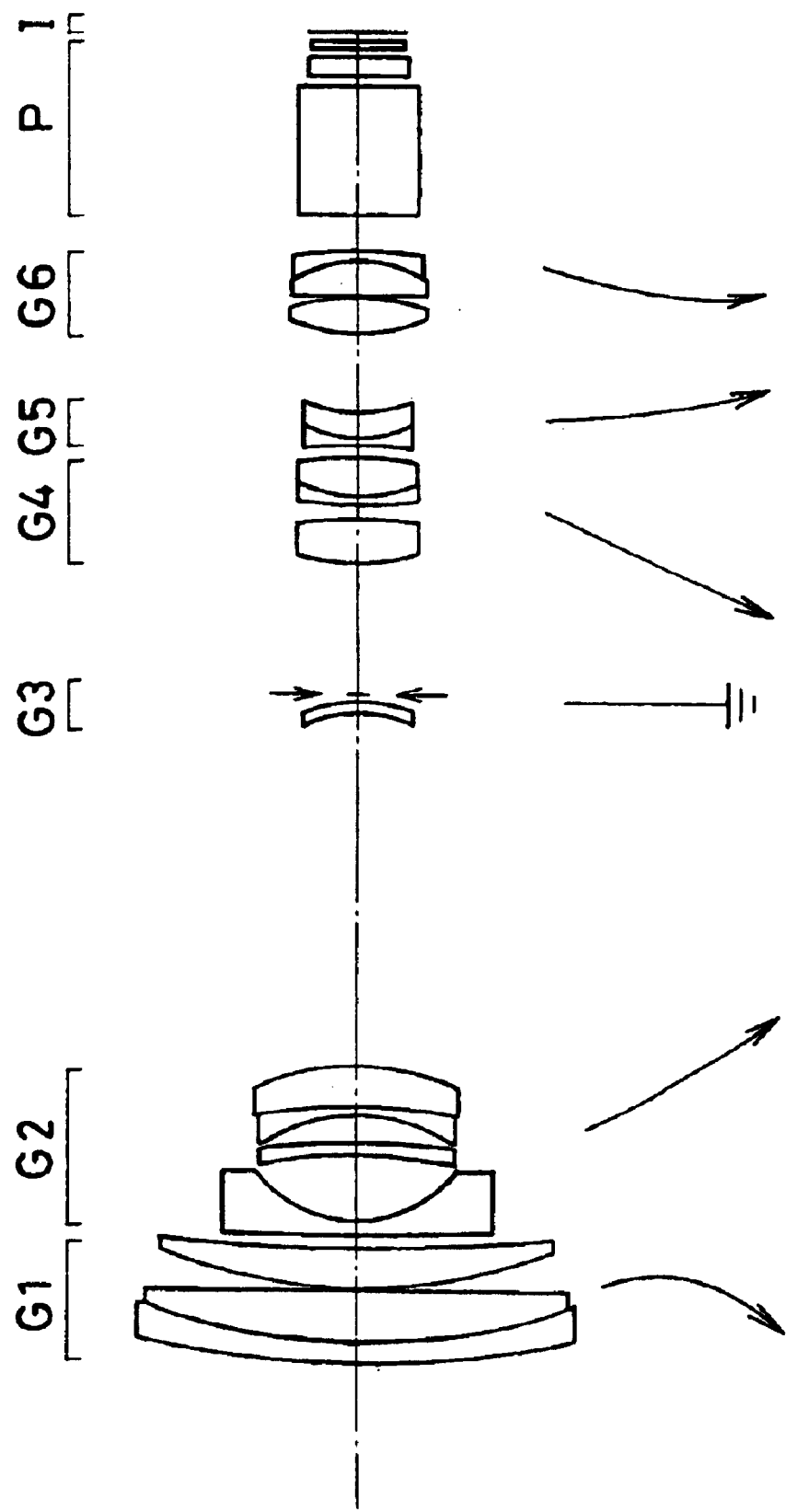
FIG. 24 is a sectional view, similar to FIG. 1, of the lens arrangement of Example 24 of the zoom lens system.

As shown in FIG. 24, the zoom lens system of Example 24 is composed of a first lens group having positive refracting power, a second lens group G2 having negative refracting power, a third lens group G3 having negative refracting power, a fourth lens group G4 having positive refracting power, a fifth lens group G5 having negative refracting power and a sixth lens group G6 having positive refracting power. For zooming from the wide-angle end to the telephoto end of the system when focused on an object point at infinity, the first lens group G1 moves toward the image side of the zoom lens system in a convex reciprocation locus and reaches the telephoto end where it is located nearer to the object side of the system than at the position of the wide-angle end, the second lens group G2 moves toward the image side, the third lens group G3, which has an aperture stop on its image side as an integral piece, remains fixed, the fourth lens group G4 moves toward the object side, the fifth lens group G5 moves toward the image side, and the sixth lens group G6 moves toward the object side in a convex reciprocation locus while the spacing between the fifth lens group G5 and the sixth lens group G6 becomes narrow and reaches the telephoto end where it is located somewhat nearer to the object side than at the position of the wide-angle end. For focusing on a nearby subject, the sixth lens group G6 is designed to move out toward the object side of the system. More specifically, when the system is focused on a nearby subject at the wide angle end, the spacing between the fifth lens group G5 and the sixth lens group G6 is set at 9.73471 mm, and when focused on a nearby subject at the telephoto end, the spacing between the fifth lens group G5 and the sixth lens group G6 is set at 0.8531 mm.

In Example 24, the first lens group G1 is made up of a negative meniscus lens convex on its object side, a double-convex lens and a positive meniscus lens convex on its object side, the second lens group G2 is made up of a negative meniscus lens convex on its object side, a negative meniscus lens convex on its image side and a doublet consisting of a negative meniscus lens convex on its image side and a positive meniscus lens convex on its image side, the third lens group G3 is made up of a negative meniscus lens convex on its image side and a stop, the fourth lens group G4 is made up of a double-convex lens and a doublet consisting of a negative meniscus lens convex on its object side and a double-convex lens, the fifth lens group G5 is made up of a doublet consisting of a double-concave lens and a positive meniscus lens convex on its object side, and the sixth lens group G6 is made up of a double-convex lens and a doublet consisting of double-convex lens and a negative meniscus lens convex on its image side. Three aspheric surfaces are provided, one for the image-side surface of the negative meniscus lens in the second lens group G2, which lens is convex on its image side, one for the object-side surface of the double-convex lens in the fourth lens group G4, and one for the object-side surface of the double-convex lens in the sixth lens group G6.

Figure 25:
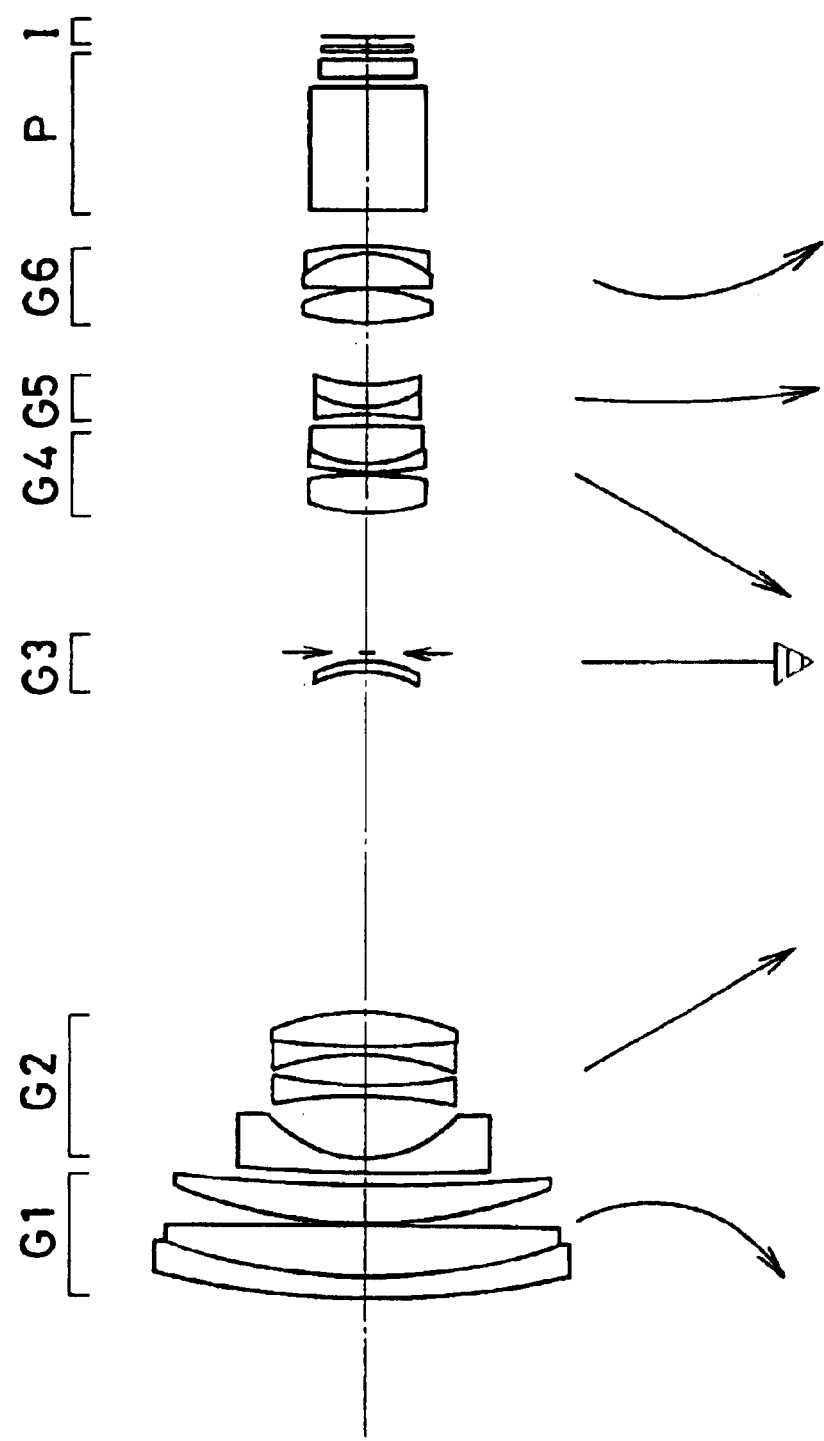
FIG. 25 is a sectional view, similar to FIG. 1, of the lens arrangement of Example 25 of the zoom lens system.
Figure 26C:
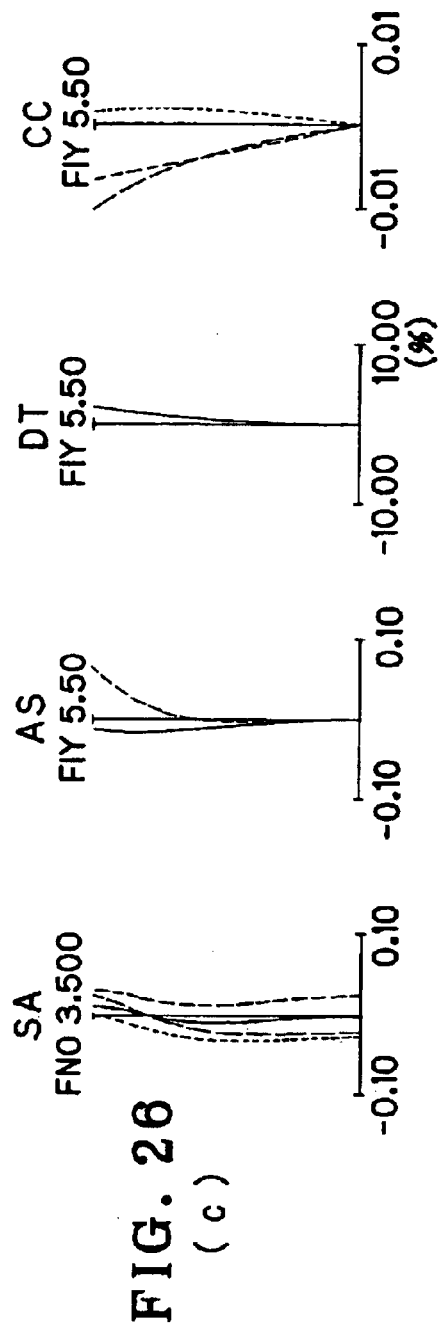
Figure 27A:
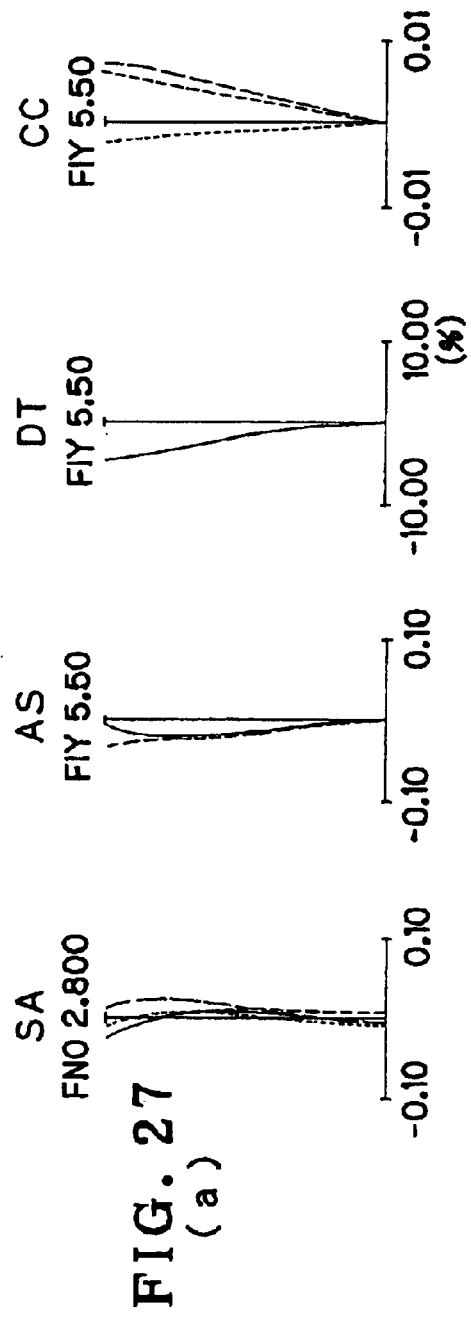
Figure 28A:
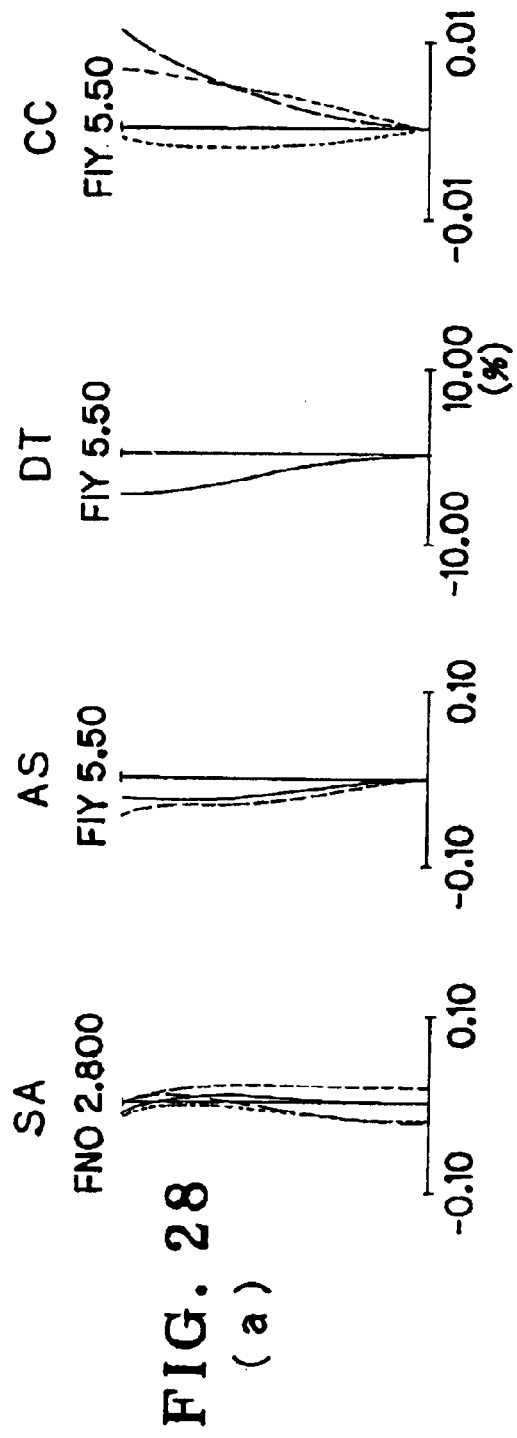
FIGS. 28(a), 28(b) and 28(c) are aberration diagrams for Example 3 when focused on an object point at infinity.
Figure 28B:
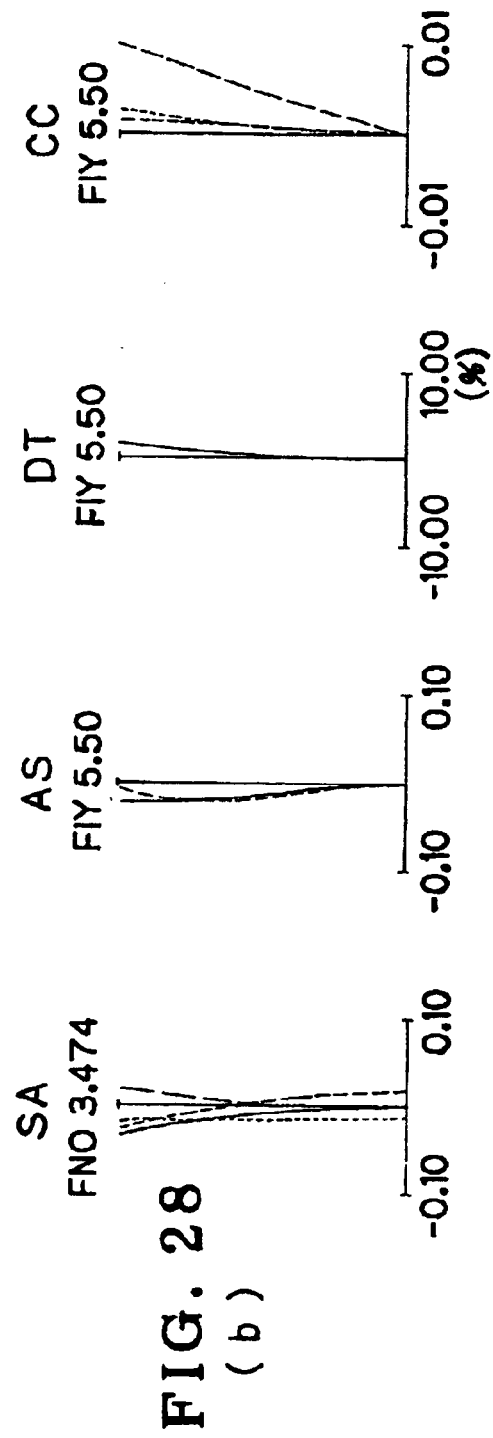
Figure 28C:
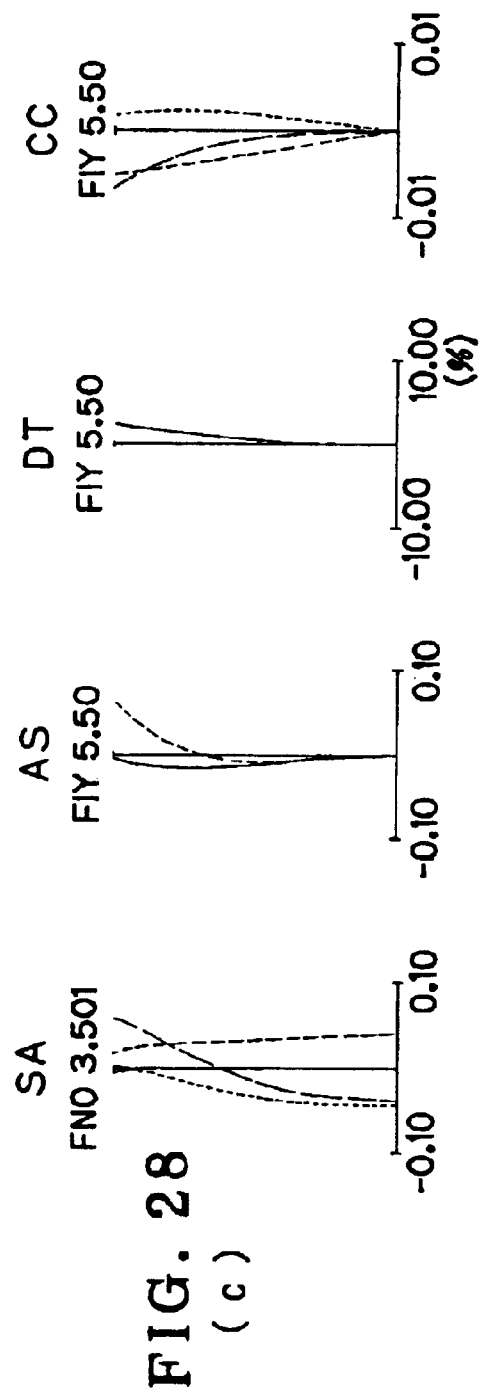
Figure 29A:
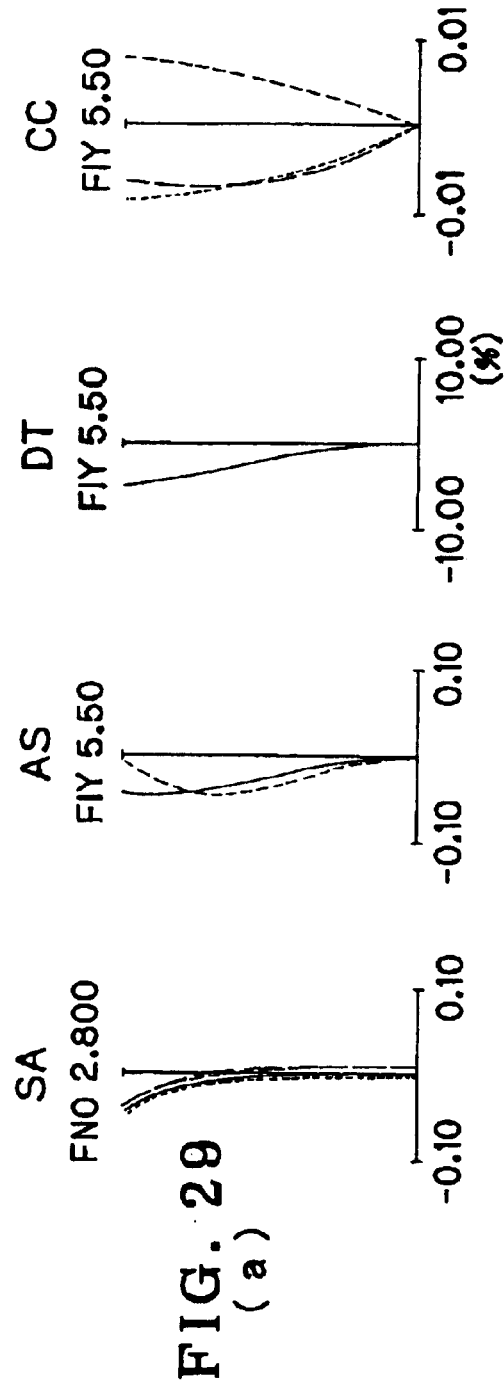
FIGS. 29(a), 29(b) and 29(c) are aberration diagrams for Example 4 when focused on an object point at infinity.
Figure 29:
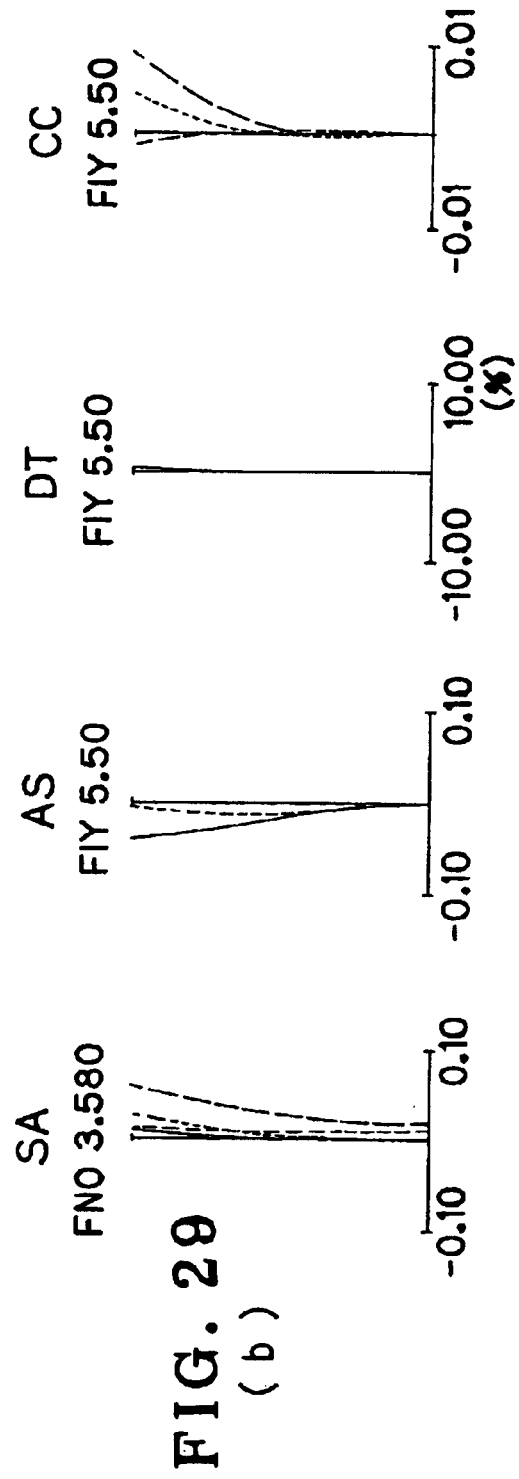
Figure 29:
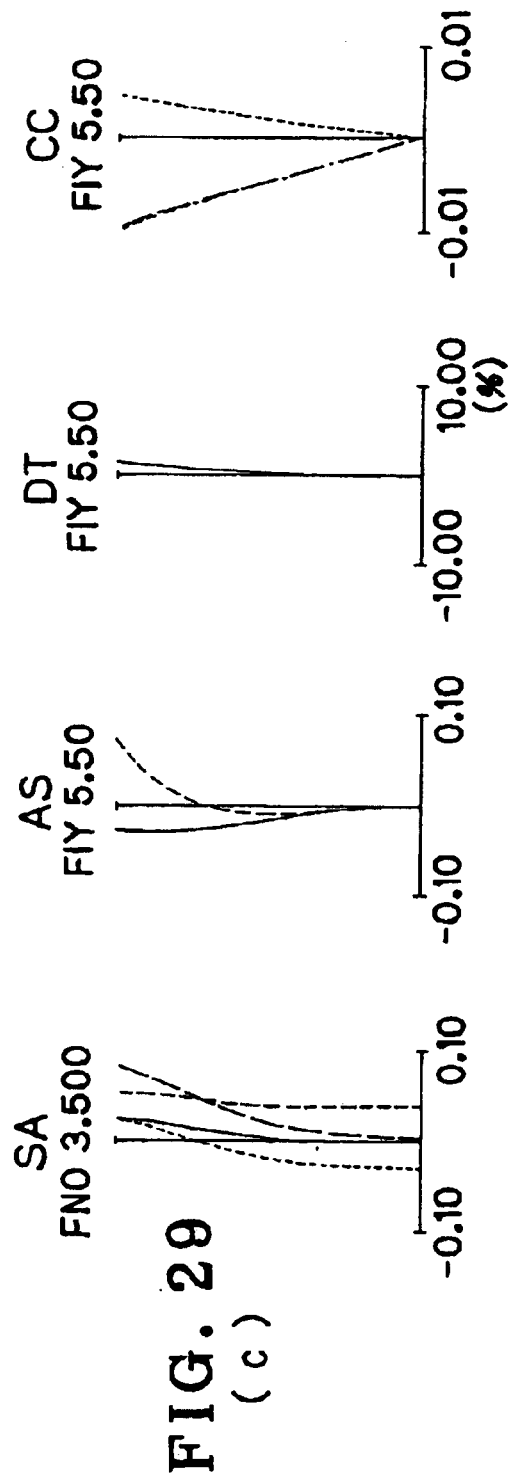
Figure 30A:
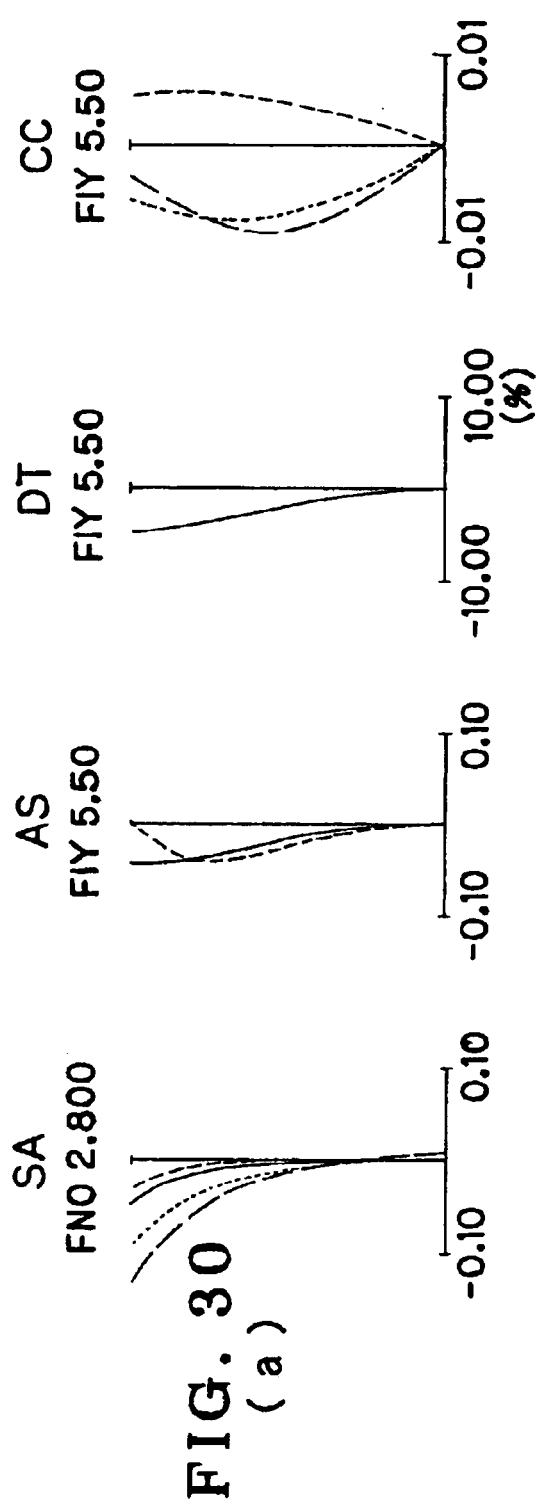
FIGS. 30(a), 30(b) and 30(c) are aberration diagrams for Example 5 when focused on an object point at infinity.
Figure 30B:
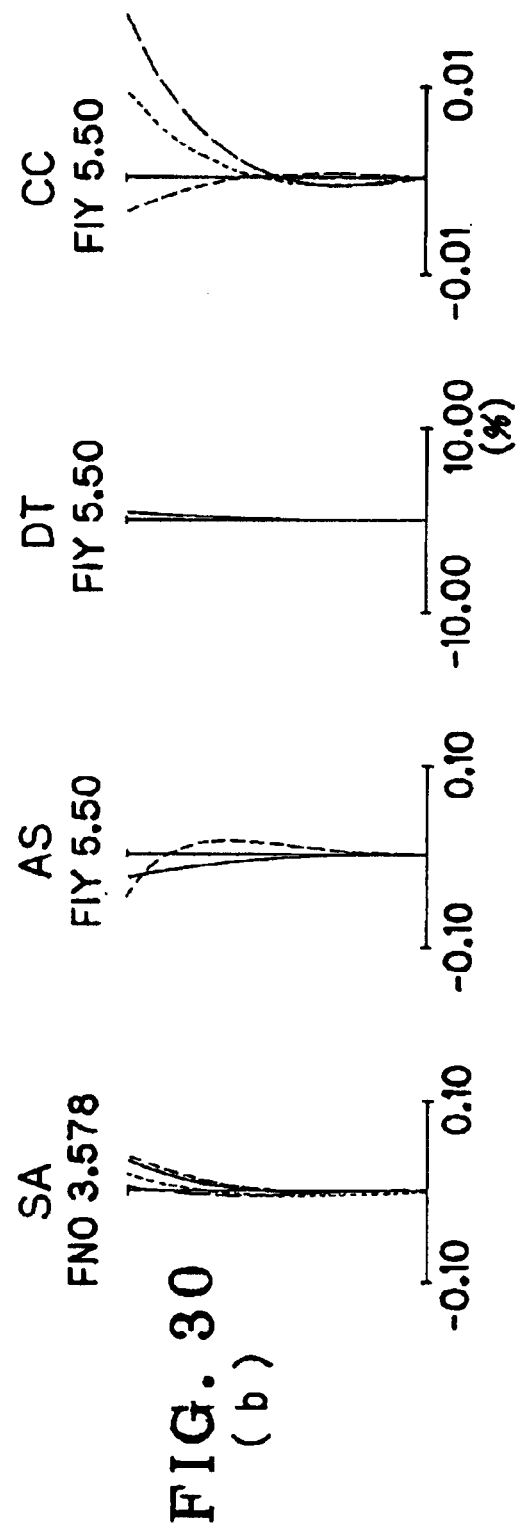
Figure 30:
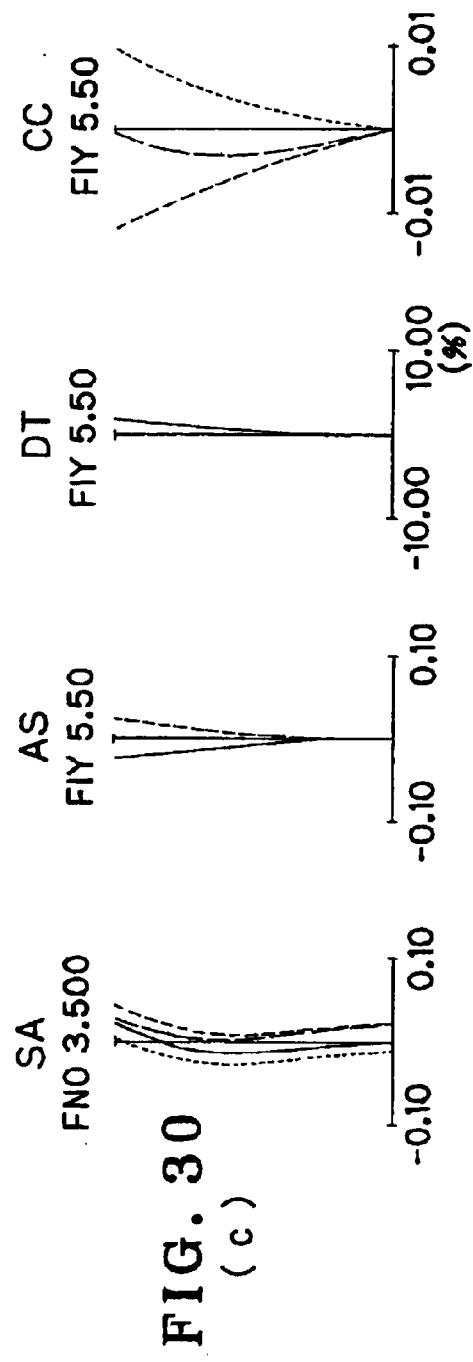
Figure 31:
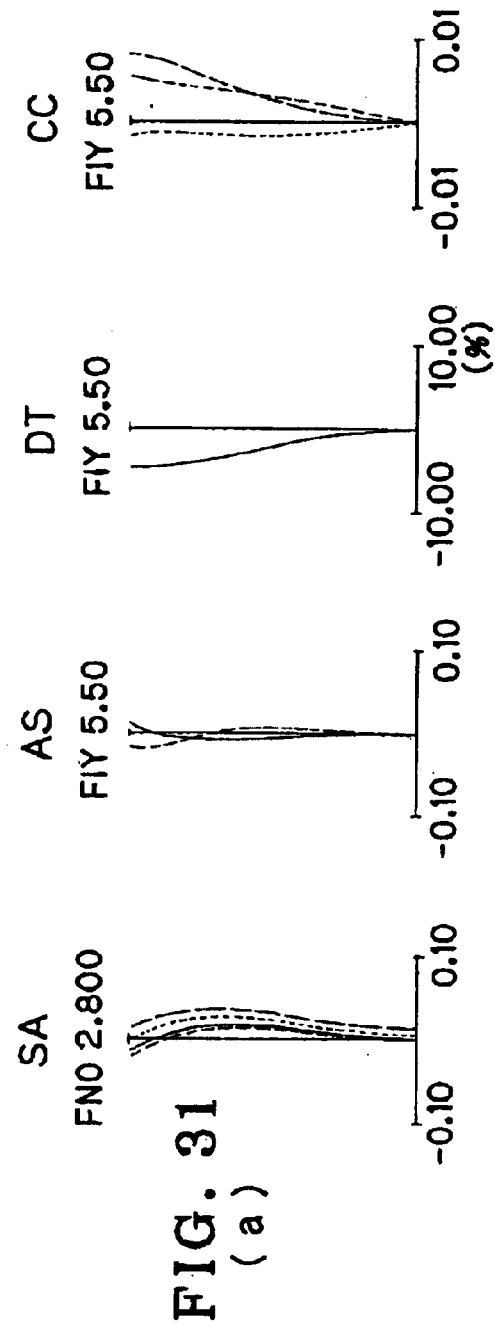
FIGS. 31(a), 31(b) and 31(c) are aberration diagrams for Example 6 when focused on an object point at infinity.
Figure 32:
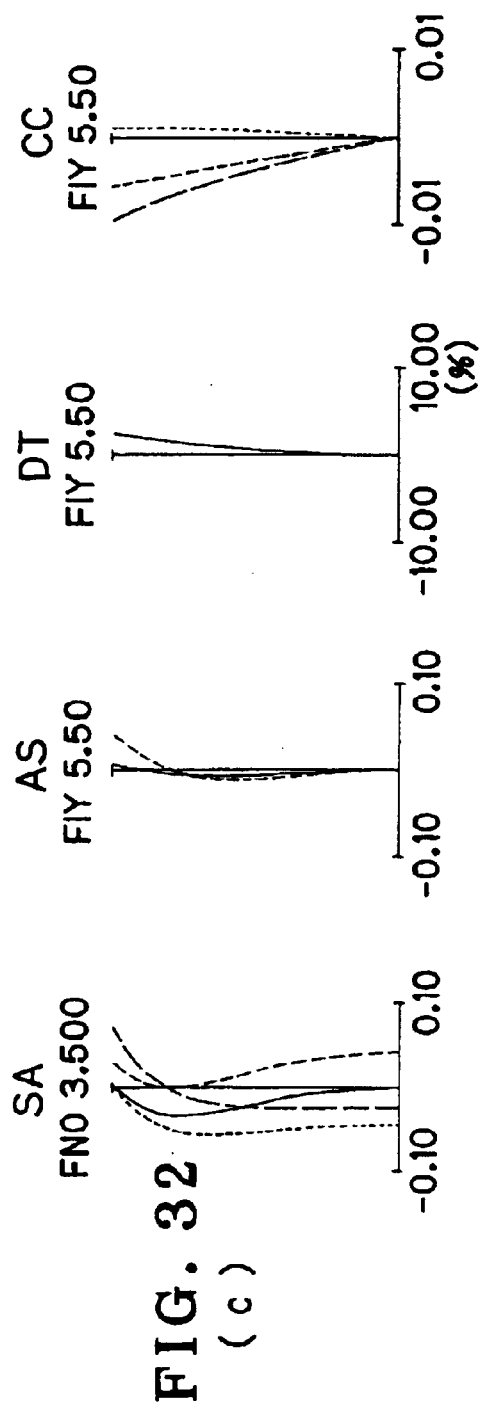
FIGS. 32(a), 32(b) and 32(c) are aberration diagrams for Example 7 when focused on an object point at infinity.
Figure 33:
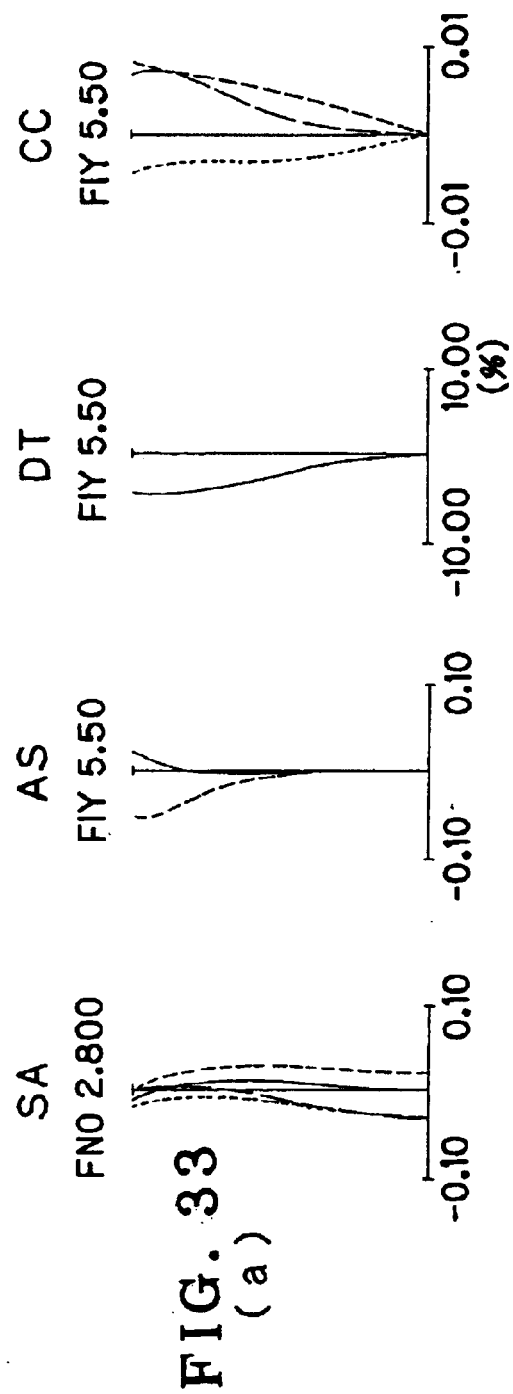
FIGS. 33(a), 33(b) and 33(c) are aberration diagrams for Example 8 when focused on an object point at infinity.
Figure 34A:
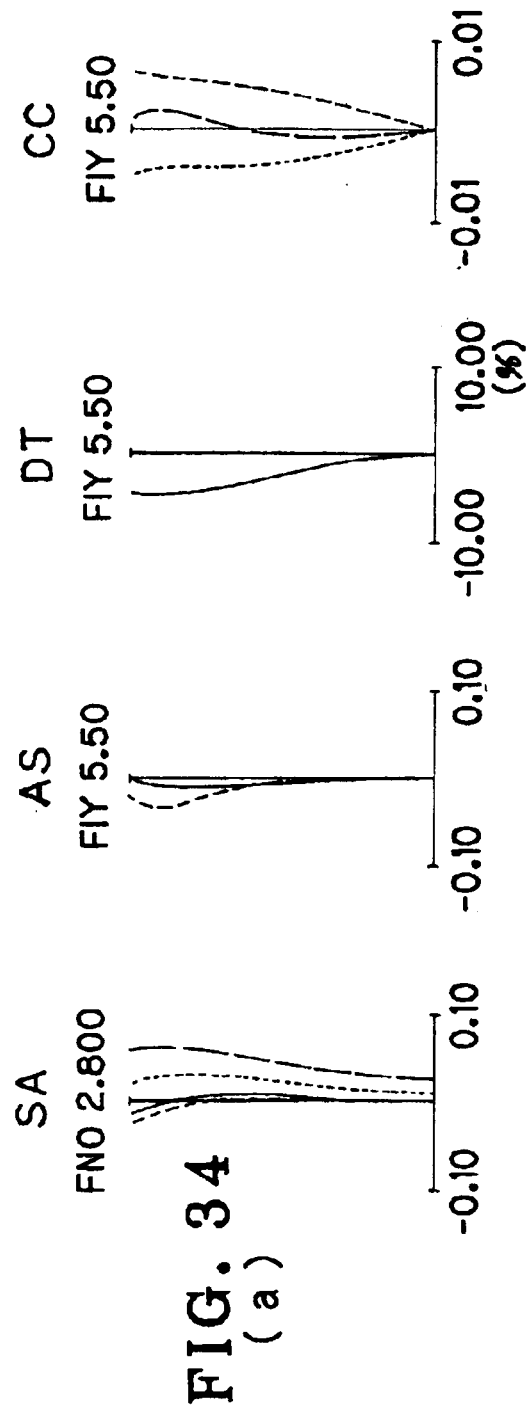
Figure 34B:
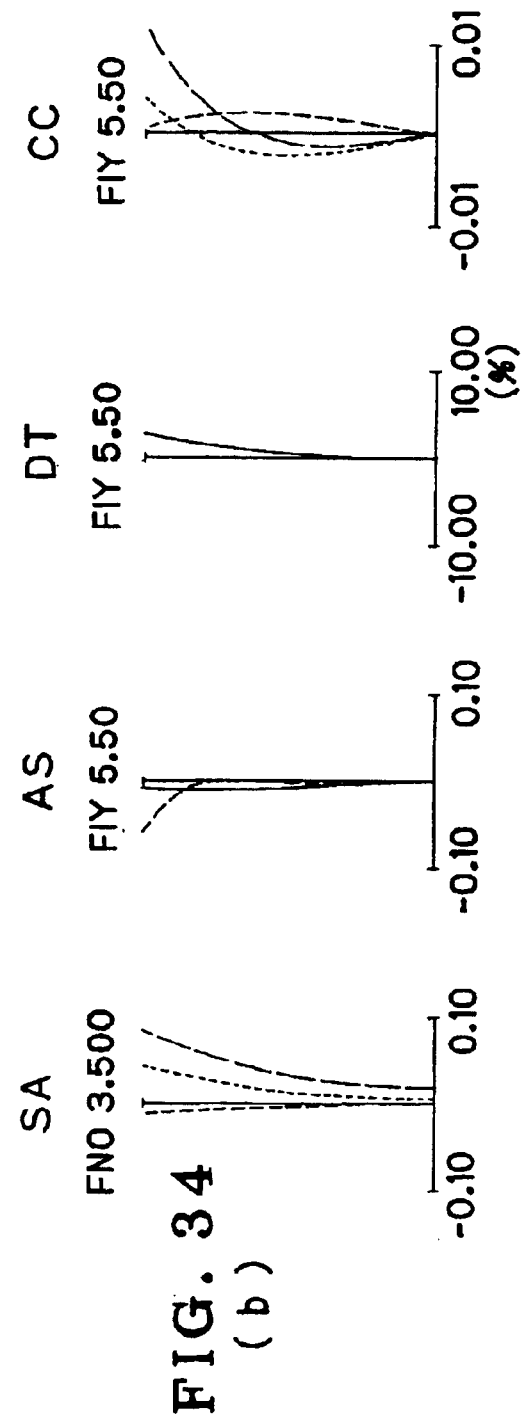
Figure 36:
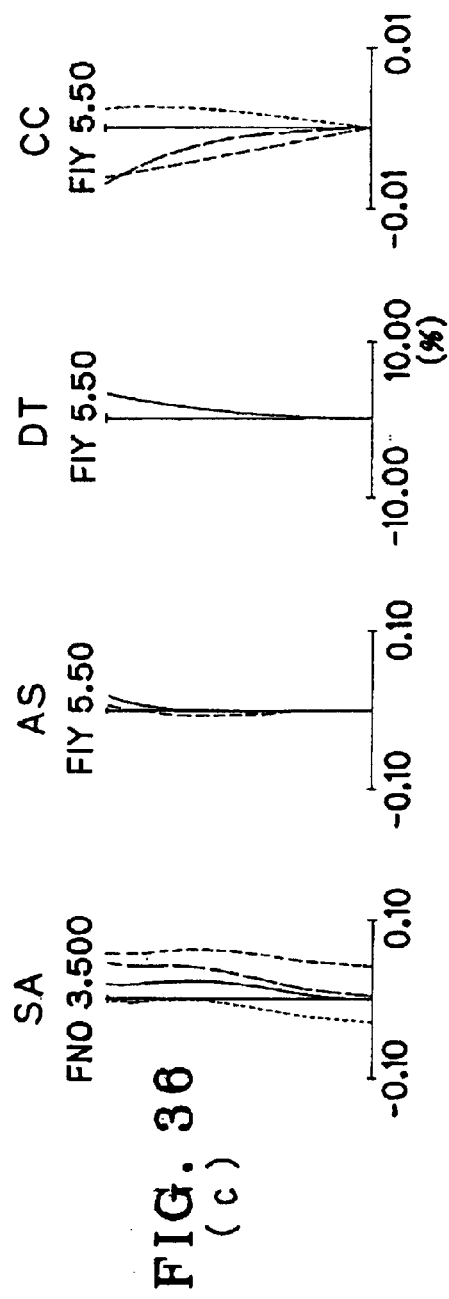
FIGS. 36(a), 36(b) and 36(c) are aberration diagrams for Example 11 when focused on an object point at infinity.
Figure 37:
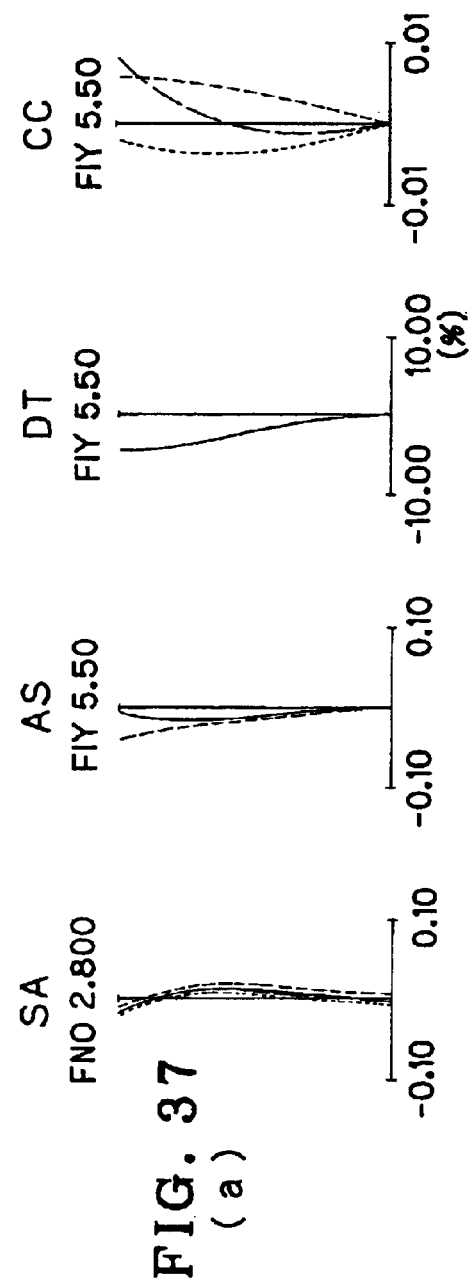
FIGS. 37(a), 37(b) and 37(c) are aberration diagrams for Example 12 when focused on an object point at infinity.
Figure 38C:
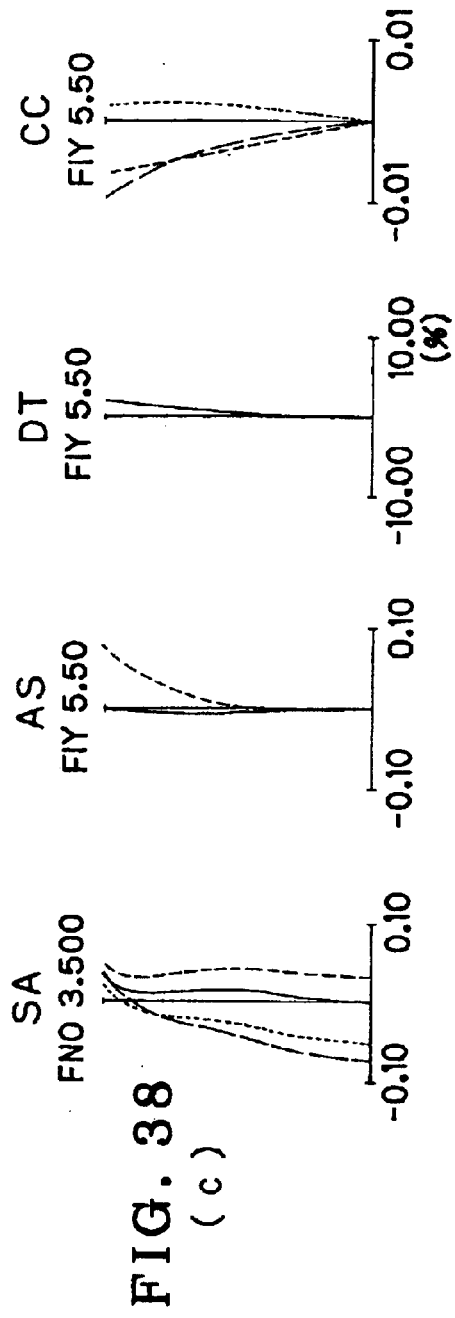
Figure 39A:
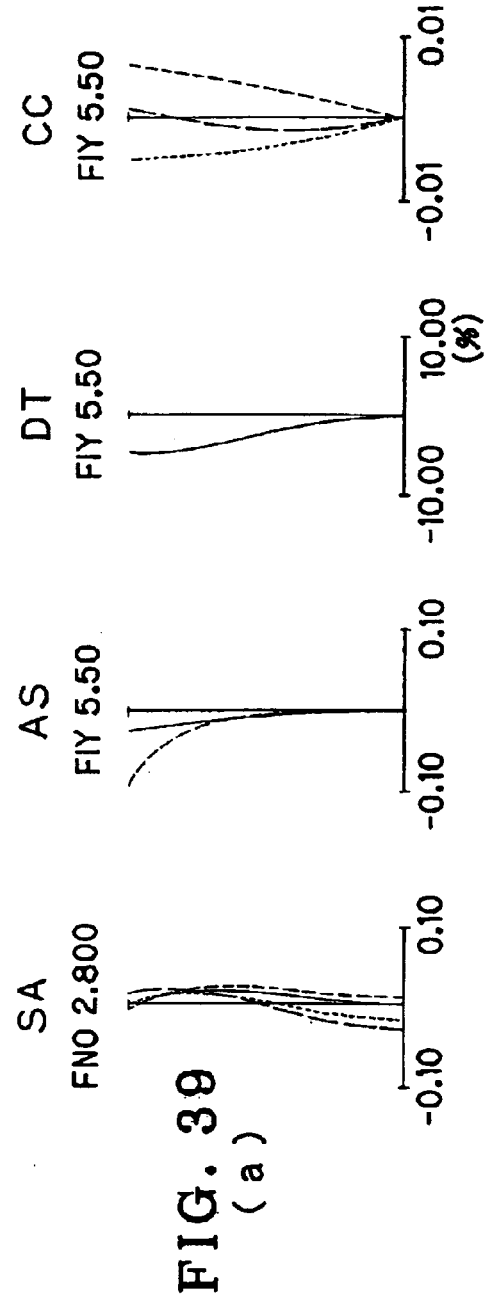
Figure 41:
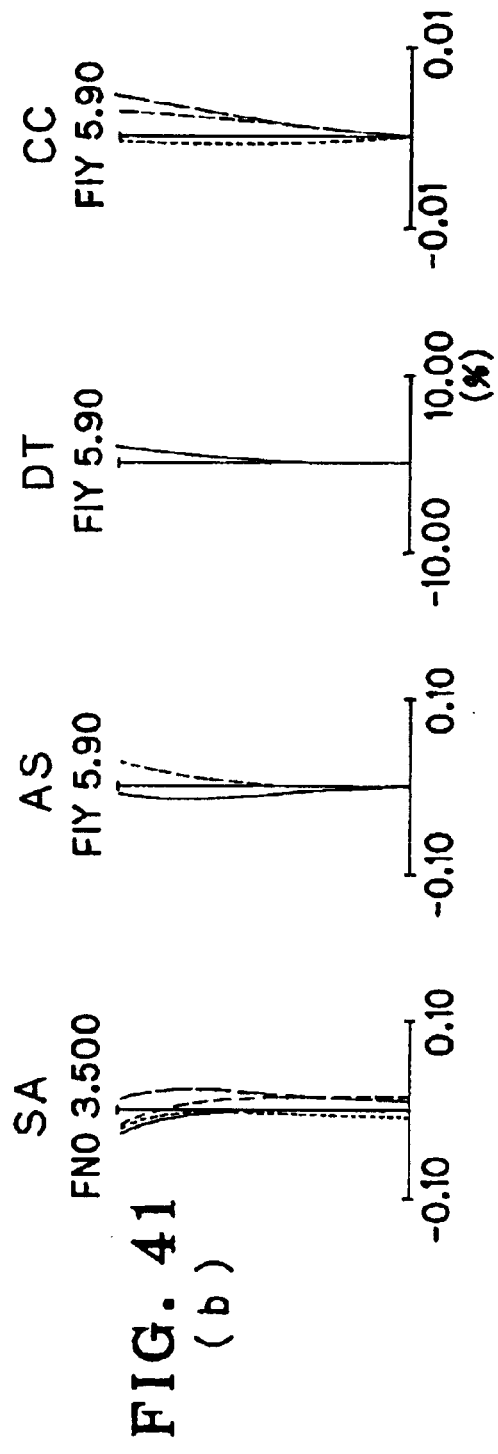
FIGS. 41(a), 41(b) and 41(c) are aberration diagrams for Example 16 when focused on an object point at infinity.
Figure 41:
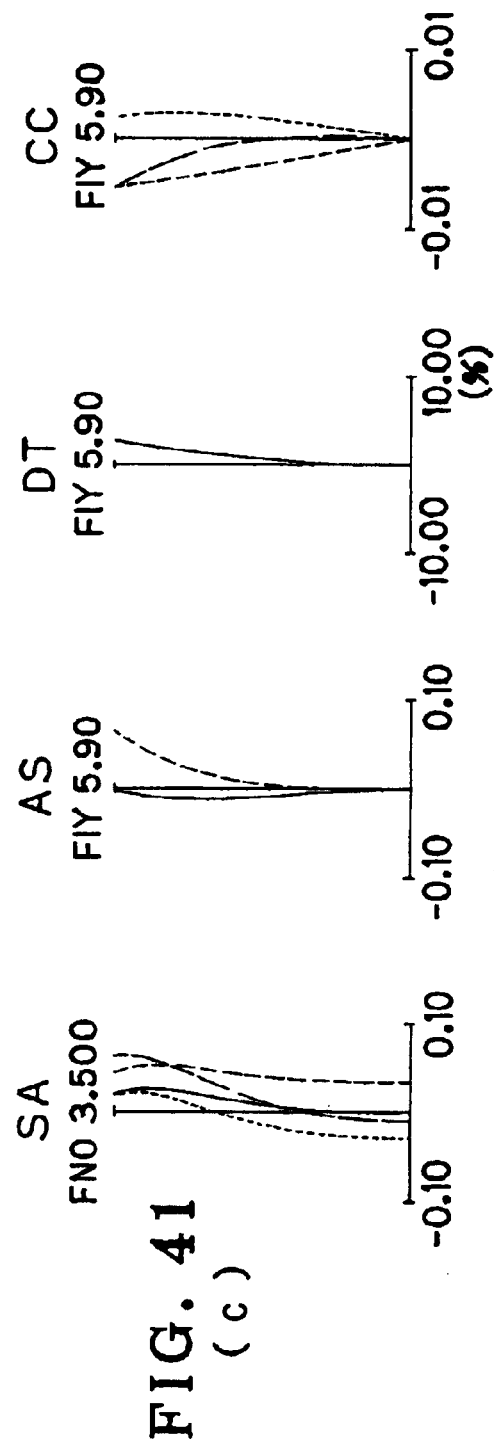
Figure 42C:
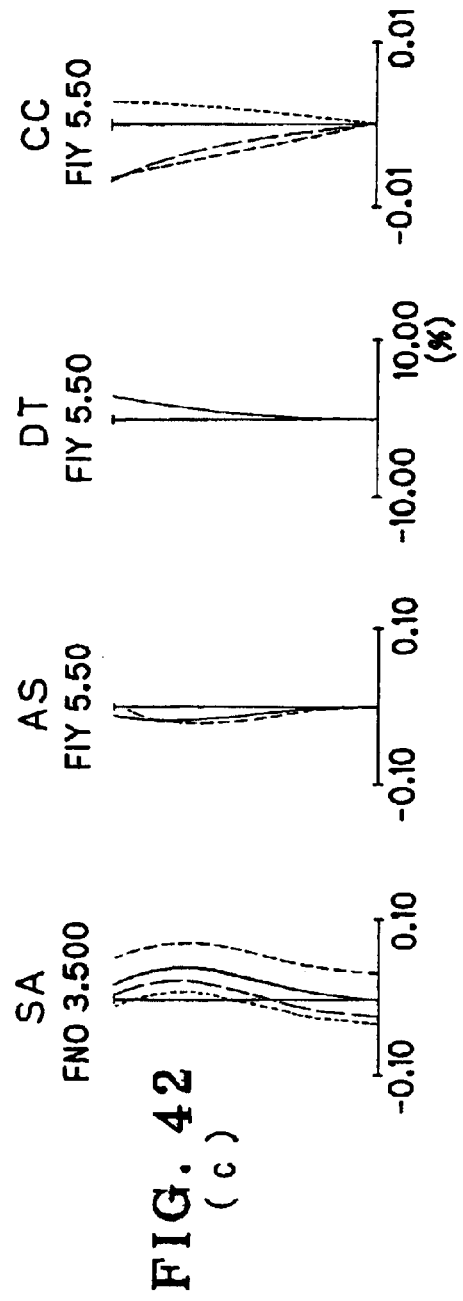
Figure 43A:
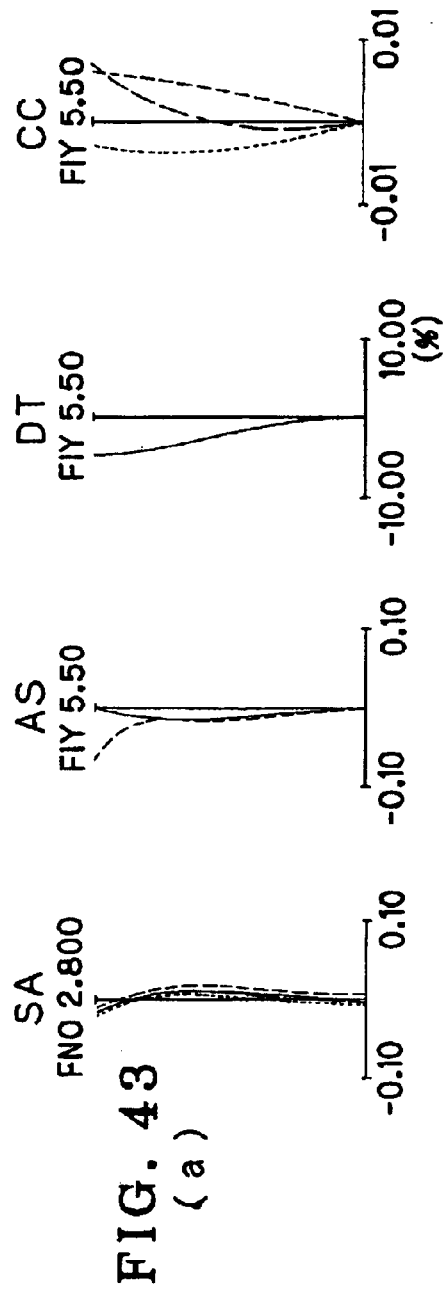
FIGS. 43(a), 43(b) and 43(c) are aberration diagrams for Example 18 when focused on an object point at infinity.
Figure 43B:
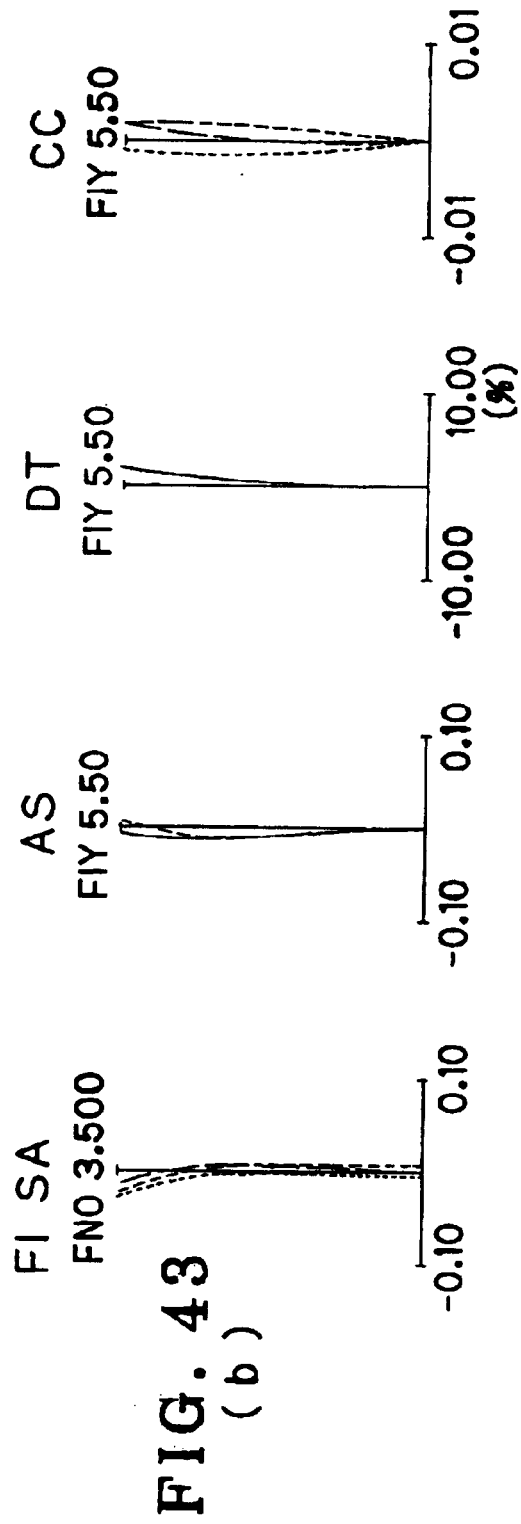
Figure 43C:
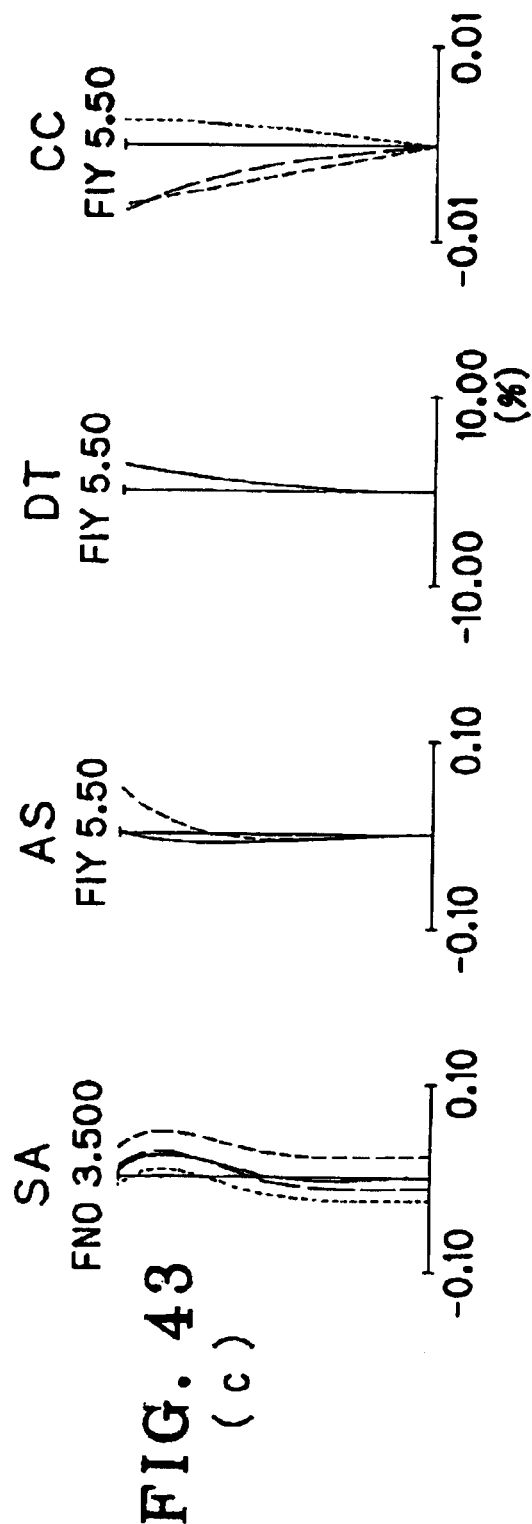
Figure 44C:
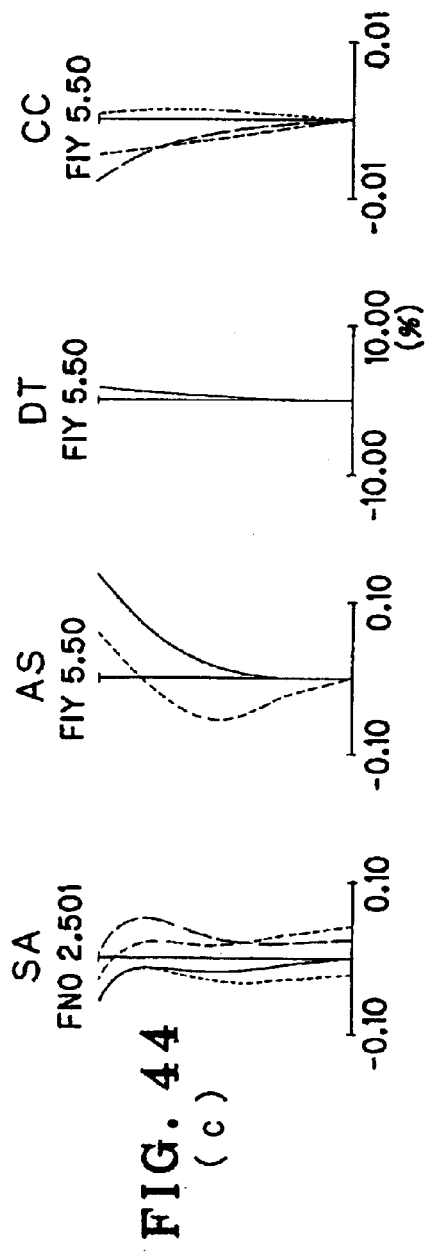
Figure 45A:
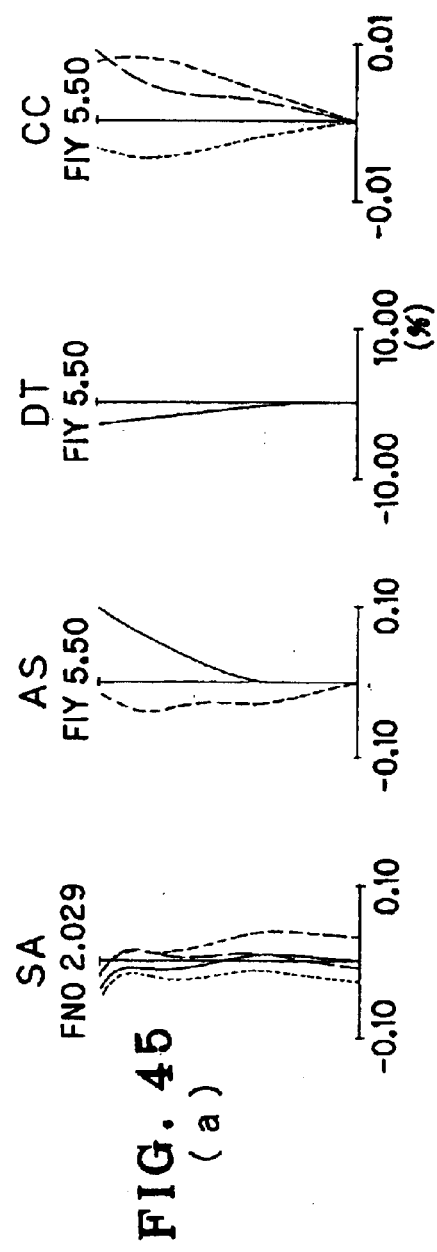
FIGS. 45(a), 45(b) and 45(c) are aberration diagrams for Example 20 when focused on an object point at infinity.
Figure 45:
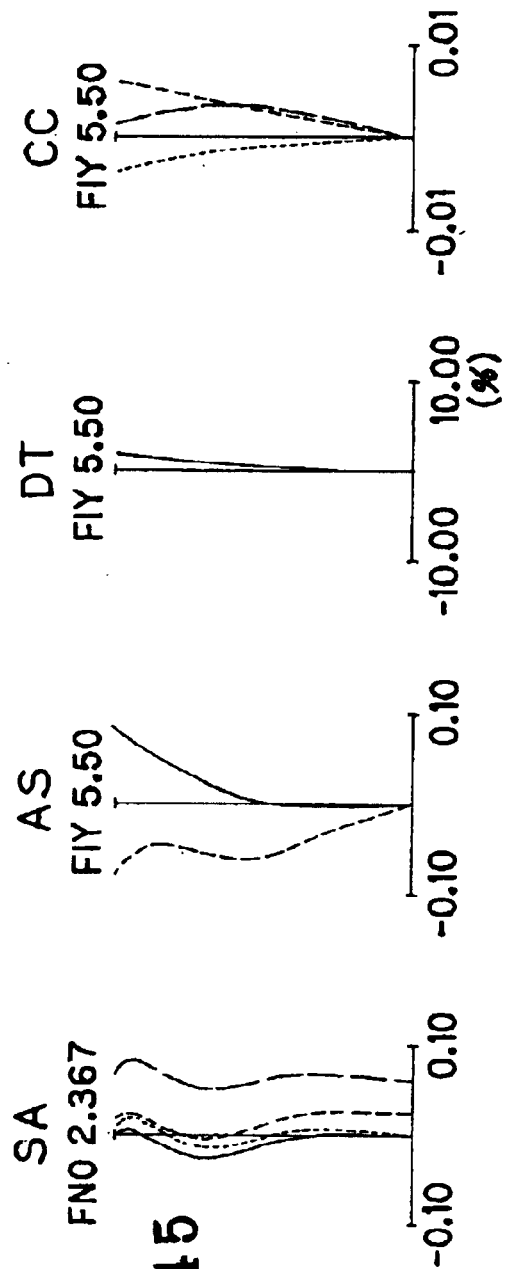
Figure 45:
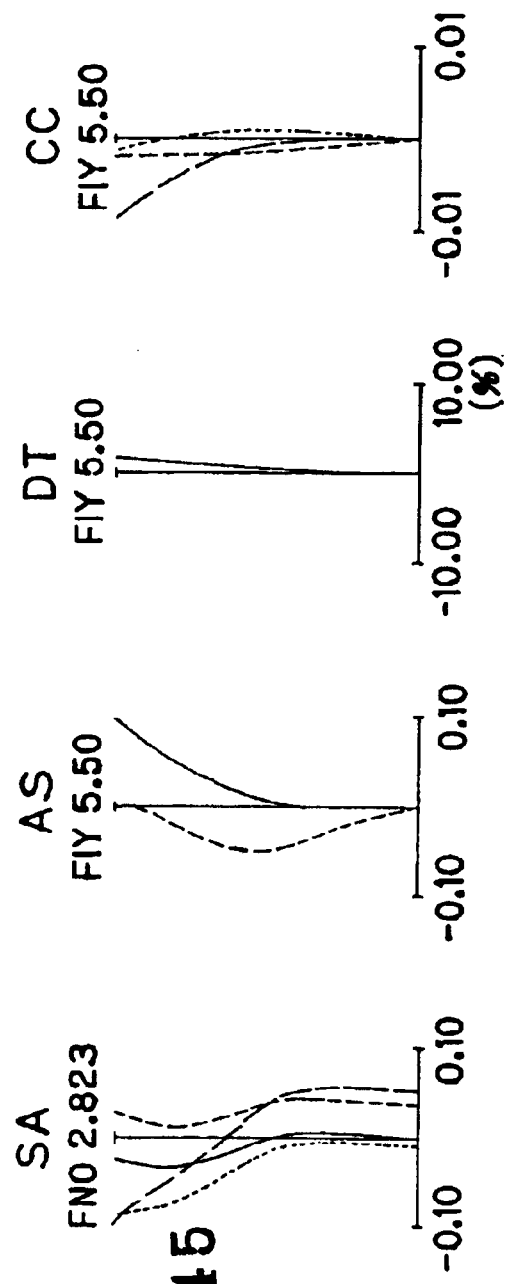
Figure 46A:
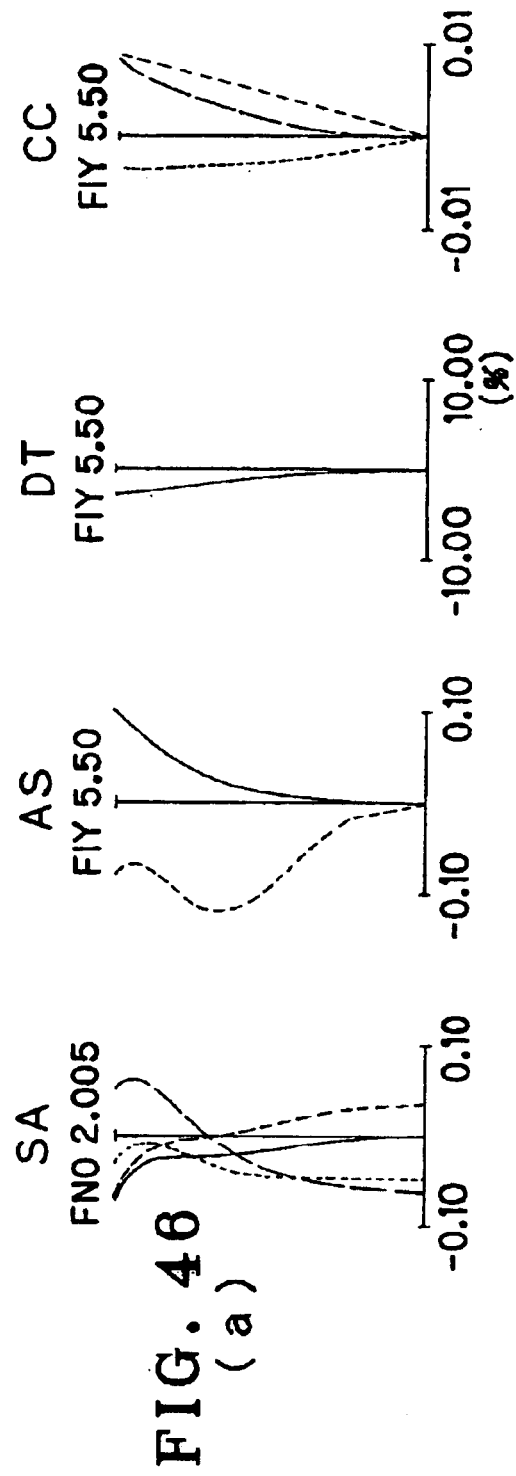
FIGS. 46(a), 46(b) and 46(c) are aberration diagrams for Example 21 when focused on an object point at infinity.
Figure 46B:
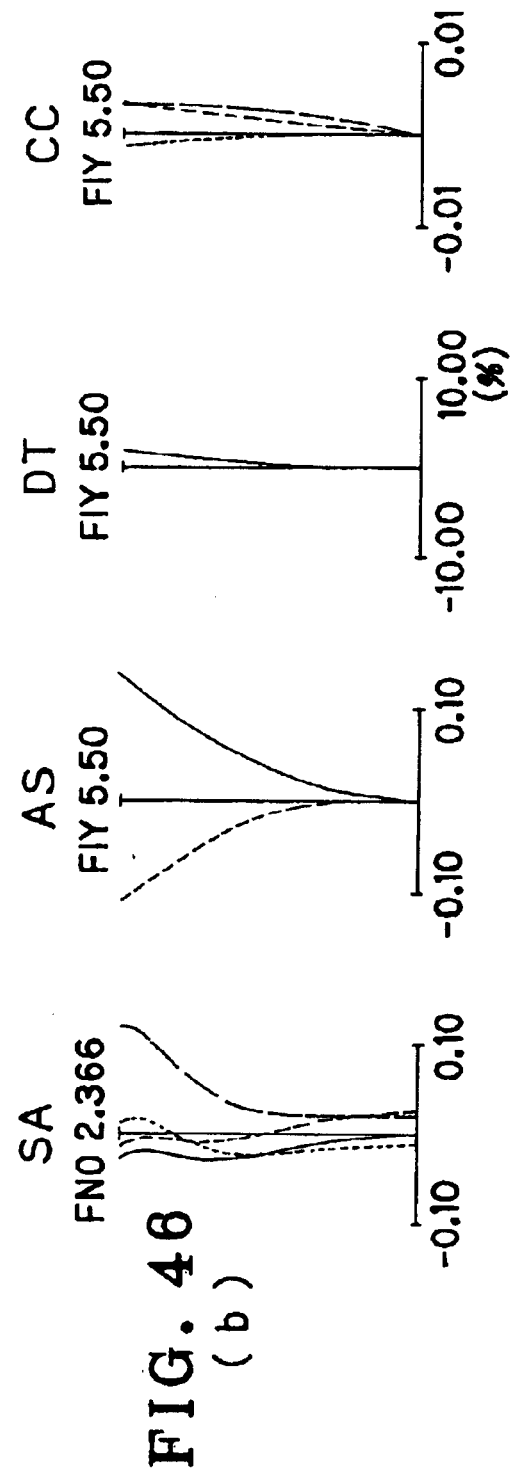
Figure 46C:
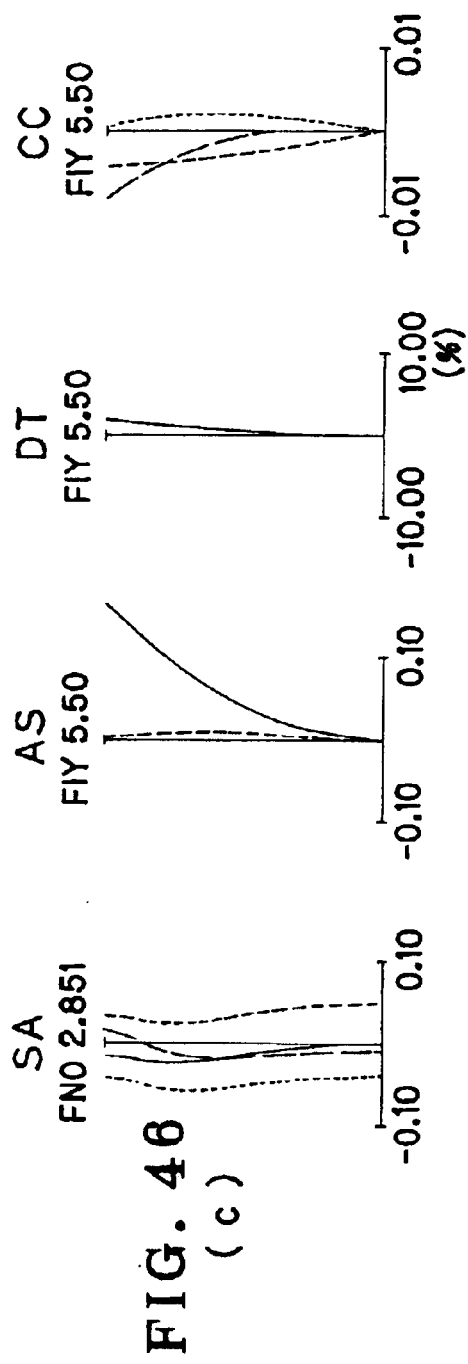
Figure 47A:
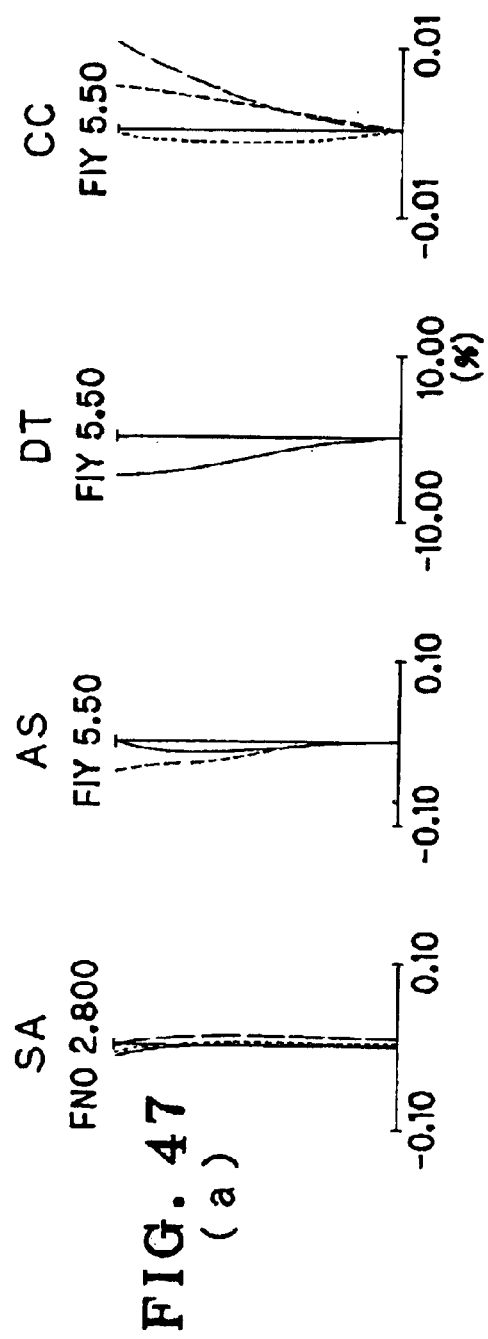
Figure 48C:
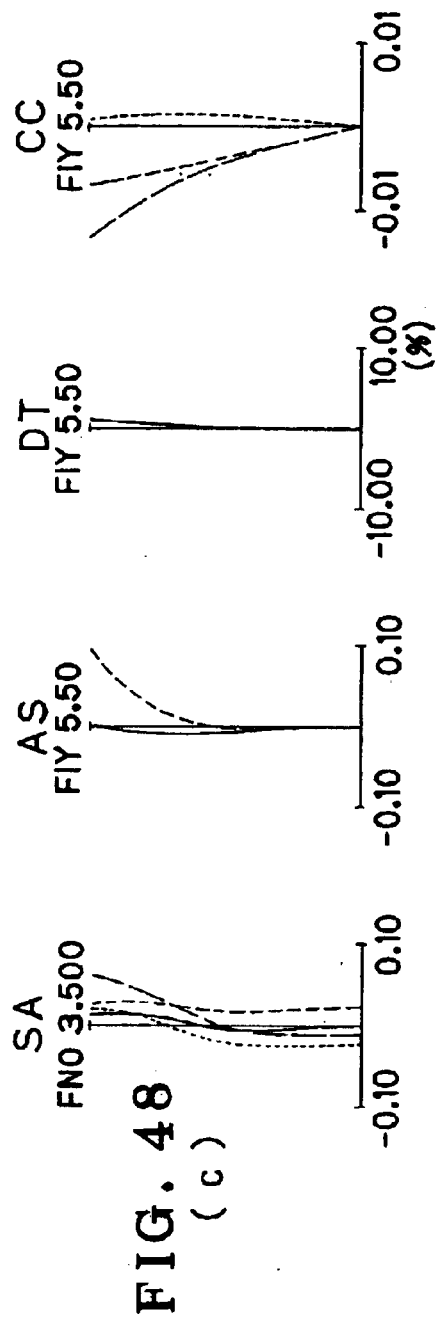
Figure 49A:
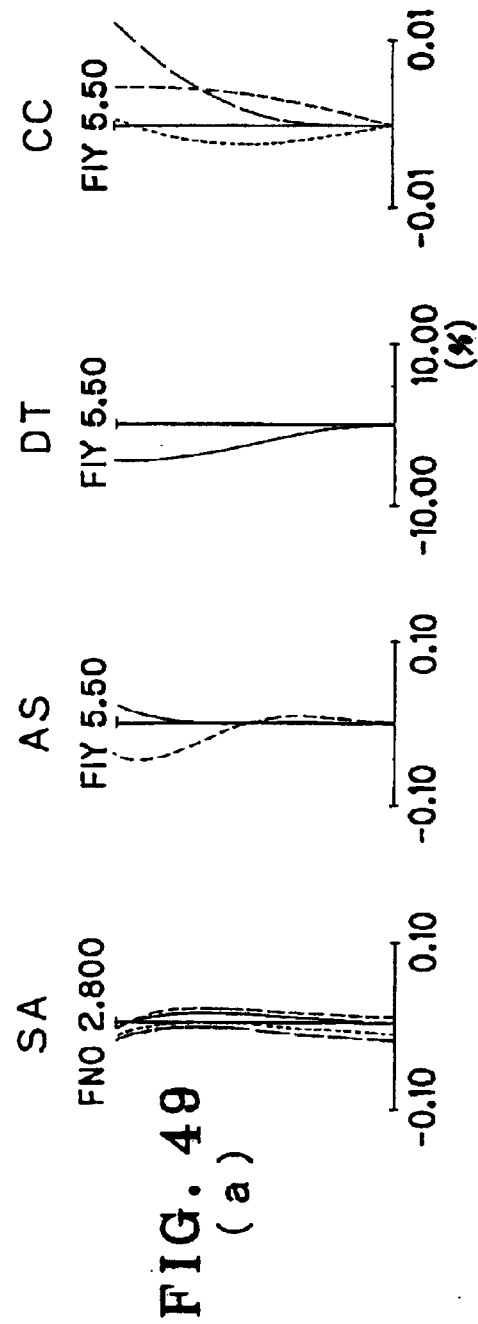
FIGS. 49(a), 49(b) and 49(c) are aberration diagrams for Example 24 when focused on an object point at infinity.
Figure 49B:
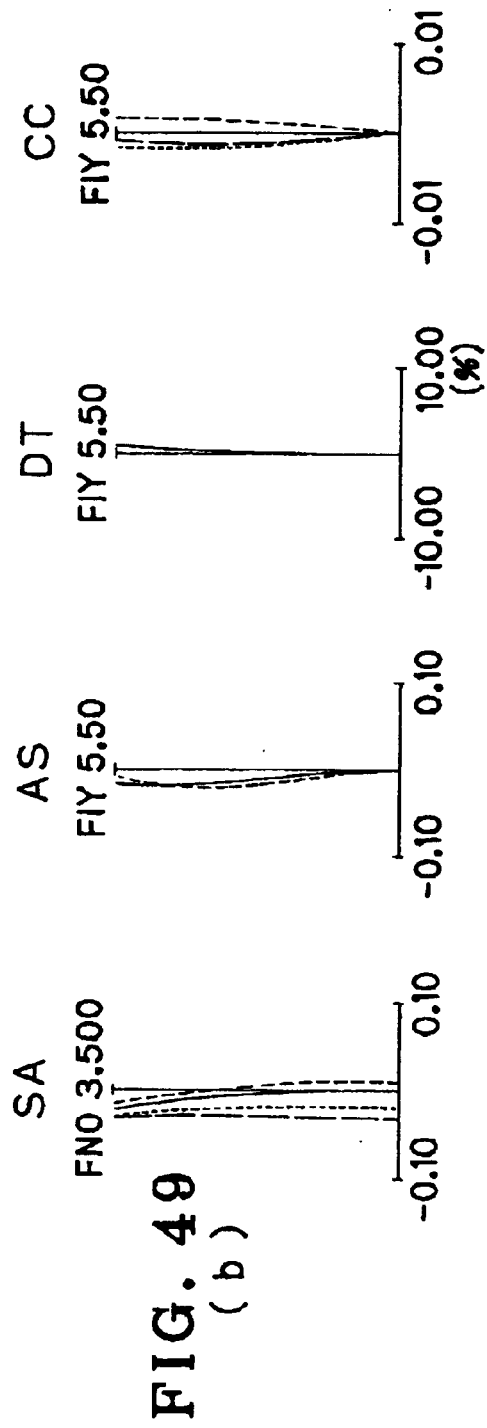
Figure 49C:
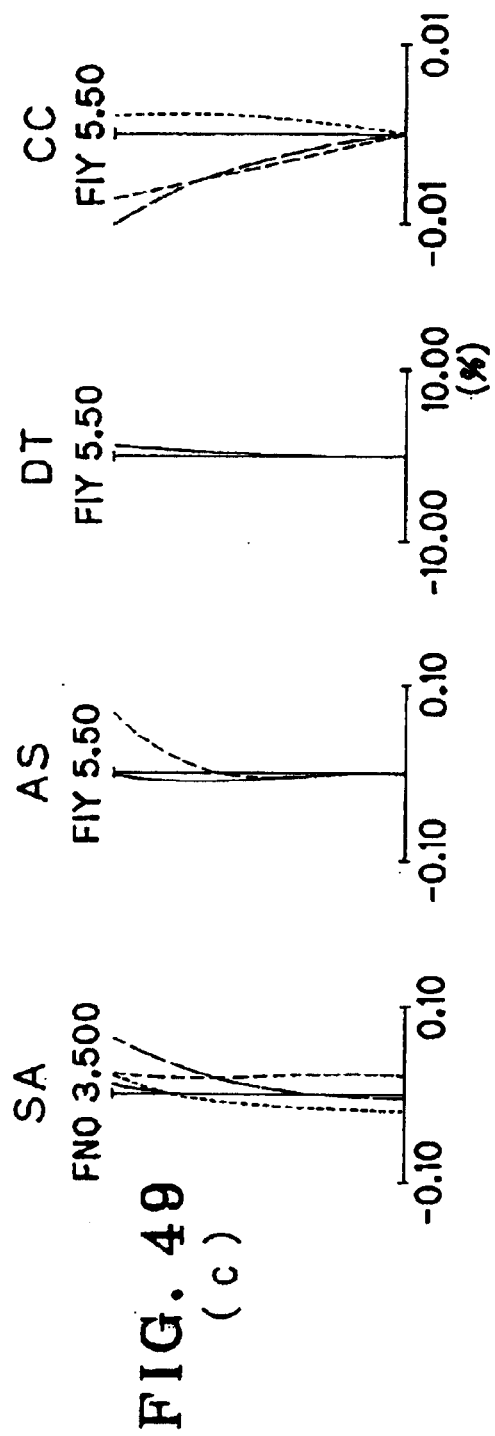
Figure 50A:
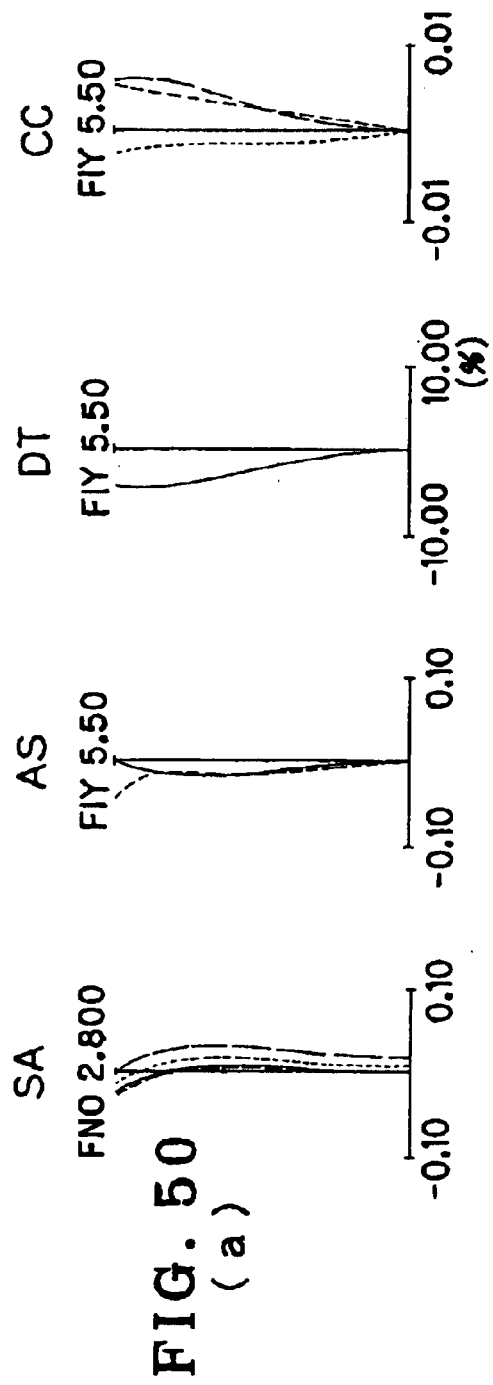
FIGS. 50(a), 50(b) and 50(c) are aberration diagrams for Example 25 when focused on an object point at infinity.
Figure 50B:
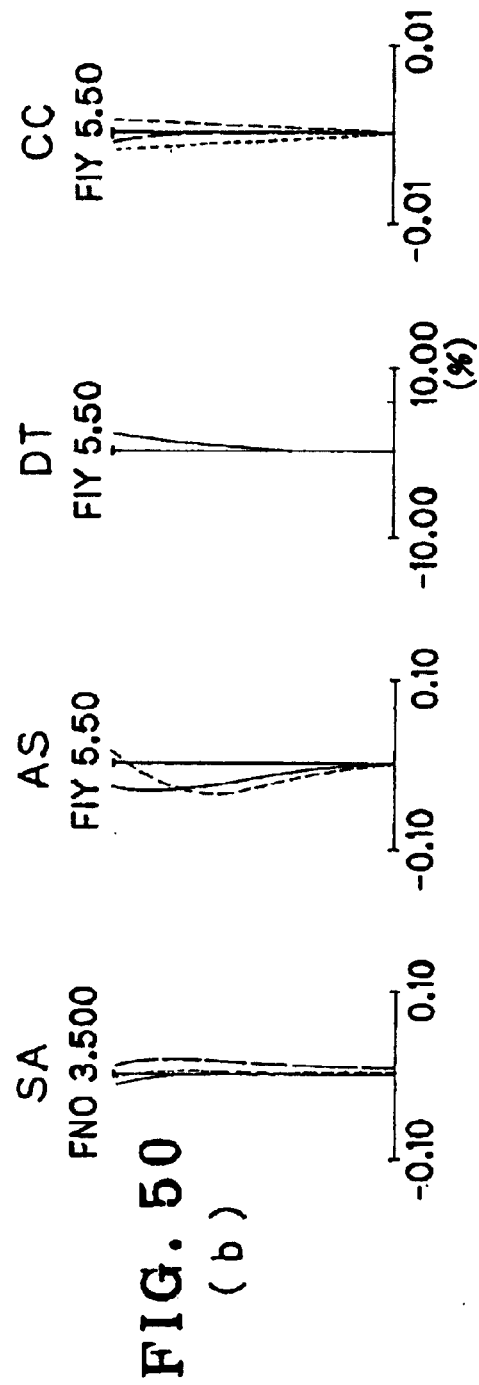
Figure 50:
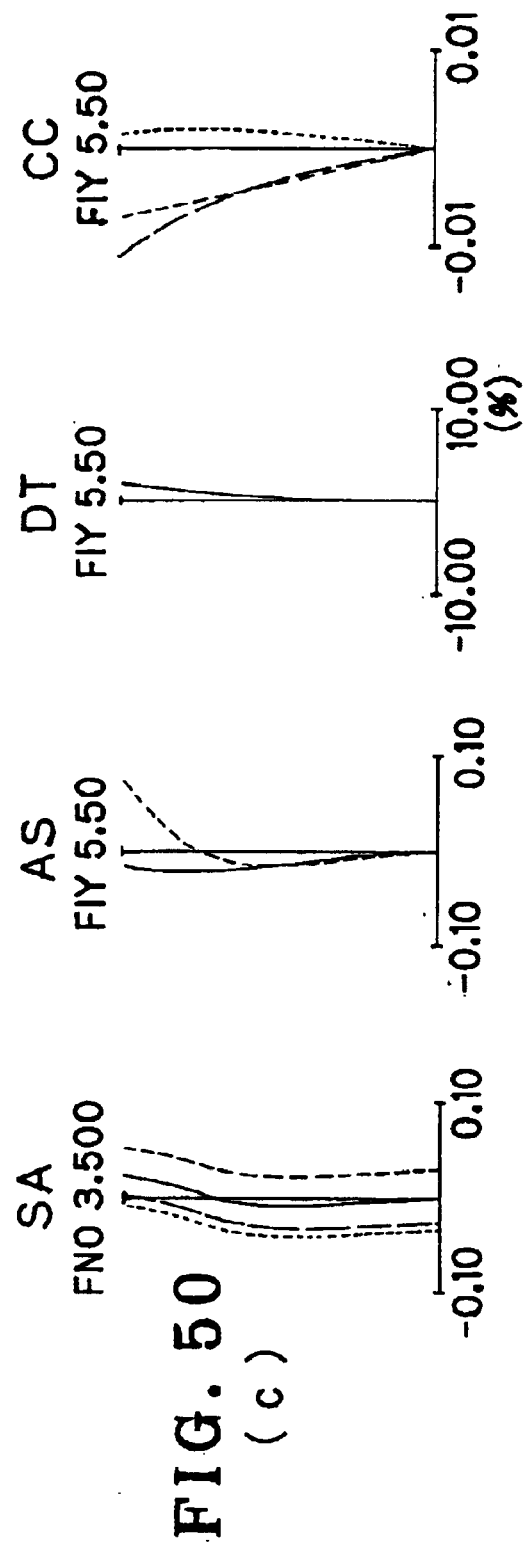

As shown in FIG. 25, the zoom lens system of Example 25 is composed of a first lens group G1 having positive refracting power, a second lens group G2 having negative refracting power, a third lens group G3 having negative refracting power, a fourth lens group G4 having positive refracting power, a fifth lens group G5 having negative refracting power and a sixth lens group G6 having positive refracting power. For zooming from the wide-angle end to the telephoto end of the zoom lens system when focused on an object point at infinity, the first lens group G1 moves toward the image side of the zoom lens system in a convex reciprocation locus and reaches the telephoto end where it is located nearer to the object side of the zoom lens system than at the position of the wide-angle end, the second lens group G2 moves toward the image side, the third lens group G3, which has an aperture stop on its image side as an integral piece, remains fixed, the fourth lens group G4 moves toward the object side, the fifth lens group G5 moves toward the image side, and the sixth lens group G6 moves toward the object side while the spacing between the fifth lens group G5 and the sixth lens group G6 becomes narrow and reaches the telephoto end where it is located somewhat nearer to the image side than at the position of the wide-angle end. For focusing on a nearby subject, the sixth lens group G6 is designed to move out toward the object side. More specifically, when the system is focused on a nearby subject at the wide-angle end, the spacing between the fifth lens group G5 and the sixth lens group G6 is set at 7.9914 mm, and when focused on a nearby subject at the telephoto end, the spacing between the fifth lens group G5 and the sixth lens group G6 is set at 1.4726 mm.

In Example 25, the first lens group G1 is made up of a negative meniscus lens convex on its object side, a double-convex lens and a positive meniscus lens convex on its object side, the second lens group G2 is made up of a negative meniscus lens convex on its object side, a double-concave lens and a doublet consisting of a double-concave lens and a double-convex lens, the third lens group G3 is made up of a negative meniscus lens convex on its image side and a stop, the fourth lens group G4 is made up of a double-convex lens and a doublet consisting of a negative meniscus lens convex on its object side and a double-convex lens, the fifth lens group G5 is made up of a doublet consisting of a double-concave lens and a positive meniscus lens convex on its object side, and the sixth lens group G6 is made up of a double-convex lens and a doublet consisting of a double-convex lens and a negative meniscus lens convex on its image side. Three aspheric surfaces are provided, one for the surface of the doublet in the second lens group G2, which is located nearest to the image side, one for the object-side surface of the double-convex lens in the fourth lens group G4 and one for the object-side surface of the double-convex lens in the sixth lens group G6.

Throughout Examples 1 to 25, it is acceptable to make the amount of focusing movement larger than exemplified above, thereby focusing the system on a more nearby subject.

Enumerated below are the data on each example. However, it is noted that the symbols used hereinafter but not hereinbefore have the following meanings.

f is the focal length of the zoom lens system, $\omega$ is the half field angle of the system, $F_{NO}$ is the F-number of the system, W is the wide-angle end of the system, WS is an intermediate state between the wide-angle end and a standard state (the geometric means of the wide-angle end and the standard state), S is the standard state, ST is an intermediate state between the standard state and the telephoto end of the system, T is the telephoto end of the system, $r_1$, $r_2$ . . . are the radii of curvature of the respective lens surfaces, $d_1$, $d_2$ . . . are the spacing between adjacent lens surfaces, $n_{d1}$, $n_{d2}$ . . . are the d-line refractive indices of the respective lenses, and $\nu_{d1}$, $\nu_{d2}$ . . . are the Abbe constants of the respective lenses. Here let x stand for an optical axis where the direction of propagation of light is positive and y represent a direction perpendicular to the optical axis. Then, aspheric surface shape is given by $$x=(y^2/r)/[1+\{1-(K+1)(y/r)^2\}^{1/2}]+A_4y^4+A_6y^6+A_8y^8+A_{10}y^{10}$$

where r is a paraxial radius of curvature, K is a conical coefficient, and $A_4$, $A_6$, $A_8$ and $A_{10}$ are the fourth, sixth, eighth and tenth aspherical coefficients.

EXAMPLE 1

| | | |
|---|---|---|
| $r_1$ = 144.6796 | $d_1$ = 2.6000 | $n_{d1}$ = 1.84666  $\nu_{d1}$ = 23.78 |
| $r_2$ = 82.7855 | $d_2$ = 0.2000 | |
| $r_3$ = 86.4734 | $d_3$ = 6.6250 | $n_{d2}$ = 1.49700  $\nu_{d2}$ = 81.54 |
| $r_4$ = −587.8788 | $d_4$ = 0.2000 | |
| $r_5$ = 67.2317 | $d_5$ = 4.9655 | $n_{d3}$ = 1.69680  $\nu_{d3}$ = 55.53 |
| $r_6$ = 245.5595 | $d_6$ = (Variable) | |
| $r_7$ = −2.080 × 10$^4$ | $d_7$ = 1.7000 | $n_{d4}$ = 1.77250  $\nu_{d4}$ = 49.60 |
| $r_8$ = 17.9014 | $d_8$ = 8.5657 | |
| $r_9$ = −66.4539 (Aspheric) | $d_9$ = 0.2000 | $n_{d5}$ = 1.53508  $\nu_{d5}$ = 40.94 |
| $r_{10}$ = −145.6382 | $d_{10}$ = 1.3000 | $n_{d6}$ = 1.77250  $\nu_{d6}$ = 49.60 |
| $r_{11}$ = 275.5575 | $d_{11}$ = 4.1902 | |
| $r_{12}$ = −23.6269 | $d_{12}$ = 1.1790 | $n_{d7}$ = 1.48749  $\nu_{d7}$ = 70.23 |
| $r_{13}$ = −120.2094 | $d_{13}$ = 4.4826 | $n_{d8}$ = 1.84666  $\nu_{d8}$ = 23.78 |
| $r_{14}$ = −36.0216 | $d_{14}$ = (Variable) | |
| $r_{15}$ = −13.3441 | $d_{15}$ = 1.3000 | $n_{d9}$ = 1.77250  $\nu_{d9}$ = 49.60 |
| $r_{16}$ = −14.7782 | $d_{16}$ = 1.0476 | |
| $r_{17}$ = ∞ (Stop) | $d_{17}$ = (Variable) | |
| $r_{18}$ = 22.2411 (Aspheric) | $d_{18}$ = 5.1519 | $n_{d10}$ = 1.49700  $\nu_{d10}$ = 81.54 |
| $r_{19}$ = −44.3261 | $d_{19}$ = 0.1026 | |
| $r_{20}$ = 66.0894 | $d_{20}$ = 1.1010 | $n_{d11}$ = 1.80610  $\nu_{d11}$ = 40.92 |
| $r_{21}$ = 17.8460 | $d_{21}$ = 5.1279 | $n_{d12}$ = 1.49700  $\nu_{d12}$ = 81.54 |
| $r_{22}$ = −87.9421 | $d_{22}$ = (Variable) | |
| $r_{23}$ = −55.9458 | $d_{23}$ = 0.9000 | $n_{d13}$ = 1.51633  $\nu_{d13}$ = 64.14 |
| $r_{24}$ = 13.4125 | $d_{24}$ = 3.2354 | $n_{d14}$ = 1.84666  $\nu_{d14}$ = 23.78 |
| $r_{25}$ = 19.3681 | $d_{25}$ = (Variable) | |
| $r_{26}$ = 26.8826 (Aspheric) | $d_{26}$ = 4.2125 | $n_{d15}$ = 1.49700  $\nu_{d15}$ = 81.54 |
| $r_{27}$ = −27.8744 | $d_{27}$ = 0.1500 | |
| $r_{28}$ = 279.7814 | $d_{28}$ = 4.1538 | $n_{d16}$ = 1.61800  $\nu_{d16}$ = 63.33 |
| $r_{29}$ = −15.8089 | $d_{29}$ = 1.0000 | $n_{d17}$ = 1.84666  $\nu_{d17}$ = 23.78 |
| $r_{30}$ = −57.4983 | $d_{30}$ = (Variable) | |
| $r_{31}$ = ∞ | $d_{31}$ = 16.0000 | $n_{d18}$ = 1.51633  $\nu_{d18}$ = 64.14 |
| $r_{32}$ = ∞ | $d_{32}$ = 1.0000 | |
| $r_{33}$ = ∞ | $d_{33}$ = 2.6000 | $n_{d19}$ = 1.54771  $\nu_{d19}$ = 62.84 |
| $r_{34}$ = ∞ | $d_{34}$ = 1.0000 | |
| $r_{35}$ = ∞ | $d_{35}$ = 0.7500 | $n_{d20}$ = 1.51633  $\nu_{d20}$ = 64.14 |
| $r_{36}$ = ∞ | $d_{36}$ = 1.2400 | |
| $r_{37}$ = ∞ | | |

Aspherical Coefficients
9 th surface
K=0
$A_4$=2.1263×10$^{-5}$
$A_6$=1.5727×10$^{-8}$
$A_8$=3.9610×10$^{-11}$
$A_{10}$=0.0000

18th surface
K=0
$A_4=-1.9875\times10^{-5}$
$A_6=-1.3029\times10^{-8}$
$A_8=5.1888\times10^{-11}$
$A_{10}=0.0000$
26th surface
K=0
$A_4=-1.7061\times10^{-5}$
$A_6=-8.7539\times10^{-9}$
$A_8=1.1345\times10^{-10}$
$A_{10}=0.0000$
Zooming Data (∞)

|  | W | WS | S | ST | T |
|---|---|---|---|---|---|
| f (mm) | 7.26000 | 12.99999 | 23.29997 | 41.72984 | 74.74939 |
| $F_{NO}$ | 2.8000 | 3.3795 | 3.5000 | 3.5000 | 3.5000 |
| ω (°) | 38.45 | — | 13.04 | — | 4.12 |
| $d_6$ | 1.68869 | 10.56701 | 29.85764 | 47.13961 | 57.82811 |
| $d_{14}$ | 44.76569 | 23.28314 | 12.25974 | 6.30842 | 2.57394 |
| $d_{17}$ | 19.00232 | 11.35026 | 8.66100 | 6.27017 | 0.99971 |
| $d_{22}$ | 1.50000 | 7.83915 | 11.97947 | 16.04050 | 22.86634 |
| $d_{25}$ | 8.26323 | 8.96815 | 6.46694 | 5.08222 | 5.08574 |
| $d_{30}$ | 4.69246 | 5.30046 | 6.35060 | 6.06512 | 4.50622 |

EXAMPLE 2

| | | | |
|---|---|---|---|
| $r_1$ = 82.4483 | $d_1$ = 2.6000 | $n_{d1}$ = 1.84666 | $v_{d1}$ = 23.78 |
| $r_2$ = 57.4502 | $d_2$ = 0.1000 | | |
| $r_3$ = 57.9164 | $d_3$ = 7.1329 | $n_{d2}$ = 1.49700 | $v_{d2}$ = 81.54 |
| $r_4$ = 284.4315 | $d_4$ = 0.2000 | | |
| $r_5$ = 69.2991 | $d_5$ = 5.3163 | $n_{d3}$ = 1.60311 | $v_{d3}$ = 60.64 |
| $r_6$ = 400.4019 | $d_6$ = (Variable) | | |
| $r_7$ = −1559.7350 | $d_7$ = 1.5000 | $n_{d4}$ = 1.77250 | $v_{d4}$ = 49.60 |
| $r_8$ = 18.3563 | $d_8$ = 8.8487 | | |
| $r_9$ = −51.0656 | $d_9$ = 1.3643 | $n_{d5}$ = 1.77250 | $v_{d5}$ = 49.60 |
| $r_{10}$ = 89.9326 | $d_{10}$ = 0.2000 | $n_{d6}$ = 1.53508 | $v_{d6}$ = 40.94 |
| $r_{11}$ = 56.6440 (Aspheric) | $d_{11}$ = 2.9409 | | |
| $r_{12}$ = −70.2481 | $d_{12}$ = 1.1135 | $n_{d7}$ = 1.48749 | $v_{d7}$ = 70.23 |
| $r_{13}$ = −351.6349 | $d_{13}$ = 3.8722 | $n_{d8}$ = 1.84666 | $v_{d8}$ = 23.78 |
| $r_{14}$ = −41.4750 | $d_{14}$ = (Variable) | | |
| $r_{15}$ = −21.7766 | $d_{15}$ = 1.0673 | $n_{d9}$ = 1.69680 | $v_{d9}$ = 55.53 |
| $r_{16}$ = −24.1145 | $d_{16}$ = 1.4225 | | |
| $r_{17}$ = ∞ (Stop) | $d_{17}$ = (Variable) | | |
| $r_{18}$ = 21.1358 (Aspheric) | $d_{18}$ = 5.4704 | $n_{d10}$ = 1.49700 | $v_{d10}$ = 81.54 |
| $r_{19}$ = −79.1895 | $d_{19}$ = 0.1774 | | |
| $r_{20}$ = 47.1634 | $d_{20}$ = 1.1410 | $n_{d11}$ = 1.80440 | $v_{d11}$ = 39.59 |
| $r_{21}$ = 15.0512 | $d_{21}$ = 3.4835 | $n_{d12}$ = 161800 | $v_{d12}$ = 63.33 |
| $r_{22}$ = −184.9380 | $d_{22}$ = (Variable) | | |
| $r_{23}$ = −74.7571 | $d_{23}$ = 0.9000 | $n_{d13}$ = 1.51633 | $v_{d13}$ = 64.14 |
| $r_{24}$ = 11.7718 | $d_{24}$ = 1.9155 | $n_{d14}$ = 1.84666 | $v_{d14}$ = 23.78 |
| $r_{25}$ = 17.1123 | $d_{25}$ = (Variable) | | |
| $r_{26}$ = 37.8693 (Aspheric) | $d_{26}$ = 3.4588 | $n_{d15}$ = 1.49700 | $v_{d15}$ = 81.54 |
| $r_{27}$ = −21.7737 | $d_{27}$ = 0.1500 | | |
| $r_{28}$ = −131.6293 | $d_{28}$ = 3.7575 | $n_{d16}$ = 1.61800 | $v_{d16}$ = 63.33 |
| $r_{29}$ = −12.5491 | $d_{29}$ = 1.0000 | $n_{d17}$ = 1.84666 | $v_{d17}$ = 23.78 |
| $r_{30}$ = −38.2936 | $d_{30}$ = (Variable) | | |
| $r_{31}$ = ∞ | $d_{31}$ = 16.0000 | $n_{d18}$ = 1.51633 | $v_{d18}$ = 64.14 |
| $r_{32}$ = ∞ | $d_{32}$ = 1.0000 | | |
| $r_{33}$ = ∞ | $d_{33}$ = 2.6000 | $n_{d19}$ = 1.54771 | $v_{d19}$ = 62.84 |
| $r_{34}$ = ∞ | $d_{34}$ = 1.0000 | | |
| $r_{35}$ = ∞ | $d_{35}$ = 0.7500 | $n_{d20}$ = 1.51633 | $v_{d20}$ = 64.14 |
| $r_{36}$ = ∞ | $d_{36}$ = 1.2400 | | |
| $r_{37}$ = ∞ | | | |

Aspherical Coefficients
11th surface
K=0
$A_4=-2.3956\times10^{-5}$
$A_6=1.1363\times10^{-8}$
$A_8=-2.9304\times10^{-11}$
$A_{10}=0.0000$
18th surface
K=0
$A_4=-1.9310\times10^{-5}$
$A_6=-5.6603\times10^{-9}$
$A_8=-5.6829\times10^{-11}$
$A_{10}=0.0000$
26th surface
K=0
$A_4=-1.9084\times10^{-5}$
$A_6=8.1108\times10^{-9}$
$A_8=2.2527\times10^{-10}$
$A_{10}=0.0000$
Zooming Data (∞)

|  | W | WS | S | ST | T |
|---|---|---|---|---|---|
| f (mm) | 7.2599 | 12.99998 | 23.29994 | 41.72977 | 74.74923 |
| $F_{NO}$ | 2.8000 | 3.0773 | 3.4040 | 3.5000 | 3.5000 |
| ω (°) | 38.47 | — | 13.05 | — | 4.09 |
| $d_6$ | 2.04129 | 12.03456 | 30.35700 | 47.31707 | 58.11117 |
| $d_{14}$ | 52.08359 | 23.80135 | 12.15120 | 5.17137 | 2.10989 |
| $d_{17}$ | 15.96754 | 11.83766 | 8.87742 | 6.74717 | 1.12789 |
| $d_{22}$ | 1.50000 | 4.35576 | 7.49811 | 10.64193 | 17.10388 |
| $d_{25}$ | 7.96197 | 7.07284 | 5.58079 | 4.44519 | 5.93947 |
| $d_{30}$ | 4.69339 | 6.85663 | 8.16658 | 8.28861 | 5.95167 |

EXAMPLE 3

| | | | |
|---|---|---|---|
| $r_1$ = 79.8928 | $d_1$ = 2.6000 | $n_{d1}$ = 1.84666 | $v_{d1}$ = 23.78 |
| $r_2$ = 56.5419 | $d_2$ = 0.0932 | | |
| $r_3$ = 56.8568 | $d_3$ = 7.2921 | $n_{d2}$ = 1.49700 | $v_{d2}$ = 81.54 |
| $r_4$ = 279.2946 | $d_4$ = 0.2000 | | |
| $r_5$ = 71.4740 | $d_5$ = 5.1087 | $n_{d3}$ = 1.60311 | $v_{d3}$ = 60.64 |
| $r_6$ = 368.5676 | $d_6$ = (Variable) | | |
| $r_7$ = 297.1098 | $d_7$ = 1.5000 | $n_{d4}$ = 1.77250 | $v_{d4}$ = 49.60 |
| $r_8$ = 16.7226 | $d_8$ = 8.2214 | | |
| $r_9$ = −58.5814 | $d_9$ = 1.3643 | $n_{d5}$ = 1.77250 | $v_{d5}$ = 49.60 |
| $r_{10}$ = 42.9833 | $d_{10}$ = 2.8172 | | |
| $r_{11}$ = 44.9540 | $d_{11}$ = 2.4853 | $n_{d6}$ = 1.68893 | $v_{d6}$ = 31.07 |
| $r_{12}$ = 67.5910 | $d_{12}$ = 0.5000 | $n_{d7}$ = 1.53508 | $v_{d7}$ = 40.94 |
| $r_{13}$ = 60.4446 (Aspheric) | $d_{13}$ = 2.4132 | | |
| $r_{14}$ = −152.6589 | $d_{14}$ = 2.7489 | $n_{d8}$ = 1.84666 | $v_{d8}$ = 23.78 |
| $r_{15}$ = −43.1824 | $d_{15}$ = (Variable) | | |
| $r_{16}$ = 1521.7545 | $d_{16}$ = 1.2383 | $n_{d9}$ = 1.69680 | $v_{d9}$ = 55.53 |
| $r_{17}$ = 103.2631 | $d_{17}$ = 1.3581 | | |
| $r_{18}$ = ∞ (Stop) | $d_{18}$ = (Variable) | | |
| $r_{19}$ = 19.8319 (Aspheric) | $d_{19}$ = 6.0797 | $n_{d10}$ = 1.49700 | $v_{d10}$ = 81.54 |
| $r_{20}$ = −98.1431 | $d_{20}$ = 0.1774 | | |
| $r_{21}$ = 41.2385 | $d_{21}$ = 1.1410 | $n_{d11}$ = 1.80440 | $v_{d11}$ = 39.59 |
| $r_{22}$ = 13.6120 | $d_{22}$ = 5.6638 | $n_{d12}$ = 1.60311 | $v_{d12}$ = 60.64 |
| $r_{23}$ = −105.3016 | $d_{23}$ = (Variable) | | |
| $r_{24}$ = −60.3378 | $d_{24}$ = 0.9000 | $n_{d13}$ = 1.51633 | $v_{d13}$ = 64.14 |
| $r_{25}$ = 11.2684 | $d_{25}$ = 2.0556 | $n_{d14}$ = 1.84666 | $v_{d14}$ = 23.78 |
| $r_{26}$ = 16.0592 | $d_{26}$ = (Variable) | | |
| $r_{27}$ = 57.5023 | $d_{27}$ = 3.0046 | $n_{d15}$ = 1.49700 | $v_{d15}$ = 81.54 |
| $r_{28}$ = −29.3958 (Aspheric) | $d_{28}$ = 0.1500 | | |
| $r_{29}$ = 60.6802 | $d_{29}$ = 4.8459 | $n_{d16}$ = 1.60311 | $v_{d16}$ = 60.64 |
| $r_{30}$ = −12.9748 | $d_{30}$ = 1.0000 | $n_{d17}$ = 1.84666 | $v_{d17}$ = 23.78 |

-continued

| | | | |
|---|---|---|---|
| $r_{31} = -47.6191$ | $d_{31} =$ (Variable) | | |
| $r_{32} = \infty$ | $d_{32} = 16.0000$ | $n_{d18} = 1.51633$ | $\nu_{d18} = 64.14$ |
| $r_{33} = \infty$ | $d_{33} = 1.0000$ | | |
| $r_{34} = \infty$ | $d_{34} = 2.6000$ | $n_{d19} = 1.54771$ | $\nu_{d19} = 62.84$ |
| $r_{35} = \infty$ | $d_{35} = 1.0000$ | | |
| $r_{36} = \infty$ | $d_{36} = 0.7500$ | $n_{d20} = 1.51633$ | $\nu_{d20} = 64.14$ |
| $r_{37} = \infty$ | $d_{37} = 1.2400$ | | |
| $r_{38} = \infty$ | | | |

Aspherical Coefficients
13 th surface
K=0
$A_4 = -1.4437 \times 10^{-5}$
$A_6 = 2.9795 \times 10^{-9}$
$A_8 = -9.7997 \times 10^{-12}$
$A_{10} = 0.0000$
19 th surface
K=0
$A_4 = -1.9829 \times 10^{-5}$
$A_6 = -1.2490 \times 10^{-9}$
$A_8 = 9.5912 \times 10^{-12}$
$A_{10} = 0.0000$
28 th surface
K=0
$A_4 = -8.0968 \times 10^{-6}$
$A_6 = -1.4115 \times 10^{-8}$
$A_8 = -3.7788 \times 10^{-10}$
$A_{10} = 0.0000$
Zooming Data ($\infty$)

| | W | WS | S | ST | T |
|---|---|---|---|---|---|
| f (mm) | 7.26002 | 13.00003 | 23.30008 | 41.73033 | 74.75116 |
| $F_{NO}$ | 2.8003 | 3.0838 | 3.4742 | 3.5003 | 3.5007 |
| $\omega$ (°) | 38.42 | — | 13.05 | — | 4.11 |
| $d_6$ | 1.36006 | 12.49834 | 30.21824 | 47.74332 | 58.25431 |
| $d_{15}$ | 54.96399 | 24.89992 | 12.03611 | 4.74729 | 1.70314 |
| $d_{18}$ | 17.14336 | 12.83290 | 9.24821 | 6.81249 | 1.02608 |
| $d_{23}$ | 1.50000 | 3.50570 | 6.35732 | 8.92130 | 16.08346 |
| $d_{26}$ | 7.83356 | 7.52870 | 6.60733 | 5.98190 | 6.80232 |
| $d_{31}$ | 5.02576 | 7.63538 | 9.28981 | 9.78699 | 7.59082 |

EXAMPLE 4

| | | | |
|---|---|---|---|
| $r_1 = 81.6544$ | $d_1 = 2.6000$ | $n_{d1} = 1.84666$ | $\nu_{d1} = 23.78$ |
| $r_2 = 54.5219$ | $d_2 = 0.0918$ | | |
| $r_3 = 55.1373$ | $d_3 = 6.6789$ | $n_{d2} = 1.60311$ | $\nu_{d2} = 60.64$ |
| $r_4 = 170.0871$ | $d_4 = 0.2000$ | | |
| $r_5 = 63.9518$ | $d_5 = 5.5295$ | $n_{d3} = 1.60311$ | $\nu_{d3} = 60.64$ |
| $r_6 = 261.7938$ | $d_6 =$ (Variable) | | |
| $r_7 = 135.9397$ | $d_7 = 1.5000$ | $n_{d4} = 1.77250$ | $\nu_{d4} = 49.60$ |
| $r_8 = 18.6691$ | $d_8 = 7.1069$ | | |
| $r_9 = -77.9436$ | $d_9 = 1.3643$ | $n_{d5} = 1.77250$ | $\nu_{d5} = 49.60$ |
| $r_{10} = 29.3916$ | $d_{10} = 3.6128$ | | |
| $r_{11} = -136.6311$ (Aspheric) | $d_{11} = 2.6052$ | $n_{d6} = 1.68893$ | $\nu_{d6} = 31.07$ |
| $r_{12} = -93.2719$ | $d_{12} = 1.2000$ | $n_{d7} = 1.77250$ | $\nu_{d7} = 49.60$ |
| $r_{13} = 48.4132$ | $d_{13} = 0.1500$ | | |
| $r_{14} = 40.2538$ | $d_{14} = 5.6753$ | $n_{d8} = 1.68893$ | $\nu_{d8} = 31.07$ |
| $r_{15} = -41.2699$ | $d_{15} =$ (Variable) | | |
| $r_{16} = \infty$ (Stop) | $d_{16} =$ (Variable) | | |
| $r_{17} = 20.5800$ (Aspheric) | $d_{17} = 3.1262$ | $n_{d9} = 1.49700$ | $\nu_{d9} = 81.54$ |

-continued

| | | | |
|---|---|---|---|
| $r_{18} = -89.3640$ | $d_{18} = 0.1500$ | | |
| $r_{19} = 221.1623$ | $d_{19} = 3.2743$ | $n_{d10} = 1.48749$ | $\nu_{d10} = 70.23$ |
| $r_{20} = -22.6962$ | $d_{20} = 1.0743$ | $n_{d11} = 1.69895$ | $\nu_{d11} = 30.13$ |
| $r_{21} = -65.3546$ | $d_{21} =$ (Variable) | | |
| $r_{22} = -44.1685$ | $d_{22} = 2.2362$ | $n_{d12} = 1.84666$ | $\nu_{d12} = 23.78$ |
| $r_{23} = -17.9114$ | $d_{23} = 0.9000$ | $n_{d13} = 1.51633$ | $\nu_{d13} = 64.14$ |
| $r_{24} = 19.1017$ | $d_{24} =$ (Variable) | | |
| $r_{25} = 26.6661$ (Aspheric) | $d_{25} = 3.6847$ | $n_{d14} = 1.49700$ | $\nu_{d14} = 81.54$ |
| $r_{26} = -34.1574$ | $d_{26} = 0.1500$ | | |
| $r_{27} = 52.2108$ | $d_{27} = 4.2853$ | $n_{d15} = 1.49700$ | $\nu_{d15} = 81.54$ |
| $r_{28} = -14.7656$ | $d_{28} = 1.2000$ | $n_{d16} = 1.80518$ | $\nu_{d16} = 25.42$ |
| $r_{29} = -55.0799$ | $d_{29} =$ (Variable) | | |
| $r_{30} = \infty$ | $d_{30} = 16.0000$ | $n_{d17} = 1.51633$ | $\nu_{d17} = 64.14$ |
| $r_{31} = \infty$ | $d_{31} = 1.0000$ | | |
| $r_{32} = \infty$ | $d_{32} = 2.6000$ | $n_{d18} = 1.54771$ | $\nu_{d18} = 62.84$ |
| $r_{33} = \infty$ | $d_{33} = 1.0000$ | | |
| $r_{34} = \infty$ | $d_{34} = 0.7500$ | $n_{d19} = 1.51633$ | $\nu_{d19} = 64.14$ |
| $r_{35} = \infty$ | $d_{35} = 1.2400$ | | |
| $r_{36} = \infty$ | | | |

Aspherical Coefficients
11 th surface
K=0
$A_4 = 1.0139 \times 10^{-5}$
$A_6 = 3.2872 \times 10^{-9}$
$A_8 = -1.1023 \times 10^{-11}$
$A_{10} = 0.0000$
17 th surface
K=0
$A_4 = -1.7036 \times 10^{-5}$
$A_6 = -1.7437 \times 10^{-8}$
$A_8 = 4.5946 \times 10^{-11}$
$A_{10} = 0.0000$
25 th surface
K=0
$A_4 = 3.4248 \times 10^{-6}$
$A_6 = 1.4711 \times 10^{-8}$
$A_8 = 4.5298 \times 10^{-10}$
$A_{10} = 0.0000$
Zooming Data ($\infty$)

| | W | WS | S | ST | T |
|---|---|---|---|---|---|
| f (mm) | 7.25999 | — | 23.29992 | — | 74.74889 |
| $F_{NO}$ | 2.8000 | — | 3.5801 | — | 3.5000 |
| $\omega$ (°) | 38.54 | — | 13.22 | — | 4.14 |
| $d_6$ | 1.00000 | 14.89793 | 31.05521 | 47.12742 | 59.32091 |
| $d_{15}$ | 52.30556 | 29.13766 | 15.90712 | 7.48462 | 2.50000 |
| $d_{16}$ | 20.23714 | 12.06038 | 7.38350 | 5.16625 | 1.27216 |
| $d_{21}$ | 3.72767 | 5.35270 | 8.32036 | 10.89531 | 15.89787 |
| $d_{24}$ | 3.24286 | 7.15116 | 6.72019 | 5.06310 | 5.57919 |
| $d_{29}$ | 4.69211 | 7.33554 | 9.47573 | 10.77513 | 9.15056 |

EXAMPLE 5

| | | | |
|---|---|---|---|
| $r_1 = 78.1210$ | $d_1 = 2.6000$ | $n_{d1} = 1.84666$ | $\nu_{d1} = 23.78$ |
| $r_2 = 52.5351$ | $d_2 = 0.0776$ | | |
| $r_3 = 53.2073$ | $d_3 = 6.8025$ | $n_{d2} = 1.60311$ | $\nu_{d2} = 60.64$ |
| $r_4 = 159.3705$ | $d_4 = 0.2000$ | | |
| $r_5 = 65.8776$ | $d_5 = 5.5331$ | $n_{d3} = 1.60311$ | $\nu_{d3} = 60.64$ |
| $r_6 = 303.8063$ | $d_6 =$ (Variable) | | |

-continued

| | | | |
|---|---|---|---|
| $r_7 = 163.0022$ | $d_7 = 1.5000$ | $n_{d4} = 1.77250$ | $v_{d4} = 49.60$ |
| $r_8 = 17.9806$ | $d_8 = 6.9388$ | | |
| $r_9 = -95.4021$ | $d_9 = 1.3643$ | $n_{d5} = 1.77250$ | $v_{d5} = 49.60$ |
| $r_{10} = 31.9739$ | $d_{10} = 3.3248$ | | |
| $r_{11} = -83.4161$ (Aspheric) | $d_{11} = 2.2162$ | $n_{d6} = 1.68893$ | $v_{d6} = 31.07$ |
| $r_{12} = -51.8821$ | $d_{12} = 1.2000$ | $n_{d7} = 1.77250$ | $v_{d7} = 49.60$ |
| $r_{13} = 110.2656$ | $d_{13} = 0.1500$ | | |
| $r_{14} = 52.7805$ | $d_{14} = 4.8751$ | $n_{d8} = 1.68893$ | $v_{d8} = 31.07$ |
| $r_{15} = -44.3555$ | $d_{15} =$ (Variable) | | |
| $r_{16} = \infty$ (Stop) | $d_{16} =$ (Variable) | | |
| $r_{17} = 20.3453$ (Aspheric) | $d_{17} = 4.8644$ | $n_{d9} = 1.49700$ | $v_{d9} = 81.54$ |
| $r_{18} = -18.1397$ | $d_{18} = 0.1995$ | | |
| $r_{19} = -17.0247$ | $d_{19} = 0.9865$ | $n_{d10} = 1.58144$ | $v_{d10} = 40.75$ |
| $r_{20} = -41.9737$ | $d_{20} =$ (Variable) | | |
| $r_{21} = -34.7870$ | $d_{21} = 1.6000$ | $n_{d11} = 1.84666$ | $v_{d11} = 23.78$ |
| $r_{22} = -15.2340$ | $d_{22} = 0.9000$ | $n_{d12} = 1.51633$ | $v_{d12} = 64.14$ |
| $r_{23} = 20.7010$ | $d_{23} =$ (Variable) | | |
| $r_{24} = 21.6523$ | $d_{24} = 1.2000$ | $n_{d13} = 1.80518$ | $v_{d13} = 25.42$ |
| $r_{25} = 11.8448$ | $d_{25} = 5.1050$ | $n_{d14} = 1.49700$ | $v_{d14} = 81.54$ |
| $r_{26} = 282.0413$ | $d_{26} = 0.1500$ | | |
| $r_{27} = 18.6629$ | $d_{27} = 5.4207$ | $n_{d15} = 1.49700$ | $v_{d15} = 81.54$ |
| $r_{28} = -35.6003$ (Aspheric) | $d_{28} = 0.1500$ | | |
| $r_{29} = 45.1746$ | $d_{29} = 1.0526$ | $n_{d16} = 1.80518$ | $v_{d16} = 25.42$ |
| $r_{30} = 26.6635$ | $d_{30} =$ (Variable) | | |
| $r_{31} = \infty$ | $d_{31} = 16.0000$ | $n_{d17} = 1.51633$ | $v_{d17} = 64.14$ |
| $r_{32} = \infty$ | $d_{32} = 1.0000$ | | |
| $r_{33} = \infty$ | $d_{33} = 2.6000$ | $n_{d18} = 1.54771$ | $v_{d18} = 62.84$ |
| $r_{34} = \infty$ | $d_{34} = 1.0000$ | | |
| $r_{35} = \infty$ | $d_{35} = 0.7500$ | $n_{d19} = 1.51633$ | $v_{d19} = 64.14$ |
| $r_{36} = \infty$ | $d_{36} = 1.2400$ | | |
| $r_{37} = \infty$ | | | |

Aspherical Coefficients
11 th surface
K=0
$A_4 = 7.1125 \times 10^{-6}$
$A_6 = 2.0512 \times 10^{-8}$
$A_8 = -5.1595 \times 10^{-11}$
$A_{10} = 0.0000$
17 th surface
K=0
$A_4 = -1.5184 \times 10^{-5}$
$A_6 = -2.3566 \times 10^{-8}$
$A_8 = 3.4360 \times 10^{-10}$
$A_{10} = 0.0000$
28 th surface
K=0
$A_4 = 3.1780 \times 10^{-5}$
$A_6 = -9.9597 \times 10^{-8}$
$A_8 = -5.2192 \times 10^{-10}$
$A_{10} = 0.0000$
Zooming Data (∞)

| | W | WS | S | ST | T |
|---|---|---|---|---|---|
| f (mm) | 7.25999 | — | 23.29997 | — | 74.75182 |
| $F_{NO}$ | 2.8000 | — | 3.5778 | — | 3.5000 |
| ω (°) | 38.52 | — | 13.19 | — | 4.13 |
| $d_6$ | 1.04546 | 15.02846 | 31.09889 | 46.16763 | 59.30495 |
| $d_{15}$ | 52.08237 | 29.21796 | 16.44547 | 7.46848 | 2.50000 |
| $d_{16}$ | 19.83770 | 12.09302 | 7.11800 | 4.38285 | 1.23876 |
| $d_{20}$ | 2.85510 | 5.90624 | 9.13593 | 11.32215 | 15.45881 |

-continued

| | W | WS | S | ST | T |
|---|---|---|---|---|---|
| $d_{23}$ | 4.36441 | 7.15116 | 6.72019 | 5.06310 | 5.57919 |
| $d_{30}$ | 5.49442 | 7.40121 | 9.57751 | 11.78353 | 10.27488 |

EXAMPLE 6

| | | | |
|---|---|---|---|
| $r_1 = 141.6786$ | $d_1 = 2.6000$ | $n_{d1} = 1.84666$ | $v_{d1} = 23.78$ |
| $r_2 = 82.2770$ | $d_2 = 0.2054$ | | |
| $r_3 = 86.0098$ | $d_3 = 6.6214$ | $n_{d2} = 1.49700$ | $v_{d2} = 81.54$ |
| $r_4 = -623.7275$ | $d_4 = 0.2000$ | | |
| $r_5 = 66.9330$ | $d_5 = 4.9709$ | $n_{d3} = 1.69680$ | $v_{d3} = 55.53$ |
| $r_6 = 242.1492$ | $d_6 =$ (Variable) | | |
| $r_7 = -1681.4393$ | $d_7 = 1.7000$ | $n_{d4} = 1.77250$ | $v_{d4} = 49.60$ |
| $r_8 = 17.8527$ | $d_8 = 8.5980$ | | |
| $r_9 = -59.5314$ (Aspheric) | $d_9 = 0.2000$ | $n_{d5} = 1.53508$ | $v_{d5} = 40.94$ |
| $r_{10} = -119.6362$ | $d_{10} = 1.3000$ | $n_{d6} = 1.77250$ | $v_{d6} = 49.60$ |
| $r_{11} = 342.3608$ | $d_{11} = 4.1895$ | | |
| $r_{12} = -24.2842$ | $d_{12} = 1.1790$ | $n_{d7} = 1.48749$ | $v_{d7} = 70.23$ |
| $r_{13} = -101.8680$ | $d_{13} = 4.5574$ | $n_{d8} = 1.84666$ | $v_{d8} = 23.78$ |
| $r_{14} = -33.5232$ | $d_{14} =$ (Variable) | | |
| $r_{15} = -17.5269$ | $d_{15} = 1.3000$ | $n_{d9} = 1.77250$ | $v_{d9} = 49.60$ |
| $r_{16} = -20.0488$ | $d_{16} = 1.0127$ | | |
| $r_{17} = \infty$ (Stop) | $d_{17} =$ (Variable) | | |
| $r_{18} = 21.3027$ (Aspheric) | $d_{18} = 5.1829$ | $n_{d10} = 1.49700$ | $v_{d10} = 81.54$ |
| $r_{19} = -71.1108$ | $d_{19} = 0.0740$ | | |
| $r_{20} = 64.9416$ | $d_{20} = 1.1010$ | $n_{d11} = 1.80610$ | $v_{d11} = 40.92$ |
| $r_{21} = 16.9316$ | $d_{21} = 5.1171$ | $n_{d12} = 1.49700$ | $v_{d12} = 81.54$ |
| $r_{22} = -53.3840$ | $d_{22} =$ (Variable) | | |
| $r_{23} = -52.6066$ | $d_{23} = 0.9000$ | $n_{d13} = 1.51633$ | $v_{d13} = 64.14$ |
| $r_{24} = 13.9038$ | $d_{24} = 3.2142$ | $n_{d14} = 1.84666$ | $v_{d14} = 23.78$ |
| $r_{25} = 21.1652$ | $d_{25} =$ (Variable) | | |
| $r_{26} = 30.4474$ (Aspheric) | $d_{26} = 5.0612$ | $n_{d15} = 1.49700$ | $v_{d15} = 81.54$ |
| $r_{27} = -27.3044$ | $d_{27} = 0.1500$ | | |
| $r_{28} = 172.6100$ | $d_{28} = 4.5076$ | $n_{d16} = 1.61800$ | $v_{d16} = 63.33$ |
| $r_{29} = -16.2580$ | $d_{29} = 1.0000$ | $n_{d17} = 1.84666$ | $v_{d17} = 23.78$ |
| $r_{30} = -61.9158$ | $d_{30} =$ (Variable) | | |
| $r_{31} = \infty$ | $d_{31} = 16.0000$ | $n_{d18} = 1.51633$ | $v_{d18} = 64.14$ |
| $r_{32} = \infty$ | $d_{32} = 1.0000$ | | |
| $r_{33} = \infty$ | $d_{33} = 2.6000$ | $n_{d19} = 1.54771$ | $v_{d19} = 62.84$ |
| $r_{34} = \infty$ | $d_{34} = 1.0000$ | | |
| $r_{35} = \infty$ | $d_{35} = 0.7500$ | $n_{d20} = 1.51633$ | $v_{d20} = 64.14$ |
| $r_{36} = \infty$ | $d_{36} = 1.2400$ | | |
| $r_{37} = \infty$ | | | |

Aspherical Coefficients
9 th surface
K=0
$A_4 = 2.2129 \times 10^{-5}$
$A_6 = 6.5725 \times 10^{-10}$
$A_8 = 7.2804 \times 10^{-11}$
$A_{10} = 0.0000$
18 th surface
K=0
$A_4 = -1.8979 \times 10^{-5}$
$A_6 = 8.7960 \times 10^{-9}$
$A_8 = -1.5301 \times 10^{-10}$
$A_{10} = 0.0000$
26 th surface
K=0
$A_4 = -1.7277 \times 10^{-5}$
$A_6 = 3.9898 \times 10^{-9}$
$A_8 = -5.5382 \times 10^{-11}$
$A_{10} = 0.0000$ Zooming Data (∞)

|        | W        | WS       | S        | ST       | T        |
|--------|----------|----------|----------|----------|----------|
| f (mm) | 7.26002  | 13.00003 | 23.30013 | 41.73069 | 74.75304 |
| $F_{NO}$ | 2.8000 | 3.4061   | 3.5000   | 3.5000   | 3.5000   |
| ω (°)  | 38.45    | —        | 13.03    | —        | 4.12     |
| $d_6$  | 1.69990  | 10.56611 | 29.95684 | 47.14010 | 57.75352 |
| $d_{14}$ | 38.83846 | 18.70163 | 9.09372 | 4.72000 | 2.59257 |
| $d_{17}$ | 25.00055 | 15.77754 | 11.57455 | 7.61504 | 1.02237 |
| $d_{22}$ | 1.49193 | 7.85215 | 11.95770 | 16.03342 | 23.12571 |
| $d_{25}$ | 8.12406 | 8.99710 | 6.58794 | 5.19826 | 5.37687 |
| $d_{30}$ | 4.61121 | 5.36097 | 6.51641 | 6.38966 | 4.90755 |

EXAMPLE 7

| $r_1 = 133.2906$ | $d_1 = 2.6000$ | $n_{d1} = 1.84666$ | $v_{d1} = 23.78$ |
|---|---|---|---|
| $r_2 = 79.7190$ | $d_2 = 0.4683$ | | |
| $r_3 = 88.0849$ | $d_3 = 6.7955$ | $n_{d2} = 1.49700$ | $v_{d2} = 81.54$ |
| $r_4 = -928.2450$ | $d_4 = 0.2000$ | | |
| $r_5 = 61.1424$ | $d_5 = 5.7149$ | $n_{d3} = 1.60311$ | $v_{d3} = 60.64$ |
| $r_6 = 290.9980$ | $d_6 =$ (Variable) | | |
| $r_7 = 858.6153$ | $d_7 = 1.7000$ | $n_{d4} = 1.77250$ | $v_{d4} = 49.60$ |
| $r_8 = 17.2556$ | $d_8 = 8.7043$ | | |
| $r_9 = -65.5194$ (Aspheric) | $d_9 = 0.2000$ | $n_{d5} = 1.53508$ | $v_{d5} = 40.94$ |
| $r_{10} = -103.0065$ | $d_{10} = 1.3000$ | $n_{d6} = 1.77250$ | $v_{d6} = 49.60$ |
| $r_{11} = 207.4789$ | $d_{11} = 3.9972$ | | |
| $r_{12} = -29.5057$ | $d_{12} = 1.2706$ | $n_{d7} = 1.60311$ | $v_{d7} = 60.64$ |
| $r_{13} = -3.472 \times 10^4$ | $d_{13} = 4.4191$ | $n_{d8} = 1.84666$ | $v_{d8} = 23.78$ |
| $r_{14} = -39.4285$ | $d_{14} =$ (Variable) | | |
| $r_{15} = -14.2222$ | $d_{15} = 1.3000$ | $n_{d9} = 1.77250$ | $v_{d9} = 49.60$ |
| $r_{16} = -15.6911$ | $d_{16} = 0.9994$ | | |
| $r_{17} = \infty$ (Stop) | $d_{17} =$ (Variable) | | |
| $r_{18} = 29.1466$ (Aspheric) | $d_{18} = 5.3713$ | $n_{d10} = 1.49700$ | $v_{d10} = 81.54$ |
| $r_{19} = -55.2100$ | $d_{19} = 0.1000$ | | |
| $r_{20} = -2878.6841$ | $d_{20} = 1.0357$ | $n_{d11} = 1.69895$ | $v_{d11} = 30.13$ |
| $r_{21} = 26.7931$ | $d_{21} = 5.3045$ | $n_{d12} = 1.61800$ | $v_{d12} = 63.33$ |
| $r_{22} = -52.9610$ | $d_{22} =$ (Variable) | | |
| $r_{23} = -72.6679$ | $d_{23} = 0.9000$ | $n_{d13} = 1.51633$ | $v_{d13} = 64.14$ |
| $r_{24} = 14.0385$ | $d_{24} = 3.1899$ | $n_{d14} = 1.84666$ | $v_{d14} = 23.78$ |
| $r_{25} = 23.1764$ | $d_{25} =$ (Variable) | | |
| $r_{26} = 34.1187$ (Aspheric) | $d_{26} = 4.0924$ | $n_{d15} = 1.49700$ | $v_{d15} = 81.54$ |
| $r_{27} = -27.1159$ | $d_{27} = 0.1500$ | | |
| $r_{28} = -179.2221$ | $d_{28} = 4.5403$ | $n_{d16} = 1.61800$ | $v_{d16} = 63.33$ |
| $r_{29} = -13.8901$ | $d_{29} = 1.0000$ | $n_{d17} = 1.84666$ | $v_{d17} = 23.78$ |
| $r_{30} = -48.2993$ | $d_{30} =$ (Variable) | | |
| $r_{31} = \infty$ | $d_{31} = 16.0000$ | $n_{d18} = 1.51633$ | $v_{d18} = 64.14$ |
| $r_{32} = \infty$ | $d_{32} = 1.0000$ | | |
| $r_{33} = \infty$ | $d_{33} = 2.6000$ | $n_{d19} = 1.54771$ | $v_{d19} = 62.84$ |
| $r_{34} = \infty$ | $d_{34} = 1.0000$ | | |
| $r_{35} = \infty$ | $d_{35} = 0.7500$ | $n_{d20} = 1.51633$ | $v_{d20} = 64.14$ |
| $r_{36} = \infty$ | $d_{36} = 1.2400$ | | |
| $r_{37} = \infty$ | | | |

Aspherical Coefficients
9 th surface
K=0
$A_4 = 2.2685 \times 10^{-5}$
$A_6 = -9.9328 \times 10^{-9}$
$A_8 = 6.5515 \times 10^{-11}$
$A_{10} = 0.0000$
18 th surface
K=0
$A_4 = -1.5955 \times 10^{-5}$
$A_6 = 1.031533 \ 10^{-8}$
$A_8 = -9.0638 \times 10^{-11}$
$A_{10} = 0.0000$ 26 th surface
K=0
$A_4 = -1.7668 \times 10^{-5}$
$A_6 = -1.6378 \times 10^{-9}$
$A_8 = 5.8919 \times 10^{-11}$
$A_{10} = 0.0000$ Zooming Data (∞)

|        | W        | WS       | S        | ST       | T        |
|--------|----------|----------|----------|----------|----------|
| f (mm) | 7.25994  | 12.99979 | 23.29960 | 41.72935 | 74.74958 |
| $F_{NO}$ | 2.8000 | 3.2736   | 3.5000   | 3.5000   | 3.5000   |
| ω (°)  | 38.48    | —        | 13.03    | —        | 4.10     |
| $d_6$  | 1.57613  | 10.58693 | 29.66082 | 47.22031 | 57.38048 |
| $d_{14}$ | 35.33624 | 14.67575 | 7.05728 | 3.95447 | 2.57253 |
| $d_{17}$ | 27.90225 | 18.46229 | 13.50552 | 9.05177 | 1.02205 |
| $d_{22}$ | 2.01227 | 6.50604 | 11.64080 | 16.22329 | 23.37367 |
| $d_{25}$ | 7.59111 | 7.59111 | 7.59111 | 7.59111 | 7.59111 |
| $d_{30}$ | 4.35060 | 6.30937 | 6.83154 | 6.23847 | 5.63660 |

EXAMPLE 8

| $r_1 = 154.0084$ | $d_1 = 2.6000$ | $n_{d1} = 1.84666$ | $v_{d1} = 23.78$ |
|---|---|---|---|
| $r_2 = 85.1308$ | $d_2 = 0.2000$ | | |
| $r_3 = 89.0506$ | $d_3 = 6.8812$ | $n_{d2} = 1.49700$ | $v_{d2} = 81.54$ |
| $r_4 = -500.6640$ | $d_4 = 0.2000$ | | |
| $r_5 = 71.0865$ | $d_5 = 4.9871$ | $n_{d3} = 1.69680$ | $v_{d3} = 55.53$ |
| $r_6 = 321.2628$ | $d_6 =$ (Variable) | | |
| $r_7 = -1661.3349$ | $d_7 = 1.7000$ | $n_{d4} = 1.77250$ | $v_{d4} = 49.60$ |
| $r_8 = 18.0950$ | $d_8 = 8.8337$ | | |
| $r_9 = -62.2296$ (Aspheric) | $d_9 = 0.2000$ | $n_{d5} = 1.53508$ | $v_{d5} = 40.94$ |
| $r_{10} = -129.5877$ | $d_{10} = 1.3000$ | $n_{d6} = 1.77250$ | $v_{d6} = 49.60$ |
| $r_{11} = 1178.5652$ | $d_{11} = 3.1344$ | | |
| $r_{12} = -33.4282$ | $d_{12} = 1.1790$ | $n_{d7} = 1.48749$ | $v_{d7} = 70.23$ |
| $r_{13} = 90.9167$ | $d_{13} = 4.3569$ | $n_{d8} = 1.84666$ | $v_{d8} = 23.78$ |
| $r_{14} = -65.5020$ | $d_{14} =$ (Variable) | | |
| $r_{15} = \infty$ (Stop) | $d_{15} = 2.6661$ | | |
| $r_{16} = -14.4489$ | $d_{16} = 0.9955$ | $n_{d9} = 1.77250$ | $v_{d9} = 49.60$ |
| $r_{17} = -16.4057$ | $d_{17} =$ (Variable) | | |
| $r_{18} = 29.3239$ (Aspheric) | $d_{18} = 5.3050$ | $n_{d10} = 1.80610$ | $v_{d10} = 40.74$ |
| $r_{19} = 422.7477$ | $d_{19} = 0.4857$ | | |
| $r_{20} = 93.3084$ | $d_{20} = 1.0357$ | $n_{d11} = 1.69895$ | $v_{d11} = 30.13$ |
| $r_{21} = 16.2156$ | $d_{21} = 5.2656$ | $n_{d12} = 1.49700$ | $v_{d12} = 81.54$ |
| $r_{22} = -38.2018$ | $d_{22} =$ (Variable) | | |
| $r_{23} = -65.0932$ | $d_{23} = 0.9000$ | $n_{d13} = 1.51633$ | $v_{d13} = 64.14$ |
| $r_{24} = 13.7958$ | $d_{24} = 2.9478$ | $n_{d14} = 1.84666$ | $v_{d14} = 23.78$ |
| $r_{25} = 19.9898$ | $d_{25} =$ (Variable) | | |
| $r_{26} = 26.7797$ (Aspheric) | $d_{26} = 4.1503$ | $n_{d15} = 1.49700$ | $v_{d15} = 81.54$ |
| $r_{27} = -33.3863$ | $d_{27} = 0.1500$ | | |
| $r_{28} = 66.7328$ | $d_{28} = 4.3835$ | $n_{d16} = 1.61800$ | $v_{d16} = 63.33$ |
| $r_{29} = -18.3728$ | $d_{29} = 1.0000$ | $n_{d17} = 1.80518$ | $v_{d17} = 25.42$ |
| $r_{30} = -118.1096$ | $d_{30} =$ (Variable) | | |
| $r_{31} = \infty$ | $d_{31} = 16.0000$ | $n_{d18} = 1.51633$ | $v_{d18} = 64.14$ |
| $r_{32} = \infty$ | $d_{32} = 1.0000$ | | |
| $r_{33} = \infty$ | $d_{33} = 2.6000$ | $n_{d19} = 1.54771$ | $v_{d19} = 62.84$ |
| $r_{34} = \infty$ | $d_{34} = 1.0000$ | | |
| $r_{35} = \infty$ | $d_{35} = 0.7500$ | $n_{d20} = 1.51633$ | $v_{d20} = 64.14$ |
| $r_{36} = \infty$ | $d_{36} = 1.2400$ | | |
| $r_{37} = \infty$ | | | |

Aspherical Coefficients
9 th surface
K=0
$A_4 = 1.7476 \times 10^{-5}$
$A_6 = 1.7656 \times 10^{-8}$
$A_8 = 2.5483 \times 10^{-11}$
$A_{10} = 0.0000$ 18 th surface
K=0
$A_4=-7.2819\times10^{-6}$
$A_6=1.5490\times10^{-8}$
$A_8=-1.0251\times10^{-10}$
$A_{10}=0.0000$
26 th surface
K=0
$A_4=-1.2862\times10^{-5}$
$A_6=-1.1215\times10^{-8}$
$A_8=2.6887\times10^{-11}$
$A_{10}=0.0000$
Zooming Data (∞)

|  | W | WS | S | ST | T |
|---|---|---|---|---|---|
| f (mm) | 7.26000 | 13.00004 | 23.30000 | 41.73010 | 74.75000 |
| $F_{NO}$ | 2.8000 | 3.2452 | 3.5000 | 3.5000 | 3.5000 |
| ω (°) | 38.43 | — | 13.04 | — | 4.11 |
| $d_6$ | 1.51813 | 10.76717 | 29.84510 | 47.35892 | 58.73695 |
| $d_{14}$ | 43.62221 | 20.67892 | 10.31138 | 5.77694 | 1.73681 |
| $d_{17}$ | 19.34970 | 13.11504 | 9.54525 | 5.96595 | 0.99829 |
| $d_{22}$ | 2.58148 | 8.81614 | 12.38593 | 15.96522 | 20.93289 |
| $d_{25}$ | 8.67490 | 7.43440 | 5.56358 | 5.04338 | 5.18729 |
| $d_{30}$ | 4.28215 | 5.52265 | 7.39346 | 7.91366 | 7.76975 |

EXAMPLE 9

| $r_1 = 125.4804$ | $d_1 = 2.6000$ | $n_{d1} = 1.84666$ | $v_{d1} = 23.78$ |
|---|---|---|---|
| $r_2 = 73.9280$ | $d_2 = 0.6131$ | | |
| $r_3 = 82.0053$ | $d_3 = 7.1121$ | $n_{d2} = 1.49700$ | $v_{d2} = 81.54$ |
| $r_4 = -2731.9228$ | $d_4 = 0.2000$ | | |
| $r_5 = 73.7403$ | $d_5 = 6.0707$ | $n_{d3} = 1.69680$ | $v_{d3} = 55.53$ |
| $r_6 = 689.0297$ | $d_6 =$ (Variable) | | |
| $r_7 = 327.5056$ | $d_7 = 1.7000$ | $n_{d4} = 1.77250$ | $v_{d4} = 49.60$ |
| $r_8 = 14.2610$ | $d_8 = 8.5253$ | | |
| $r_9 = -89.4120$ | $d_9 = 1.3000$ | $n_{d5} = 1.77250$ | $v_{d5} = 49.60$ |
| $r_{10} = 38.2328$ | $d_{10} = 0.2000$ | $n_{d6} = 1.53508$ | $v_{d6} = 40.94$ |
| $r_{11} = 28.4986$ (Aspheric) | $d_{11} = 2.5230$ | | |
| $r_{12} = 47.5033$ | $d_{12} = 1.1790$ | $n_{d7} = 1.48749$ | $v_{d7} = 70.23$ |
| $r_{13} = 34.1694$ | $d_{13} = 3.2934$ | $n_{d8} = 1.84666$ | $v_{d8} = 23.78$ |
| $r_{14} = -324.6493$ | $d_{14} =$ (Variable) | | |
| $r_{15} = ∞$ (Stop) | $d_{15} =$ (Variable) | | |
| $r_{16} = 16.9572$ (Aspheric) | $d_{16} = 7.2692$ | $n_{d9} = 1.49700$ | $v_{d9} = 81.54$ |
| $r_{17} = 452.6400$ | $d_{17} = 0.1000$ | | |
| $r_{18} = 136.4678$ | $d_{18} = 1.1010$ | $n_{d10} = 1.80610$ | $v_{d10} = 40.92$ |
| $r_{19} = 15.7221$ | $d_{19} = 5.6961$ | $n_{d11} = 1.49700$ | $v_{d11} = 81.54$ |
| $r_{20} = -38.5697$ | $d_{20} =$ (Variable) | | |
| $r_{21} = 58.4853$ | $d_{21} = 3.0175$ | $n_{d12} = 1.84666$ | $v_{d12} = 23.78$ |
| $r_{22} = -202.3168$ | $d_{22} = 1.4952$ | $n_{d13} = 1.51633$ | $v_{d13} = 64.14$ |
| $r_{23} = 15.1757$ | $d_{23} = 8.9786$ | | |
| $r_{24} = -49.4262$ (Aspheric) | $d_{24} = 5.1311$ | $n_{d14} = 1.49700$ | $v_{d14} = 81.54$ |
| $r_{25} = -19.2986$ | $d_{25} = 0.1500$ | | |
| $r_{26} = 18.4543$ | $d_{26} = 5.9364$ | $n_{d15} = 1.61800$ | $v_{d15} = 63.33$ |
| $r_{27} = -38.6487$ | $d_{27} = 1.0000$ | $n_{d16} = 1.84666$ | $v_{d16} = 23.78$ |
| $r_{28} = 76.9096$ | $d_{28} =$ (Variable) | | |
| $r_{29} = ∞$ | $d_{29} = 16.0000$ | $n_{d17} = 1.51633$ | $v_{d17} = 64.14$ |
| $r_{30} = ∞$ | $d_{30} = 1.0000$ | | |
| $r_{31} = ∞$ | $d_{31} = 2.6000$ | $n_{d18} = 1.54771$ | $v_{d18} = 62.84$ |
| $r_{32} = ∞$ | $d_{32} = 1.0000$ | | |
| $r_{33} = ∞$ | $d_{33} = 0.7500$ | $n_{d19} = 1.51633$ | $v_{d19} = 64.14$ |
| $r_{34} = ∞$ | $d_{34} = 1.2400$ | | |
| $r_{35} = ∞$ | | | |

Aspherical Coefficients
11 th surface
K=0
$A_4=-2.9080\times10^{-5}$
$A_6=-4.7003\times10^{-8}$
$A_8=1.3039\times10^{-11}$
$A_{10}=0.0000$
16 th surface
K=0
$A_4=-2.6940\times10^{-5}$
$A_6=-2.6991\times10^{-8}$
$A_8=-4.1850\times10^{-11}$
$A_{10}=0.0000$
24 th surface
K=0
$A_4=4.8837\times10^{-6}$
$A_6=4.0251\times10^{-8}$
$A_8=5.0375\times10^{-10}$
$A_{10}=0.0000$
Zooming Data (∞)

|  | W | WS | S | ST | T |
|---|---|---|---|---|---|
| f (mm) | 7.26010 | 13.00010 | 23.30000 | 41.72939 | 74.74571 |
| $F_{NO}$ | 2.8000 | 3.2311 | 3.5000 | 3.5000 | 3.5000 |
| ω (°) | 38.43 | — | 12.96 | — | 4.12 |
| $d_4$ | 1.22382 | 10.57521 | 30.86112 | 47.17255 | 60.33060 |
| $d_{14}$ | 44.41629 | 22.39761 | 12.10735 | 5.55000 | 2.52402 |
| $d_{15}$ | 18.02944 | 9.25134 | 6.75230 | 3.90933 | 1.06282 |
| $d_{20}$ | 1.56309 | 6.26309 | 10.18795 | 14.94609 | 18.74913 |
| $d_{28}$ | 2.00000 | 5.88418 | 8.79568 | 11.11914 | 9.89434 |

EXAMPLE 10

| $r_1 = 127.5747$ | $d_1 = 2.6000$ | $n_{d1} = 1.84666$ | $v_{d1} = 23.78$ |
|---|---|---|---|
| $r_2 = 76.5681$ | $d_2 = 0.6108$ | | |
| $r_3 = 87.0503$ | $d_3 = 6.7061$ | $n_{d2} = 1.49700$ | $v_{d2} = 81.54$ |
| $r_4 = -906.1216$ | $d_4 = 0.2000$ | | |
| $r_5 = 65.5756$ | $d_5 = 5.1656$ | $n_{d3} = 1.69680$ | $v_{d3} = 55.53$ |
| $r_6 = 257.9868$ | $d_6 =$ (Variable) | | |
| $r_7 = -841.7430$ | $d_7 = 1.7000$ | $n_{d4} = 1.77250$ | $v_{d4} = 49.60$ |
| $r_8 = 20.7672$ | $d_8 = 0.1181$ | $n_{d5} = 1.53508$ | $v_{d5} = 40.94$ |
| $r_9 = 17.4318$ (Aspheric) | $d_9 = 8.3674$ | | |
| $r_{10} = -69.0347$ | $d_{10} = 1.3000$ | $n_{d6} = 1.77250$ | $v_{d6} = 49.60$ |
| $r_{11} = 50.8067$ | $d_{11} = 3.5790$ | | |
| $r_{12} = -34.9364$ | $d_{12} = 1.2000$ | $n_{d7} = 1.48749$ | $v_{d7} = 70.23$ |
| $r_{13} = -206.9525$ | $d_{13} = 0.7359$ | | |
| $r_{14} = 131.5379$ | $d_{14} = 2.9312$ | $n_{d8} = 1.68893$ | $v_{d8} = 31.07$ |
| $r_{15} = -65.1273$ | $d_{15} = 0.2838$ | | |
| $r_{16} = 446.1597$ | $d_{16} = 3.4504$ | $n_{d9} = 1.84666$ | $v_{d9} = 23.78$ |
| $r_{17} = -111.5214$ | $d_{17} =$ (Variable) | | |
| $r_{18} = -89.0223$ | $d_{18} = 1.2751$ | $n_{d10} = 1.73400$ | $v_{d10} = 51.47$ |
| $r_{19} = -5156.0079$ | $d_{19} = 1.0546$ | | |
| $r_{20} = ∞$ (Stop) | $d_{20} =$ (Variable) | | |
| $r_{21} = 20.4978$ (Aspheric) | $d_{21} = 5.4824$ | $n_{d11} = 1.49700$ | $v_{d11} = 81.54$ |
| $r_{22} = -55.0155$ | $d_{22} = 0.4103$ | | |
| $r_{23} = 42.1503$ | $d_{23} = 1.1010$ | $n_{d12} = 1.80610$ | $v_{d12} = 40.92$ |
| $r_{24} = 14.0853$ | $d_{24} = 5.1806$ | $n_{d13} = 1.49700$ | $v_{d13} = 81.54$ |
| $r_{25} = -75.3872$ | $d_{25} =$ (Variable) | | |
| $r_{26} = -29.7893$ | $d_{26} = 0.9000$ | $n_{d14} = 1.51633$ | $v_{d14} = 64.14$ |
| $r_{27} = 14.3985$ | $d_{27} = 3.2881$ | $n_{d15} = 1.84666$ | $v_{d15} = 23.78$ |
| $r_{28} = 28.0747$ | $d_{28} =$ (Variable) | | |
| $r_{29} = 117.1492$ (Aspheric) | $d_{29} = 4.3053$ | $n_{d16} = 1.49700$ | $v_{d16} = 81.54$ |
| $r_{30} = -21.7875$ | $d_{30} = 0.1500$ | | |
| $r_{31} = 78.2931$ | $d_{31} = 5.0168$ | $n_{d17} = 1.61800$ | $v_{d17} = 63.33$ |

-continued

| | | | |
|---|---|---|---|
| $r_{32} = -14.1145$ | $d_{32} = 1.0000$ | $n_{d18} = 1.84666$ | $\nu_{d18} = 23.78$ |
| $r_{33} = -50.2289$ | $d_{33} =$ (Variable) | | |
| $r_{34} = \infty$ | $d_{34} = 16.0000$ | $n_{d19} = 1.51633$ | $\nu_{d19} = 64.14$ |
| $r_{35} = \infty$ | $d_{35} = 1.0000$ | | |
| $r_{36} = \infty$ | $d_{36} = 2.6000$ | $n_{d20} = 1.54771$ | $\nu_{d20} = 62.84$ |
| $r_{37} = \infty$ | $d_{37} = 1.0000$ | | |
| $r_{38} = \infty$ | $d_{38} = 0.7500$ | $n_{d21} = 1.51633$ | $\nu_{d21} = 64.14$ |
| $r_{39} = \infty$ | $d_{39} = 1.2400$ | | |
| $r_{40} = \infty$ | | | |

Aspherical Coefficients
9 th surface
$K=0$
$A_4=-1.8060\times10^{-5}$
$A_6=-1.5653\times10^{-8}$
$A_8=-3.1402\times10^{-10}$
$A_{10}=0.0000$
21 th surface
$K=0$
$A_4=-1.9350\times10^{-5}$
$A_6=8.1535\times10^{-9}$
$A_8=-1.1537\times10^{-10}$
$A_{10}=0.0000$
29 th surface
$K=0$
$A_4=-1.4723\times10^{-5}$
$A_6=-4.3194\times10^{-9}$
$A_8=1.8719\times10^{-10}$
$A_{10}=0.0000$
Zooming Data ($\infty$)

| | W | WS | S | ST | T |
|---|---|---|---|---|---|
| f (mm) | 7.26000 | 13.00000 | 23.30008 | 41.73059 | 74.75291 |
| $F_{NO}$ | 2.8000 | 3.4512 | 3.5000 | 3.5000 | 3.5000 |
| $\omega$ (°) | 38.48 | — | 12.85 | — | 4.11 |
| $d_6$ | 1.64787 | 10.58883 | 30.04822 | 47.11870 | 58.44456 |
| $d_{17}$ | 44.72174 | 22.79418 | 11.48117 | 5.95085 | 3.03382 |
| $d_{20}$ | 18.91464 | 11.56777 | 8.33111 | 5.33947 | 1.07479 |
| $d_{25}$ | 1.84897 | 8.03143 | 11.95783 | 16.13820 | 22.70498 |
| $d_{28}$ | 8.28264 | 8.78214 | 6.88040 | 5.85483 | 5.87377 |
| $d_{33}$ | 4.71029 | 5.37520 | 6.58719 | 6.42403 | 4.10299 |

EXAMPLE 11

| | | | |
|---|---|---|---|
| $r_1 = 89.8312$ | $d_1 = 2.6000$ | $n_{d1} = 1.84666$ | $\nu_{d1} = 23.78$ |
| $r_2 = 63.9685$ | $d_2 = 0.0006$ | | |
| $r_3 = 64.1053$ | $d_3 = 9.1675$ | $n_{d2} = 1.49700$ | $\nu_{d2} = 81.54$ |
| $r_4 = 479.8472$ | $d_4 = 0.2000$ | | |
| $r_5 = 75.2405$ | $d_5 = 6.4325$ | $n_{d3} = 1.60311$ | $\nu_{d3} = 60.64$ |
| $r_6 = 342.9922$ | $d_6 =$ (Variable) | | |
| $r_7 = 959.9708$ | $d_7 = 1.8000$ | $n_{d4} = 1.81600$ | $\nu_{d4} = 46.62$ |
| $r_8 = 18.8418$ | $d_8 = 5.3800$ | | |
| $r_9 = -472.5238$ | $d_9 = 1.1000$ | $n_{d5} = 1.73400$ | $\nu_{d5} = 51.47$ |
| $r_{10} = 28.9390$ | $d_{10} = 5.9081$ | | |
| $r_{11} = -29.2098$ | $d_{11} = 1.2000$ | $n_{d6} = 1.71300$ | $\nu_{d6} = 53.87$ |
| $r_{12} = 100.5460$ | $d_{12} = 0.1500$ | | |
| $r_{13} = 49.3222$ | $d_{13} = 7.5695$ | $n_{d7} = 1.63980$ | $\nu_{d7} = 34.46$ |
| $r_{14} = -24.6810$ (Aspheric) | $d_{14} =$ (Variable) | | |
| $r_{15} = 1133.4292$ | $d_{15} = 1.2000$ | $n_{d8} = 1.78472$ | $\nu_{d8} = 25.68$ |
| $r_{16} = 106.5968$ | $d_{16} = 0.2500$ | | |
| $r_{17} = \infty$ (Stop) | $d_{17} =$ (Variable) | | |
| $r_{18} = 20.1552$ (Aspheric) | $d_{18} = 5.1000$ | $n_{d9} = 1.49700$ | $\nu_{d9} = 81.54$ |
| $r_{19} = -94.7419$ | $d_{19} = 0.1774$ | | |
| $r_{20} = 36.0051$ | $d_{20} = 1.1410$ | $n_{d10} = 1.80440$ | $\nu_{d10} = 39.59$ |
| $r_{21} = 13.5064$ | $d_{21} = 5.5328$ | $n_{d11} = 1.60311$ | $\nu_{d11} = 30.64$ |
| $r_{22} = -1129.4923$ | $d_{22} =$ (Variable) | | |
| $r_{23} = -72.5596$ | $d_{23} = 0.9000$ | $n_{d12} = 1.51633$ | $\nu_{d12} = 64.14$ |
| $r_{24} = 11.8049$ | $d_{24} = 2.9338$ | $n_{d13} = 1.84666$ | $\nu_{d13} = 23.78$ |
| $r_{25} = 16.8009$ | $d_{25} =$ (Variable) | | |
| $r_{26} = 91.9126$ | $d_{26} = 2.9663$ | $n_{d14} = 1.49700$ | $\nu_{d14} = 81.54$ |
| $r_{27} = -29.0231$ (Aspheric) | $d_{27} = 0.1500$ | | |
| $r_{28} = 48.8627$ | $d_{28} = 5.1022$ | $n_{d15} = 1.60311$ | $\nu_{d15} = 60.64$ |
| $r_{29} = -13.3197$ | $d_{29} = 0.8500$ | $n_{d16} = 1.84666$ | $\nu_{d16} = 23.78$ |
| $r_{30} = -48.0006$ | $d_{30} =$ (Variable) | | |
| $r_{31} = \infty$ | $d_{31} = 16.0000$ | $n_{d17} = 1.51633$ | $\nu_{d17} = 64.14$ |
| $r_{32} = \infty$ | $d_{32} = 1.0000$ | | |
| $r_{33} = \infty$ | $d_{33} = 2.6000$ | $n_{d18} = 1.54771$ | $\nu_{d18} = 62.84$ |
| $r_{34} = \infty$ | $d_{34} = 1.0000$ | | |
| $r_{35} = \infty$ | $d_{35} = 0.7500$ | $n_{d19} = 1.51633$ | $\nu_{d19} = 64.14$ |
| $r_{36} = \infty$ | $d_{36} = 1.2400$ | | |
| $r_{37} = \infty$ | | | |

Aspherical Coefficients
14 th surface
$K=0$
$A_4=-8.9550\times10^{-9}$
$A_6=8.4748\times10^{-9}$
$A_8=1.6761\times10^{-11}$
$A_{10}=0.0000$
18 th surface
$K=0$
$A_4=-1.7592\times10^{-5}$
$A_6=4.4455\times10^{-9}$
$A_8=-1.3451\times10^{-10}$
$A_{10}=0.0000$
27 th surface
$K=0$
$A_4=-1.4716\times10^{-6}$
$A_6=1.5442\times10^{-9}$
$A_8=-2.3629\times10^{-10}$
$A_{10}=0.0000$
Zooming Data ($\infty$)

| | W | WS | S | ST | T |
|---|---|---|---|---|---|
| f (mm) | 7.33845 | 13.10321 | 23.28940 | 38.89145 | 74.68837 |
| $F_{NO}$ | 2.8000 | 3.1859 | 3.5000 | 3.5000 | 3.5000 |
| $\omega$ (°) | 38.12 | — | 13.01 | — | 4.08 |
| $d_6$ | 1.36006 | 12.64030 | 31.07482 | 48.17964 | 61.33273 |
| $d_{14}$ | 54.26370 | 25.04693 | 11.10499 | 5.19824 | 1.70314 |
| $d_{17}$ | 17.41698 | 12.14210 | 8.86214 | 6.81538 | 1.02608 |
| $d_{22}$ | 1.50000 | 4.14980 | 6.85803 | 9.34039 | 16.90092 |
| $d_{25}$ | 6.85640 | 7.47895 | 6.17972 | 5.74352 | 6.81559 |
| $d_{30}$ | 4.46020 | 7.59229 | 8.38310 | 9.82468 | 5.35600 |

EXAMPLE 12

| | | | |
|---|---|---|---|
| $r_1 = 82.2399$ | $d_1 = 2.6000$ | $n_{d1} = 1.84666$ | $\nu_{d1} = 23.78$ |
| $r_2 = 60.0259$ | $d_2 = 0.1000$ | | |
| $r_3 = 60.6829$ | $d_3 = 7.7500$ | $n_{d2} = 1.49700$ | $\nu_{d2} = 81.54$ |
| $r_4 = 307.4605$ | $d_4 = 0.2000$ | | |
| $r_5 = 72.7643$ | $d_5 = 5.8500$ | $n_{d3} = 1.60311$ | $\nu_{d3} = 60.64$ |

-continued

| | | | |
|---|---|---|---|
| $r_6 = 328.6935$ | $d_6 =$ (Variable) | | |
| $r_7 = 266.6699$ | $d_7 = 1.8000$ | $n_{d4} = 1.81600$ | $v_{d4} = 46.62$ |
| $r_8 = 18.3068$ | $d_8 = 6.0269$ | | |
| $r_9 = -91.9091$ | $d_9 = 1.1000$ | $n_{d5} = 1.73400$ | $v_{d5} = 51.47$ |
| $r_{10} = 31.9296$ | $d_{10} = 5.1735$ | | |
| $r_{11} = -33.4696$ (Aspheric) | $d_{11} = 1.2000$ | $n_{d6} = 1.71300$ | $v_{d6} = 53.87$ |
| $r_{12} = 1.387 \times 10^4$ | $d_{12} = 0.1500$ | | |
| $r_{13} = 76.1645$ | $d_{13} = 6.2143$ | $n_{d7} = 1.69895$ | $v_{d7} = 30.13$ |
| $r_{14} = -29.0944$ | $d_{14} =$ (Variable) | | |
| $r_{15} = -256.8086$ | $d_{15} = 1.0000$ | $n_{d8} = 1.78472$ | $v_{d8} = 25.68$ |
| $r_{16} = 217.7610$ | $d_{16} = 0.2030$ | | |
| $r_{17} = \infty$ (Stop) | $d_{17} =$ (Variable) | | |
| $r_{18} = 19.3410$ (Aspheric) | $d_{18} = 5.5508$ | $n_{d9} = 1.49700$ | $v_{d9} = 81.54$ |
| $r_{19} = -61.9647$ | $d_{19} = 0.1774$ | | |
| $r_{20} = 28.8671$ | $d_{20} = 1.1410$ | $n_{d10} = 1.80440$ | $v_{d10} = 39.59$ |
| $r_{21} = 13.5945$ | $d_{21} = 5.8000$ | $n_{d11} = 1.49700$ | $v_{d11} = 81.54$ |
| $r_{22} = 5392.6719$ | $d_{22} =$ (Variable) | | |
| $r_{23} = -154.6780$ | $d_{23} = 0.9000$ | $n_{d12} = 1.51633$ | $v_{d12} = 64.14$ |
| $r_{24} = 11.7076$ | $d_{24} = 3.6031$ | $n_{d13} = 1.84666$ | $v_{d13} = 23.78$ |
| $r_{25} = 15.0847$ | $d_{25} =$ (Variable) | | |
| $r_{26} = 50.4757$ | $d_{26} = 3.2775$ | $n_{d14} = 1.49700$ | $v_{d14} = 81.54$ |
| $r_{27} = -50.8313$ (Aspheric) | $d_{27} = 0.1500$ | | |
| $r_{28} = 45.8348$ | $d_{28} = 5.5505$ | $n_{d15} = 1.60311$ | $v_{d15} = 60.64$ |
| $r_{29} = -13.2011$ | $d_{29} = 0.8500$ | $n_{d16} = 1.84666$ | $v_{d16} = 23.78$ |
| $r_{30} = -38.4178$ | $d_{30} =$ (Variable) | | |
| $r_{31} = \infty$ | $d_{31} = 16.0000$ | $n_{d17} = 1.51633$ | $v_{d17} = 64.14$ |
| $r_{32} = \infty$ | $d_{32} = 1.0000$ | | |
| $r_{33} = \infty$ | $d_{33} = 2.6000$ | $n_{d18} = 1.54771$ | $v_{d18} = 62.84$ |
| $r_{34} = \infty$ | $d_{34} = 1.0000$ | | |
| $r_{35} = \infty$ | $d_{35} = 0.7500$ | $n_{d19} = 1.51633$ | $v_{d19} = 64.14$ |
| $r_{36} = \infty$ | $d_{36} = 1.2400$ | | |
| $r_{37} = \infty$ | | | |

Aspherical Coefficients
11 th surface
K=0
$A_4 = 2.1955 \times 10^{-6}$
$A_6 = 7.9776 \times 10^{-10}$
$A_8 = 4.2465 \times 10^{-12}$
$A_{10} = 0.0000$
18 th surface
K=0
$A_4 = -2.2173 \times 10^{-5}$
$A_6 = -5.2442 \times 10^{-10}$
$A_8 = -1.3172 \times 10^{-10}$
$A_{10} = 0.0000$
27 th surface
K=0
$A_4 = -4.3385 \times 10^{-6}$
$A_6 = -5.8507 \times 10^{-9}$
$A_8 = -3.8312 \times 10^{-10}$
$A_{10} = 0.0000$ Zooming Data ($\infty$)

| | W | WS | S | ST | T |
|---|---|---|---|---|---|
| f (mm) | 7.35253 | 13.14155 | 23.30044 | 40.58970 | 74.68803 |
| $F_{NO}$ | 2.8000 | 3.1943 | 3.5000 | 3.5000 | 3.5000 |
| $\omega$ (°) | 38.09 | — | 13.06 | — | 4.10 |
| $d_6$ | 1.36006 | 12.88245 | 31.00495 | 49.05687 | 59.99418 |
| $d_{14}$ | 52.40573 | 25.29926 | 11.47801 | 5.29211 | 1.70314 |
| $d_{17}$ | 17.47445 | 12.09215 | 9.07829 | 6.89688 | 1.02608 |
| $d_{22}$ | 1.50000 | 3.82243 | 6.29079 | 8.72220 | 16.22424 |

-continued

| | W | WS | S | ST | T |
|---|---|---|---|---|---|
| $d_{25}$ | 6.18879 | 6.98900 | 5.58223 | 5.34260 | 5.88322 |
| $d_{30}$ | 1.19155 | 7.72421 | 5.35600 | 9.52720 | 3.22100 |

EXAMPLE 13

| | | | |
|---|---|---|---|
| $r_1 = 128.1845$ | $d_1 = 2.6000$ | $n_{d1} = 1.84666$ | $v_{d1} = 23.78$ |
| $r_2 = 77.8836$ | $d_2 = 0.1422$ | | |
| $r_3 = 79.5351$ | $d_3 = 8.7726$ | $n_{d2} = 1.60311$ | $v_{d2} = 60.64$ |
| $r_4 = 1.760 \times 10^5$ | $d_4 = 0.2000$ | | |
| $r_5 = 60.5207$ | $d_5 = 7.8199$ | $n_{d3} = 1.49700$ | $v_{d3} = 81.54$ |
| $r_6 = 225.3888$ | $d_6 =$ (Variable) | | |
| $r_7 = 87.0813$ | $d_7 = 1.5000$ | $n_{d4} = 1.77250$ | $v_{d4} = 49.60$ |
| $r_8 = 15.7852$ | $d_8 = 8.9335$ | | |
| $r_9 = -28.4093$ | $d_9 = 1.3643$ | $n_{d5} = 1.77250$ | $v_{d5} = 49.60$ |
| $r_{10} = 61.5066$ | $d_{10} = 2.4804$ | | |
| $r_{11} = -48.6469$ (Aspheric) | $d_{11} = 0.2000$ | $n_{d6} = 1.53508$ | $v_{d6} = 40.94$ |
| $r_{12} = -200.0000$ | $d_{12} = 1.2000$ | $n_{d7} = 1.69350$ | $v_{d7} = 53.20$ |
| $r_{13} = 96.2114$ | $d_{13} = 0.2000$ | | |
| $r_{14} = 68.6685$ | $d_{14} = 6.7199$ | $n_{d8} = 1.68893$ | $v_{d8} = 31.07$ |
| $r_{15} = -32.7420$ | $d_{15} =$ (Variable) | | |
| $r_{16} = \infty$ (Stop) | $d_{16} = 0.4000$ | | |
| $r_{17} = 312.4731$ | $d_{17} = 0.9972$ | $n_{d9} = 1.60342$ | $v_{d9} = 38.03$ |
| $r_{18} = -144.3938$ | $d_{18} =$ (Variable) | | |
| $r_{19} = 18.9253$ (Aspheric) | $d_{19} = 3.6985$ | $n_{d10} = 1.49700$ | $v_{d10} = 81.54$ |
| $r_{20} = -1.054 \times 10^7$ | $d_{20} = 0.1774$ | | |
| $r_{21} = 58.8544$ | $d_{21} = 1.1208$ | $n_{d11} = 1.77250$ | $v_{d11} = 49.60$ |
| $r_{22} = 15.9897$ | $d_{22} = 4.9136$ | $n_{d12} = 1.49700$ | $v_{d12} = 81.54$ |
| $r_{23} = -68.6413$ | $d_{23} =$ (Variable) | | |
| $r_{24} = -73.7867$ | $d_{24} = 0.9000$ | $n_{d13} = 1.51633$ | $v_{d13} = 64.14$ |
| $r_{25} = 17.0943$ | $d_{25} = 1.8262$ | $n_{d14} = 1.84666$ | $v_{d14} = 23.78$ |
| $r_{26} = 22.4714$ | $d_{26} =$ (Variable) | | |
| $r_{27} = 37.0884$ (Aspheric) | $d_{27} = 4.8733$ | $n_{d15} = 1.49700$ | $v_{d15} = 81.54$ |
| $r_{28} = -23.1086$ | $d_{28} = 0.1500$ | | |
| $r_{29} = -909.2556$ | $d_{29} = 3.3951$ | $n_{d16} = 1.49700$ | $v_{d16} = 81.54$ |
| $r_{30} = -18.5310$ | $d_{30} = 1.0265$ | $n_{d17} = 1.84666$ | $v_{d17} = 23.78$ |
| $r_{31} = -50.0749$ | $d_{31} =$ (Variable) | | |
| $r_{32} = \infty$ | $d_{32} = 16.0000$ | $n_{d18} = 1.51633$ | $v_{d18} = 64.14$ |
| $r_{33} = \infty$ | $d_{33} = 1.0000$ | | |
| $r_{34} = \infty$ | $d_{34} = 2.6000$ | $n_{d19} = 1.54771$ | $v_{d19} = 62.84$ |
| $r_{35} = \infty$ | $d_{35} = 1.0000$ | | |
| $r_{36} = \infty$ | $d_{36} = 0.7500$ | $n_{d20} = 1.51633$ | $v_{d20} = 64.14$ |
| $r_{37} = \infty$ | $d_{37} = 1.2400$ | | |
| $r_{38} = \infty$ | | | |

Aspherical Coefficients
11 th surface
K=0
$A_4 = 9.2934 \times 10^{-6}$
$A_6 = -4.3005 \times 10^{-9}$
$A_8 = -6.0577 \times 10^{-11}$
$A_{10} = 0.0000$
19 th surface
K=0
$A_4 = -1.5515 \times 10^{-5}$
$A_6 = -1.5901 \times 10^{-9}$
$A_8 = -1.9683 \times 10^{-10}$
$A_{10} = 0.0000$
27 th surface
K=0
$A_4 = -1.7557 \times 10^{-5}$
$A_6 = -2.2661 \times 10^{-9}$
$A_8 = 1.2023 \times 10^{-10}$
$A_{10} = 0.0000$ Zooming Data (∞)

|  | W | WS | S | ST | T |
|---|---|---|---|---|---|
| f (mm) | 7.27699 | 13.13483 | 23.30156 | 41.85838 | 74.69868 |
| $F_{NO}$ | 2.8000 | 3.0096 | 3.5000 | 3.5000 | 3.5000 |
| ω (°) | 38.47 | — | 13.07 | — | 4.13 |
| $d_6$ | 1.00000 | 12.32463 | 29.12057 | 47.14255 | 58.02772 |
| $d_{15}$ | 6.72043 | 27.00532 | 13.69308 | 7.48255 | 2.50000 |
| $d_{18}$ | 20.38443 | 13.68554 | 10.29674 | 7.22603 | 1.55935 |
| $d_{23}$ | 0.86734 | 3.00362 | 6.20380 | 8.91257 | 14.79711 |
| $d_{26}$ | 7.49819 | 8.31394 | 5.77953 | 5.09499 | 5.49059 |
| $d_{31}$ | 5.53190 | 9.13816 | 11.98670 | 8.63592 | 12.42630 |

EXAMPLE 14

| $r_1$ = 117.1093 | $d_1$ = 2.6000 | $n_{d1}$ = 1.84666 | $v_{d1}$ = 23.78 |
|---|---|---|---|
| $r_2$ = 78.9815 | $d_2$ = 0.2900 | | |
| $r_3$ = 83.6308 | $d_3$ = 7.1360 | $n_{d2}$ = 1.49700 | $v_{d2}$ = 81.54 |
| $r_4$ = 8.136 × $10^4$ | $d_4$ = 0.2000 | | |
| $r_5$ = 64.0026 | $d_5$ = 7.2854 | $n_{d3}$ = 1.49700 | $v_{d3}$ = 81.54 |
| $r_6$ = 406.9074 | $d_6$ = (Variable) | | |
| $r_7$ = 173.0596 | $d_7$ = 1.5000 | $n_{d4}$ = 1.77250 | $v_{d4}$ = 49.60 |
| $r_8$ = 14.7807 | $d_8$ = 8.6963 | | |
| $r_9$ = −33.4479 | $d_9$ = 1.3643 | $n_{d5}$ = 1.77250 | $v_{d5}$ = 49.60 |
| $r_{10}$ = 82.7642 | $d_{10}$ = 1.5769 | | |
| $r_{11}$ = −78.1187 (Aspheric) | $d_{11}$ = 0.4088 | $n_{d6}$ = 1.66680 | $v_{d6}$ = 33.05 |
| $r_{12}$ = 518.9177 | $d_{12}$ = 1.2000 | $n_{d7}$ = 1.69350 | $v_{d7}$ = 53.20 |
| $r_{13}$ = 55.8817 | $d_{13}$ = 0.0065 | | |
| $r_{14}$ = 43.1420 | $d_{14}$ = 5.9081 | $n_{d8}$ = 1.68893 | $v_{d8}$ = 31.07 |
| $r_{15}$ = −31.8050 | $d_{15}$ = (Variable) | | |
| $r_{16}$ = ∞ (Stop) | $d_{16}$ = (Variable) | | |
| $r_{17}$ = 21.9025 (Aspheric) | $d_{17}$ = 3.3063 | $n_{d9}$ = 1.49700 | $v_{d9}$ = 81.54 |
| $r_{18}$ = −1.082 × $10^6$ | $d_{18}$ = 0.2991 | | |
| $r_{19}$ = 30.2359 | $d_{19}$ = 1.1208 | $n_{d10}$ = 1.77250 | $v_{d10}$ = 49.60 |
| $r_{20}$ = 14.9061 | $d_{20}$ = 5.0481 | $n_{d11}$ = 1.49700 | $v_{d11}$ = 81.54 |
| $r_{21}$ = −81.9434 | $d_{21}$ = (Variable) | | |
| $r_{22}$ = −101.2030 | $d_{22}$ = 0.9000 | $n_{d12}$ = 1.51633 | $v_{d12}$ = 64.14 |
| $r_{23}$ = 15.4168 | $d_{23}$ = 1.8234 | $n_{d13}$ = 1.84666 | $v_{d13}$ = 23.78 |
| $r_{24}$ = 20.2251 | $d_{24}$ = (Variable) | | |
| $r_{25}$ = 42.9650 (Aspheric) | $d_{25}$ = 4.1635 | $n_{d14}$ = 1.49700 | $v_{d14}$ = 81.54 |
| $r_{26}$ = −21.2353 | $d_{26}$ = 0.1500 | | |
| $r_{27}$ = −231.8094 | $d_{27}$ = 2.6973 | $n_{d15}$ = 1.49700 | $v_{d15}$ = 81.54 |
| $r_{28}$ = −16.2244 | $d_{28}$ = 1.2276 | $n_{d16}$ = 1.84666 | $v_{d16}$ = 23.78 |
| $r_{29}$ = −47.0800 | $d_{29}$ = (Variable) | | |
| $r_{30}$ = ∞ | $d_{30}$ = 16.0000 | $n_{d17}$ = 1.51633 | $v_{d17}$ = 64.14 |
| $r_{31}$ = ∞ | $d_{31}$ = 1.0000 | | |
| $r_{32}$ = ∞ | $d_{32}$ = 2.6000 | $n_{d18}$ = 1.54771 | $v_{d18}$ = 62.84 |
| $r_{33}$ = ∞ | $d_{33}$ = 1.0000 | | |
| $r_{34}$ = ∞ | $d_{34}$ = 0.7500 | $n_{d19}$ = 1.51633 | $v_{d19}$ = 64.14 |
| $r_{35}$ = ∞ | $d_{35}$ = 1.2400 | | |
| $r_{36}$ = ∞ | | | |

Aspherical Coefficients
11 th surface
K=0
$A_4$=8.8203×$10^{-6}$
$A_6$=9.5199×$10^{-9}$
$A_8$=−4.6923×$10^{-11}$
$A_{10}$=0.0000
17 th surface
K=0
$A_4$=−1.2806×$10^{-5}$
$A_6$=−2.1296×$10^{-9}$
$A_8$=−2.5132×$10^{-11}$
$A_{10}$=0.0000

25 th surface
K=0
$A_4$=−1.7844×$10^{-5}$
$A_6$=8.4598×$10^{-10}$
$A_8$=1.3070×$10^{-10}$
$A_{10}$=0.0000

Zooming Data (∞)

|  | W | WS | S | ST | T |
|---|---|---|---|---|---|
| f (mm) | 7.33668 | 13.24737 | 23.30078 | 42.13815 | 74.69414 |
| $F_{NO}$ | 2.8000 | 3.0902 | 3.5000 | 3.5000 | 3.5000 |
| ω (°) | 38.27 | — | 13.00 | — | 4.12 |
| $d_6$ | 1.00000 | 11.42124 | 30.94061 | 48.29039 | 59.30210 |
| $d_{15}$ | 55.59662 | 25.85692 | 13.75365 | 6.56339 | 2.50000 |
| $d_{16}$ | 20.18772 | 14.53075 | 11.35844 | 7.51283 | 1.55935 |
| $d_{21}$ | 2.76426 | 4.80624 | 7.15711 | 10.16404 | 16.30729 |
| $d_{24}$ | 7.71856 | 7.83389 | 6.04720 | 4.97905 | 4.27440 |
| $d_{29}$ | 4.70560 | 8.31100 | 10.79320 | 8.56974 | 13.14420 |

EXAMPLE 15

| $r_1$ = 132.6548 | $d_1$ = 2.6000 | $n_{d1}$ = 1.84666 | $v_{d1}$ = 23.78 |
|---|---|---|---|
| $r_2$ = 79.4364 | $d_2$ = 0.4361 | | |
| $r_3$ = 85.8501 | $d_3$ = 6.6634 | $n_{d2}$ = 1.60311 | $v_{d2}$ = 60.64 |
| $r_4$ = 4.060 × $10^4$ | $d_4$ = 0.2000 | | |
| $r_5$ = 59.6705 | $d_5$ = 6.1756 | $n_{d3}$ = 1.49700 | $v_{d3}$ = 81.54 |
| $r_6$ = 294.2591 | $d_6$ = (Variable) | | |
| $r_7$ = 98.7402 | $d_{7-1.5000}$ | $n_{d4}$ = 1.77250 | $v_{d4}$ = 49.60 |
| $r_8$ = 14.8930 | $d_8$ = 9.4296 | | |
| $r_9$ = −32.3971 | $d_{9-1.3643}$ | $n_{d5}$ = 1.77250 | $v_{d5}$ = 49.60 |
| $r_{10}$ = 70.8620 | $d_{10}$ = 2.0091 | | |
| $r_{11}$ = −72.3210 (Aspheric) | $d_{11}$ = 0.2000 | $n_{d6}$ = 1.53508 | $v_{d6}$ = 40.94 |
| $r_{12}$ = −200.0000 | $d_{12}$ = 1.2000 | $n_{d7}$ = 1.69350 | $v_{d7}$ = 53.20 |
| $r_{13}$ = 67.0853 | $d_{13}$ = 0.2000 | | |
| $r_{14}$ = 44.8428 | $d_{14}$ = 6.9613 | $n_{d8}$ = 1.68893 | $v_{d8}$ = 31.07 |
| $r_{15}$ = −35.6841 | $d_{15}$ = (Variable) | | |
| $r_{16}$ = ∞ (Stop) | $d_{16}$ = (Variable) | | |
| $r_{17}$ = 21.0081 (Aspheric) | $d_{17}$ = 2.9255 | $n_{d9}$ = 1.49700 | $v_{d9}$ = 81.54 |
| $r_{18}$ = −9.840 × $10^5$ | $d_{18}$ = 0.1774 | | |
| $r_{19}$ = 34.1654 | $d_{19}$ = 1.1208 | $n_{d10}$ = 1.77250 | $v_{d10}$ = 49.60 |
| $r_{20}$ = 14.0687 | $d_{20}$ = 4.9352 | $n_{d11}$ = 1.49700 | $v_{d11}$ = 81.54 |
| $r_{21}$ = −74.9646 | $d_{21}$ = (Variable) | | |
| $r_{22}$ = −61.8007 | $d_{22}$ = 0.9000 | $n_{d12}$ = 1.51633 | $v_{d12}$ = 64.14 |
| $r_{23}$ = 16.0108 | $d_{23}$ = 1.8375 | $n_{d13}$ = 1.84666 | $v_{d13}$ = 23.78 |
| $r_{24}$ = 22.5570 | $d_{24}$ = (Variable) | | |
| $r_{25}$ = 32.5943 (Aspheric) | $d_{25}$ = 4.3313 | $n_{d14}$ = 1.49700 | $v_{d14}$ = 81.54 |
| $r_{26}$ = −33.8655 | $d_{26}$ = 0.1500 | | |
| $r_{27}$ = 53.1963 | $d_{27}$ = 1.1524 | $n_{d15}$ = 1.84666 | $v_{d15}$ = 23.78 |
| $r_{28}$ = 18.3125 | $d_{28}$ = 3.6734 | $n_{d16}$ = 1.49700 | $v_{d16}$ = 81.54 |
| $r_{29}$ = −121.7913 | $d_{29}$ = (Variable) | | |
| $r_{30}$ = ∞ | $d_{30}$ = 16.0000 | $n_{d17}$ = 1.51633 | $v_{d17}$ = 64.14 |
| $r_{31}$ = ∞ | $d_{31}$ = 1.0000 | | |
| $r_{32}$ = ∞ | $d_{32}$ = 2.6000 | $n_{d18}$ = 1.54771 | $v_{d18}$ = 62.84 |
| $r_{33}$ = ∞ | $d_{33}$ = 1.0000 | | |
| $r_{34}$ = ∞ | $d_{34}$ = 0.7500 | $n_{d19}$ = 1.51633 | $v_{d19}$ = 64.14 |
| $r_{35}$ = ∞ | $d_{35}$ = 1.2400 | | |
| $r_{36}$ = ∞ | | | |

Aspherical Coefficients
11 th surface
K=0
$A_4$=5.6253×$10^{-6}$
$A_6$=8.1204×$10^{-9}$
$A_8$=−1.5465×$10^{-10}$
$A_{10}$=0.0000

17 th surface
K=0
$A_4=-1.0911\times10^{-5}$
$A_6=-8.6347\times10^{-10}$
$A_8=-3.2657\times10^{-11}$
$A_{10}=0.0000$
25 th surface
K=0
$A_4=-1.8333\times10^{-5}$
$A_6=-3.1998\times10^{-9}$
$A_8=1.0415\times10^{-10}$
$A_{10}=0.0000$
Zooming Data (∞)

|  | W | WS | S | ST | T |
|---|---|---|---|---|---|
| f (mm) | 7.28638 | 13.09183 | 23.29942 | 41.55110 | 74.69787 |
| $F_{NO}$ | 2.8000 | 3.0933 | 3.5000 | 3.5000 | 3.5000 |
| ω (°) | 38.41 | — | 13.04 | — | 4.13 |
| $d_6$ | 1.00000 | 12.01687 | 29.52891 | 47.09799 | 58.40761 |
| $d_{15}$ | 56.60227 | 27.25102 | 13.50469 | 7.09969 | 2.50000 |
| $d_{16}$ | 20.20946 | 14.09927 | 10.84298 | 7.36903 | 1.55935 |
| $d_{21}$ | 2.22975 | 4.07145 | 6.73846 | 9.29928 | 14.66227 |
| $d_{24}$ | 8.05739 | 8.70338 | 6.54360 | 6.01591 | 6.08811 |
| $d_{29}$ | 6.19420 | 9.22330 | 12.55330 | 8.60639 | 14.38620 |

EXAMPLE 16

| $r_1$ = 80.0460 | $d_1$ = 2.6000 | $n_{d1}$ = 1.84666 | $v_{d1}$ = 23.78 |
|---|---|---|---|
| $r_2$ = 57.3690 | $d_2$ = 0.0798 | | |
| $r_3$ = 56.8758 | $d_3$ = 6.9751 | $n_{d2}$ = 1.49700 | $v_{d2}$ = 81.54 |
| $r_4$ = 362.0517 | $d_4$ = 0.2000 | | |
| $r_5$ = 73.3775 | $d_5$ = 4.4654 | $n_{d3}$ = 1.60311 | $v_{d3}$ = 60.64 |
| $r_6$ = 289.7112 | $d_6$ = (Variable) | | |
| $r_7$ = 177.0825 | $d_7$ = 1.5000 | $n_{d4}$ = 1.77250 | $v_{d4}$ = 49.60 |
| $r_8$ = 16.8427 | $d_8$ = 7.9000 | | |
| $r_9$ = −29.2679 (Aspheric) | $d_9$ = 1.3643 | $n_{d5}$ = 1.77250 | $v_{d5}$ = 49.60 |
| $r_{10}$ = 67.6142 | $d_{10}$ = 3.5642 | | |
| $r_{11}$ = 117.8157 | $d_{11}$ = 4.8943 | $n_{d6}$ = 1.72825 | $v_{d6}$ = 28.46 |
| $r_{12}$ = −31.3298 | $d_{12}$ = 0.5000 | | |
| $r_{13}$ = −63.4774 | $d_{13}$ = 1.0000 | $n_{d7}$ = 1.74400 | $v_{d7}$ = 44.78 |
| $r_{14}$ = −239.8825 | $d_{14}$ = (Variable) | | |
| $r_{15}$ = −435.4231 | $d_{15}$ = 1.2680 | $n_{d8}$ = 1.72825 | $v_{d8}$ = 28.46 |
| $r_{16}$ = 514.6994 | $d_{16}$ = 1.3139 | | |
| $r_{17}$ = ∞ (Stop) | $d_{17}$ = (Variable) | | |
| $r_{18}$ = 20.0387 (Aspheric) | $d_{18}$ = 5.6776 | $n_{d9}$ = 1.49700 | $v_{d9}$ = 81.54 |
| $r_{19}$ = −73.1240 | $d_{19}$ = 0.1774 | | |
| $r_{20}$ = 46.3298 | $d_{20}$ = 1.1410 | $n_{d10}$ = 1.80440 | $v_{d10}$ = 39.59 |
| $r_{21}$ = 13.8759 | $d_{21}$ = 5.4223 | $n_{d11}$ = 1.60311 | $v_{d11}$ = 60.64 |
| $r_{22}$ = −120.0020 | $d_{22}$ = (Variable) | | |
| $r_{23}$ = −55.7471 | $d_{23}$ = 0.9000 | $n_{d12}$ = 1.51633 | $v_{d12}$ = 64.14 |
| $r_{24}$ = 11.2108 | $d_{24}$ = 1.8651 | $n_{d13}$ = 1.84666 | $v_{d13}$ = 23.78 |
| $r_{25}$ = 15.9872 | $d_{25}$ = (Variable) | | |
| $r_{26}$ = 55.1052 | $d_{26}$ = 2.9459 | $n_{d14}$ = 1.49700 | $v_{d14}$ = 81.54 |
| $r_{27}$ = −28.6459 (Aspheric) | $d_{27}$ = 0.1500 | | |
| $r_{28}$ = 69.1964 | $d_{28}$ = 4.5501 | $n_{d15}$ = 1.60311 | $v_{d15}$ = 60.64 |
| $r_{29}$ = −13.8791 | $d_{29}$ = 1.0000 | $n_{d16}$ = 1.84666 | $v_{d16}$ = 23.78 |
| $r_{30}$ = −46.4615 | $d_{30}$ = (Variable) | | |
| $r_{31}$ = ∞ | $d_{31}$ = 16.0000 | $n_{d17}$ = 1.51633 | $v_{d17}$ = 64.14 |
| $r_{32}$ = ∞ | $d_{32}$ = 1.0000 | | |
| $r_{33}$ = ∞ | $d_{33}$ = 2.6000 | $n_{d18}$ = 1.54771 | $v_{d18}$ = 62.84 |
| $r_{34}$ = ∞ | $d_{34}$ = 1.0000 | | |
| $r_{35}$ = ∞ | $d_{35}$ = 0.7500 | $n_{d19}$ = 1.51633 | $v_{d19}$ = 64.14 |
| $r_{36}$ = ∞ | $d_{36}$ = 1.2400 | | |
| $r_{37}$ = ∞ | | | |

Aspherical Coefficients
9 th surface
K=0
$A_4=8.8395\times10^{-6}$
$A_6=5.0711\times10^{-9}$
$A_8=-1.9545\times10^{-11}$
$A_{10}=0.0000$
18 th surface
K=0
$A_4=-2.0678\times10^{-5}$
$A_6=-6.4243\times10^{-9}$
$A_8=2.3028\times10^{-11}$
$A_{10}=0.0000$
27 th surface
K=0
$A_4=-3.0971\times10^{-6}$
$A_6=-9.4407\times10^{-9}$
$A_8=1.9644\times10^{-11}$
$A_{10}=0.0000$
Zooming Data (∞)

|  | W | S | T |
|---|---|---|---|
| f (mm) | 7.27185 | 23.29749 | 74.69992 |
| $F_{NO}$ | 2.8000 | 3.5000 | 3.5000 |
| ω (°) | 40.17 | 13.97 | 4.40 |
| $d_6$ | 1.36006 | 30.12912 | 58.31748 |
| $d_{14}$ | 54.70456 | 12.24625 | 1.70314 |
| $d_{17}$ | 17.26301 | 9.52391 | 1.02608 |
| $d_{22}$ | 1.50000 | 6.53585 | 16.09191 |
| $d_{25}$ | 7.85799 | 6.35824 | 6.81641 |
| $d_{30}$ | 4.64000 | 8.84600 | 7.32400 |

EXAMPLE 17

| $r_1$ = 84.5614 | $d_1$ = 2.6000 | $n_{d1}$ = 1.84666 | $v_{d1}$ = 23.78 |
|---|---|---|---|
| $r_2$ = 60.9235 | $d_2$ = 0.1000 | | |
| $r_3$ = 60.9993 | $d_3$ = 7.7500 | $n_{d2}$ = 1.49700 | $v_{d2}$ = 81.54 |
| $r_4$ = 411.3180 | $d_4$ = 0.2000 | | |
| $r_5$ = 69.8137 | $d_5$ = 5.8500 | $n_{d3}$ = 1.60311 | $v_{d3}$ = 60.64 |
| $r_6$ = 273.9185 | $d_6$ = (Variable) | | |
| $r_7$ = 326.8029 | $d_7$ = 1.8000 | $n_{d4}$ = 1.81600 | $v_{d4}$ = 46.62 |
| $r_8$ = 18.4614 | $d_8$ = 5.8823 | | |
| $r_9$ = −86.8945 | $d_9$ = 1.1000 | $n_{d5}$ = 1.73400 | $v_{d5}$ = 51.47 |
| $r_{10}$ = 32.9914 | $d_{10}$ = 5.2210 | | |
| $r_{11}$ = −30.1936 (Aspheric) | $d_{11}$ = 1.2000 | $n_{d6}$ = 1.71300 | $v_{d6}$ = 53.87 |
| $r_{12}$ = 3.111 × $10^4$ | $d_{12}$ = 0.1500 | | |
| $r_{13}$ = 94.9186 | $d_{13}$ = 6.1767 | $n_{d7}$ = 1.69895 | $v_{d7}$ = 30.13 |
| $r_{14}$ = −27.0373 | $d_{14}$ = (Variable) | | |
| $r_{15}$ = −754.3167 | $d_{15}$ = 0.8000 | $n_{d8}$ = 1.78472 | $v_{d8}$ = 25.68 |
| $r_{16}$ = 50.7584 | $d_{16}$ = 2.0000 | $n_{d9}$ = 1.68893 | $v_{d9}$ = 31.07 |
| $r_{17}$ = 699.9122 | $d_{17}$ = 0.7000 | | |
| $r_{18}$ = ∞ (Stop) | $d_{18}$ = (Variable) | | |
| $r_{19}$ = 19.3389 (Aspheric) | $d_{19}$ = 5.5976 | $n_{d10}$ = 1.49700 | $v_{d10}$ = 81.54 |
| $r_{20}$ = −64.3089 | $d_{20}$ = 0.1774 | | |
| $r_{21}$ = 36.8090 | $d_{21}$ = 1.1410 | $n_{d11}$ = 1.80440 | $v_{d11}$ = 39.59 |
| $r_{22}$ = 15.7560 | $d_{22}$ = 4.3000 | $n_{d12}$ = 1.49700 | $v_{d12}$ = 81.54 |
| $r_{23}$ = 6909.3107 | $d_{23}$ = (Variable) | | |
| $r_{24}$ = −213.9678 | $d_{24}$ = 0.9000 | $n_{d13}$ = 1.51633 | $v_{d13}$ = 64.14 |
| $r_{25}$ = 11.9504 | $d_{25}$ = 3.6757 | $n_{d14}$ = 1.84666 | $v_{d14}$ = 23.78 |
| $r_{26}$ = 15.7330 | $d_{26}$ = (Variable) | | |
| $r_{27}$ = 56.9085 | $d_{27}$ = 3.2663 | $n_{d15}$ = 1.49700 | $v_{d15}$ = 81.54 |
| $r_{28}$ = −49.9335 (Aspheric) | $d_{28}$ = 0.1500 | | |
| $r_{29}$ = 48.3454 | $d_{29}$ = 5.3103 | $n_{d16}$ = 1.60311 | $v_{d16}$ = 60.64 |
| $r_{30}$ = −12.9112 | $d_{30}$ = 0.8500 | $n_{d17}$ = 1.84666 | $v_{d17}$ = 23.78 |

-continued

| | | | |
|---|---|---|---|
| $r_{31} = -36.0617$ | $d_{31} =$ (Variable) | | |
| $r_{32} = \infty$ | $d_{32} = 16.0000$ | $n_{d18} = 1.51633$ | $\nu_{d18} = 64.14$ |
| $r_{33} = \infty$ | $d_{33} = 1.0000$ | | |
| $r_{34} = \infty$ | $d_{34} = 2.6000$ | $n_{d19} = 1.54771$ | $\nu_{d19} = 62.84$ |
| $r_{35} = \infty$ | $d_{35} = 1.0000$ | | |
| $r_{36} = \infty$ | $d_{36} = 0.7500$ | $n_{d20} = 1.51633$ | $\nu_{d20} = 64.14$ |
| $r_{37} = \infty$ | $d_{37} = 1.2400$ | | |
| $r_{38} = \infty$ | | | |

Aspherical Coefficients
11 th surface
K=0
$A_4=3.5442\times10^{-6}$
$A_6=-1.0145\times10^{-8}$
$A_8=4.1292\times10^{-11}$
$A_{10}=0.0000$
19 th surface
K=0
$A_4=-2.3122\times10^{-5}$
$A_6=-1.0925\times10^{-9}$
$A_8=-1.2640\times10^{-10}$
$A_{10}=0.0000$
28 th surface
K=0
$A_4=-2.8818\times10^{-6}$
$A_6=-5.4227\times10^{-9}$
$A_8=-2.8339\times10^{-10}$
$A_{10}=0.0000$
Zooming Data ($\infty$)

| | W | S | T |
|---|---|---|---|
| f (mm) | 7.27212 | 23.29915 | 74.69940 |
| $F_{NO}$ | 2.8000 | 3.5000 | 3.5000 |
| $\omega$ (°) | 38.44 | 13.06 | 4.09 |
| $d_6$ | 1.36006 | 31.23645 | 59.54246 |
| $d_{14}$ | 52.32231 | 11.30384 | 1.70314 |
| $d_{18}$ | 17.20275 | 8.82296 | 1.02608 |
| $d_{23}$ | 1.50000 | 6.61710 | 16.48589 |
| $d_{26}$ | 6.17485 | 5.37142 | 6.39230 |
| $d_{31}$ | 2.40000 | 6.46400 | 3.36900 |

EXAMPLE 18

| | | | |
|---|---|---|---|
| $r_1 = 85.6717$ | $d_1 = 2.6000$ | $n_{d1} = 1.84666$ | $\nu_{d1} = 23.78$ |
| $r_2 = 61.4682$ | $d_2 = 0.1000$ | | |
| $r_3 = 61.7093$ | $d_3 = 7.7500$ | $n_{d2} = 1.49700$ | $\nu_{d2} = 81.54$ |
| $r_4 = 391.3879$ | $d_4 = 0.2000$ | | |
| $r_5 = 71.8120$ | $d_5 = 5.8500$ | $n_{d3} = 1.60311$ | $\nu_{d3} = 60.64$ |
| $r_6 = 318.2499$ | $d_6 =$ (Variable) | | |
| $r_7 = 360.3572$ | $d_7 = 1.8000$ | $n_{d4} = 1.81600$ | $\nu_{d4} = 46.62$ |
| $r_8 = 18.8770$ | $d_8 = 5.9565$ | | |
| $r_9 = -91.8447$ | $d_9 = 1.1000$ | $n_{d5} = 1.73400$ | $\nu_{d5} = 51.47$ |
| $r_{10} = 33.5783$ | $d_{10} = 5.2551$ | | |
| $r_{11} = -31.3548$ (Aspheric) | $d_{11} = 1.2000$ | $n_{d6} = 1.71300$ | $\nu_{d6} = 53.87$ |
| $r_{12} = 4.805\times10^4$ | $d_{12} = 0.1500$ | | |
| $r_{13} = 97.5840$ | $d_{13} = 6.2516$ | $n_{d7} = 1.69895$ | $\nu_{d7} = 30.13$ |
| $r_{14} = -27.8035$ | $d_{14} =$ (Variable) | | |
| $r_{15} = \infty$ | $d_{15} = 1.8000$ | $n_{d8} = 1.78472$ | $\nu_{d8} = 25.68$ |
| $r_{16} = 268.7641$ (Aspheric) | $d_{16} = 1.0000$ | | |
| $r_{17} = \infty$ (Stop) | $d_{17} =$ (Variable) | | |
| $r_{18} = 18.6304$ (Aspheric) | $d_{18} = 5.6253$ | $n_{d9} = 1.49700$ | $\nu_{d9} = 81.54$ |
| $r_{19} = -57.6238$ | $d_{19} = 0.1774$ | | |
| $r_{20} = 34.9774$ | $d_{20} = 1.1410$ | $n_{d10} = 1.80440$ | $\nu_{d10} = 39.59$ |
| $r_{21} = 14.9385$ | $d_{21} = 4.3000$ | $n_{d11} = 1.49700$ | $\nu_{d11} = 81.54$ |
| $r_{22} = 4295.3319$ | $d_{22} =$ (Variable) | | |
| $r_{23} = -226.3830$ | $d_{23} = 0.9000$ | $n_{d12} = 1.51633$ | $\nu_{d12} = 64.14$ |
| $r_{24} = 11.9132$ | $d_{24} = 3.6481$ | $n_{d13} = 1.84666$ | $\nu_{d13} = 23.78$ |
| $r_{25} = 15.2759$ | $d_{25} =$ (Variable) | | |
| $r_{26} = 54.3162$ | $d_{26} = 3.3130$ | $n_{d14} = 1.49700$ | $\nu_{d14} = 81.54$ |
| $r_{27} = -51.5747$ (Aspheric) | $d_{27} = 0.1500$ | | |
| $r_{28} = 49.4131$ | $d_{28} = 5.2625$ | $n_{d15} = 1.60311$ | $\nu_{d15} = 60.64$ |
| $r_{29} = -13.1129$ | $d_{29} = 0.8500$ | $n_{d16} = 1.84666$ | $\nu_{d16} = 23.78$ |
| $r_{30} = -36.5139$ | $d_{30} =$ (Variable) | | |
| $r_{31} = \infty$ | $d_{31} = 16.0000$ | $n_{d17} = 1.51633$ | $\nu_{d17} = 64.14$ |
| $r_{32} = \infty$ | $d_{32} = 1.0000$ | | |
| $r_{33} = \infty$ | $d_{33} = 2.6000$ | $n_{d18} = 1.54771$ | $\nu_{d18} = 62.84$ |
| $r_{34} = \infty$ | $d_{34} = 1.0000$ | | |
| $r_{35} = \infty$ | $d_{35} = 0.7500$ | $n_{d19} = 1.51633$ | $\nu_{d19} = 64.14$ |
| $r_{36} = \infty$ | $d_{36} = 1.2400$ | | |
| $r_{37} = \infty$ | | | |

Aspherical Coefficients
11 th surface
K=0
$A_4=3.5400\times10^{-6}$
$A_6=-7.6377\times10^{-9}$
$A_8=4.0209\times10^{-11}$
$A_{10}=0.0000$
16 th surface
K=0
$A_4=-4.0343\times10^{-7}$
$A_6=2.7672\times10^{-8}$
$A_8=-2.5380\times10^{-10}$
$A_{10}=0.0000$
18 th surface
K=0
$A_4=-2.6388\times10^{-5}$
$A_6=-1.7329\times10^{-9}$
$A_8=-1.6305\times10^{-10}$
$A_{10}=0.0000$
27 th surface
K=0
$A_4=-3.4938\times10^{-6}$
$A_6=-5.9935\times10^{-9}$
$A_8=-2.8356\times10^{-10}$
$A_{10}=0.0000$
Zooming Data ($\infty$)

| | W | S | T |
|---|---|---|---|
| f (mm) | 7.27244 | 23.30032 | 74.70039 |
| $F_{NO}$ | 2.8000 | 3.5000 | 3.5000 |
| $\omega$ (°) | 38.45 | 13.05 | 4.09 |
| $d_6$ | 1.36006 | 31.15403 | 59.61613 |
| $d_{14}$ | 52.28998 | 11.32834 | 1.70314 |
| $d_{17}$ | 17.27794 | 8.92919 | 1.02608 |
| $d_{22}$ | 1.50000 | 6.44912 | 16.47111 |
| $d_{25}$ | 6.18489 | 5.46432 | 6.07561 |
| $d_{30}$ | 2.39700 | 6.50900 | 3.82700 |

EXAMPLE 19

| | | | |
|---|---|---|---|
| $r_1 = 102.8951$ | $d_1 = 2.2000$ | $n_{d1} = 1.84666$ | $v_{d1} = 23.78$ |
| $r_2 = 61.5389$ | $d_2 = 11.0000$ | $n_{d2} = 1.49700$ | $v_{d2} = 81.54$ |
| $r_3 = -641.2805$ | $d_3 = 0.2750$ | | |
| $r_4 = 51.4180$ | $d_4 = 6.1875$ | $n_{d3} = 1.69680$ | $v_{d3} = 55.53$ |
| $r_5 = 146.6226$ | $d_5 =$ (Variable) | | |
| $r_6 = 148.7220$ | $d_6 = 1.9010$ | $n_{d4} = 1.83400$ | $v_{d4} = 37.16$ |
| $r_7 = 15.1960$ | $d_7 = 8.2500$ | | |
| $r_8 = -17.1556$ | $d_8 = 1.6500$ | $n_{d5} = 1.80610$ | $v_{d5} = 40.92$ |
| $r_9 = 15.0399$ (Aspheric) | $d_9 = 2.0625$ | | |
| $r_{10} = 58.8129$ | $d_{10} = 3.4375$ | $n_{d6} = 1.68893$ | $v_{d6} = 31.07$ |
| $r_{11} = -74.3150$ | $d_{11} = 0.2062$ | | |
| $r_{12} = 241.0544$ | $d_{12} = 4.8125$ | $n_{d7} = 1.68893$ | $v_{d7} = 31.07$ |
| $r_{13} = -21.3830$ | $d_{13} =$ (Variable) | | |
| $r_{14} \infty$ (Stop) | $d_{14} =$ (Variable) | | |
| $r_{15} = 37.4279$ (Aspheric) | $d_{15} = 3.4375$ | $n_{d8} = 1.49700$ | $v_{d8} = 81.54$ |
| $r_{16} = -462.8778$ | $d_{16} = 0.2062$ | | |
| $r_{17} = 15.8702$ | $d_{17} = 5.5000$ | $n_{d9} = 1.59551$ | $v_{d9} = 39.24$ |
| $r_{18} = 79.4628$ | $d_{18} = 1.3750$ | $n_{d10} = 1.80610$ | $v_{d10} = 40.92$ |
| $r_{19} = 14.4884$ | $d_{19} =$ (Variable) | | |
| $r_{20} = 26.6553$ | $d_{20} = 4.1250$ | $n_{d11} = 1.83400$ | $v_{d11} = 37.16$ |
| $r_{21} = 147.2888$ | $d_{21} = 0.4125$ | | |
| $r_{22} = 142.7176$ | $d_{22} = 1.3750$ | $n_{d12} = 1.84666$ | $v_{d12} = 23.78$ |
| $r_{23} = 17.8989$ | $d_{23} = 6.1875$ | $n_{d13} = 1.49700$ | $v_{d13} = 81.54$ |
| $r_{24} = -22.9886$ (Aspheric) | $d_{24} =$ (Variable) | | |
| $r_{25} = \infty$ | $d_{25} = 23.3750$ | $n_{d14} = 1.51633$ | $v_{d14} = 64.14$ |
| $r_{26} = \infty$ | $d_{26} = 1.3750$ | | |
| $r_{27} = \infty$ | $d_{27} = 2.2000$ | $n_{d15} = 1.54771$ | $v_{d15} = 62.84$ |
| $r_{28} = \infty$ | $d_{28} = 1.3750$ | | |
| $r_{29} = \infty$ | $d_{29} = 1.0313$ | $n_{d16} = 1.52300$ | $v_{d16} = 55.00$ |
| $r_{30} = \infty$ | $d_{30} = 3.2468$ | | |
| $r_{31} = \infty$ | | | |

Aspherical Coefficients
9 th surface
$K=0$
$A_4=-1.4335\times10^{-4}$
$A_6=3.6008\times10^{-7}$
$A_8=-1.5707\times10^{-9}$
$A_{10}=0.0000$
15 th surface
$K=0$
$A_4=-8.3514\times10^{-6}$
$A_6=-6.4776\times10^{-10}$
$A_8=-1.3217\times10^{-11}$
$A_{10}=0.0000$
24 th surface
$K=0$
$A_4=2.1082\times10^{-5}$
$A_6=9.2526\times10^{-8}$
$A_8=-1.4509\times10^{-9}$
$A_{10}=6.8600\times10^{-12}$ Zooming Data ($\infty$)

| | W | S | T |
|---|---|---|---|
| f (mm) | 7.15436 | 18.83672 | 50.05002 |
| $F_{NO}$ | 2.0482 | 2.3536 | 2.5012 |
| $\omega$ (°) | 38.38 | 15.78 | 6.16 |
| $d_5$ | 1.37500 | 23.10024 | 44.56543 |
| $d_{13}$ | 53.62605 | 19.09389 | 6.13762 |
| $d_{14}$ | 23.19509 | 10.31787 | 3.56923 |
| $d_{19}$ | 7.00580 | 12.70882 | 18.49477 |
| $d_{24}$ | 1.19821 | 7.55450 | 9.33878 |

EXAMPLE 20

| | | | |
|---|---|---|---|
| $r_1 = 155.9824$ | $d_1 = 1.7875$ | $n_{d1} = 1.84666$ | $v_{d1} = 23.78$ |
| $r_2 = 61.8424$ | $d_2 = 11.0000$ | $n_{d2} = 1.61800$ | $v_{d2} = 63.33$ |
| $r_3 = -600.9530$ | $d_3 = 0.2750$ | | |
| $r_4 = 47.5178$ | $d_4 = 6.1875$ | $n_{d3} = 1.69680$ | $v_{d3} = 55.53$ |
| $r_5 = 121.5999$ | $d_5 =$ (Variable) | | |
| $r_6 = 119.2914$ | $d_6 = 1.3750$ | $n_{d4} = 1.80610$ | $v_{d4} = 40.92$ |
| $r_7 = 13.2227$ (Aspheric) | $d_7 = 8.2500$ | | |
| $r_8 = -32.4710$ | $d_8 = 1.6500$ | $n_{d5} = 1.83400$ | $v_{d5} = 37.16$ |
| $r_9 = 39.0123$ | $d_9 = 1.3750$ | | |
| $r_{10} = 165.6443$ | $d_{10} = 1.3750$ | $n_{d6} = 1.57501$ | $v_{d6} = 41.50$ |
| $r_{11} = 20.0406$ | $d_{11} = 7.1500$ | $n_{d7} = 1.75520$ | $v_{d7} = 27.51$ |
| $r_{12} = -48.8507$ | $d_{12} =$ (Variable) | | |
| $r_{13} = \infty$ (Stop) | $d_{13} =$ (Variable) | | |
| $r_{14} = 30.8548$ | $d_{14} = 3.4375$ | $n_{d8} = 1.80518$ | $v_{d8} = 25.42$ |
| $r_{15} = -89.0085$ | $d_{15} = 0.2062$ | | |
| $r_{16} = 38.9337$ (Aspheric) | $d_{16} = 4.4000$ | $n_{d9} = 1.80610$ | $v_{d9} = 40.92$ |
| $r_{17} = -94.3851$ | $d_{17} = 1.3750$ | $n_{d10} = 1.84666$ | $v_{d10} = 23.78$ |
| $r_{18} = 32.5308$ | $d_{18} =$ (Variable) | | |
| $r_{19} = -57.6645$ | $d_{19} = 2.7500$ | $n_{d11} = 1.77250$ | $v_{d11} = 49.60$ |
| $r_{20} = -47.1601$ | $d_{20} = 1.3750$ | $n_{d12} = 1.60342$ | $v_{d12} = 38.03$ |
| $r_{21} = 30.6668$ | $d_{21} =$ (Variable) | | |
| $r_{22} = -228.3337$ | $d_{22} = 1.3750$ | $n_{d13} = 1.84666$ | $v_{d13} = 23.78$ |
| $r_{23} = 19.0716$ | $d_{23} = 6.1875$ | $n_{d14} = 1.49700$ | $v_{d14} = 81.54$ |
| $r_{24} = -31.2823$ (Aspheric) | $d_{24} = 0.2062$ | | |
| $r_{25} = 36.1622$ | $d_{25} = 6.1875$ | $n_{d15} = 1.69350$ | $v_{d15} = 53.21$ |
| $r_{26} = -35.8359$ | $d_{26} =$ (Variable) | | |
| $r_{27} = \infty$ | $d_{27} = 23.3750$ | $n_{d16} = 1.51633$ | $v_{d16} = 64.14$ |
| $r_{28} = \infty$ | $d_{28} = 1.3750$ | | |
| $r_{29} = \infty$ | $d_{29} = 2.2000$ | $n_{d17} = 1.54771$ | $v_{d17} = 62.84$ |
| $r_{30} = \infty$ | $d_{30} = 1.3750$ | | |
| $r_{31} = \infty$ | $d_{31} = 1.0313$ | $n_{d18} = 1.52300$ | $v_{d18} = 55.00$ |
| $r_{32} = \infty$ | $d_{32} = 3.2377$ | | |
| $r_{33} = \infty$ | | | |

Aspherical Coefficients
7 th surface
$K=0$
$A_4=-2.0811\times10^{-5}$
$A_6=-9.3584\times10^{-10}$
$A_8=-9.2039\times10^{-10}$
$A_{10}=0.0000$
16 th surface
$K=0$
$A_4=-9.0277\times10^{-6}$
$A_6=2.1013\times10^{-8}$
$A_8=-5.4554\times10^{-10}$
$A_{10}=2.6012\times10^{-12}$
24 th surface
$K=0$
$A_4=-1.8657\times10^{-6}$
$A_6=2.3003\times10^{-8}$
$A_8=-5.0119\times10^{-10}$
$A_{10}=0.0000$ Zooming Data ($\infty$)

| | W | S | T |
|---|---|---|---|
| f (mm) | 7.16206 | 18.83631 | 50.04733 |
| $F_{NO}$ | 2.0290 | 2.3673 | 2.8226 |
| $\omega$ (°) | 38.34 | 15.98 | 6.16 |
| $d_5$ | 1.37500 | 20.39279 | 42.36136 |
| $d_{12}$ | 49.98780 | 14.95968 | 7.89768 |
| $d_{13}$ | 20.74150 | 12.47266 | 4.81483 |

-continued

|  | W | S | T |
|---|---|---|---|
| $d_{18}$ | 2.75692 | 5.61404 | 10.58915 |
| $d_{21}$ | 7.73772 | 5.38351 | 6.87877 |
| $d_{26}$ | 2.75000 | 9.90480 | 11.70852 |

EXAMPLE 21

| $r_1 = 104.3405$ | $d_1 = 2.2000$ | $n_{d1} = 1.84666$ | $\nu_{d1} = 23.78$ |
|---|---|---|---|
| $r_2 = 59.5725$ | $d_2 = 11.0000$ | $n_{d2} = 1.49700$ | $\nu_{d2} = 81.54$ |
| $r_3 = -1321.3547$ | $d_3 = 0.2750$ | | |
| $r_4 = 47.5960$ | $d_4 = 6.1875$ | $n_{d3} = 1.69680$ | $\nu_{d3} = 55.53$ |
| $r_5 = 136.8909$ | $d_5 = $ (Variable) | | |
| $r_6 = 140.6680$ | $d_6 = 1.9010$ | $n_{d4} = 1.80610$ | $\nu_{d4} = 40.92$ |
| $r_7 = 13.7491$ (Aspheric) | $d_7 = 6.1875$ | | |
| $r_8 = -60.0958$ | $d_8 = 1.6500$ | $n_{d5} = 1.83400$ | $\nu_{d5} = 37.16$ |
| $r_9 = 61.9207$ | $d_9 = 4.1250$ | | |
| $r_{10} = -21.5206$ | $d_{10} = 1.3750$ | $n_{d6} = 1.63930$ | $\nu_{d6} = 44.87$ |
| $r_{11} = 56.5075$ | $d_{11} = 3.4375$ | | |
| $r_{12} = 96.6074$ | $d_{12} = 5.5000$ | $n_{d7} = 1.80100$ | $\nu_{d7} = 34.97$ |
| $r_{13} = -25.9673$ | $d_{13} = $ (Variable) | | |
| $r_{14} = \infty$ (Stop) | $d_{14} = 2.7500$ | | |
| $r_{15} = -40.0734$ | $d_{15} = 1.2375$ | $n_{d8} = 1.60311$ | $\nu_{d8} = 60.64$ |
| $r_{16} = -78.4453$ | $d_{16} = $ (Variable) | | |
| $r_{17} = 34.7554$ | $d_{17} = 4.8125$ | $n_{d9} = 1.80809$ | $\nu_{d9} = 22.76$ |
| $r_{18} = 1028.4306$ | $d_{18} = 0.2062$ | | |
| $r_{19} = 60.9355$ (Aspheric) | $d_{19} = 4.4000$ | $n_{d10} = 1.80610$ | $\nu_{d10} = 40.92$ |
| $r_{20} = -29.1117$ | $d_{20} = 1.3750$ | $n_{d11} = 1.84666$ | $\nu_{d11} = 23.78$ |
| $r_{21} = 127.3373$ | $d_{21} = $ (Variable) | | |
| $r_{22} = 32.2756$ | $d_{22} = 2.7500$ | $n_{d12} = 1.60342$ | $\nu_{d12} = 38.03$ |
| $r_{23} = 145.1897$ | $d_{23} = 1.3750$ | $n_{d13} = 1.77250$ | $\nu_{d13} = 49.60$ |
| $r_{24} = 16.7202$ | $d_{24} = $ (Variable) | | |
| $r_{25} = 33.5170$ | $d_{25} = 7.5625$ | $n_{d14} = 1.49700$ | $\nu_{d14} = 81.54$ |
| $r_{26} = -27.9038$ (Aspheric) | $d_{26} = 0.2062$ | | |
| $r_{27} = 69.1174$ | $d_{27} = 1.3750$ | $n_{d15} = 1.84666$ | $\nu_{d15} = 23.78$ |
| $r_{28} = 19.6221$ | $d_{28} = 6.1875$ | $n_{d16} = 1.49700$ | $\nu_{d16} = 81.54$ |
| $r_{29} = -57.6668$ | $d_{29} = $ (Variable) | | |
| $r_{30} = \infty$ | $d_{30} = 23.3750$ | $n_{d17} = 1.51633$ | $\nu_{d17} = 64.14$ |
| $r_{31} = \infty$ | $d_{31} = 1.3750$ | | |
| $r_{32} = \infty$ | $d_{32} = 2.2000$ | $n_{d18} = 1.54771$ | $\nu_{d18} = 62.84$ |
| $r_{33} = \infty$ | $d_{33} = 1.3750$ | | |
| $r_{34} = \infty$ | $d_{34} = 1.0313$ | $n_{d19} = 1.52300$ | $\nu_{d19} = 55.00$ |
| $r_{35} = \infty$ | $d_{35} = 3.2477$ | | |
| $r_{36} = \infty$ | | | |

Aspherical Coefficients
7 th surface
K=0
$A_4 = -9.7269 \times 10^{-6}$
$A_6 = -1.1309 \times 10^{-7}$
$A_8 = 6.4969 \times 10^{-10}$
$A_{10} = 0.0000$
19 th surface
K=0
$A_4 = -7.1713 \times 10^{-6}$
$A_6 = -1.9289 \times 10^{-9}$
$A_8 = -3.9414 \times 10^{-11}$
$A_{10} = 2.4197 \times 10^{-13}$
26 th surface
K=0
$A_4 = -5.4190 \times 10^{-7}$
$A_6 = -2.7019 \times 10^{-8}$
$A_8 = -3.8924 \times 10^{-11}$
$A_{10} = 0.0000$ Zooming Data (∞)

|  | W | S | T |
|---|---|---|---|
| f (mm) | 7.14571 | 18.85522 | 50.04974 |
| $F_{NO}$ | 2.0047 | 2.3661 | 2.8509 |
| ω (°) | 38.44 | 15.98 | 6.16 |
| $d_5$ | 1.37500 | 21.94583 | 42.47373 |
| $d_{13}$ | 50.65754 | 14.25486 | 5.45806 |
| $d_{16}$ | 21.33520 | 12.38223 | 5.88901 |
| $d_{21}$ | 2.74731 | 5.18781 | 10.57000 |
| $d_{24}$ | 7.02907 | 7.05019 | 6.86418 |
| $d_{29}$ | 2.75000 | 9.01050 | 10.53508 |

EXAMPLE 22

| $r_1 = 131.8770$ | $d_1 = 2.6000$ | $n_{d1} = 1.84666$ | $\nu_{d1} = 23.78$ |
|---|---|---|---|
| $r_2 = 77.6142$ | $d_2 = 0.2000$ | | |
| $r_3 = 80.8510$ | $d_3 = 6.3796$ | $n_{d2} = 1.49700$ | $\nu_{d2} = 81.54$ |
| $r_4 = -2977.8302$ | $d_4 = 0.2000$ | | |
| $r_5 = 67.0321$ | $d_5 = 5.0727$ | $n_{d3} = 1.69680$ | $\nu_{d3} = 55.53$ |
| $r_6 = 266.3144$ | $d_6 = $ (Variable) | | |
| $r_7 = 1181.5043$ | $d_7 = 1.7000$ | $n_{d4} = 1.77250$ | $\nu_{d4} = 49.60$ |
| $r_8 = 17.1175$ | $d_8 = 8.6482$ | | |
| $r_9 = -77.8867$ (Aspheric) | $d_9 = 0.2000$ | $n_{d5} = 1.53508$ | $\nu_{d5} = 40.94$ |
| $r_{10} = -246.1158$ | $d_{10} = 1.3000$ | $n_{d6} = 1.77250$ | $\nu_{d6} = 49.60$ |
| $r_{11} = 430.0786$ | $d_{11} = 4.1745$ | | |
| $r_{12} = -24.0715$ | $d_{12} = 1.1790$ | $n_{d7} = 1.48749$ | $\nu_{d7} = 70.23$ |
| $r_{13} = -346.5320$ | $d_{13} = 4.4844$ | $n_{d8} = 1.84666$ | $\nu_{d8} = 23.78$ |
| $r_{14} = -42.2965$ | $d_{14} = $ (Variable) | | |
| $r_{15} = -13.2198$ | $d_{15} = 1.3000$ | $n_{d9} = 1.77250$ | $\nu_{d9} = 49.60$ |
| $r_{16} = -14.9920$ | $d_{16} = 1.0969$ | | |
| $r_{17} = \infty$ (Stop) | $d_{17} = $ (Variable) | | |
| $r_{18} = 23.9865$ (Aspheric) | $d_{18} = 5.3859$ | $n_{d10} = 1.49700$ | $\nu_{d10} = 81.54$ |
| $r_{19} = -62.7302$ | $d_{19} = 0.4217$ | | |
| $r_{20} = 65.9532$ | $d_{20} = 1.1010$ | $n_{d11} = 1.80610$ | $\nu_{d11} = 40.92$ |
| $r_{21} = 18.5852$ | $d_{21} = 5.1465$ | $n_{d12} = 1.49700$ | $\nu_{d12} = 81.54$ |
| $r_{22} = -44.8828$ | $d_{22} = $ (Variable) | | |
| $r_{23} = -97.1974$ | $d_{23} = 0.9000$ | $n_{d13} = 1.51633$ | $\nu_{d13} = 64.14$ |
| $r_{24} = 13.4425$ | $d_{24} = 3.0840$ | $n_{d14} = 1.84666$ | $\nu_{d14} = 23.78$ |
| $r_{25} = 18.2242$ | $d_{25} = $ (Variable) | | |
| $r_{26} = 22.8739$ (Aspheric) | $d_{26} = 4.4524$ | $n_{d15} = 1.49700$ | $\nu_{d15} = 81.54$ |
| $r_{27} = -32.9476$ | $d_{27} = 0.1500$ | | |
| $r_{28} = 111.9927$ | $d_{28} = 3.9237$ | $n_{d16} = 1.61800$ | $\nu_{d16} = 63.33$ |
| $r_{29} = -19.6931$ | $d_{29} = 1.0000$ | $n_{d17} = 1.84666$ | $\nu_{d17} = 23.78$ |
| $r_{30} = -150.1546$ | $d_{30} = $ (Variable) | | |
| $r_{31} = \infty$ | $d_{31} = 16.0000$ | $n_{d18} = 1.51633$ | $\nu_{d18} = 64.14$ |
| $r_{32} = \infty$ | $d_{32} = 1.0000$ | | |
| $r_{33} = \infty$ | $d_{33} = 2.6000$ | $n_{d19} = 1.54771$ | $\nu_{d19} = 62.84$ |
| $r_{34} = \infty$ | $d_{34} = 1.0000$ | | |
| $r_{35} = \infty$ | $d_{35} = 0.7500$ | $n_{d20} = 1.51633$ | $\nu_{d20} = 64.14$ |
| $r_{36} = \infty$ | $d_{36} = 1.2400$ | | |
| $r_{37} = \infty$ | | | |

Aspherical Coefficients
9 th surface
K=0
$A_4 = 2.1755 \times 10^{-5}$
$A_6 = 7.8908 \times 10^{-8}$
$A_8 = -3.9978 \times 10^{-10}$
$A_{10} = 1.3455 \times 10^{-12}$
18 th surface
K=0
$A_4 = -1.6485 \times 10^{-5}$
$A_6 = 1.0262 \times 10^{-8}$
$A_8 = -3.9805 \times 10^{-10}$
$A_{10} = 3.5368 \times 10^{-12}$ 26 th surface  
K=0  
$A_4 = -1.4825 \times 10^{-5}$  
$A_6 = -5.9281 \times 10^{-8}$  
$A_8 = 7.7542 \times 10^{-10}$  
$A_{10} = -4.4522 \times 10^{-12}$  
Zooming Data (∞)

|  | W | WS | S | ST | T |
|---|---|---|---|---|---|
| f (mm) | 7.25994 | 12.99981 | 23.29962 | 41.72909 | 74.74765 |
| $F_{NO}$ | 2.8000 | 3.3689 | 3.5000 | 3.5000 | 3.5000 |
| ω (°) | 38.50 | — | 13.16 | — | 4.16 |
| $d_6$ | 1.61417 | 10.64862 | 30.77400 | 47.23205 | 58.71613 |
| $d_{14}$ | 44.70529 | 23.26327 | 13.31755 | 6.20175 | 2.00079 |
| $d_{17}$ | 17.54504 | 10.44417 | 7.81832 | 5.52178 | 1.09606 |
| $d_{22}$ | 1.50000 | 7.82981 | 12.51540 | 16.74044 | 22.56134 |
| $d_{25}$ | 10.82401 | 10.71984 | 7.99123 | 5.55224 | 4.75986 |
| $d_{30}$ | 4.54790 | 5.42312 | 6.09200 | 6.60249 | 5.99969 |

EXAMPLE 23

| | | | |
|---|---|---|---|
| $r_1 = 120.4727$ | $d_1 = 2.6000$ | $n_{d1} = 1.84666$ | $v_{d1} = 23.78$ |
| $r_2 = 73.3708$ | $d_2 = 0.2000$ | | |
| $r_3 = 76.1454$ | $d_3 = 6.5370$ | $n_{d2} = 1.49700$ | $v_{d2} = 81.54$ |
| $r_4 = 2489.4366$ | $d_4 = 0.2000$ | | |
| $r_5 = 67.2263$ | $d_5 = 5.1710$ | $n_{d3} = 1.69680$ | $v_{d3} = 55.53$ |
| $r_6 = 274.6988$ | $d_6 =$ (Variable) | | |
| $r_7 = 714.7087$ | $d_7 = 1.7000$ | $n_{d4} = 1.77250$ | $v_{d4} = 49.60$ |
| $r_8 = 16.1327$ | $d_8 = 8.7770$ | | |
| $r_9 = -81.5087$ (Aspheric) | $d_9 = 1.5000$ | $n_{d5} = 1.69350$ | $v_{d5} = 53.20$ |
| $r_{10} = -1305.7058$ | $d_{10} = 4.0368$ | | |
| $r_{11} = -20.2734$ | $d_{11} = 1.1790$ | $n_{d6} = 1.48749$ | $v_{d6} = 70.23$ |
| $r_{12} = -62.9405$ | $d_{12} = 4.8993$ | $n_{d7} = 1.84666$ | $v_{d7} = 23.78$ |
| $r_{13} = -30.8273$ | $d_{13} =$ (Variable) | | |
| $r_{14} = -15.4268$ | $d_{14} = 1.3000$ | $n_{d8} = 1.77250$ | $v_{d8} = 49.60$ |
| $r_{15} = -18.4448$ | $d_{15} = 1.1025$ | | |
| $r_{16} = \infty$ (Stop) | $d_{16} =$ (Variable) | | |
| $r_{17} = 25.1535$ (Aspheric) | $d_{17} = 5.5136$ | $n_{d9} = 1.49700$ | $v_{d9} = 81.54$ |
| $r_{18} = -55.2846$ | $d_{18} = 1.5487$ | | |
| $r_{19} = 64.5304$ | $d_{19} = 1.1010$ | $n_{d10} = 1.80610$ | $v_{d10} = 40.92$ |
| $r_{20} = 18.9507$ | $d_{20} = 5.1163$ | $n_{d11} = 1.49700$ | $v_{d11} = 81.54$ |
| $r_{21} = -43.1776$ | $d_{21} =$ (Variable) | | |
| $r_{22} = -77.9341$ | $d_{22} = 0.9000$ | $n_{d12} = 1.51633$ | $v_{d12} = 64.14$ |
| $r_{23} = 13.4277$ | $d_{23} = 3.4850$ | $n_{d13} = 1.84666$ | $v_{d13} = 23.78$ |
| $r_{24} = 17.9962$ | $d_{24} =$ (Variable) | | |
| $r_{25} = 21.5792$ (Aspheric) | $d_{25} = 4.5936$ | $n_{d14} = 1.49700$ | $v_{d14} = 81.54$ |
| $r_{26} = -34.1855$ | $d_{26} = 0.1500$ | | |
| $r_{27} = 300.7621$ | $d_{27} = 4.4791$ | $n_{d15} = 1.61800$ | $v_{d15} = 63.33$ |
| $r_{28} = -17.4341$ | $d_{28} = 1.0000$ | $n_{d16} = 1.84666$ | $v_{d16} = 23.78$ |
| $r_{29} = -75.6852$ | $d_{29} =$ (Variable) | | |
| $r_{30} = \infty$ | $d_{30} = 16.0000$ | $n_{d17} = 1.51633$ | $v_{d17} = 64.14$ |
| $r_{31} = \infty$ | $d_{31} = 1.0000$ | | |
| $r_{32} = \infty$ | $d_{32} = 2.6000$ | $n_{d18} = 1.54771$ | $v_{d18} = 62.84$ |
| $r_{33} = \infty$ | $d_{33} = 1.0000$ | | |
| $r_{34} = \infty$ | $d_{34} = 0.7500$ | $n_{d19} = 1.51633$ | $v_{d19} = 64.14$ |
| $r_{35} = \infty$ | $d_{35} = 1.2400$ | | |
| $r_{36} = \infty$ | | | |

Aspherical Coefficients  
9 th surface  
K=0  
$A_4 = 1.8629 \times 10^{-5}$  
$A_6 = 6.9168 \times 10^{-8}$  
$A_8 = -2.7327 \times 10^{-10}$  
$A_{10} = 1.2121 \times 10^{-12}$ 17 th surface  
K=0  
$A_4 = -1.6089 \times 10^{-5}$  
$A_6 = -2.0073 \times 10^{-8}$  
$A_8 = 3.8142 \times 10^{-10}$  
$A_{10} = -2.1082 \times 10^{-12}$  
25 th surface  
K=0  
$A_4 = -1.5463 \times 10^{-5}$  
$A_6 = -2.6231 \times 10^{-8}$  
$A_8 = 2.4043 \times 10^{-10}$  
$A_{10} = -9.6547 \times 10^{-13}$  
Zooming Data (∞)

|  | W | S | T |
|---|---|---|---|
| f (mm) | 7.25982 | 23.29910 | 74.74396 |
| $F_{NO}$ | 2.8000 | 3.5000 | 3.5000 |
| ω (°) | 40.41 | 14.08 | 4.46 |
| $d_6$ | 1.59627 | 31.97645 | 59.22440 |
| $d_{13}$ | 44.75692 | 12.18599 | 2.03777 |
| $d_{16}$ | 17.39564 | 8.62546 | 1.04694 |
| $d_{21}$ | 1.58062 | 11.29335 | 21.65579 |
| $d_{24}$ | 9.55837 | 6.83300 | 4.68713 |
| $d_{29}$ | 4.66609 | 6.44892 | 5.81086 |

EXAMPLE 24

| | | | |
|---|---|---|---|
| $r_1 = 128.7222$ | $d_1 = 2.6000$ | $n_{d1} = 1.84666$ | $v_{d1} = 23.78$ |
| $r_2 = 76.5762$ | $d_2 = 0.1990$ | | |
| $r_3 = 79.6940$ | $d_3 = 6.4626$ | $n_{d2} = 1.49700$ | $v_{d2} = 81.54$ |
| $r_4 = -2955.9452$ | $d_4 = 0.2000$ | | |
| $r_5 = 67.1272$ | $d_5 = 5.0669$ | $n_{d3} = 1.69680$ | $v_{d3} = 55.53$ |
| $r_6 = 263.8928$ | $d_6 =$ (Variable) | | |
| $r_7 = 380.2582$ | $d_7 = 1.7000$ | $n_{d4} = 1.77250$ | $v_{d4} = 49.60$ |
| $r_8 = 15.9616$ | $d_8 = 8.7181$ | | |
| $r_9 = -59.9828$ | $d_9 = 1.5000$ | $n_{d5} = 1.69350$ | $v_{d5} = 53.20$ |
| $r_{10} = -301.9443$ (Aspheric) | $d_{10} = 3.8167$ | | |
| $r_{11} = -20.5627$ | $d_{11} = 1.1790$ | $n_{d6} = 1.48749$ | $v_{d6} = 70.23$ |
| $r_{12} = -59.0207$ | $d_{12} = 5.1126$ | $n_{d7} = 1.84666$ | $v_{d7} = 23.78$ |
| $r_{13} = -30.2745$ | $d_{13} =$ (Variable) | | |
| $r_{14} = -15.4364$ | $d_{14} = 1.3000$ | $n_{d8} = 1.77250$ | $v_{d8} = 49.60$ |
| $r_{15} = -18.6107$ | $d_{15} = 1.1009$ | | |
| $r_{16} = \infty$ (Stop) | $d_{16} =$ (Variable) | | |
| $r_{17} = 25.8357$ (Aspheric) | $d_{17} = 5.4824$ | $n_{d9} = 1.49700$ | $v_{d9} = 81.54$ |
| $r_{18} = -58.3524$ | $d_{18} = 1.9683$ | | |
| $r_{19} = 67.3450$ | $d_{19} = 1.1010$ | $n_{d10} = 1.80610$ | $v_{d10} = 40.92$ |
| $r_{20} = 19.5738$ | $d_{20} = 5.1220$ | $n_{d11} = 1.49700$ | $v_{d11} = 81.54$ |
| $r_{21} = -40.5031$ | $d_{21} =$ (Variable) | | |
| $r_{22} = -94.9007$ | $d_{22} = 0.9000$ | $n_{d12} = 1.51633$ | $v_{d12} = 64.14$ |
| $r_{23} = 13.4666$ | $d_{23} = 3.4715$ | $n_{d13} = 1.84666$ | $v_{d13} = 23.78$ |
| $r_{24} = 17.9806$ | $d_{24} =$ (Variable) | | |
| $r_{25} = 20.7610$ (Aspheric) | $d_{25} = 4.5646$ | $n_{d14} = 1.49700$ | $v_{d14} = 81.54$ |
| $r_{26} = -34.2142$ | $d_{26} = 0.1500$ | | |
| $r_{27} = 513.7109$ | $d_{27} = 4.4703$ | $n_{d15} = 1.61800$ | $v_{d15} = 63.33$ |
| $r_{28} = -17.8110$ | $d_{28} = 1.0000$ | $n_{d16} = 1.84666$ | $v_{d16} = 23.78$ |
| $r_{29} = -83.6823$ | $d_{29} =$ (Variable) | | |
| $r_{30} = \infty$ | $d_{30} = 16.0000$ | $n_{d17} = 1.51633$ | $v_{d17} = 64.14$ |
| $r_{31} = \infty$ | $d_{31} = 1.0000$ | | |
| $r_{32} = \infty$ | $d_{32} = 2.6000$ | $n_{d18} = 1.54771$ | $v_{d18} = 62.84$ |
| $r_{33} = \infty$ | $d_{33} = 1.0000$ | | |
| $r_{34} = \infty$ | $d_{34} = 0.7500$ | $n_{d19} = 1.51633$ | $v_{d19} = 64.14$ |
| $r_{35} = \infty$ | $d_{35} = 1.2400$ | | |
| $r_{36} = \infty$ | | | |

Aspherical Coefficients
10 th surface
K=0
$A_4=-1.7426\times10^{-5}$
$A_6=-6.5228\times10^{-8}$
$A_8=2.7392\times10^{-10}$
$A_{10}=-7.9412\times10^{-13}$
17 th surface
K=0
$A_4=-1.6148\times10^{-5}$
$A_6=6.2346\times10^{-9}$
$A_8=-1.2987\times10^{-10}$
$A_{10}=1.1435\times10^{-12}$
25 th surface
K=0
$A_4=-1.7043\times10^{-5}$
$A_6=-3.2560\times10^{-9}$
$A_8=2.8184\times10^{-10}$
$A_{10}=-1.6473\times10^{-12}$
Zooming Data (∞)

|  | W | S | T |
|---|---|---|---|
| f (mm) | 7.25999 | 23.30005 | 74.75174 |
| $F_{NO}$ | 2.8000 | 3.5000 | 3.5000 |
| ω (°) | 38.46 | 13.17 | 4.17 |
| $d_6$ | 1.60767 | 32.04855 | 59.57895 |
| $d_{13}$ | 44.71134 | 12.27559 | 2.02865 |
| $d_{16}$ | 17.18153 | 8.38526 | 1.03922 |
| $d_{21}$ | 1.50000 | 11.41739 | 21.29066 |
| $d_{24}$ | 9.89355 | 6.80745 | 4.59258 |
| $d_{29}$ | 4.61028 | 6.57526 | 6.26289 |

EXAMPLE 25

| | | | |
|---|---|---|---|
| $r_1$ = 125.0583 | $d_1$ = 2.6000 | $n_{d1}$ = 1.84666 | $v_{d1}$ = 23.78 |
| $r_2$ = 75.8265 | $d_2$ = 0.2052 | | |
| $r_3$ = 78.8734 | $d_3$ = 6.6854 | $n_{d2}$ = 1.49700 | $v_{d2}$ = 81.54 |
| $r_4$ = −1567.5318 | $d_4$ = 0.2000 | | |
| $r_5$ = 66.2728 | $d_5$ = 5.0118 | $n_{d3}$ = 1.69680 | $v_{d3}$ = 55.53 |
| $r_6$ = 235.6712 | $d_6$ = (Variable) | | |
| $r_7$ = 304.4445 | $d_7$ = 1.7000 | $n_{d4}$ = 1.77250 | $v_{d4}$ = 49.60 |
| $r_8$ = 16.9298 | $d_8$ = 8.3012 | | |
| $r_9$ = −67.4212 | $d_9$ = 1.5000 | $n_{d5}$ = 1.77250 | $v_{d5}$ = 49.60 |
| $r_{10}$ = 58.4741 | $d_{10}$ = 4.0559 | | |
| $r_{11}$ = −33.1641 | $d_{11}$ = 1.1790 | $n_{d6}$ = 1.48749 | $v_{d6}$ = 70.23 |
| $r_{12}$ = 123.4460 | $d_{12}$ = 4.7343 | $n_{d7}$ = 1.68893 | $v_{d7}$ = 31.07 |
| $r_{13}$ = −32.8044 (Aspheric) | $d_{13}$ = (Variable) | | |
| $r_{14}$ = −13.3788 | $d_{14}$ = 1.3000 | $n_{d8}$ = 1.77250 | $v_{d8}$ = 49.60 |
| $r_{15}$ = −14.1982 | $d_{15}$ = 0.9997 | | |
| $r_{16}$ = ∞ (Stop) | $d_{16}$ = (Variable) | | |
| $r_{17}$ = 21.1913 (Aspheric) | $d_{17}$ = 5.3343 | $n_{d9}$ = 1.49700 | $v_{d9}$ = 81.54 |
| $r_{18}$ = −53.8005 | $d_{18}$ = 0.3147 | | |
| $r_{19}$ = 53.6050 | $d_{19}$ = 1.1010 | $n_{d10}$ = 1.80610 | $v_{d10}$ = 40.92 |
| $r_{20}$ = 16.0840 | $d_{20}$ = 5.1135 | $n_{d11}$ = 1.49700 | $v_{d11}$ = 81.54 |
| $r_{21}$ = −142.9938 | $d_{21}$ = (Variable) | | |
| $r_{22}$ = −42.8783 | $d_{22}$ = 0.9000 | $n_{d12}$ = 1.51633 | $v_{d12}$ = 64.14 |
| $r_{23}$ = 13.9697 | $d_{23}$ = 3.3288 | $n_{d13}$ = 1.84666 | $v_{d13}$ = 23.78 |
| $r_{24}$ = 21.2945 | $d_{24}$ = (Variable) | | |
| $r_{25}$ = 31.1501 (Aspheric) | $d_{25}$ = 4.3266 | $n_{d14}$ = 1.49700 | $v_{d14}$ = 81.54 |
| $r_{26}$ = −23.5905 | $d_{26}$ = 0.1500 | | |
| $r_{27}$ = 911.4978 | $d_{27}$ = 4.2792 | $n_{d15}$ = 1.61800 | $v_{d15}$ = 63.33 |
| $r_{28}$ = −15.3539 | $d_{28}$ = 1.0000 | $n_{d16}$ = 1.84666 | $v_{d16}$ = 23.78 |
| $r_{29}$ = −50.5690 | $d_{29}$ = (Variable) | | |
| $r_{30}$ = ∞ | $d_{30}$ = 16.0000 | $n_{d17}$ = 1.51633 | $v_{d17}$ = 64.14 |
| $r_{31}$ = ∞ | $d_{31}$ = 1.0000 | | |
| $r_{32}$ = ∞ | $d_{32}$ = 2.6000 | $n_{d18}$ = 1.54771 | $v_{d18}$ = 62.84 |
| $r_{33}$ = ∞ | $d_{33}$ = 1.0000 | | |
| $r_{34}$ = ∞ | $d_{34}$ = 0.7500 | $n_{d19}$ = 1.51633 | $v_{d19}$ = 64.14 |
| $r_{35}$ = ∞ | $d_{35}$ = 1.2400 | | |
| $r_{36}$ = ∞ | | | |

Aspherical Coefficients
13 th surface
K=0
$A_4=-7.0043\times10^{-6}$
$A_6=-5.4249\times10^{-9}$
$A_8=3.0262\times10^{-12}$
$A_{10}=0.0000$
17 th surface
K=0
$A_4=-1.8414\times10^{-5}$
$A_6=-1.4788\times10^{-8}$
$A_8=5.9114\times10^{-11}$
$A_{10}=0.0000$
25 th surface
K=0
$A_4=-2.1192\times10^{-5}$
$A_6=-1.3690\times10^{-8}$
$A_8=1.3573\times10^{-10}$
$A_{10}=0.0000$
Zooming Data (∞)

|  | W | S | T |
|---|---|---|---|
| f (mm) | 2.8000 | 3.5000 | 3.5000 |
| $F_{NO}$ | 7.26001 | 23.29997 | 74.74863 |
| ω (°) | 38.37 | 13.00 | 4.12 |
| $d_6$ | 1.71542 | 30.14291 | 58.15917 |
| $d_{13}$ | 44.90072 | 12.40034 | 2.55088 |
| $d_{16}$ | 19.05859 | 8.36633 | 0.99888 |
| $d_{21}$ | 1.50000 | 12.21200 | 22.72088 |
| $d_{24}$ | 8.15011 | 6.36382 | 5.19171 |
| $d_{29}$ | 4.65995 | 6.42650 | 4.45718 |

FIGS. 26 to 50 are aberration diagrams for Examples 1 to 25 upon focused on an object point at infinity. In these diagrams, SA, AS, DT and CC stand for spherical aberrations, astigmatisms, distortions and chromatic aberrations of magnification at the wide-angle end (a), the intermediate state (b) and the telephoto end of the system, respectively, with "FIY" representing an image height.

Enumerated below the values of conditions (1) to (14) in the respective examples.

| Condition | Ex. 1 | Ex. 2 | Ex. 3 | Ex. 4 | Ex. 5 |
|---|---|---|---|---|---|
| (1) | 9.303 | 9.549 | 9.718 | 9.690 | 9.615 |
| (2) | 0.0280 | 0.0280 | 0.0280 | −0.0019 | −0.0019 |
| (3) | 5.104 | 5.097 | 5.172 | 5.302 | 5.296 |
| (4) | −0.331 | −0.122 | −0.068 | −0.171 | −0.175 |
| (5) | 0.581 | 0.570 | 0.557 | 0.594 | 0.610 |
| (6) | 10.296 | 10.296 | 10.296 | 10.296 | 10.296 |
| (7) | −0.287 | −0.288 | −0.269 | −0.285 | −0.281 |
| (8) | 0.058 | 0.182 | 0.151 | 0.068 | −0.039 |
| (9) | 0.010 | 0.085 | 0.159 | 0.235 | 0.257 |
| (10) | 1.637 | 1.349 | 1.465 | 1.724 | 1.691 |
| (11) | 0.306 | 0.069 | −0.139 | −0.618 | −0.545 |
| (12) | 2.846 | 2.846 | 2.891 | 2.846 | 2.956 |
| (13) | 2.800 | 2.800 | 2.800 | 2.800 | 2.800 |
| (14) | 2.984 | 3.206 | 3.124 | 3.060 | 3.066 |

-continued

| Condition | Ex. 6 | Ex. 7 | Ex. 8 | Ex. 9 | Ex. 10 |
|---|---|---|---|---|---|
| (1) | 9.257 | 9.346 | 9.311 | 9.123 | 9.260 |
| (2) | 0.0280 | 0.0280 | 0.0280 | 0.0280 | 0.0280 |
| (3) | 5.096 | 5.073 | 5.202 | 5.373 | 5.163 |
| (4) | −0.366 | −0.508 | −0.366 | −0.750 | −0.362 |
| (5) | 0.592 | 0.566 | 0.610 | 0.643 | 0.610 |
| (6) | 10.297 | 10.296 | 10.296 | 10.295 | 10.297 |
| (7) | −0.274 | −0.297 | −0.275 | −0.326 | −0.257 |
| (8) | 0.075 | 0.264 | 0.034 | 0.524 | 0.143 |
| (9) | 0.015 | 0.057 | 0.190 | 0.315 | −0.034 |
| (10) | 1.744 | 2.059 | 1.668 | 2.280 | 1.622 |
| (11) | 0.223 | −0.117 | 0.000 | — | 0.274 |
| (12) | 2.834 | 2.798 | 2.789 | 2.475 | 2.848 |
| (13) | 2.800 | 2.800 | 2.800 | 2.800 | 2.800 |
| (14) | 2.940 | 2.982 | 3.003 | 2.839 | 3.014 |

| Condition | Ex. 11 | Ex. 12 | Ex. 13 | Ex. 14 | Ex. 15 |
|---|---|---|---|---|---|
| (1) | 9.978 | 9.887 | 9.754 | 10.142 | 9.704 |
| (2) | 0.0280 | 0.0280 | 0.0280 | 0.0280 | 0.0280 |
| (3) | 5.452 | 5.330 | 5.184 | 5.300 | 5.219 |
| (4) | −0.138 | −0.156 | −0.052 | −0.096 | −0.061 |
| (5) | 0.591 | 0.576 | 0.547 | 0.502 | 0.539 |
| (6) | 10.178 | 10.158 | 10.265 | 10.191 | 10.252 |
| (7) | −0.255 | −0.261 | −0.334 | −0.315 | −0.306 |
| (8) | 0.177 | 0.253 | 0.187 | 0.302 | 0.187 |
| (9) | 0.055 | 0.123 | 0.366 | 0.455 | 0.439 |
| (10) | 1.478 | 1.495 | 1.711 | 1.685 | 1.696 |
| (11) | −0.078 | −0.157 | −0.444 | −0.454 | −0.566 |
| (12) | 2.784 | 2.334 | 2.954 | 2.818 | 3.041 |
| (13) | 2.800 | 2.800 | 2.800 | 2.800 | 2.800 |
| (14) | 3.225 | 3.122 | 3.289 | 3.030 | 2.986 |

| Condition | Ex. 16 | Ex. 17 | Ex. 18 | Ex. 19 | Ex. 20 |
|---|---|---|---|---|---|
| (1) | 9.110 | 9.595 | 9.707 | 7.465 | 7.644 |
| (2) | 0.0280 | 0.0280 | 0.0280 | 0.0280 | 0.0051 |
| (3) | 4.827 | 5.289 | 5.296 | 3.927 | 3.727 |
| (4) | −0.075 | −0.149 | −0.153 | 0.090 | 0.026 |
| (5) | 0.542 | 0.603 | 0.589 | 0.704 | 0.584 |
| (6) | 10.273 | 10.272 | 10.272 | 6.996 | 6.988 |
| (7) | −0.286 | −0.270 | −0.264 | −0.294 | −0.346 |
| (8) | 0.149 | 0.235 | 0.238 | 0.045 | 0.606 |
| (9) | 0.165 | 0.060 | 0.088 | 0.415 | 0.562 |
| (10) | 1.376 | 1.470 | 1.481 | 1.784 | 1.448 |
| (11) | −0.139 | −0.108 | −0.120 | — | −0.736 |
| (12) | 2.834 | 2.525 | 2.525 | 3.454 | 3.665 |
| (13) | 2.800 | 2.800 | 2.800 | 2.048 | 2.029 |
| (14) | 2.817 | 3.103 | 3.122 | 3.078 | 2.989 |

| Condition | Ex. 21 | Ex. 22 | Ex. 23 | Ex. 24 | Ex. 25 |
|---|---|---|---|---|---|
| (1) | 7.409 | 9.448 | 8.780 | 9.391 | 9.275 |
| (2) | 0.0280 | 0.0280 | 0.0280 | 0.0280 | 0.0280 |
| (3) | 3.736 | 5.191 | 4.884 | 5.270 | 5.131 |
| (4) | 0.091 | −0.337 | −0.349 | −0.358 | −0.333 |
| (5) | 0.656 | 0.578 | 0.596 | 0.605 | 0.585 |
| (6) | 7.004 | 10.296 | 10.296 | 10.296 | 10.296 |
| (7) | −0.490 | −0.291 | −0.281 | −0.280 | −0.301 |
| (8) | −0.102 | 0.077 | 0.045 | 0.056 | 0.054 |
| (9) | 0.504 | 0.088 | 0.070 | 0.102 | −0.011 |
| (10) | 1.404 | 1.495 | 1.386 | 1.467 | 1.642 |
| (11) | −0.693 | 0.419 | 0.316 | 0.332 | 0.287 |
| (12) | 3.675 | 2.826 | 2.842 | 2.834 | 2.841 |
| (13) | 2.005 | 2.800 | 2.800 | 2.800 | 2.800 |
| (14) | 3.085 | 2.967 | 2.748 | 2.922 | 2.938 |

It is here noted that the resin layer provided on such lens elements as exemplified above is not in itself regarded as any lens element.

While various examples corresponding to the respective embodiments of the present invention have been given, it is appreciated that many other modifications thereto may be feasible without departing the scope of the invention described herein.

For instance, the second lens group G2 in each example may be composed of, in order from its object side, a negative lens element, a negative lens element, a negative lens element, a positive lens element and a positive lens element, as shown in FIG. 10.

The best arrangement for the third through sixth lens groups G3 through G6 is composed of six lens elements as shown in FIG. 19, or ten lens elements as shown in FIG. 19. Of course, it is noted that the number of lens elements in the rear lens groups, too, may be varied in the scope disclosed herein. For instance, it is possible to replace the positive single lens element on the object side of the fourth lens group G4 shown in FIG. 17 by a doublet lens component obtained by cementing together a positive lens element and a negative lens element; that is, it is possible to construct the third through sixth lens groups with 11 lens elements.

Figure 51:
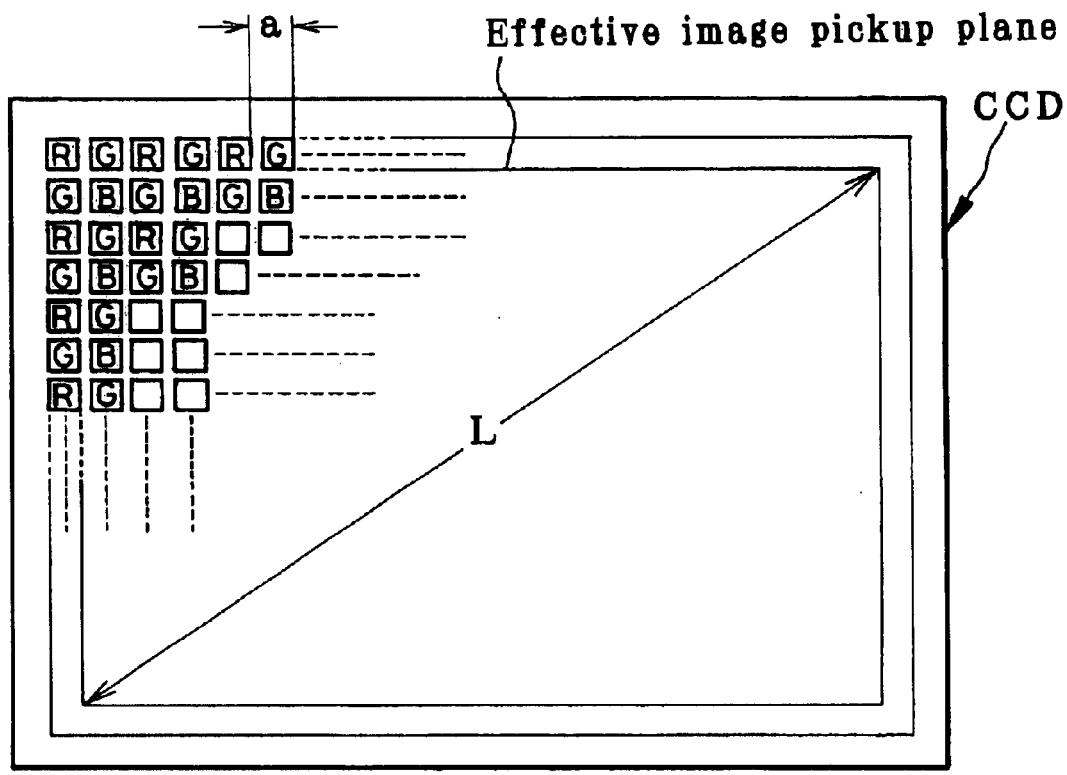
FIG. 51 is illustrative of the diagonal length of an effective image pickup surface for phototaking on an image pickup device.

In what follows, the diagonal length L of the effective image pickup surface and the pixel interval a are now explained. FIG. 51 is illustrative of one exemplary pixel matrix for a given image pickup device. R (red), G (green) and B (blue) pixels are arranged in a mosaic pattern at a pixel interval a. By the term "effective image pickup surface" is intended an area within a photoelectric conversion surface on an image pickup device used for the reproduction of a phototaken image (e.g., for displaying an image on a personal computer or outputting an image to a printer). The effective image pickup surface is set at an area narrower than the overall photoelectric conversion surface of the image pickup device in correspondence to the performance of an optical system (an image circle wherein the performance of the optical system can be assured). The diagonal length L of the effective image pickup surface used herein is understood to mean the diagonal length of this effective image pickup surface. While the image pickup range used for image reproduction may be optionally varied, it is noted that when the zoom lens of the present invention is used for an image pickup device having such functions, there is a change in the diagonal length L of the effective image pickup surface thereof. In such a case, the diagonal length L of the effective image pickup surface according to the present invention is defined by the maximum value in the range allowed for L.

Figure 52:
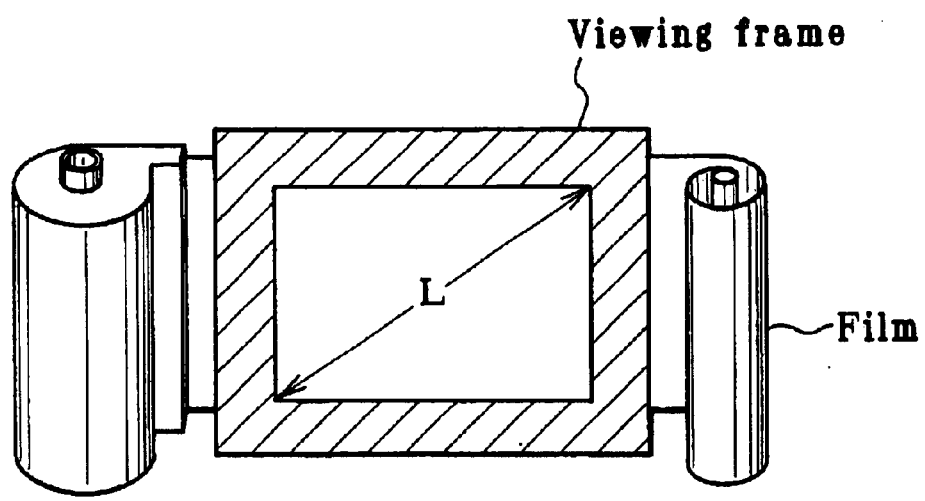
FIG. 52 is illustrative of the diagonal length of an effective image pickup surface for phototaking on a phototaking film.

FIG. 52 is illustrative of the diagonal length of an effective image pickup surface in the case where a phototaking film is used instead of the image pickup device. When an image is formed on the phototaking film, the effective phototaking area is determined by the aperture of a viewing frame located just in front of the film surface. In this case, too, the shape of the viewing frame may be optionally varied. As in the case of FIG. 51, the diagonal length L of the effective phototaking surface according to the present invention is defined by the maximum value in the range allowed for L.

The inventive electronic image pickup device as explained above may be applied to phototaking devices wherein object images are formed through a zoom lens and then received on an image pickup device such as a CCD or a silver-salt film, especially digital cameras, video cameras, information processors represented by personal computers, telephone sets, convenient-to-carry portable telephones, etc., as typically explained below.

Figure 53:
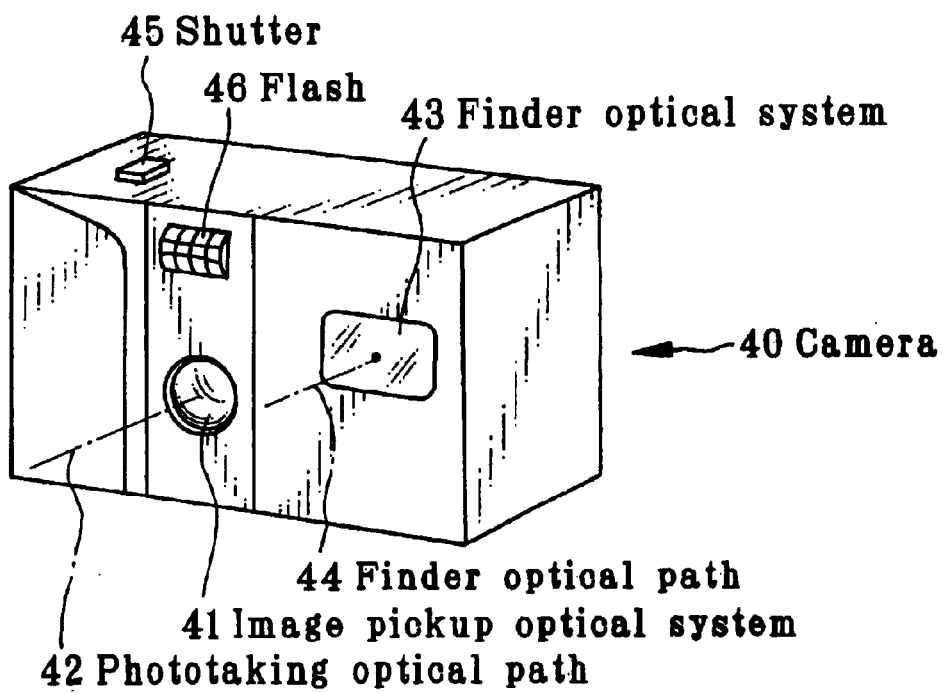
FIG. 53 is a front perspective view illustrative of the outside shape of a digital camera with the inventive zoom lens built therein.
Figure 54:
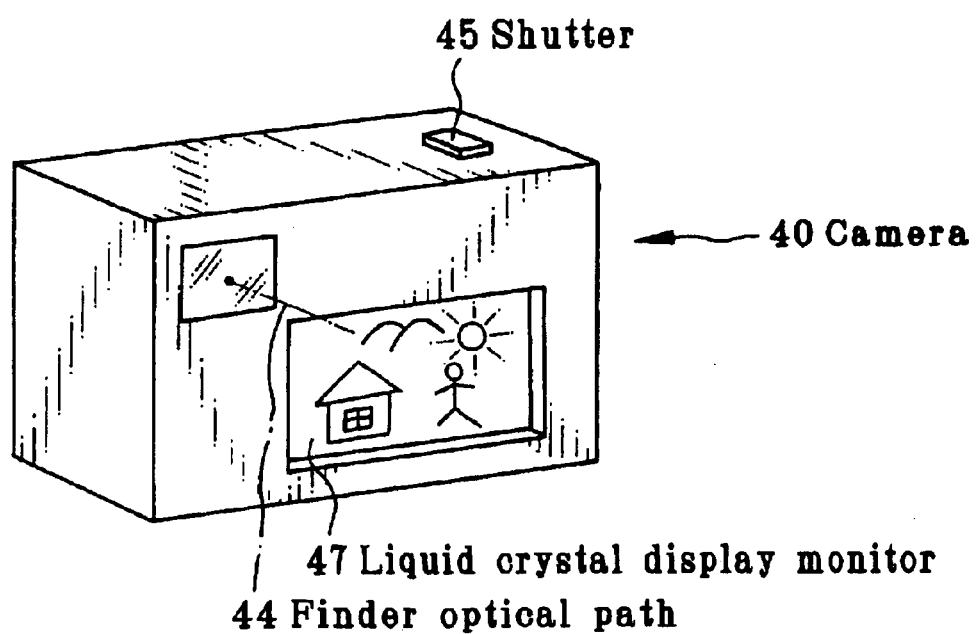
FIG. 54 is a rear perspective view of the digital camera.

How the inventive zoom lens is incorporated in a phototaking optical system 41 of a digital camera is conceptually illustrated in FIGS. 53 through 55. FIG. 53 is a front perspective view of the outside shape of a digital camera 40, and FIG. 54 is a rear perspective view of the same. FIG. 55 is a sectional view illustrative of the construction of the digital camera 40. In this embodiment, the digital camera 40 comprises a phototaking optical system 41 having a phototaking optical path 42, a finder optical system 43 having a finder optical path 44, a shutter 45, a flash 46, a liquid crystal monitor 47, etc. As the shutter 45 attached onto the camera 40 is pressed down, an image is phototaken through the phototaking optical system 41 comprising the inventive zoom lens (roughly illustrated), e.g., the zoom lens system of Example 1. An object image formed through the phototaking optical system 41 is formed on the image pickup surface of a CCD 45 through an optical low-pass filter with an infrared cutting coat applied thereon. The object image received on the CCD 49 is displayed as an electronic image on the liquid crystal monitor 47 attached to the backside of the camera via processing means 51. If this processing means 51 is connected to recording means 52, then it is also possible to record the phototaken electronic image. It is here noted that the recording means 52 may be provided separately from the processing means 51 or, alternatively, may be constructed in such a way that images are written on floppy disks, memory cards, MOs or the like. If a silver-salt film is used instead of the CCD 49, it is then possible to construct a silver-salt camera.

Further, a finder objective optical system 53 is provided on the finder optical path 44. An object image formed by this finder objective optical system 53 is formed on a viewing frame 57 of an image erection Porro prism 55. In the rear of this Porro prism 55, there is disposed an eyepiece optical system 59 for guiding the erected image to the eyeball E of the observer. It is here noted that cover members 50 are provided on the incident sides of the phototaking optical system 45 and finder objective optical system 53, with a cover member 50 located on the exit side of the eyepiece optical system 59.

The thus constructed digital camera 40 can be achieved with high performance yet at low cost, because the phototaking optical system 41 is constructed of the inventive zoom lens which has a wide field angle and a high zoom ratio with improved aberrations and is fast with a back focus enough for receiving filters, etc.

In the FIG. 55 embodiment, plane-parallel plates are used as the cover members 50. However, it is acceptable to use powered lenses instead.

It is noted that the FIG. 55 embodiment is an example of the digital camera wherein the phototaking optical path 42 is located parallel with the finder optical path 44. If a prism for splitting the finder optical path is provided in association with an image pickup surface of the zoom lens system for the phototaking optical system 41, it is then possible to dispense with the finder objective optical system 53 and Porro prism 55 and, instead, provide a penta prism so as to guide a subject image to the eyeball E of an observer via the phototaking optical system 41.

Figure 56A:
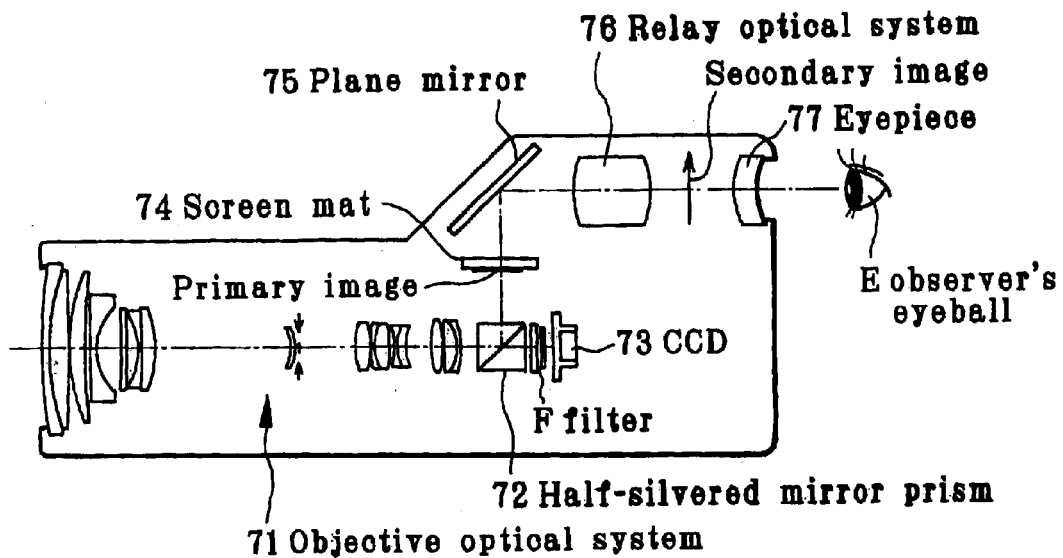
FIG. 56 is a conceptual illustration of a single-lens reflex camera's objective optical system with the inventive zoom lens incorporated therein.

FIG. 56(a) is a conceptual schematic illustrative of an objective optical system for a single-lens reflex camera, in which the inventive zoom lens is incorporated. In this case, too, the zoom lens system of Example 1 is used as an objective optical system 71. An image-formation light beam passing through this objective optical system 71 is split into a phototaking optical path and a finder optical path through a half-silvered mirror prism (a beam splitter or the like) 72. It is here preferable to use a quick-return mirror in place of the half-silvered mirror prism 72, because light quantity losses are avoidable. In the phototaking optical path, there are disposed a filter F such as a low-pass filter or an infrared cut filter and a CCD 73 to form an object image on an image pickup surface of the CCD 73 through the filter F. The finder optical path is provided with a screen mat 74 on a primary image plane formed at a position conjugate to its image pickup surface. This primary image is reflected by a plane mirror 75, and then relayed as a secondary image via a relay optical system 76 where it is erected into an erected image. Finally, the secondary image is guided to the eyeball E of an observer via an eyepiece lens 77.

Figure 56B:
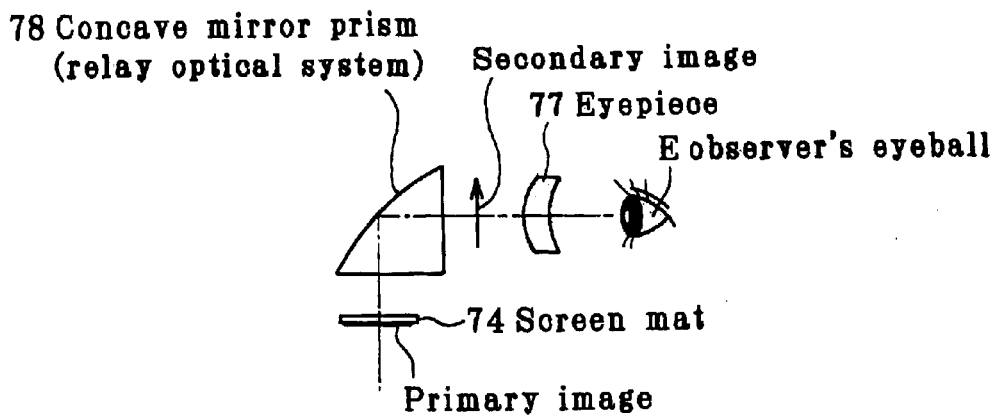

In the finder optical path portion shown in FIG. 56(a), the plane mirror 75 and relay optical system 76 may be replaced by a concave mirror prism 78 having positive power, as shown in FIG. 56(b). With this arrangement, it is possible to achieve some reduction in the number of parts and compactness. It is here noted that this concave mirror prism 78 may be composed of an entrance surface having power and an exit surface having power as well as a reflecting surface defined by not only a rotationally symmetric surface (such as a spherical or aspheric surface) but also a non-rotationally symmetric surface such as an anamorphic or free surface. By using a silver-salt film in place of the CCD 73, it is possible to obtain a silver-salt camera with the silver-salt film loaded therein.

Figure 57:
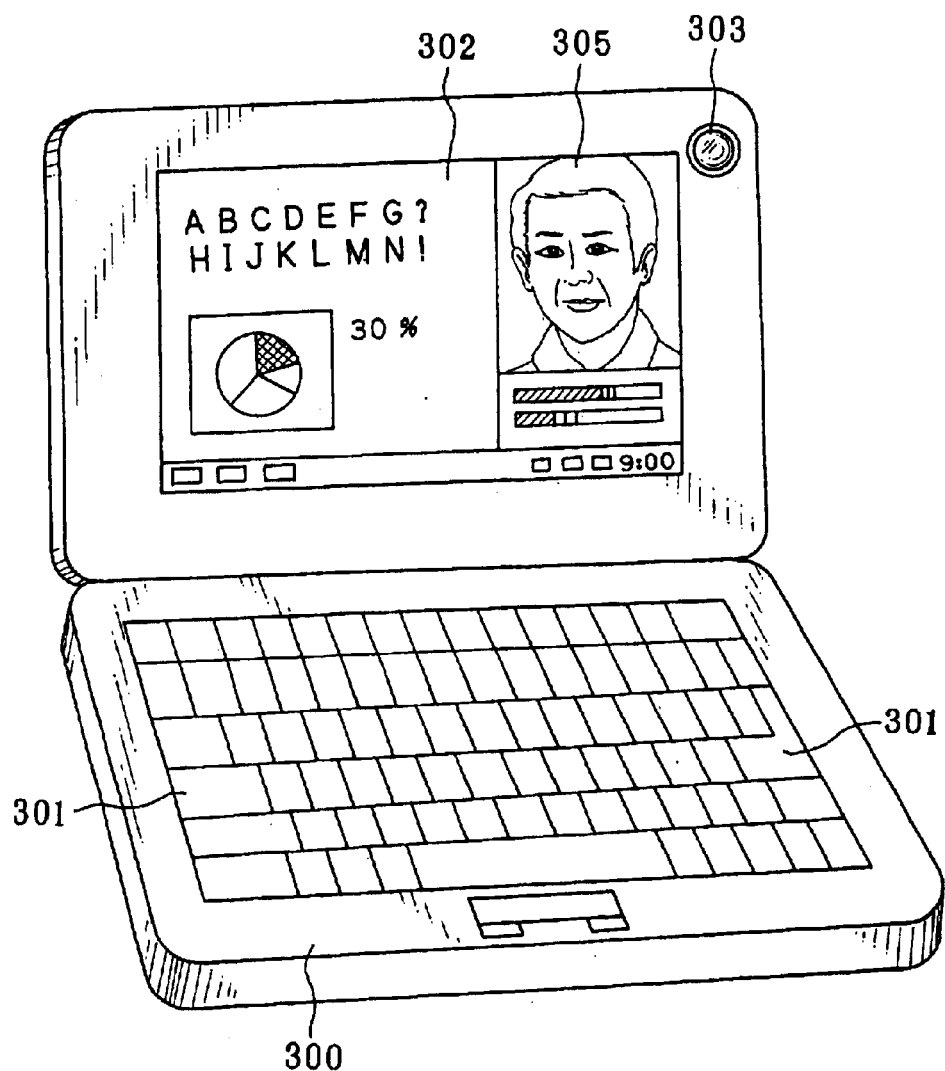
FIG. 57 is a front perspective view illustrative of an uncovered personal computer in which the inventive zoom lens is incorporated as an objective optical system.
Figure 58:
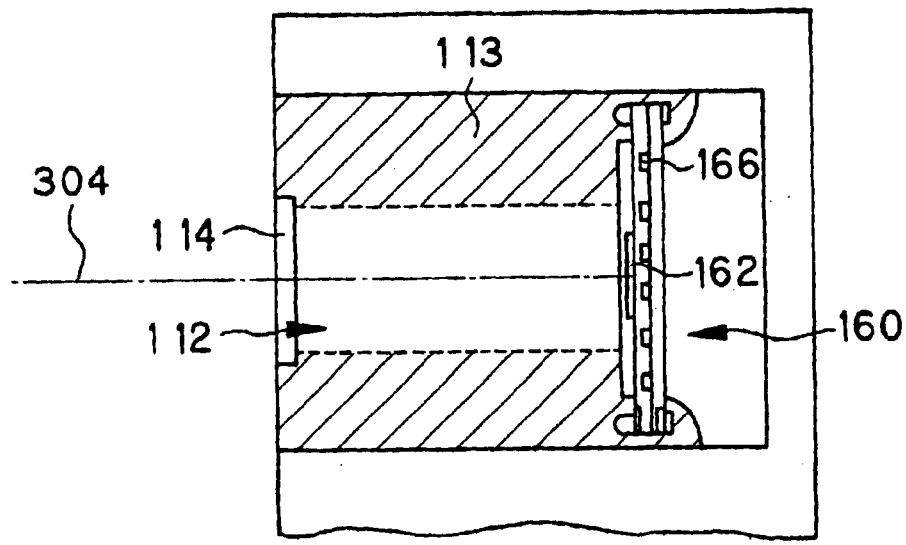
FIG. 58 is a sectional view of a phototaking optical system for a personal computer.
Figure 59:
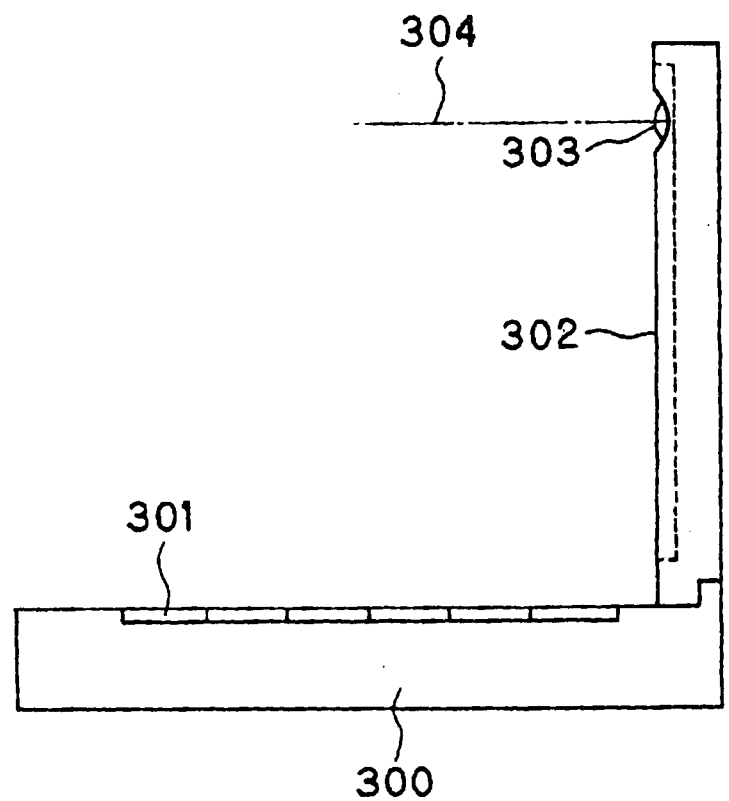
FIG. 59 is a sectional view of the FIG. 57 state.

FIGS. 57 to 59 are illustrative of a personal computer that is one exemplary information processor in which the inventive zoom lens is incorporated as an objective optical system. FIG. 57 is a front perspective view of an uncovered personal computer 300, FIG. 58 is a sectional view of a phototaking optical system 303 in the personal computer 300, and FIG. 59 is a side view of the FIG. 57 state. As can be seen from FIGS. 57 to 59, the personal computer 300 comprises a keyboard 301 via which an operator enters information therein from outside, information processing and recording means (not shown), a monitor 302 for displaying information to the operator and a phototaking optical system 303 for phototaking the image of the operator and the images of objects therearound. The monitor 302 used may be any one of a transmission type liquid crystal display device designed to be illuminated from its backside by a backlight (not shown), a reflection type liquid crystal display device wherein images are displayed by reflecting incoming light, a CRT display, and so on. As shown, the phototaking optical system 302 is built in the right upper portion of the monitor 302. However, it is noted that this phototaking optical system 302 may be located everywhere around the monitor 302 or the keyboard 301.

This phototaking optical system 303 comprises on a phototaking optical path 304 an objective lens 112 formed of the inventive zoom lens (roughly illustrated) and an image pickup device chip 162 for receiving an image. These are built in the personal computer 300.

An optical low-pass filter is additionally applied onto the image pickup device chip 162 to form a monolithic image pickup unit 160, which can be fitted in the rear end of a barrel 113 of the objective lens 112 in one-touch simple operation. Thus, any center or surface alignment of the objective lens 112 and image pickup device chip 162 can be dispensed with, so that these can be easily assembled together. It is noted that the barrel 113 is provided at the end with a cover glass 114 for protection of the objective lens 112 and the driving mechanism for the zoom lens in the barrel 113 is not shown.

An object image received on the image pickup device chip 162 is entered in the processing means of the personal computer 300 through a terminal 166, so that it is displayed as an electronic image on the monitor 302. As an example, an image 305 phototaken of the operator is depicted. It is also possible to display this image 305 on a remote display located on the other end of the computer via the processing means and via the Internet or a telephone.

Figure 60A:
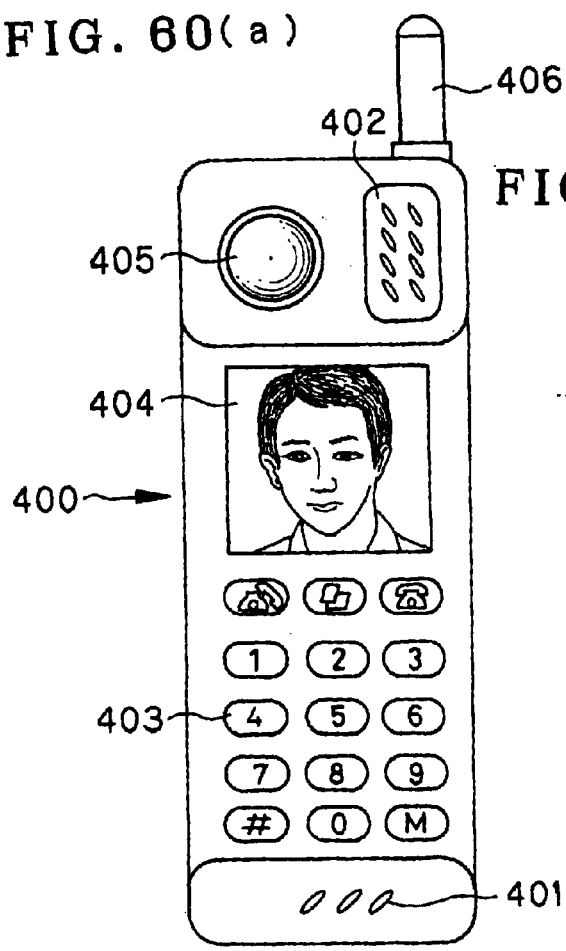
FIGS. 60(a), 60(b) and 60(c) are a front and a side view of a portable telephone in which the inventive zoom lens is incorporated as an objective optical system and a sectional view of a phototaking optical system therefore.
Figure 60B:
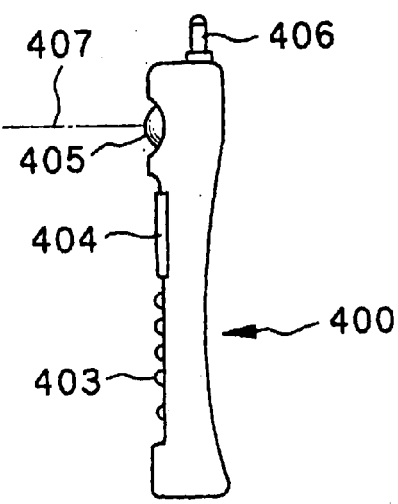
Figure 60C:
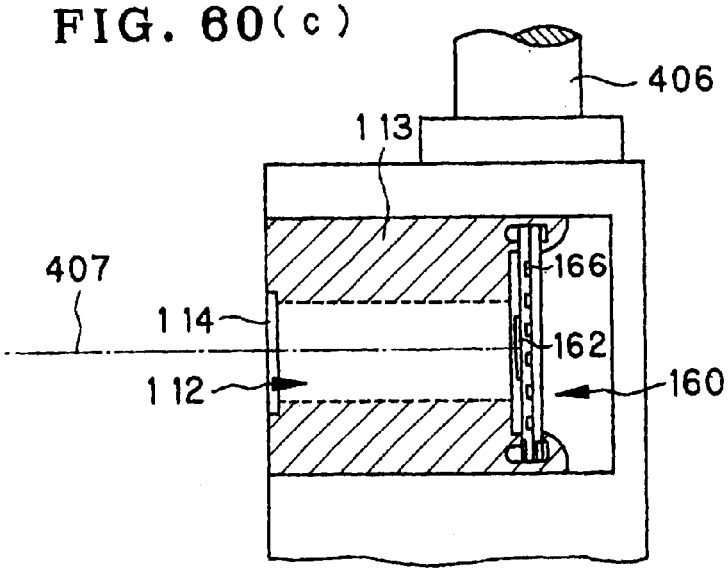

FIGS. 60(a), 60(b) and 60(c) are illustrative of a telephone, especially a convenient-to-carry portable telephone that is one exemplary information processor in which the inventive zoom lens is incorporated as a phototaking optical system. FIG. 60(a) is a front view of a portable telephone 400, FIG. 60(b) is a side view thereof, and FIG. 60(c) is a sectional view of a phototaking optical system 405. As shown in FIGS. 60(a) to 60(c), the portable telephone 400 comprises a microphone portion 401 for entering operator's voice therein as information, a speaker portion 402 for producing the voice of an operator at the other end, an input dial 403 for allowing an operator to enter information therein, a monitor 404 for displaying the image of the operator or the image of the operator at the other end and information such as telephone numbers and processing means (not shown) for processing image information, communication information, input signals and so on. The monitor 404 used herein is a liquid crystal display device. It is noted that the positions where these parts are mounted are not limited to those illustrated. This phototaking optical system 405 comprises an objective lens 112 formed of the inventive zoom lens (roughly shown) disposed on a phototaking optical path 407 and an image pickup device chip 162 for receiving an object image. These are all built in the portable telephone 400.

An optical low-pass filter is additionally applied onto the image pickup device chip 162 to form a monolithic image pickup unit 160, which can be fitted in the rear end of a barrel 113 of the objective lens 112 in one-touch simple operation. Thus, any center or surface alignment of the objective lens 112 and image pickup device chip 162 can be dispensed with, so that these can be easily assembled together. It is noted that the barrel 113 is provided at the end with a cover glass 114 for protection of the objective lens 112 and the driving mechanism for the zoom lens in the barrel 113 is not shown.

An object image received on the image pickup device chip 162 is entered in the processing means (not shown) through a terminal 166, so that it is displayed as an electronic image on the monitor 402 and/or a monitor at the other end. As an example, an image 305 phototaken of the operator is depicted. To transmit images to the operator at the other end, the processing means includes a signal processing function of converting information on the object image received on the image pickup device chip 162 to transmittable signals.

As can be appreciated from the foregoing, the present invention can provide a wide-angle, high-zoom-ratio zoom lens system which is used for cameras having a small effective image pickup surface size such as a digital camera and compatible with TTL optical finders having a diagonal field angle of at least 70° at wide-angle ends and about 7 to 10 magnifications, and is fast as well, as expressed by an F-number of about 2.0 to 2.8 at the wide-angle end.

What we claim is:

1. A zoom lens system comprising, in order from an object side thereof, a first lens group which is movable along an optical axis of said zoom lens system during zooming and has positive refracting power, a second lens group having negative refracting power, wherein a spacing between the first lens group and the second lens group becomes wide upon zooming from a wide-angle end to a telephoto end of said zoom lens system and a rear lens group having at least two movable subgroups, wherein a focal length $f_1$ of said first lens group and anomalous dispersion $\Delta\theta_{gF}$ of at least one positive lens element in said first lens group satisfy the following conditions:

$$6 < f_1/L < 20 \quad (1)$$

$$0.015 < \Delta\theta_{gF} < 0.1 \quad (2)$$

where L is a diagonal length of an effective image pickup surface located in the vicinity of an image-formation plane, and the anomalous dispersion $\Delta\theta_{gF}$ of each medium (vitreous material) is defined by $$\theta_{gF} = A_{gF} + B_{gF} \cdot v_d + \Delta\theta_{gF}$$

with the proviso that $\theta_{gF} = (n_g - n_F)/(n_F - n_C)$ and $v_d = (n_d - 1)/(n_F - n_C)$ wherein $n_d$, $n_F$, $n_C$ and $n_g$ are refractive indices with respect to d-line, F-line, C-line and g-line, respectively, and $A_{gF}$ and $B_{gF}$ are each a linear coefficient determined by two vitreous material types represented by glass code 511605 (available under the trade name of NSL7, Ohara Co., Ltd. with $\theta_{gF} = 0.5436$ and $v_d = 60.49$) and glass code 620363 (available under the trade name of PBM2, Ohara Co., Ltd. with $\theta_{gF} = 0.582$ and $v_d = 36.26$); $A_{gF}$ is 0.641462485 and $B_{gF}$ is −0.001617829.

2. A zoom lens system comprising, in order from an object side thereof, a first lens group which is movable along an optical axis of said zoom lens system during zooming and has positive refracting power, a second lens group having negative refracting power, wherein spacing between the first lens group and the second lens group becomes wide upon zooming from an wide-angle end to a telephoto end of said zoom lens, and at least two rear lens groups which are located subsequent to said second lens group and have a spacing variable during zooming, wherein a focal length $f_1$ of said first lens group satisfies the following condition:

$$6 < f_1/L < 20 \quad (1)$$

where L is a diagonal length of an effective image pickup surface located in the vicinity of an image-formation plane.

3. A zoom lens system comprising, in order from an object side thereof, a first lens group which is movable along an optical axis of said zoom lens system during zooming and has positive refracting power, a second lens group having negative refracting power, wherein a spacing between the first lens group and the second lens group becomes wide upon zooming from an wide-angle end to a telephoto end of said zoom lens and at least two rear lens groups which are located subsequent to said second lens group and have a spacing variable during zooming, wherein a focal length $f_1$ of said first lens group and anomalous dispersion $\Delta\theta_{gF}$ of at least one positive lens element in said first lens group satisfy the following conditions:

$$6 < f_1/L < 20 \quad (1)$$

$$0.015 < \Delta\theta_{gF} < 0.1 \quad (2)$$

where L is a diagonal length of an effective image pickup surface located in the vicinity of an image-formation plane, and the anomalous dispersion $\Delta\theta_{gF}$ of each medium (vitreous material) is defined by $$\theta_{gF} = A_{gF} + B_{gF} \cdot v_d + \Delta\theta_{gF}$$

with the proviso that $\theta_{gF} = (n_g - n_F)/(n_F - n_C)$ and $v_d = (n_d - 1)/(n_F - n_C)$ wherein $n_d$, $n_F$, $n_C$ and $n_g$ are refractive indices with respect to d-line, F-line, C-line and g-line, respectively, and $A_{gF}$ and $B_{gF}$ are each a linear coefficient determined by two vitreous material types represented by glass code 511605 (available under the trade name of NSL7, Ohara Co., Ltd. with $\theta_{gF} = 0.5436$ and $v_d = 60.49$) and glass code 620363 (available under the trade name of PBM2, Ohara Co., Ltd. with $\theta_{gF} = 0.582$ and $v_d = 36.26$); $A_{gF}$ is 0.641462485 and $B_{gF}$ is −0.001617829.

4. A zoom lens system comprising, in order from an object side thereof, a first lens group which is movable along an optical axis of said zoom lens system during zooming and has positive refracting power, a second lens group having negative refracting power, wherein a spacing between the first lens group and the second lens group becomes wide upon zooming from an wide-angle end to a telephoto end of said zoom lens and at least two rear lens groups which are located subsequent to said second lens group and have a spacing variable during zooming, wherein the following condition is satisfied with respect to a composite magnification $\beta_{rW}$ of said rear lens groups when said zoom lens system is focused at said wide-angle end on an object point at infinity:

$$-0.6 < \beta_{rW} < -0.1 \qquad (7).$$

5. A zoom lens system comprising, in order from an object side thereof, a first lens group which is movable along an optical axis of said zoom lens system during zooming and has positive refracting power, a second lens group having negative refracting power, wherein a spacing between the first lens group and the second lens group becomes wide upon zooming from an wide-angle end to a telephoto end of said zoom lens and at least two rear lens groups which are located subsequent to said second lens group and have a spacing variable during zooming, wherein focusing is effected by any one of subgroups located nearer to an image side of said rear lens group than a positive subgroup of subgroups having negative magnification, said positive subgroup located nearest to an object side of said rear lens group, and the following condition is satisfied with respect to a magnification $\beta_{RRW}$ of said positive subgroup located nearest to the image side of said rear lens group when said zoom lens system is focused at said wide-angle end on an object point at infinity:

$$-0.4 < \beta_{RRW} < -0.9 \qquad (8).$$

6. A zoom lens system comprising, in order from an object side thereof, a first lens group which is movable along an optical axis of said zoom lens system during zooming and has positive refracting power, a second lens group having negative refracting power, wherein a spacing between the first lens group and the second lens group becomes wide upon zooming from an wide-angle end to a telephoto end of said zoom lens and a rear lens group having at least two movable subgroups and comprising a total of 6 to 11 lens elements inclusive, wherein the following conditions are satisfied with respect to an amount of movement $\Delta_{zRF}$ of a subgroup of said subgroups in said rear lens group, said subgroup having positive refracting power and located nearest to an object side of said rear lens group, from said wide-angle end to said telephoto end when said zoom lens system is focused on an object point at infinity and an amount of movement $\Delta_{zRR}$ of a positive subgroup located nearest to an image side of said rear lens group when said zoom lens system is focused on an object point at infinity:

$$-0.4 < \Delta_{zRR}/\Delta_{zRF} < 0.8 \qquad (9)$$

$$0.3 < |\Delta_{zRF}|/L < 4.0 \qquad (10)$$

where L is a diagonal length of an effective image pickup surface located in the vicinity of an image-formation plane.

7. The zoom lens system according to claim 1, wherein said subgroup located nearest to said object side of said rear lens group has negative magnification.

8. The zoom lens system according to claim 1, which comprises a zoom zone including a field angle $2\omega = 70°$ at which phototaking is possible.

9. The zoom lens system according to claim 1, wherein the following condition is satisfied with respect to a back focus $F_{Bw}$ (as calculated on an air basis) of said zoom lens system when focused at said wide-angle end on an object point at infinity:

$$2.0 < F_{BW}/f_W < 5.0 \qquad (12)$$

where $f_W$ is a composite focal length of said zoom lens system when focused at said wide-angle end on an object point at infinity.

10. The zoom lens system according to claim 1, wherein the following condition is satisfied with respect to a minimum F-number $F_w$ of said zoom lens system when focused at said wide-angle end on an object point at infinity:

$$1.4 < F_W < 3.5 \qquad (13).$$

11. The zoom lens system according to claim 1, wherein the following condition is satisfied with respect to an entrance pupil position ENP of said zoom lens system at said wide-angle end:

$$2 < ENP/L < 5 \qquad (14).$$

where L is a diagonal length of an effective image pickup surface located in the vicinity of an image-formation plane.

12. The zoom lens system according to claim 1, which is used as an image-formation optical system for a phototaking system (a camera, a video movie, etc.) having an image pickup device having a pixel interval [] given by $$1.0 \times 10^{-4} \times L < a < 6.0 \times 10^{-4} \times L \text{ (mm)}$$

where L is a diagonal length of an effective image pickup surface located in the vicinity of an image-formation plane.

13. An image pickup system comprising an image pickup device located in the vicinity of an image-formation plane of a zoom lens system as recited in any one of claims 1 to 6.

14. The image pickup system according to claim 13, wherein an electronic image pickup device is used as said image pickup device and a low-pass filter is located between said zoom lens system and said electronic image pickup device.

15. The zoom lens system according to any one of claims 1, to 6, wherein the second lens group comprises, in order from an object side thereof, a first negative lens, a second negative lens, a third positive lens, a fourth lens and a fifth lens.

16. The zoom lens system according to claim 15, wherein the fourth lens and the fifth lens each consists of a positive lens element and a negative lens element.

17. The zoom lens system according to any one of claims 1 to 6, wherein the first lens group, the second lens group, and the third lens group each includes at least one cemented lens.

18. The zoom lens system according to claim 17, wherein the cemented lens in the second lens group consists of a positive lens element and a negative lens element, which are cemented together.

19. The zoom lens system according to any one of claims 1 to 6, which consists of sixteen lens elements.

* * * * *